United States Patent
Han et al.

(10) Patent No.: US 12,242,389 B2
(45) Date of Patent: Mar. 4, 2025

(54) APPLICATION-LEVEL MEMORY CONTROL GROUP MEMORY RECLAMATION

(71) Applicant: Huawei Device Co., Ltd., Guangdong (CN)

(72) Inventors: Wei Han, Shanghai (CN); Chang Xie, Shanghai (CN); Qinxu Pan, Shanghai (CN); Jian Chen, Shanghai (CN); Qiang Gao, Xi'an (CN); Song Liu, Xi'an (CN); Jinxuan Fang, Shanghai (CN); Yuanfeng Hu, Shanghai (CN); Xiangbing Tang, Shanghai (CN); Weilai Zhou, Shanghai (CN); Cai Sun, Shanghai (CN); Zuoyu Wu, Saint Petersburg (RU); Qing Xia, Shanghai (CN); Wei Du, Shanghai (CN); Biao He, Shanghai (CN); Fa Wang, Shanghai (CN); Chengke Wang, Hangzhou (CN); Ziyue Luo, Dongguan (CN); Zongfeng Li, Shanghai (CN); Xu Wang, Shanghai (CN); Xiyu Zhou, Shanghai (CN); Yu Liu, Shanghai (CN); Tao Li, Shanghai (CN); Long Jin, Dongguan (CN); Di Fang, Suzhou (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 15 days.

(21) Appl. No.: 18/251,157

(22) PCT Filed: Oct. 26, 2021

(86) PCT No.: PCT/CN2021/126523
§ 371 (c)(1),
(2) Date: Apr. 28, 2023

(87) PCT Pub. No.: WO2022/089452
PCT Pub. Date: May 5, 2022

(65) Prior Publication Data
US 2024/0054079 A1   Feb. 15, 2024

(30) Foreign Application Priority Data

Oct. 31, 2020 (CN) .......................... 202011197410.1
Oct. 31, 2020 (CN) .......................... 202011197416.9
(Continued)

(51) Int. Cl.
*G06F 12/123*  (2016.01)
*G06F 12/02*   (2006.01)
*G06F 12/0882* (2016.01)

(52) U.S. Cl.
CPC ........ *G06F 12/123* (2013.01); *G06F 12/0253* (2013.01); *G06F 12/0882* (2013.01)

(58) Field of Classification Search
CPC ................. G06F 12/0253; G06F 12/08; G06F 12/0882; G06F 12/123; G06F 12/144;
(Continued)

(56) References Cited

U.S. PATENT DOCUMENTS

| 10,228,868 B1 | 3/2019 | Liang et al. |
| 2009/0063915 A1* | 3/2009 | Panther ................. G06F 12/121 711/170 |

(Continued)

FOREIGN PATENT DOCUMENTS

| CN | 104375899 A | 2/2015 |
| CN | 108205501 A | 6/2018 |

(Continued)

OTHER PUBLICATIONS

"Huawei OceanStor Dorado V3 All-Flash Storage Systems Technical White Paper," May 31, 2019, 97 pages, XP093106789.

*Primary Examiner* — Jane W Benner
(74) *Attorney, Agent, or Firm* — Conley Rose, P.C.

(57) ABSTRACT

An application-level memory control group of a first application may be created when the first application is opened. An anonymous page of the first application is added to a least recently used linked list of the application-level memory control group, and a file page of the first application is added to a global least recently used linked list. An application-level memory control group is created in a
(Continued)

dimension of an application, and an anonymous page of the application is managed in a refined manner. In addition, a file page of the application-level memory control group may be managed based on a global least recently used linked list.

20 Claims, 72 Drawing Sheets

(30) Foreign Application Priority Data

| Nov. 30, 2020 | (CN) | 202011381223.9 |
| Nov. 30, 2020 | (CN) | 202011381363.6 |
| Nov. 30, 2020 | (CN) | 202011381379.7 |
| Dec. 1, 2020 | (CN) | 202011385387.9 |
| Dec. 23, 2020 | (CN) | 202011540521.8 |
| Dec. 30, 2020 | (CN) | 202011628747.3 |

(58) Field of Classification Search
    CPC ............ G06F 12/1483; G06F 12/1491; G06F 2212/1032; G06F 2212/1044
    See application file for complete search history.

(56) References Cited

U.S. PATENT DOCUMENTS

| 2011/0066808 A1 | 3/2011 | Flynn et al. |
| 2014/0189267 A1 | 7/2014 | Qi et al. |
| 2017/0322736 A1* | 11/2017 | Kimberly ............ G06F 12/0246 |
| 2018/0307600 A1* | 10/2018 | Wang ...................... G06F 12/02 |
| 2018/0364947 A1 | 12/2018 | Jean |
| 2019/0220391 A1 | 7/2019 | Simak et al. |
| 2020/0014531 A1* | 1/2020 | Falco .................. H04L 63/0884 |
| 2024/0054079 A1 | 2/2024 | Han et al. |

FOREIGN PATENT DOCUMENTS

| CN | 108287761 A | 7/2018 |
| CN | 108664411 A | 10/2018 |
| CN | 110532197 A | 12/2019 |
| CN | 111831441 A | 10/2020 |
| CN | 114443268 A | 5/2022 |

* cited by examiner

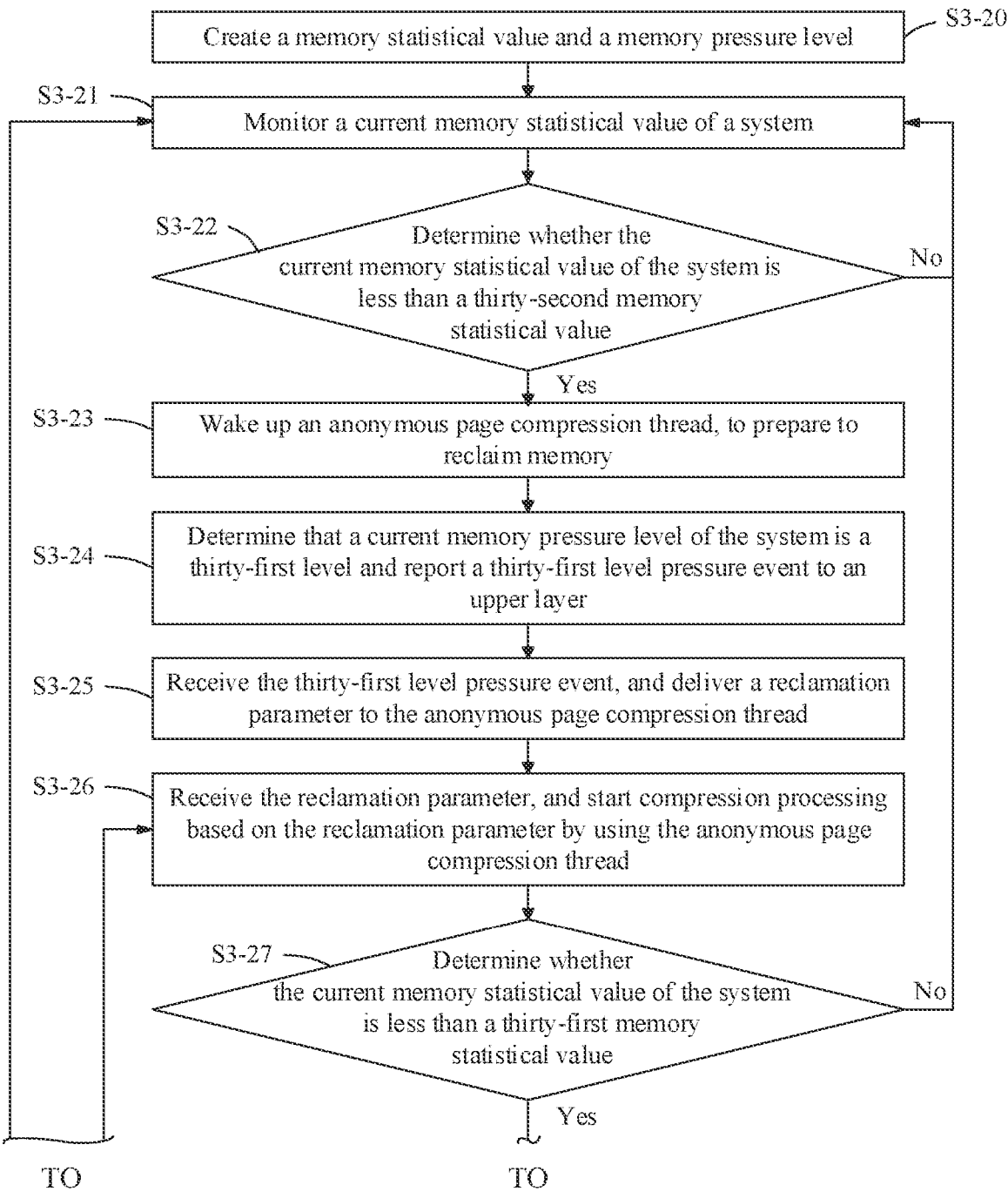
FIG. 3-2a(1)

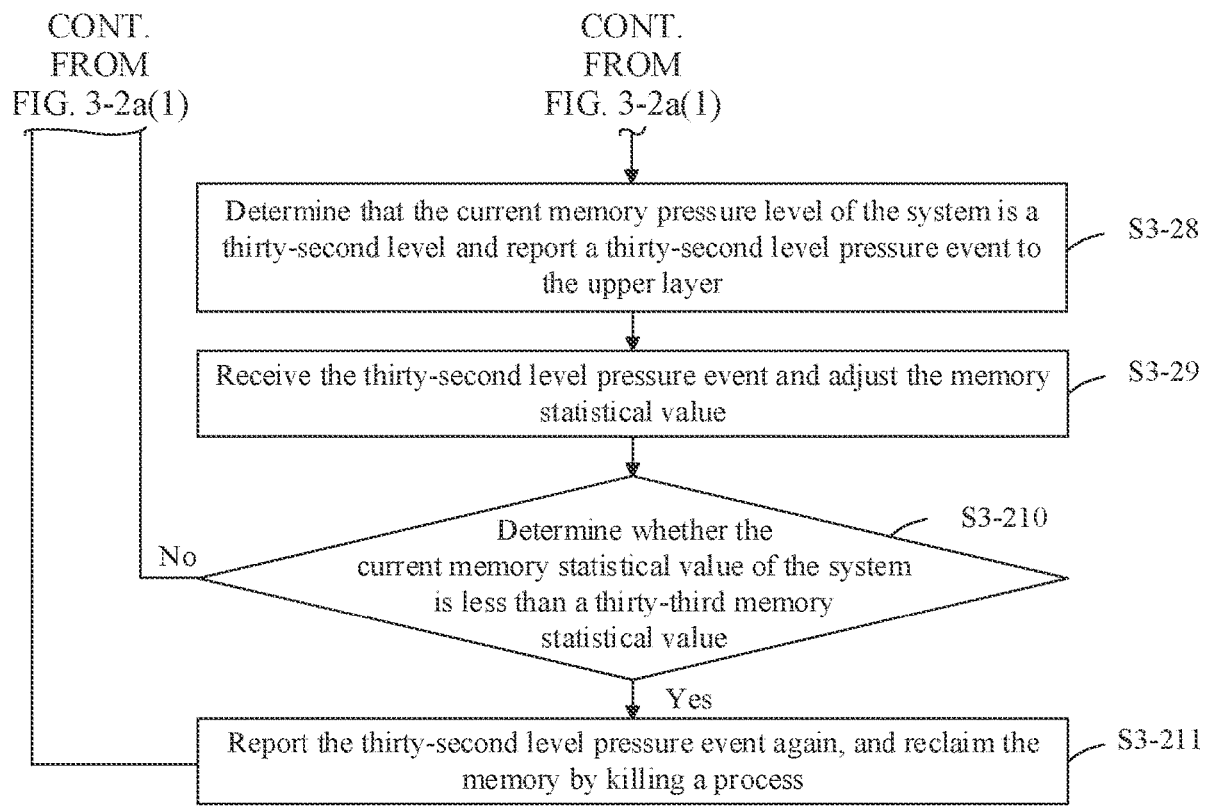
FIG. 3-2a(2)

CONT. FROM

APPLICATION-LEVEL MEMORY CONTROL GROUP MEMORY RECLAMATION

This application claims priority to Chinese Patent Application No. 202011381363.6, filed with the China National Intellectual Property Administration on Nov. 30, 2020 and entitled "MEMORY MANAGEMENT METHOD AND APPARATUS, ELECTRONIC DEVICE, AND COMPUTER-READABLE STORAGE MEDIUM", claims priority to Chinese Patent Application No. 202011381379.7, filed with the China National Intellectual Property Administration on Nov. 30, 2020 and entitled "MEMORY MANAGEMENT METHOD AND APPARATUS, ELECTRONIC DEVICE, AND COMPUTER-READABLE STORAGE MEDIUM", claims priority to Chinese Patent Application No. 202011381223.9, filed with the China National Intellectual Property Administration on Nov. 30, 2020 and entitled "MEMORY MANAGEMENT METHOD AND APPARATUS, ELECTRONIC DEVICE, AND COMPUTER-READABLE STORAGE MEDIUM", claims priority to Chinese Patent Application No. 202011385387.9, filed with the China National Intellectual Property Administration on Dec. 1, 2020 and entitled "ANONYMOUS PAGE MANAGEMENT METHOD AND APPARATUS, ELECTRONIC DEVICE, MEDIUM, AND PROGRAM PRODUCT", claims priority to Chinese Patent Application No. 202011540521.8, filed with the China National Intellectual Property Administration on Dec. 23, 2020 and entitled "LIFE CONTROL METHOD FOR UFS DEVICE BASED ON LIFE PREDICTION", claims priority to Chinese Patent Application No. 202011197410.1, filed with the China National Intellectual Property Administration on Oct. 31, 2020 and entitled "MEMORY MANAGEMENT METHOD AND ELECTRONIC DEVICE", claims priority to Chinese Patent Application No. 202011197416.9, filed with the China National Intellectual Property Administration on Oct. 31, 2020 and entitled "MEMORY MANAGEMENT METHOD AND DEVICE", and claims priority to Chinese patent application No. 202011628747.3, filed with the China National Intellectual Property Administration on Dec. 30, 2020 and entitled "MEMORY MANAGEMENT METHOD AND APPARATUS, ELECTRONIC DEVICE, AND COMPUTER-READABLE STORAGE MEDIUM", which are incorporated herein by reference in their entireties.

TECHNICAL FIELD

Embodiments of this application relate to the field of computer technologies, and in particular, to a memory management method and apparatus, an electronic device, and a computer-readable storage medium.

BACKGROUND

With development of terminal technologies, terminal devices become indispensable items in people's daily life. However, in a process of using a terminal device, as a quantity of opened applications increases, increasingly more processes run, and increasingly more memory is occupied. As a result, available memory of a system decreases, a problem of out of memory occurs, and consequently frame freezing in the terminal device occurs.

SUMMARY

Embodiments of this application provide a memory management method and apparatus, an electronic device, and a computer-readable storage medium, to manage memory of the electronic device, so as to improve memory reclamation efficiency, reduce system freezing, and improve user experience.

According to a first aspect, an embodiment of this application provides a memory management method. The memory management method includes:

creating an application-level memory control group of a first application when the first application is opened; adding an anonymous page of the first application to a least recently used linked list of the application-level memory control group, and reclaiming the anonymous page based on the least recently used linked list; and adding a file page of the first application to a global least recently used linked list of a memory node, and reclaiming the file page based on the global least recently used linked list. According to the memory management method provided in this embodiment of this application, the corresponding application-level memory control group is created for the first application, the anonymous page of the first application is added to the corresponding application-level memory control group, and the file page of the first application is added to the global least recently used linked list. In this way, not only the anonymous page can be managed in a refined manner, but also memory reclamation efficiency is not affected, to reduce system freezing and improve user experience.

With reference to the first aspect, in a possible design, the memory management method further includes: managing the anonymous page of the first application based on the application-level memory control group; and/or controlling a reclamation rank of the anonymous page based on a status of the first application; and/or controlling a reclamation proportion of the anonymous page based on the application-level memory control group, where the reclamation proportion of the anonymous page is a proportion of a quantity of to-be-reclaimed anonymous pages in the first application to a total quantity of anonymous pages in the first application; and/or controlling memory usage of the first application managed by the application-level memory control group. Based on the foregoing design, in this embodiment of this application, an anonymous page of an application can be managed based on the application-level memory control group, for example, memory reclamation and release can be managed, to improve user experience.

With reference to the first aspect, in a possible design, the memory management method further includes: determining the reclamation rank of the anonymous page of the first application based on a frozen state and/or an active state and/or a foreground state of the first application. Therefore, in this embodiment of this application, an anonymous page of an application can be managed based on the application-level memory control group, for example, memory reclamation and release can be managed, to improve user experience.

With reference to the first aspect, in a possible design, the creating an application-level memory control group of a first application when the first application is opened further includes: creating, when a first process of the first application is started, based on an application identifier corresponding to the first process, the application-level memory control group corresponding to the first application. Based on this design, each application has one application identifier, which may be used to uniquely identify the application. Therefore, when the first application is opened, a corresponding application-level memory control group may be created based on an application identifier, and therefore the corresponding application-level memory control group is created in a dimension of an application, to improve memory reclamation efficiency.

With reference to the first aspect, in a possible design, the creating, when a first process of the first application is started, based on an application identifier corresponding to the first process, the application-level memory control group corresponding to the first application further includes: if a memory control group corresponding to the application identifier corresponding to the first process does not exist, creating the application-level memory control group corresponding to the first application. Based on this design, system freezing can be reduced and user experience can be improved.

With reference to the first aspect, in a possible design, if a memory control group corresponding to the application identifier exists, the first process is added to the application-level memory control group, and the first process is managed based on the application-level memory control group. Based on this design, when the first process of the application is started, the anonymous page obtained by the first process through application may be added to the application-level memory control group, and the file page obtained by the first process through application may be added to the global least recently used linked list. Therefore, in the foregoing design, memory may be reclaimed in a targeted manner, to improve memory reclamation efficiency.

With reference to the first aspect, in a possible design, the memory management method further includes: creating a corresponding memory control group based on a whitelist when the electronic device is started; and when a system process is started, determining, based on a process name of the system process, whether the system process is a whitelist process; and if the system process is the whitelist process, adding the whitelist process to the memory control group. In this design, a problem that user experience is affected because a system mistakenly reclaims the system process.

With reference to the first aspect, in a possible design, the memory management method further includes: adding an anonymous page of the whitelist process to a least recently used linked list of the memory control group; and reclaiming the anonymous pages of the whitelist process based on the least recently used linked list. In this design, a problem that user experience is affected because a system mistakenly reclaims the system process.

With reference to the first aspect, in a possible design, the memory management method further includes: adding a file page of the whitelist process to the global least recently used linked list of the memory node; and reclaiming the file page of the whitelist process based on the global least recently used linked list. In this design, a problem that user experience is affected because a system mistakenly reclaims the system process.

In a possible design, the memory management method further includes: when a second process of the first application is started, adding an anonymous page of the second process to the least recently used linked list of the application-level memory control group, and adding a file page of the second process to the global least recently used linked list. Therefore, in the foregoing design, memory may be reclaimed in a targeted manner, to improve memory reclamation efficiency.

In a possible design, the memory management method further includes: deleting the first process and/or the second process from the application-level memory control group when the first process and/or the second process are/is destroyed. Based on this design, when a process is destroyed, the process is deleted from the memory control group, so that an anonymous page and a file page of the process are released, to improve smoothness of an operating system and avoid frame freezing in the electronic device.

In a possible design, the memory management method further includes: deleting the application-level memory control group when the first application is destroyed. Based on this design, an anonymous page of the process may be deleted from the least recently used linked list of the application-level memory control group and released, and a file page of the process may be deleted from the global least recently used linked list and released, to improve smoothness of an operating system and avoid frame freezing in the electronic device.

In a possible design, the memory management method further includes: adding the anonymous page to an active least recently used linked list of the application-level memory control group when the first application obtains the anonymous page through application; and adding the file page to a global active least recently used linked list when the first application obtains the file page through application. Therefore, in the foregoing design, memory may be reclaimed in a targeted manner, to improve memory reclamation efficiency.

According to a second aspect, an embodiment of this application further provides a memory management apparatus. The memory management apparatus includes:
 a creating module, configured to create an application-level memory control group of a first application when the first application is opened; and
 a control module, configured to: add an anonymous page of the first application to a least recently used linked list of the memory control group, and reclaim the anonymous page based on the least recently used linked list, where the control module is further configured to: add a file page of the first application to a global least recently used linked list, and reclaim the file page based on the global least recently used linked list. According to the memory management apparatus provided in this embodiment of this application, the creating module creates the corresponding application-level memory control group for the first application, and the control module adds the anonymous page of the first application to the corresponding application-level memory control group, and adds the file page of the first application to the global least recently used linked list. In this way, not only the anonymous page can be managed in a refined manner, but also memory reclamation efficiency is not affected, to reduce system freezing and improve user experience.

With reference to the second aspect, in a possible design, the memory management apparatus further includes a management module. The management module is further configured to: manage the anonymous page of the first application based on the application-level memory control group; and/or control a reclamation rank of the anonymous page based on a status of the first application; and/or control a reclamation proportion of the anonymous page based on the application-level memory control group, where the reclamation proportion of the anonymous page is a proportion of a quantity of to-be-reclaimed anonymous pages in the first application to a total quantity of anonymous pages in the first application; and/or control memory usage of the application-level memory control group. Based on this design, memory reclamation efficiency can be improved, system freezing can be reduced, and user experience can be improved.

With reference to the second aspect, in a possible design, the creating module may be further configured to create, when a first process of the first application is started, based on an application identifier corresponding to the first process, the application-level memory control group corresponding to the first application. Based on this design, each application has one application identifier, which may be used to uniquely identify the application. Therefore, the creating module may create the corresponding application-level memory control group based on the application identifier when the first application is opened, and therefore the corresponding application-level memory control group is created in a dimension of an application, to improve memory reclamation efficiency.

With reference to the second aspect, in a possible design, the creating module is further configured to: when a memory control group corresponding to the application identifier corresponding to the first process does not exist, create the application-level memory control group corresponding to the first application. Therefore, in the foregoing design, memory may be reclaimed in a targeted manner, to improve memory reclamation efficiency.

With reference to the second aspect, in a possible design, the control module is configured to add the first process to the application-level memory control group when a memory control group corresponding to the application identifier exists; and the management module is further configured to manage the first process based on the application-level memory control group. Based on this design, memory reclamation efficiency can be improved, system freezing can be reduced, and user experience can be improved.

In a possible design, the management module is configured to delete the first process from the application-level memory control group when the first process is destroyed. Based on this design, when a process is destroyed, the process is deleted from the memory control group, so that an anonymous page and a file page of the process are released, to improve smoothness of an operating system and avoid frame freezing in the electronic device.

In a possible design, the management module is further configured to delete the application-level memory control group when the first application is destroyed. Based on this design, an anonymous page of the process is deleted from the least recently used linked list of the first memory control group and released, and a file page of the process is deleted from the global least recently used linked list and released, to improve smoothness of an operating system and avoid frame freezing in the electronic device.

In some possible designs, the control module is configured to add the anonymous page to an active least recently used linked list of the application-level memory control group when the first application obtains the anonymous page through application; and the control module is configured to add the file page to a global active least recently used linked list when the first application obtains the file page through application. Therefore, in the foregoing design, memory may be reclaimed in a targeted manner, to improve memory reclamation efficiency.

According to a third aspect, an embodiment of this application further provides an electronic device. The electronic device includes:
 a memory, configured to store a computer program; and
 a processor, configured to execute the computer program stored in the memory, where when the computer program is executed, the processor is configured to perform the foregoing memory management method.

Based on the foregoing design, the corresponding memory control group is created for the first application, the anonymous page of the first application is added to the corresponding memory control group, and the file page of the first application is added to the global least recently used linked list. In this way, not only the anonymous page can be managed in a refined manner, but also memory reclamation efficiency is not affected, to reduce system freezing and improve user experience.

According to a fourth aspect, an embodiment of this application further provides a computer-readable storage medium. The computer-readable storage medium includes computer instructions, and when the computer instructions are run on an electronic device, the electronic device is enabled to perform the foregoing memory management method.

In the foregoing embodiment of this application, the corresponding application-level memory control group is created for the first application, the anonymous page of the first application is added to the corresponding application-level memory control group, and the file page of the first application is added to the global least recently used linked list. In this way, not only the anonymous page can be managed in a refined manner, but also memory reclamation efficiency is not affected, to reduce system freezing and improve user experience.

Embodiments of this application provide a memory management method and apparatus, an electronic device, and a computer-readable storage medium, to manage memory of the electronic device, so as to improve memory reclamation efficiency, expand equivalent memory, improve smoothness of an operating system, avoid frame freezing in the electronic device, and improve user experience.

According to a fifth aspect, an embodiment of this application provides a memory management method. The memory management method includes:
 creating a tenth memory control group of a tenth application and an eleventh memory control group of an eleventh application; setting an important score of the tenth memory control group; setting an important score of the eleventh memory control group; sorting, by a memory control group linked list, the tenth memory control group and the eleventh memory control group based on the important scores of the tenth memory control group and the eleventh memory control group; and performing memory reclamation on the tenth memory control group and the eleventh memory control group based on a sequence of the tenth memory control group and the eleventh memory control group in the memory control group linked list.

According to the memory management method provided in this embodiment of this application, the important scores of the tenth memory control group and the eleventh memory control group may be updated based on statuses of the tenth application and the eleventh application, and the memory control group linked list may sort the tenth memory control group and the eleventh memory control group based on the important scores of the memory control groups. Therefore, a reclamation mechanism performs memory reclamation on the tenth memory control group and the eleventh memory control group based on the sequence of the tenth memory control group and the eleventh memory control group in the memory control group linked list. In this embodiment of this application, a reclamation sequence of the memory control group of the tenth application and the eleventh memory control group of the eleventh application can be adjusted based on a running status of an application, to improve memory reclamation efficiency, expand equivalent memory, improve smoothness of an operating system, avoid frame freezing in an electronic device, and improve user experience.

With reference to the fifth aspect, in a possible design, the important score of the tenth memory control group is set based on a status of the tenth application, and the important score of the eleventh memory control group is set based on a status of the eleventh application. Based on the foregoing design, an important score system of a corresponding memory control group may be adjusted based on a running status of an application, to improve user experience.

With reference to the fifth aspect, in a possible design, when memory reclamation is performed, memory compression is performed on the tenth memory control group based on a compression ratio, and compressed data is placed into a swap area; and memory compression is performed on the eleventh memory control group based on a compression ratio, and compressed data is placed into the swap area. Based on this design, memory reclamation efficiency can be improved, to improve smoothness of an operating system, avoid frame freezing in an electronic device, and improve user experience.

With reference to the fifth aspect, in a possible design, memory compression is performed on the tenth memory control group based on the compression ratio, and the compressed data is placed into the swap area. Based on this design, memory compression may be performed on the memory control group based on a preset compression ratio, so that memory reclamation is more targeted and accurate, and memory reclamation efficiency can be improved.

With reference to the fifth aspect, in a possible design, if an amount of data in the swap area reaches a preset watermark, the data in the tenth memory control group is swapped from the swap area to an external storage based on a swap-out ratio; and if the amount of data in the swap area reaches the preset watermark, the data in the eleventh memory control group is swapped from the swap area to the external storage based on a swap-out ratio. Based on this design, data may be swapped from the swap area to the external storage based on a preset swap-out ratio, so that memory reclamation is more targeted and accurate, and memory reclamation efficiency can be improved.

With reference to the fifth aspect, in a possible design, the compression ratio and/or the swap-out ratio of the tenth memory control group are/is set based on a status of the tenth application; and the compression ratio and/or the swap-out ratio of the eleventh memory control group are/is set based on a status of the eleventh application. In this embodiment of this application, when the status of the tenth application changes, the important score, the compression ratio, and the swap-out ratio of the tenth memory control group change accordingly, and a reclamation sequence of the memory control groups of the applications may be adjusted based on a running status of the tenth application, to improve memory reclamation efficiency, improve smoothness of an operating system, avoid frame freezing in an electronic device, and improve user experience.

With reference to the fifth aspect, in a possible design, a compression sequence and a swap-out sequence of the tenth memory control group and the eleventh memory control group are controlled based on the sequence of the tenth memory control group and the eleventh memory control group in the memory control group linked list. Based on this design, in a memory reclamation process, a sequence of the important scores of the memory control groups is an application compression and swap-out sequence, to improve memory reclamation efficiency, improve smoothness of an operating system, avoid frame freezing in an electronic device, and improve user experience.

With reference to the fifth aspect, in a possible design, if a compression amount ratio of the tenth application reaches the compression ratio, compression on the tenth application is terminated, and compression continues to be performed based on a sequence of memory control groups in the memory control group linked list. Based on this design, memory reclamation efficiency can be improved, to improve smoothness of an operating system, avoid frame freezing in an electronic device, and improve user experience.

With reference to the fifth aspect, in a possible design, if a swap-out amount ratio of the tenth application reaches the swap-out ratio, swap-out on the tenth application is terminated, and swap-out continues to be performed based on the sequence of the memory control groups in the memory control group linked list. Based on this design, equivalent memory is expanded and user experience is improved.

With reference to the fifth aspect, in a possible design, when the tenth application is opened, the tenth memory control group of the tenth application is created, and the important score of the tenth memory control group is set to a tenth preset value. Based on the foregoing design, memory reclamation efficiency can be improved, to improve smoothness of an operating system, avoid frame freezing in an electronic device, and improve user experience.

With reference to the fifth aspect, in a possible design, the eleventh memory control group of the eleventh application is created when the eleventh application is opened. Based on the foregoing design, memory reclamation efficiency can be improved, to improve smoothness of an operating system, avoid frame freezing in an electronic device, and improve user experience.

With reference to the fifth aspect, in a possible design, when the tenth application runs in the foreground, the important score of the tenth memory control group is set to a foreground default value; when the tenth application is in an unfrozen state, the important score of the tenth memory control group is set to an important score existing before the tenth application is in a frozen state, when the tenth application is in an active state, the important score of the tenth memory control group is adjusted based on an active time ratio and a use frequency of the tenth application; or when the tenth application is in a frozen state, the important score of the tenth memory control group is adjusted based on a quantity of freezing and unfreezing times and memory usage of the tenth application. In this embodiment of this application, when the status of the tenth application changes, the important score, the compression ratio, and the swap-out ratio of the tenth memory control group change accordingly, and a reclamation sequence of the memory control groups of the applications may be adjusted based on a running status of the tenth application, to improve memory reclamation efficiency, improve smoothness of an operating system, avoid frame freezing in an electronic device, and improve user experience.

With reference to the fifth aspect, in a possible design, if a compression amount ratio of the tenth application reaches a tenth compression ratio, compression on the tenth application is terminated, and a next application in the memory control group linked list is selected for compression. Based on the foregoing design, a proper compression amount is set for each application, so that memory reclamation efficiency can be effectively improved.

According to a sixth aspect, an embodiment of this application further provides a memory management apparatus. The memory management apparatus includes:

- a creating module, where the creating module is configured to create a tenth memory control group of a tenth application and an eleventh memory control group of an eleventh application;
- a control module, where the control module is configured to set an important score of the tenth memory control group and an importance score of the eleventh memory control group, where
- the control module is further configured to control a memory control group linked list to sort the tenth memory control group and the eleventh memory control group based on the important scores of the tenth memory control group and the eleventh memory control group; and
- a reclamation module, where the reclamation module is configured to perform memory reclamation on the tenth memory control group and the eleventh memory control group based on a sequence of the tenth memory control group and the eleventh memory control group in the memory control group linked list.

According to the memory management apparatus provided in this embodiment of this application, the control module may set the important score of the tenth memory control group and the important score of the eleventh memory control group, and the memory control group linked list may sort a plurality of memory control groups based on important scores of the memory control groups. Therefore, the reclamation module may perform memory reclamation on the tenth memory control group and the eleventh memory control group based on the sequence of the tenth memory control group and the eleventh memory control group in the memory control group linked list. In this embodiment of this application, a reclamation sequence of memory control groups of applications can be adjusted based on a running status of an application, to improve memory reclamation efficiency, expand equivalent memory, improve smoothness of an operating system, avoid frame freeing in an electronic device, and improve user experience.

With reference to the sixth aspect, in some possible designs, the control module is further configured to set the important score of the tenth memory control group based on a status of the tenth application. The control module is further configured to set the important score of the eleventh memory control group based on a status of the eleventh application. Based on this design, an important score system of a corresponding memory control group may be adjusted based on a running status of an application, to improve user experience.

With reference to the sixth aspect, in some possible designs, the reclamation module is further configured to: perform memory compression on the tenth memory control group based on a compression ratio, and place compressed data into a swap area; and the reclamation module is further configured to: perform memory compression on the eleventh memory control group based on a compression ratio, and place compressed data into the swap area. Based on this design, reclamation mechanism may perform memory compression on the memory control group based on the compression ratio, so that memory reclamation is more targeted and accurate, and memory reclamation efficiency can be improved.

With reference to the sixth aspect, in some possible designs, the reclamation module is further configured to: when an amount of data in the swap area reaches a preset watermark, swap the data in the tenth memory control group from the swap area to an external storage based on a swap-out ratio; and the reclamation module is further configured to: when the amount of data in the swap area reaches the preset watermark, swap the data in the eleventh memory control group from the swap area to the external storage based on a swap-out ratio. Based on this design, a reclamation mechanism may swap data from the swap area to the external storage based on a preset swap-out ratio, so that memory reclamation is more targeted and accurate, and memory reclamation efficiency can be improved.

With reference to the sixth aspect, in some possible designs, the reclamation module is further configured to control a compression sequence and a swap-out sequence of the tenth memory control group and the eleventh memory control group based on the sequence of the tenth memory control group and the eleventh memory control group in the memory control group linked list. Based on the foregoing design, memory reclamation efficiency can be improved, to improve smoothness of an operating system, avoid frame freezing in an electronic device, and improve user experience.

With reference to the sixth aspect, in some possible designs, when the status of the tenth application changes, the control module updates the important score and/or a compression ratio and/or a swap-out ratio of the tenth memory control group of the tenth application. In this embodiment of this application, when the status of the application changes, the important score, the compression ratio, and the swap-out ratio of the memory control group change accordingly, and a reclamation sequence of the memory control groups of the applications may be adjusted based on a running status of the application, to improve memory reclamation efficiency, improve smoothness of an operating system, avoid frame freezing in an electronic device, and improve user experience.

With reference to the sixth aspect, in some possible designs, when the tenth application is in the foreground, the control module sets the important score of the tenth memory control group of the tenth application to a foreground default value; when the tenth application is in an unfrozen state, the control module sets the important score of the tenth memory control group of the tenth application to an important score obtained when the application is active before the tenth application is in a frozen state; when the tenth application is in an active state, the control module adjusts the important score of the tenth memory control group of the tenth application based on an active time ratio and a use frequency of the tenth application; or when the tenth application is in a frozen state, the control module adjusts the important score of the tenth memory control group of the tenth application based on a quantity of freezing and unfreezing times and memory usage of the tenth application. In this embodiment of this application, when the status of the tenth application changes, the important score, the compression ratio, and the swap-out ratio of the tenth memory control group change accordingly, and a reclamation sequence of the memory control groups of the applications may be adjusted based on a running status of the tenth application, to improve memory reclamation efficiency, improve smoothness of an operating system, avoid frame freezing in an electronic device, and improve user experience.

With reference to the sixth aspect, in some possible designs, if a compression amount ratio of the tenth application reaches a tenth compression ratio, the reclamation module terminates compression on the tenth application, and continues to perform compression based on a sequence of memory control groups in the memory control group linked list. Based on the foregoing design, a proper compression amount is set for each application, so that memory reclamation efficiency can be effectively improved.

With reference to the sixth aspect, in some possible designs, the creating module is further configured to create the tenth memory control group of the tenth application when the tenth application is opened. Based on this design, memory reclamation efficiency can be improved, to improve smoothness of an operating system, avoid frame freezing in an electronic device, and improve user experience.

With reference to the sixth aspect, in some possible designs, the creating module is further configured to create the eleventh memory control group of the eleventh application when the eleventh application is opened. Based on the foregoing design, memory reclamation efficiency can be improved, to improve smoothness of an operating system, avoid frame freezing in an electronic device, and improve user experience.

According to a seventh aspect, an embodiment of this application further provides an electronic device. The electronic device includes:
  a memory, configured to store a computer program; and
  a processor, configured to execute the computer program stored in the memory, where when the computer program is executed, the processor is configured to perform the foregoing memory management method.

According to this embodiment of this application, the electronic device may update an important score of a memory control group based on a status of an application, and a memory control group linked list may rank a tenth memory control group based on the important score of the memory control group. Therefore, a reclamation mechanism performs memory reclamation on a plurality of memory control groups based on a sequence of the plurality of memory control groups in the memory control group linked list. The electronic device provided in this embodiment of this application may adjust a reclamation sequence of the plurality of memory control groups based on a running status of an application, to improve memory reclamation efficiency, improve smoothness of an operating system, avoid frame freezing in the electronic device, and improve user experience.

According to an eighth aspect, an embodiment of this application further provides a computer-readable storage medium. The computer-readable storage medium includes computer instructions, and when the computer instructions are run on an electronic device, the electronic device is enabled to perform the foregoing memory management method.

According to this embodiment of this application, an important score of a memory control group may be updated based on a status of an application, and a memory control group linked list may sort a plurality of memory control groups based on the important score of the memory control group. Therefore, a reclamation mechanism performs memory reclamation on the plurality of memory control groups based on a sequence of the plurality of memory control groups in the memory control group linked list. In this embodiment of this application, a reclamation rank of a memory control group of a tenth application can be adjusted based on a running status of an application, to improve memory reclamation efficiency, improve smoothness of an operating system, avoid frame freezing in an electronic device, and improve user experience.

In this embodiment of this application, important scores of a tenth memory control group and an eleventh memory control group are respectively updated based on statuses of the tenth application and an eleventh application. When memory reclamation needs to be performed, the reclamation mechanism performs memory reclamation on the tenth memory control group and the eleventh memory control group based on a sequence of the tenth memory control group and the eleventh memory control group in the memory control group linked list. Therefore, according to the memory management method, the electronic device, and the computer-readable storage medium disclosed in embodiments of this application, memory reclamation efficiency can be improved, equivalent memory can be expanded, frame freezing can be reduced, and user experience can be improved.

Embodiments of this application provide a memory management method and apparatus, an electronic device, and a computer-readable storage medium, to resolve problems that memory management efficiency is low, memory is not supplied in a timely manner, and a quantity of keepalive applications is small.

According to a ninth aspect, this application provides a memory management method, applied to an electronic device. The memory management method includes: creating a memory statistical value, where the memory statistical value is used to represent remaining available memory in system memory of the electronic device, and the available memory includes thirty-first memory and thirty-second memory, where the thirty-first memory is free memory, and the free memory is memory that is not used by a system; the thirty-second memory is occupied memory that can be converted into the thirty-first memory through reclamation; and the memory statistical value includes a thirty-first memory statistical value and a thirty-second memory statistical value, and the thirty-first memory statistical value is greater than the thirty-second memory statistical value; when a current memory statistical value of the system is less than the thirty-second memory statistical value, starting anonymous page compression to reclaim the thirty-second memory; and decreasing the memory statistical value when the current memory statistical value of the system is less than the thirty-first memory statistical value after anonymous page compression. According to the method provided in this embodiment of this application, new available memory is created. The available memory can more effectively reflect an available memory supply capability, and more effectively reflect a memory pressure status. In addition, based on a multi-level memory statistical value, the multi-level memory statistical value can be maintained through anonymous page compression. Setting the multi-level memory statistical value can maintain a large memory statistical value when memory pressure is low, and can avoid low-efficiency reclamation or idleness caused by frequent anonymous page compression when memory pressure is high. In this way, long-term stability of the memory statistical value can be efficiently maintained and a quantity of keepalive applications can be increased based on the memory pressure.

In a possible design, the memory statistical value further includes a thirty-third memory statistical value, and the thirty-third memory statistical value is less than the thirty-second memory statistical value; and the method further includes: when the memory statistical value is decreased and the current memory statistical value of the system is less than the thirty-third memory statistical value, reclaiming the thirty-second memory by killing a process, to convert the thirty-second memory into the thirty-first memory until the current memory statistical value of the system is not less than the thirty-third memory statistical value. Therefore, different memory reclamation manners are used in different scenarios, to effectively improve memory reclamation efficiency and provide memory in a timely manner.

In a possible design, the method further includes: monitoring space usage of a swap area; and reclaiming, when current space usage of the swap area reaches a preset proportion, the thirty-second memory by killing a process, to convert the thirty-second memory into the thirty-first memory. In this design, when space usage of the swap area reaches the preset proportion when anonymous page compression is started, it is difficult to continue to reclaim memory through anonymous page compression for the memory statistical value. In this case, the memory may be reclaimed by directly killing a process. Therefore, different memory reclamation manners are used in different scenarios, to effectively improve memory reclamation efficiency and provide memory in a timely manner.

In a possible design, the starting anonymous page compression to reclaim the thirty-second memory, so as to convert the thirty-second memory into the thirty-first memory includes: determining that a current memory pressure level of the system is a thirty-first level and reporting a thirty-first level pressure event; and starting anonymous page compression based on the thirty-first level pressure event to reclaim the thirty-second memory, so as to convert the thirty-second memory into the thirty-first memory. The decreasing the memory statistical value when the current memory statistical value of the system is less than the thirty-first memory statistical value after anonymous page compression includes: determining that the current memory pressure level of the system is a thirty-second level and reporting a thirty-second level pressure event; and decreasing the memory statistical value based on the thirty-second level pressure event. The reclaiming, when current space usage of the swap area reaches a preset proportion, the thirty-second memory by killing a process, to convert the thirty-second memory into the thirty-first memory includes: determining that the current memory pressure level of the system is a thirty-third level and reporting a thirty-third level pressure event; and reclaiming the thirty-second memory based on the thirty-third level pressure event by killing the process, to convert the thirty-second memory into the thirty-first memory, where memory pressure of the thirty-third level is higher than memory pressure of the thirty-second level, and the memory pressure of the thirty-second level is higher than memory pressure of the thirty-first level. It is clear that, in this design, different pressure events may be reported by determining the current memory level of the system, and different memory reclamation policies are used based on the different pressure events. That is, different memory reclamation manners are used in different scenarios, to effectively improve memory reclamation efficiency and provide memory in a timely manner.

In a possible design, the memory statistical value further includes a thirty-fourth memory statistical value, and the method further includes: reporting a pressure stall information (PSI) pressure value when a current PSI value of the system is greater than a preset threshold; and when the PSI pressure value is received and it is determined that the current memory statistical value of the system is less than the thirty-fourth memory statistical value, reclaiming the thirty-second memory by killing the process, to convert the thirty-second memory into the thirty-first memory. In this design, usually, when a large-memory application (for example, Camera) is opened, a large amount of memory is consumed in a short period of time, and a memory statistical value is decreased. In this case, memory is reclaimed through anonymous page compression. However, a process of decreasing the memory statistical value to the thirty-third memory statistical value may be slow for camera opening. Therefore, in addition to a kill process triggered by opening of the large-memory application, PSI pressure reporting is a good supplement. When the memory statistical value has a decreasing trend, memory is also reclaimed in a timely manner by killing the process.

In a possible design, the method further includes: detecting whether a preset application is opened; and when detecting that the preset application is opened and the current memory statistical value of the system is less than the thirty-first memory statistical value, reclaiming the thirty-second memory by killing the process, to convert the thirty-second memory into the thirty-first memory. In this design, if a memory requirement of an application is too high and PSI pressure reporting is still delayed, memory cannot be reclaimed in a timely manner by killing the process. Therefore, in an opening scenario of an application that requires large memory, for example, Camera is opened, when an opening message is received, memory reclamation performed by killing a process is immediately triggered.

In a possible design, when the system is in a screen-off state, the thirty-first memory statistical value, the thirty-second memory statistical value, and the thirty-third memory statistical value are respectively less than a thirty-first memory statistical value, a thirty-second memory statistical value, and a thirty-third memory statistical value when the system is in a screen-on state. In this design, considering that screen-off background power consumption needs to be reduced in a screen-off scenario, and a memory impact scenario caused by centralized application wakeup at a screen-on moment needs to be resolved, the memory statistical value may be set to two different values in the screen-off scenario and the screen-on scenario respectively, and a memory statistical value in the screen-off scenario is less than a memory statistical value in the screen-on scenario.

In a possible design, the method further includes: sorting processes based on importance of an application, a process priority, and/or a size and distribution of an anonymous page of the application, to kill the processes based on the sorted processes. In this design, a kill process list is created, and the processes are killed in a sequence of processes in the kill process list, so that fast and efficient memory reclamation can be implemented.

In a possible design, the method further includes: configuring a reclamation parameter; and compressing an anonymous page based on the reclamation parameter, to reclaim the thirty-second memory, where the reclamation parameter includes a quantity of target memory pages, a priority of reclaiming a target memory page, and/or a memory reclamation ratio (ratio). Therefore, in this design, setting the reclamation parameter can guide anonymous page compression to be performed more quickly and efficiently.

According to a tenth aspect, an embodiment of this application further provides a memory management apparatus. The memory management apparatus includes a creating module, configured to create a memory statistical value, where the memory statistical value is used to represent remaining available memory in system memory of an electronic device, and the available memory includes thirty-first memory and thirty-second memory; the thirty-first memory is free memory of a system, and the free memory is memory that is not used by the system; the thirty-second memory is occupied memory that can be converted into the thirty-first memory through reclamation; and the memory statistical value includes a thirty-first memory statistical value and a thirty-second memory statistical value, and the thirty-first memory statistical value is greater than the thirty-second memory statistical value; the memory management apparatus further includes a memory reclamation module, configured to: when a current memory statistical value of the system is less than the thirty-second memory statistical value, start anonymous page compression to reclaim the thirty-second memory, so as to convert the thirty-second memory into the thirty-first memory; and the memory management apparatus further includes a memory adjustment module, configured to decrease the memory statistical value when the current memory statistical value of the system is less than the thirty-first memory statistical value after anonymous page compression.

In a possible design, the memory statistical value further includes a thirty-third memory statistical value, and the thirty-third memory statistical value is less than the thirty-second memory statistical value; and the memory reclamation module is further configured to: when the memory statistical value is decreased and the current memory statistical value of the system is less than the thirty-third memory statistical value, reclaim the thirty-second memory by killing a process, to convert the thirty-second memory into the thirty-first memory.

In a possible design, the memory management apparatus further includes a reporting module, the reporting module is configured to monitor space usage of a swap area, and the memory reclamation module is further configured to reclaim, when current space usage of the swap area reaches a preset proportion, the thirty-second memory by killing a process, to convert the thirty-second memory into the thirty-first memory.

In a possible design, the reporting module is further configured to: when the current memory statistical value of the system is less than the thirty-second memory statistical value, determine that a current memory pressure level of the system is a thirty-first level and report a thirty-first level pressure event, and then the memory reclamation module starts anonymous page compression based on the thirty-first level pressure event to reclaim the thirty-second memory, so as to convert the thirty-second memory into the thirty-first memory; the reporting module is further configured to: when the current memory statistical value of the system is less than the thirty-first memory statistical value after anonymous page compression, determine that the current memory pressure level of the system is a thirty-second level and report a thirty-second level pressure event, and then the memory adjustment module decreases the memory statistical value based on the thirty-second level pressure event; and the reporting module is further configured to: when the current space usage of the swap area reaches the preset proportion, determine that the current memory pressure level of the system is a thirty-third level and report a thirty-third level pressure event, and then the memory reclamation module reclaims the thirty-second memory based on the thirty-third level pressure event by killing the process, to convert the thirty-second memory into the thirty-first memory, where memory pressure of the thirty-third level is higher than memory pressure of the thirty-second level, and the memory pressure of the thirty-second level is higher than memory pressure of the thirty-first level.

In a possible design, the memory statistical value further includes a thirty-fourth memory statistical value, and the reporting module is further configured to: report a pressure stall information (PSI) pressure value when a current PSI value of the system is greater than a preset threshold; and the memory reclamation module is further configured to: when the PSI pressure value is received and the current memory statistical value of the system is less than the thirty-fourth memory statistical value, reclaim the thirty-second memory by killing the process, to convert the thirty-second memory into the thirty-first memory.

In a possible design, the memory reclamation module is further configured to detect whether a preset application is opened; and when detecting that the preset application is opened and the current memory statistical value of the system is less than the thirty-first memory statistical value, the memory reclamation module reclaims the thirty-second memory by killing the process, to convert the thirty-second memory into the thirty-first memory.

In a possible design, when the system is in a screen-off state, the thirty-first memory statistical value, the thirty-second memory statistical value, and the thirty-third memory statistical value are respectively less than a thirty-first memory statistical value, a thirty-second memory statistical value, and a thirty-third memory statistical value when the system is in a screen-on state.

In a possible design, the memory reclamation module is configured to sort processes based on importance of an application, a process priority, and/or a size and distribution of an anonymous page of the application, to kill the processes based on the sorted processes.

In a possible design, the memory reclamation module is further configured to: configure a reclamation parameter, and compress an anonymous page based on the reclamation parameter, to reclaim the thirty-second memory, where the reclamation parameter includes a quantity of target memory pages, a priority of reclaiming a target memory page, and/or a memory reclamation ratio (ratio).

According to an eleventh aspect, an embodiment of this application further provides an electronic device, including:
a storage unit, configured to store a computer program; and
a processor, configured to execute the computer program stored in the storage unit, where when the computer program is executed, the processor is configured to perform the memory management method according to any one of the ninth aspect and the possible designs of the ninth aspect in embodiments of this application.

According to a twelfth aspect, an embodiment of this application provides a computer-readable storage medium, including computer instructions. When the computer instructions are on an electronic device, the electronic device is enabled to perform the memory management method according to any one of the ninth aspect or the possible designs of the ninth aspect in embodiments of this application.

In addition, for technical effects brought by the tenth aspect, the eleventh aspect, and the twelfth aspect, refer to descriptions related to the methods of the designs of the foregoing methods. Details are not described herein again.

Embodiments of this application provide an anonymous page management method and apparatus, an electronic device, a medium, and a program product, to manage memory of the electronic device, so as to improve memory reclamation efficiency, improve smoothness of an operating system, and improve user experience.

According to a thirteenth aspect, an embodiment of this application provides an anonymous page management method, including:

swapping data of an anonymous page from memory to external storage space, and recording a time parameter of a swap-out moment;

swapping, from the external storage space to the memory, data swapped out of the anonymous page, and recording a time parameter of a swap-in moment;

obtaining information about a time interval from the swap-in to the swap-out based on the time parameter of the swap-out moment and the time parameter of the swap-in moment; and swapping the anonymous page into an inactive linked list of the memory when a value corresponding to the information about the time interval is greater than a preset fixed value.

According to the anonymous page management method provided in this embodiment of this application, a non-bumped anonymous page is swapped into the inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In a possible design, the swapping data of an anonymous page from memory to external storage space, and recording a time parameter of a swap-out moment includes: when the data of the anonymous page is swapped from the memory to the external storage space, obtaining the time parameter of the swap-out moment based on a quantity of pages moved from the inactive linked list to which the anonymous page belongs.

Based on this design, the time parameter of the swap-out moment is recorded based on the quantity of pages moved from the inactive linked list to which the anonymous page belongs. This reduces a probability that a bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In a possible design, the swapping data of an anonymous page from memory to external storage space, and recording a time parameter of a swap-out moment further includes: when the data of the anonymous page is swapped from the memory to the external storage space, storing the time parameter of the swap-out moment in a page table entry corresponding to the anonymous page.

Based on this design, the page table entry is stored in the memory, and the time parameter of the swap-out moment is recorded in the page table entry. This facilitates a subsequent operation of swapping the anonymous page into the inactive linked list, reduces a probability that a bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In a possible design, the anonymous page management method provided in this embodiment of this application further includes: recording, based on page movement of the inactive linked list to which the anonymous page belongs, the quantity of pages moved from the inactive linked list to which the anonymous page belongs.

Based on this design, the quantity of pages moved from the inactive linked list is recorded based on the page movement of the inactive linked list to which the anonymous page belongs. This facilitates a subsequent operation of swapping the anonymous page into the inactive linked list, reduces a probability that a bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In a possible design, the page movement of the inactive linked list to which the anonymous page belongs includes:

removing a page of the inactive linked list to which the anonymous page belongs from a tail of the inactive linked list, or moving a page of the inactive linked list to which the anonymous page belongs to an active linked list.

Based on this design, the quantity of pages moved from the inactive linked list to which the anonymous page belongs is recorded based on the page movement of the inactive linked list to which the anonymous page belongs. This facilitates a subsequent operation of swapping the anonymous page into the inactive linked list, reduces a probability that a bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In a possible design, the swapping, from the external storage space to the memory, data swapped out of the anonymous page, and recording a time parameter of a swap-in moment includes: when the data swapped out of the anonymous page is swapped from the external storage space to the memory, obtaining the time parameter of the swap-in moment based on the quantity of pages moved from the inactive linked list to which the anonymous page belongs.

Based on this design, the time parameter of the swap-in moment is recorded based on the quantity of pages moved from the inactive linked list to which the anonymous page belongs. This reduces a probability that a bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In a possible design, the method further includes: when a page fault occurs on the anonymous page and it is detected that a storage location of the data swapped out of the anonymous page is in the external storage space, swapping, from the external storage space to the memory, the data swapped out of the anonymous page.

Based on this design, when the page fault occurs on the anonymous page, the anonymous page is swapped into memory. This improves smoothness of an operating system and improves user experience.

According to a fourteenth aspect, an embodiment of this application further provides an anonymous page management apparatus, including:

- a fortieth recording unit, configured to: swap data of an anonymous page from memory to external storage space, and record a time parameter of a swap-out moment;
- a forty-first recording unit, configured to: swap, from the external storage space to the memory, data swapped out of the anonymous page, and record a time parameter of a swap-in moment;
- an obtaining unit, configured to obtain information about a time interval from the swap-in to the swap-out based on the time parameter of the swap-out moment and the time parameter of the swap-in moment; and
- a swap-in unit, configured to swap the anonymous page into an inactive linked list of the memory when a value corresponding to the information about the time interval is greater than a preset fixed value. In the anonymous page management apparatus provided in this embodiment of this application, a non-bumped anonymous page is swapped into the inactive linked list of the memory, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

According to a fifteenth aspect, an embodiment of this application further provides an electronic device, including:

- a memory, configured to store a computer program; and
- a processor, configured to execute the computer program stored in the memory, where when the computer program is executed, the processor is configured to perform the foregoing anonymous page management method. Therefore, a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

According to a sixteenth aspect, an embodiment of this application further provides a computer-readable storage medium. The computer-readable storage medium includes computer instructions, and when the computer instructions are run on an electronic device, the electronic device is enabled to perform the foregoing anonymous page management method. Therefore, a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

According to a seventeenth aspect, an embodiment of this application further provides a computer program product. The computer program product includes computer program code, and when the computer program code is executed by a computer, the computer program code may enable the computer to perform the foregoing anonymous page management method. Therefore, a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

In this embodiment of this application, information about a time interval from swap-in to swap-out is obtained, and when a value corresponding to the information about the time interval is greater than a preset fixed value, the non-bumped anonymous page is swapped into the inactive linked list, so that the non-bumped anonymous page can be swapped out prior to the bumped anonymous page. This reduces the probability that the bumped anonymous page is swapped out, to reduce bumping of the data of the anonymous page, so as to reduce invalid anonymous page reclamation in the high-pressure state of the system memory, and improve memory reclamation efficiency. In this way, smoothness of the operating system is improved and user experience is improved.

Embodiments of this application provide a life management method for a memory, an electronic device, and a computer storage medium, to manage and control an amount of written data written into a storage device, and ensure that a service life of the storage device reaches an expected service life.

According to an eighteenth aspect, this application provides a life management method for a memory, applied to an electronic device. The method includes: obtaining first data to be swapped from memory of the electronic device to a memory of the electronic device in a first period; obtaining a total data quota of the memory in the first period, and subtracting preset user data usage of the memory from the total data quota to obtain a swap-out data quota in the first period; swapping the first data from the memory to the memory based on the swap-out data quota; and obtaining status information of the memory, and determining a swap-out data quota of the memory in a second period based on the status information of the memory, where the status information includes: program-erase cycles, and/or a total service life, and/or a used service life, and/or a capacity, and/or a component write amplification coefficient, and/or a used time. In this application, the preset user data usage of the memory can be subtracted from the total data quota to obtain the swap-out data quota in the first period, and an amount of data swapped from the memory to the memory is limited based on the swap-out data quota, to reduce program-erase cycles of the memory, prolong a service life of the memory, and ensure that the service life of the memory reaches an expected life.

In a possible design, the subtracting preset user data usage of the memory from the total data quota to obtain a swap-out data quota in the first period includes: obtaining program-erase cycles of the memory in the first period; calculating a growth rate of the program-erase cycles of the memory in the first period based on the program-erase cycles of the memory in the first period and the first period; determining the preset user data usage based on the growth rate of the program-erase cycles of the memory in the first period; and subtracting the preset user data usage from the total data quota to obtain the swap-out data quota of the memory in the first period. According to the foregoing technical solution, the swap-out data quota of the memory in the first period is calculated based on the program-erase cycles of the memory, to control an amount of data swapped from the memory to the memory in the first period.

In a possible design, the determining the preset user data usage based on the growth rate of the program-erase cycles of the memory in the first period includes: inputting the growth rate of the program-erase cycles of the memory in the first period into a disk life prediction model, and outputting the preset user data usage after the growth rate is processed by the disk life prediction model, where the disk life prediction model is a neural network model for learning a relationship between the growth rate of the program-erase cycles of the memory and the preset user data usage. According to the foregoing technical solution, the preset user data usage is predicted by using the disk life prediction model, so that the total data quota of the memory in the first period can be quickly calculated.

In a possible design, the swapping the first data from the memory to the memory based on the swap-out data quota includes: determining whether the first period ends; if the first period does not end, obtaining data swapped to the memory in the first period, and performing subtraction on the swap-out data quota in the first period and the data swapped to the memory in the first period, to obtain a remaining data quota; determining whether the first data is less than the remaining data quota; and if the first data is less than or equal to the remaining data quota, swapping all first data from the memory to the memory; or if the first data is greater than or equal to the remaining data quota, selecting, from the first data, target data whose data amount is the same as the remaining data quota, swapping the target data from the memory to the memory, and disabling a write function of the memory. According to the foregoing technical solution, when the first data is less than the remaining data quota, all the first data is swapped from the memory to the memory, and when the first data is greater than or equal to the remaining data quota, the data whose data amount is the same as the remaining data quota is selected from the first data and swapped from the memory to the memory, and the write function of the memory is disabled. This can prolong a service life of the memory, and ensure that the service life of the memory reaches an expected life.

In a possible design, the method further includes: if it is determined that the first period ends, recalculating, in the second period, the swap-out data quota of the memory to obtain an updated swap-out data quota, and performing, in the second period based on the updated swap-out data quota, write management and control on second data to be swapped to the memory in the second period. According to the foregoing technical solution, after the first period ends, an amount of data swapped from the memory to the memory in the second period is managed and controlled based on the swap-out data quota in the second period.

In a possible design, the determining a swap-out data quota of the memory in a second period based on the status information of the memory includes: obtaining program-erase cycles of the memory in a preset time period in the second period; calculating a growth rate of the program erase cycles of the memory in the preset time period based on the growth rate of the program-erase cycles of the memory in the preset time period; inputting the growth rate of the program-erase cycles of the memory into a disk life prediction model, and outputting a total data quota of the memory in the second period after the growth rate is processed by the disk life prediction model; and subtracting preset user data usage in the second period from the total data quota of the memory in the second period, to obtain a swap-out data quota of the memory in the second period, where the disk life prediction model is a neural network model for learning a relationship between the growth rate of the program-erase cycles of the memory and the total data quota of the memory. According to the foregoing technical solution, the preset user data usage is predicted by using the disk life prediction model, so that the total data quota of the memory in the second period can be quickly calculated.

In a possible design, the obtaining a swap-out data quota of the memory in the first period includes: setting a target use time of the memory; obtaining a used service life of the memory and a total service life of the memory; obtaining a component write amplification coefficient of the memory and a capacity of the memory; and obtaining the swap-out data quota of the memory in the first period through calculation according to Formula $p=(e-b)*q/((c/t)*w)$, where e is the total service life of the memory, b is the used service life of the memory, q is the capacity of the memory, c is the target use time of the memory, w is the component write amplification coefficient of the memory, t is the first period, and p is the swap-out data quota. According to the foregoing technical solution, the swap-out data quota of the memory in the first period can be determined based on the total service life of the memory, the used service life of the memory, the capacity of the memory, the target use time of the memory, the component write amplification coefficient of the memory, and the first period.

In a possible design, the swapping the first data from the memory to the memory based on the swap-out data quota includes: performing timing based on a preset timing manner, and obtaining a timing time in the preset timing manner; determining whether the timing time is within the first period; if the timing time is within the first period, obtaining accumulated data swapped to the memory from the first period to the timing time; performing subtraction on the swap-out data quota of the memory in the first period and the accumulated data to obtain a remaining data quota; and if the first data is less than the remaining data quota, swapping the first data from the memory to the memory; or if the first data is not less than the remaining data quota, selecting, from the first data, target data whose data amount is the same as the remaining data quota, swapping the target data from the memory to the memory, and disabling a write function of the memory. According to the foregoing technical solution, timing may be performed based on the preset timing manner to determine whether the first period ends, and when the first period does not end and the first data is less than the remaining data quota, all first data is swapped from the memory to the memory.

In a possible design, the determining a swap-out data quota of the memory in a second period based on the status information of the memory includes: obtaining a used time of the memory; and obtaining the swap-out data quota of the memory in the second period through calculation according to Formula $p=(e-b)*q/((c-c1)*w/t)$, where $c1$ is the used time of the memory. According to the foregoing technical solution, the swap-out data quota of the memory in the second period can be determined based on the total service life of the memory, the used service life of the memory, the capacity of the memory, the target use time of the memory, the component write amplification coefficient of the memory, the first period, and the used time of the memory.

In a possible design, the method further includes: if a power-off instruction of the electronic device is obtained, storing, in the memory, the timing time and the accumulated data swapped to the memory from the first period to the timing time, where the memory is a non-volatile memory. According to the foregoing technical solution, the electronic device can store the timing time of the memory in the first period and the accumulated data in the memory before the electronic device is powered off.

In a possible design, the method further includes: if a power-on instruction of the electronic device is obtained, reading the timing time and the accumulated data from the memory, and managing and controlling, based on the timing time and the accumulated data, the first data to be swapped to the memory in the first period. According to the foregoing technical solution, after the electronic device is powered on, the electronic device can continue to manage and control, based on the timing time and the accumulated data before the electronic device is powered off, an amount of data to be swapped from the memory to the memory in the first period.

In a possible design, the method further includes: setting a detection period; obtaining a used service life of the memory and a total service life of the memory in each detection period; calculating a ratio of the used service life of the memory to the total service life of the memory in each detection period, to obtain a first ratio; and if the first ratio is less than a preset ratio in each detection period, swapping the first data from the memory to the memory; or if the first ratio is greater than or equal to a preset ratio in each detection period, skipping swapping the first data from the memory to the memory, and disabling a write function of the memory. According to the foregoing technical solution, the first ratio of the used service life of the memory to the total service life of the memory is used as a write condition of the memory, so that the first data to be swapped from the memory to the memory is managed and controlled, to ensure that a service life of the memory reaches a designed service life.

In a possible design, the method further includes: determining a target use time of the memory; obtaining a used service life of the memory; and if the used service life of the memory is greater than or equal to the target use time of the memory, swapping the first data from the memory to the memory; or if the used service life of the memory is less than the target use time of the memory, obtaining a data limit amount through calculation according to Formula $d=k1*(c-b)*100/b$, where c is the target use time of the memory, b is the used service life of the memory, k1 is a configuration coefficient specified by a user, the configuration coefficient indicates a quantity of GB units of stored data that needs to be subtracted from the swap-out data quota of the memory in the first period each time the target use time of the memory is reduced by 1%, and d is the data limit amount; and using a difference obtained by subtracting the data limit amount from the swap-out data quota in the first period as the swap-out data quota of the memory in the first period. According to the foregoing technical solution, the difference obtained by subtracting the data limit amount from the swap-out data quota in the first period as the swap-out data quota of the memory in the first period. In this way, data written into the memory is corrected in the first period, so that a service life of the memory can be prolonged, to reach an expected life.

In a possible design, the determining a target use time of the memory includes, obtaining a target service life of the memory and a total service life of the memory; calculating a ratio of the used service life of the memory to the total service life of the memory to obtain a second ratio; and obtaining the target use time of the memory through calculation according to Formula $c=k2*a$, where a is the target service life of the memory, and k2 is the second ratio. According to the foregoing technical solution, the target use time of the memory can be obtained through calculation based on the target service life, the used service life, and the total service life of the memory.

In a possible design, the configuration coefficient is 1 GB. The swap-out data quota in the first period may be corrected by using the configuration coefficient of 1 GB, to correct, in the first period, the data swapped from the memory to the memory, so as to reach an expected life.

In a possible design, the preset user data usage is an amount of data written into the memory by non-system software in a previous period. According to the foregoing technical solution, the preset user data usage is set to the amount of data written into the memory by the non-system software in the previous period.

According to a nineteenth aspect, an embodiment of this application provides another life management method for a memory, applied to an electronic device. The method includes: obtaining first data to be swapped from memory of the electronic device to a memory of the electronic device in a first period; obtaining a swap-out data quota of the memory in the first period; and swapping the first data from the memory to the memory based on the swap-out data quota. In this application, an amount of data swapped from the memory to the memory is limited based on the obtained swap-out data quota, to reduce program-erase cycles of the memory, prolong a service life of the memory, and ensure that the service life of the memory reaches an expected life.

According to a twentieth aspect, an embodiment of this application provides an electronic device. The electronic device includes a memory and a processor. The memory is configured to store program instructions, the processor is configured to: read and execute the program instructions stored in the memory, and when the program instructions are executed by the processor, the electronic device is enabled to perform the life management method for a memory according to the eighteenth aspect or the nineteenth aspect.

According to a twenty-first aspect, an embodiment of this application provides a computer storage medium. The computer storage medium stores program instructions, and when the program instructions are run on an electronic device, the electronic device is enabled to perform the life management method for a memory according to the eighteenth aspect or the nineteenth aspect in embodiments of this application.

In addition, for technical effects brought by the twentieth aspect to the twenty-first aspect, refer to descriptions related to the methods of the designs of the foregoing methods. Details are not described herein again.

Embodiments of this application provide a memory management method and an electronic device, to improve memory swap-out and memory swap-in performance.

According to a twenty-second aspect, an embodiment of this application provides a memory management method. The method may include: detecting that a fiftieth application is switched to the foreground, and loading fiftieth anonymous page data belonging to the fiftieth application from an external storage to a fiftieth memory area (for example, a cache block of memory); and if a fifty-first anonymous page of a fiftieth process does not exist in a memory area of the fiftieth process (that is, a memory page fault occurs) when the fiftieth process of the fiftieth application is called, reading fifty-first anonymous page data from the fiftieth memory area, where the fiftieth anonymous page data includes the fifty-first anonymous page data.

In the method, when an application is switched to the foreground, all or most anonymous pages of the application are loaded to the fiftieth memory area. When the memory page fault occurs, an anonymous page that needs to be accessed is directly read from the fiftieth memory area, and data in the memory is accessed. In this way, data read performance is not limited by read performance of the external storage, to improve data reading efficiency and effectively avoid system freezing.

With reference to the twenty-second aspect, in a possible design, the fiftieth anonymous page data is stored in the external storage as at least one data block of a preset size, and a storage address of the at least one data block meets a preset condition. The preset condition includes: storage addresses are consecutive; or a maximum hop interval between storage addresses is less than a fiftieth value.

One storage block in virtual memory may store a plurality of anonymous pages, and the anonymous pages are packaged into a data block, and are stored in space with consecutive storage addresses in the virtual memory in a unit of a data block. When the application is switched to the foreground, in an implementation, all data blocks of the application in the virtual memory may be loaded to the fiftieth memory area. In another implementation, because a process may be woken up in the background, one or more data blocks are loaded from the virtual memory to the fiftieth memory area. In this way, storage addresses of a plurality of data blocks of an application in the virtual memory may be inconsecutive. When a data block is loaded from the virtual memory, the data block of the application can be read at a skip interval. In this way, all anonymous page data of the application in the virtual memory may be loaded to the fiftieth memory area.

With reference to the twenty-second aspect, in a possible design, the method further includes: moving fifty-second anonymous page data belonging to the fiftieth application in the fiftieth memory area to fiftieth space with consecutive storage addresses in the external storage.

During swap-out of the memory, anonymous page data belonging to a same application is moved to space with consecutive storage addresses in the external storage. In this way, during swap-in of the memory, the anonymous page data of the application may be sequentially read from the space with the consecutive storage addresses. This improves data reading efficiency.

With reference to the twenty-second aspect, in a possible design, the anonymous page data belonging to the fiftieth application in the fiftieth memory area is sorted based on hot and cold; and the moving fifty-second anonymous page data belonging to the fiftieth application in the fiftieth memory area to fiftieth space with consecutive storage addresses in the external storage includes: removing, from the fiftieth memory area in an order from cold to hot, the fifty-second anonymous page data belonging to the fiftieth application, and storing the fifty-second anonymous page data in the fiftieth space with the consecutive storage addresses in the external storage.

During swap-out of the memory, the fifty-second anonymous page data belonging to the fiftieth application is removed from the fiftieth memory area in the order from cold to hot. In this way, the anonymous page data in the external storage may be sorted based on hot and cold.

With reference to the twenty-second aspect, in a possible design, the loading a plurality of pieces of fiftieth anonymous page data belonging to the fiftieth application from an external storage to a fiftieth memory area of memory includes: loading, in an order from hot to cold, the fiftieth anonymous page data belonging to the fiftieth application from the external storage to the fiftieth memory area of the memory.

Loading data blocks of one application from the virtual memory to the fiftieth memory area in an order from hot to cold can increase a probability that when the fiftieth process is called, the fiftieth memory area includes an anonymous page of the fiftieth process, that is, increase a probability that the anonymous page of the fiftieth process is read from the fiftieth memory area. A speed of reading anonymous page data from the fiftieth memory area is faster than a speed of reading anonymous page data from the virtual memory, to improve data reading efficiency and effectively avoid system freezing.

With reference to the twenty-second aspect, in a possible design, the method further includes: moving a least recently used anonymous page in memory to the fiftieth memory area, where anonymous page data that is first moved to the fiftieth memory area is colder than anonymous page data that is later moved to the fiftieth memory area.

The anonymous page is moved from the memory to the fiftieth memory area based on hot and cold, so that hot and cold anonymous pages in the fiftieth memory area can be distinguished.

With reference to the twenty-second aspect, in a possible design, the moving fifty-second anonymous page data belonging to the fiftieth application in the fiftieth memory area to fiftieth space with consecutive storage addresses in the external storage includes: packaging the fifty-second anonymous page data belonging to the fiftieth application in the fiftieth memory area into one or more data blocks; and moving the one or more data blocks to the fiftieth space with the consecutive storage addresses in the external storage, where one data block includes a plurality of pieces of fifty-second anonymous page data.

With reference to the twenty-second aspect, in a possible design, the packaging the fifty-second anonymous page data belonging to the fiftieth application in the fiftieth memory area into one or more data blocks includes: packaging compressed fifty-second anonymous page data belonging to the fiftieth application in the fiftieth memory area into one or more data blocks.

Compressing an anonymous page and then storing the compressed anonymous page in the fiftieth memory area can save memory space and improve memory utilization.

With reference to the twenty-second aspect, in a possible design, a size of one piece of fifty-second anonymous page data is 4 KB, and a size of one data block is 32 KB.

With reference to the twenty-second aspect, in a possible design, the loading fiftieth anonymous page data belonging to the fiftieth application from an external storage to a fiftieth memory area of memory includes: unpacking the fiftieth anonymous page data belonging to the fiftieth application in the external storage and then loading the fiftieth anonymous page data to the fiftieth memory area of the memory.

With reference to the twenty-second aspect, in a possible design, the loading fiftieth anonymous page data belonging to the fiftieth application from an external storage to a fiftieth memory area of memory includes: unpacking and decompressing the fiftieth anonymous page data belonging to the fiftieth application in the external storage and then loading the fiftieth anonymous page data to the fiftieth memory area of the memory.

With reference to the twenty-second aspect, in a possible design, the method further includes: if fiftieth available space with consecutive storage addresses in the external storage is less than space occupied by the fifty-second anonymous page data, releasing anonymous page data belonging to a fifty-first application in the external storage, where the fifty-first application is an application that occupies largest space with consecutive storage addresses in the external storage.

With reference to the twenty-second aspect, in a possible design, the fiftieth space with the consecutive storage addresses in the external storage is pre-allocated.

With reference to the twenty-second aspect, in a possible design, the method further includes: if the fiftieth available space in the external storage is less than the space occupied by the fifty-second anonymous page data, stopping moving the fifty-second anonymous page data from the fiftieth memory area to the external storage.

According to a twenty-third aspect, this application provides an electronic device. The electronic device may implement the memory management method according to the twenty-second aspect and the possible designs of the twenty-second aspect, and may implement the foregoing method by software, hardware, or hardware executing corresponding software. In a possible design, the electronic device may include a processor and a memory. The memory includes memory and an external storage. The processor is configured to support the electronic device in performing a corresponding function according to the twenty-second aspect and the possible designs of the twenty-second aspect. The memory is configured to be coupled to the processor, and stores program instructions and data that are necessary for the electronic device.

According to a twenty-fourth aspect, an embodiment of this application provides a computer-readable storage medium. The computer-readable storage medium includes computer instructions, and when the computer instructions are run on an electronic device, the electronic device is enabled to perform the memory management method according to the twenty-second aspect and the possible designs of the twenty-second aspect.

According to a twenty-fifth aspect, an embodiment of this application provides a computer program product. When the computer program product runs on a computer, the computer is enabled to perform the memory management method according to the twenty-second aspect and the possible designs of the twenty-second aspect.

For technical effects brought by the electronic device according to the twenty-third aspect, the computer-readable storage medium according to the twenty-fourth aspect, and the computer program product according to the twenty-fifth aspect, refer to the technical effects brought by the foregoing corresponding methods. Details are not described herein again.

Embodiments of this application provide a memory management method and a device, to reduce application to a kernel system for memory and release of memory to the kernel system, reduce a memory swap delay, and improve memory swap performance.

According to a twenty-sixth aspect, an embodiment of this application provides a memory management method. The method may include: detecting that a sixtieth application is switched to the foreground, and applying to a memory swap memory pool for sixtieth memory; and loading a data block of a preset size from an external storage to a cache block of memory by using the sixtieth memory, where the memory swap memory pool is used to store the sixtieth memory, and one data block includes one or more anonymous pages of the sixtieth application.

In the method, when the data block needs to be loaded from the external storage to the cache block of the memory during memory swap processing, the sixtieth memory is first applied for from the memory swap memory pool, instead of directly requesting a kernel system to allocate new memory. This can reduce application to the kernel system for memory and release of memory to the kernel system and reduce a memory swap delay.

With reference to the twenty-sixth aspect, in a possible design, the method further includes: if the application to the memory swap memory pool for the sixtieth memory fails, applying to a kernel system for allocating the sixtieth memory; and loading the data block of the preset size from the external storage to the cache block of the memory by using the sixtieth memory allocated by the kernel system. In other words, if the sixtieth memory does not exist in the memory swap memory pool, the kernel system is requested to allocate new memory.

With reference to the twenty-sixth aspect, in a possible design, the method further includes: applying to the memory swap memory pool for the sixtieth memory; and during memory swap processing, moving a data block of a preset size from the cache block of the memory to the external storage by using the sixtieth memory.

In the method, w % ben the data block needs to be moved from the cache block of the memory to the external storage during memory swap processing, the sixtieth memory is first applied for from the memory swap memory pool, instead of directly requesting a kernel system to allocate new memory. This can reduce application to the kernel system for memory and release of memory to the kernel system and reduce a memory swap delay.

With reference to the twenty-sixth aspect, in a possible design, the method further includes: if the application to the memory swap memory pool for the sixtieth memory fails, applying to a kernel system for allocating the sixtieth memory; and loading the data block of the preset size from the cache block of the memory to the external storage by using the sixtieth memory allocated by the kernel system. In other words, if the sixtieth memory does not exist in the memory swap memory pool, the kernel system is requested to allocate new memory.

With reference to the twenty-sixth aspect, in a possible design, the method further includes: releasing the sixtieth memory to the memory swap memory pool, so that one piece of sixtieth memory is added to the memory swap memory pool.

In the method, after the data block is moved by using the sixtieth memory, the sixtieth memory is first released to the memory swap memory pool, instead of being directly released to the kernel system. In this way, during memory swap processing, other data blocks may be moved by using the sixtieth memory, to avoid frequently applying to the kernel system for memory and releasing memory to the kernel system.

With reference to the twenty-sixth aspect, in a possible design, the method further includes: releasing, by the memory swap memory pool, all sixtieth memory in the memory swap memory pool to the kernel system when a sixtieth specified condition is met, where the sixtieth specified condition includes: no data block to be loaded into the cache block of the memory exists in the external storage; and no data block to be moved to the external storage exists in the cache block of the memory.

That is, after one memory swap process ends, all memory allocated by the kernel system is released to the kernel system.

With reference to the twenty-sixth aspect, in a possible design, the method further includes: releasing, by the memory swap memory pool, some sixtieth memory in the memory swap memory pool to the kernel system when a sixty-first specified condition is met, where the sixty-first specified condition includes: the sixtieth memory in the memory swap memory pool is greater than a specified threshold.

With reference to the twenty-sixth aspect, in a possible design, the releasing, by the memory swap memory pool, some sixtieth memory in the memory swap memory pool to the kernel system includes: releasing a part that exceeds a specified threshold in the memory swapping memory pool; or releasing some sixtieth memory in the memory swapping memory pool based on a specified range.

With reference to the twenty-sixth aspect, in a possible design, the kernel system is a Linux kernel.

According to a twenty-seventh aspect, this application provides an electronic device. The electronic device may implement the memory management method according to the twenty-sixth aspect and the possible designs of the twenty-sixth aspect, and may implement the foregoing method by software, hardware, or hardware executing corresponding software. In a possible design, the electronic device may include a processor and a memory. The memory includes memory and an external storage. The processor is configured to support the electronic device in performing a corresponding function according to the twenty-sixth aspect and the possible designs of the twenty-sixth aspect. The memory is configured to be coupled to the processor, and stores program instructions and data that are necessary for the electronic device.

According to a twenty-eighth aspect, an embodiment of this application provides a computer-readable storage medium. The computer-readable storage medium includes computer instructions, and when the computer instructions are run on an electronic device, the electronic device is enabled to perform the memory management method according to the twenty-sixth aspect and the possible designs of the twenty-sixth aspect.

According to a twenty-ninth aspect, an embodiment of this application provides a computer program product. When the computer program product runs on a computer, the computer is enabled to perform the memory management method according to the twenty-sixth aspect and the possible designs of the twenty-sixth aspect.

For technical effects brought by the electronic device according to the twenty-seventh aspect, the computer-readable storage medium according to the twenty-eighth aspect, and the computer program product according to the twenty-ninth aspect, refer to technical effects brought by the foregoing corresponding methods. Details are not described herein again.

BRIEF DESCRIPTION OF DRAWINGS

FIG. 1-2 is a schematic diagram of a structure of an operating system according to an embodiment of this application;

FIG. 1-3 is a schematic flowchart of a memory management method according to an embodiment of this application.

FIG. 1-4 is a schematic flowchart of another memory management method according to an embodiment of this application;

FIG. 1-5 is a schematic flowchart of another memory management method according to an embodiment of this application;

FIG. 1-6 is a schematic diagram of a memory management method according to an embodiment of this application:

FIG. 1-7 is a schematic diagram of another memory management method according to an embodiment of this application;

FIG. 1-8 is a schematic diagram of another memory management method according to an embodiment of this application;

FIG. 1-9 is a schematic diagram of a structure of a memory management apparatus according to an embodiment of this application;

FIG. 2-1 is a schematic diagram of a structure of an electronic device to which a memory management method is applicable according to an embodiment of this application:

FIG. 2-2 is a schematic diagram of a structure of an operating system according to an embodiment of this application;

FIG. 2-3 is a schematic flowchart of a memory management method according to an embodiment of this application;

FIG. 2-4 is a schematic flowchart of another memory management method according to an embodiment of this application;

FIG. 2-5 is a schematic diagram of swapping data from a swap area to an external storage according to an embodiment of this application;

FIG. 2-6 is a schematic diagram of a memory control group linked list according to an embodiment of this application;

FIG. 2-7 is a schematic diagram of a memory control group linked list obtained when an application status changes according to an embodiment of this application;

FIG. 2-8 is a schematic diagram of memory reclamation according to an embodiment of this application;

FIG. 2-9 is a schematic flowchart of a memory compression method according to an embodiment of this application:

FIG. 2-10 is a schematic flowchart of a memory swap-out method according to an embodiment of this application:

FIG. 2-11 is a schematic diagram of a structure of a memory management apparatus according to an embodiment of this application;

FIG. 3-1 is a schematic diagram of a structure of an electronic device to which a memory management method is applicable according to an embodiment of this application:

FIG. 3-2a(1) and FIG. 3-2a(2) are a schematic flowchart of a memory management method according to an embodiment of this application;

FIG. 3-2b is a schematic diagram in which three memory statistical values correspond to different memory management policies according to an embodiment of this application;

FIG. 3-3 is a schematic flowchart of another memory management method according to an embodiment of this application;

FIG. 3-4 is a schematic flowchart of another memory management method according to an embodiment of this application;

FIG. 3-5 is a schematic flowchart of another memory management method according to an embodiment of this application;

FIG. 3-6 is a schematic diagram of a structure of a memory management apparatus according to an embodiment of this application;

FIG. 3-7 is a schematic diagram of a framework of another memory management apparatus according to an embodiment of this application;

FIG. 3-8a and FIG. 3-8b are a schematic flowchart of opening a preset application according to an embodiment of this application;

FIG. 3-9 is a schematic diagram of a structure of another electronic device according to an embodiment of this application;

FIG. 4-1 is a schematic diagram of a structure of page table mapping according to an embodiment of this application;

FIG. 4-2 is a schematic diagram of a structural relationship between a memory node, a memory management zone, and a page according to an embodiment of this application;

FIG. 4-3 is a schematic diagram of a linked list management structure according to an embodiment of this application;

FIG. 4-4 is a schematic diagram of another linked list management structure according to an embodiment of this application;

FIG. 4-5 is a schematic diagram of a structure of an electronic device according to an embodiment of this application;

FIG. 4-6 is a block diagram of a software structure of an electronic device according to an embodiment of this application;

FIG. 4-7a and FIG. 4-7b are a schematic diagram of a lifecycle of an anonymous page according to an embodiment of this application;

FIG. 4-8 is a schematic diagram of a structure of a page table index according to an embodiment of this application;

FIG. 4-9 is a schematic flowchart of an anonymous page management method according to an embodiment of this application;

FIG. 4-10a and FIG. 4-10b are a schematic diagram of an anonymous page swap-out procedure according to an embodiment of this application;

FIG. 4-11 is a schematic flowchart of an anonymous page swap-out method according to an embodiment of this application;

FIG. 4-12a and FIG. 4-12b are a schematic diagram of an anonymous page swap-in procedure according to an embodiment of this application;

FIG. 4-13 is a schematic flowchart of an anonymous page swap-in method according to an embodiment of this application;

FIG. 4-14 is a schematic diagram of determining whether an anonymous page is bumped according to an embodiment of this application;

FIG. 4-15 is a schematic block diagram of another anonymous page management method according to an embodiment of this application;

FIG. 4-16 is a schematic flowchart of another anonymous page management method according to an embodiment of this application;

FIG. 4-17 is a schematic diagram of modules of an anonymous page management apparatus according to an embodiment of this application;

FIG. 4-18 is a schematic diagram of modules of a fortieth recording unit according to an embodiment of this application;

FIG. 4-19 is a schematic diagram of modules of another anonymous page management apparatus according to an embodiment of this application;

FIG. 5-1 is a diagram of a system architecture of a life management method for a memory according to an embodiment of this application;

FIG. 5-2 is a flowchart of a life management method for a memory according to an embodiment of this application;

FIG. 5-3 is a flowchart of a method for obtaining a swap-out data quota of a memory according to an embodiment of this application;

FIG. 5-4 is a flowchart of a method for swapping first data from memory to a memory based on a swap-out data quota according to an embodiment of this application;

FIG. 5-5 is a flowchart of a method for obtaining a swap-out data quota of a memory according to another embodiment of this application;

FIG. 5-6 is a flowchart of a method for swapping first data to a memory based on a swap-out data quota according to an embodiment of this application;

FIG. 5-7A is a schematic diagram of writing statistical information by a storage management and control module according to an embodiment of this application;

FIG. 5-7B is a schematic diagram of reading statistical information by a storage management and control module according to an embodiment of this application;

FIG. 5-8 is a flowchart of a method for swapping first data to a memory according to an embodiment of this application;

FIG. 6-1 is a schematic diagram of a hardware structure of an electronic device according to an embodiment of this application;

FIG. 6-2 is a schematic diagram of a memory swap-out process and a memory swap-in process;

FIG. 6-3 is a schematic diagram of a memory management method;

FIG. 6-4 is a schematic diagram of a scenario instance of a memory management method according to an embodiment of this application;

FIG. 6-5 is a schematic flowchart of a memory management method according to an embodiment of this application.

FIG. 6-6 is a schematic diagram of a scenario instance of a memory management method according to an embodiment of this application;

FIG. 6-7 is a schematic diagram of a scenario instance of a memory management method according to an embodiment of this application;

FIG. 6-8 is a schematic diagram of a scenario instance of a memory management method according to an embodiment of this application;

FIG. 6-9 is a schematic diagram of a scenario instance of a memory management method according to an embodiment of this application;

FIG. 6-10 is a schematic diagram of a scenario instance of a memory management method according to an embodiment of this application;

FIG. 6-11 is a schematic diagram of a scenario instance of a memory management method according to an embodiment of this application;

FIG. 6-12 is a schematic diagram of a scenario instance of a memory management method according to an embodiment of this application;

FIG. 6-13 is a schematic diagram of a scenario instance of a memory management method according to an embodiment of this application;

FIG. 6-14 is a schematic composition diagram of a structure of an electronic device according to an embodiment of this application;

FIG. 7-1 is a schematic diagram of a hardware structure of an electronic device according to an embodiment of this application, FIG. 7-2 is a schematic diagram of a memory swap-out process and a memory swap-in process;

FIG. 7-3 is a schematic diagram of a memory swap-out method and a memory swap-in method.

FIG. 7-4 is a schematic diagram of working principles of memory swapping processing in a memory swap-out process and a memory swap-in process;

FIG. 7-5 is a schematic diagram of a scenario instance of a memory management method:

FIG. 7-6 is a schematic diagram of a scenario instance of a memory management method according to an embodiment of this application; and FIG. 7-7 is a schematic composition diagram of a structure of an electronic device according to an embodiment of this application.

DESCRIPTION OF MAIN COMPONENT SYMBOLS

Figure 1:
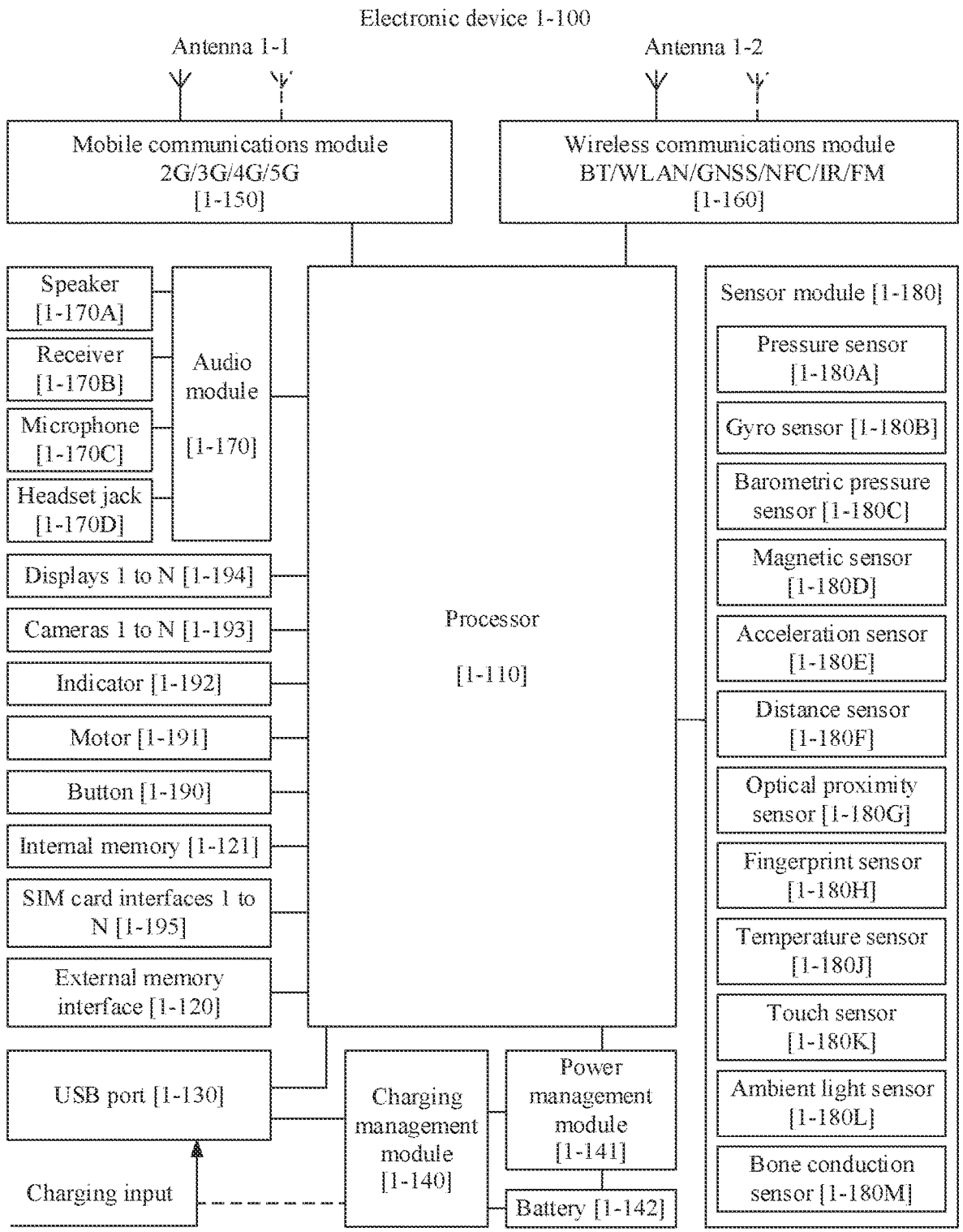
FIG. 1-1 is a schematic diagram of a structure of an electronic device to which a memory management method is applicable according to an embodiment of this application.

| | |
|---|---|
| Electronic device | 1-100 |
| Processor | 1-110 |
| External memory interface | 1-120 |
| Internal memory | 1-121 |
| USB port | 1-130 |
| Charging management module | 1-140 |
| Power management module | 1-141 |
| Battery | 1-142 |
| Antennas | 1-1 and 1-2 |
| Mobile communications module | 1-150 |
| Wireless communications module | 1-160 |
| Audio module | 1-170 |
| Speaker | 1-170A |
| Receiver | 1-170B |
| Microphone | 1-170C |
| Headset jack | 1-170D |
| Sensor module | 1-180 |
| Pressure sensor | 1-180A |
| Gyro sensor | 1-180B |
| Barometric pressure sensor | 1-180C |
| Magnetic sensor | 1-180D |
| Acceleration sensor | 1-180E |
| Distance sensor | 1-180F |
| Optical proximity sensor | 1-180G |
| Fingerprint sensor | 1-180H |
| Temperature sensor | 1-180J |
| Touch sensor | 1-180K |
| Ambient light sensor | 1-180L |
| Bone conduction sensor | 1-180M |
| Button | 1-190 |
| Motor | 1-191 |
| Indicator | 1-192 |
| Camera | 1-193 |
| Display | 1-194 |
| SIM card interface | 1-195 |
| Memory management apparatus | 1-200 |
| Creating module | 1-201 |
| Control module | 1-202 |
| Management module | 1-203 |
| Electronic device | 2-100 |
| Processor | 2-110 |
| External memory interface | 2-120 |
| Internal memory | 2-121 |
| USB port | 2-130 |
| Charging management module | 2-140 |
| Power management module | 2-141 |
| Battery | 2-142 |
| Antennas | 2-1 and 2-2 |
| Mobile communications module | 2-150 |
| Wireless communications module | 2-160 |
| Audio module | 2-170 |
| Speaker | 2-170A |
| Receiver | 2-170B |
| Microphone | 2-170C |
| Headset jack | 2-170D |
| Sensor module | 2-180 |
| Pressure sensor | 2-180A |
| Gyro sensor | 2-180B |
| Barometric pressure sensor | 2-180C |
| Magnetic sensor | 2-180D |
| Acceleration sensor | 2-180E |
| Distance sensor | 2-180F |
| Optical proximity sensor | 2-180G |
| Fingerprint sensor | 2-180H |
| Temperature sensor | 2-180J |
| Touch sensor | 2-180K |
| Ambient light sensor | 2-180L |
| Bone conduction sensor | 2-180M |
| Button | 2-190 |
| Motor | 2-191 |
| Indicator | 2-192 |
| Camera | 2-193 |
| Display | 2-194 |
| SIM card interface | 2-195 |
| Memory management apparatus | 2-200 |
| Creating module | 2-201 |
| Control module | 2-202 |
| Reclamation module | 2-203 |

Electronic devices 3-100 and 3-300 Processor 3-110 External memory interface 3-120

Internal memory 3-121 USB port 3-130 Charging management module 3-140

Power management module 3-141 Battery 3-142 Antennas 3-1 and 3-2 Mobile communications module 3-150

Wireless communications module 3-160 Audio module 3-170 Speaker 3-170A Receiver 3-170B

Microphone 3-170C Headset jack 3-170D Sensor module 3-180 Pressure sensor 3-180A

Gyro sensor 3-180B Barometric pressure sensor 3-180C Magnetic sensor 3-180D

Acceleration sensor 3-180E Distance sensor 3-180F Optical proximity sensor 3-1800

Fingerprint sensor 3-180H Temperature sensor 3-180J Touch sensor 3-180K

Ambient light sensor 3-180L Bone conduction sensor 3-180M Button 3-190 Motor 3-191

Indicator 3-192 Camera 3-193 Display 3-194 SIM card interface 3-195

Memory management apparatus 3-200 Thread module 3-21 Anonymous page compression thread 3-211 PSI thread 3-212

Creating module 3-22 Reporting module 3-23 Memory reclamation module 3-24 Memory adjustment module 3-25

Processing unit 3-301 Storage unit 3-302

| | |
|---|---|
| Electronic device | 4-100 |
| Processor | 4-110 |
| External memory interface | 4-120 |
| Internal memory | 4-121 |

-continued

| | |
|---|---|
| USB port | 4-130 |
| Charging management module | 4-140 |
| Power management module | 4-141 |
| Battery | 4-142 |
| Antennas | 4-1 and 4-2 |
| Mobile communications module | 4-150 |
| Wireless communications module | 4-160 |
| Audio module | 4-170 |
| Speaker | 4-170A |
| Receiver | 4-170B |
| Microphone | 4-170C |
| Headset jack | 4-170D |
| Sensor module | 4-180 |
| Pressure sensor | 4-180A |
| Gyro sensor | 4-180B |
| Barometric pressure sensor | 4-180C |
| Magnetic sensor | 4-180D |
| Acceleration sensor | 4-180E |
| Distance sensor | 4-180F |
| Optical proximity sensor | 4-180G |
| Fingerprint sensor | 4-180H |
| Temperature sensor | 4-180J |
| Touch sensor | 4-180K |
| Ambient light sensor | 4-180L |
| Bone conduction sensor | 4-180M |
| Button | 4-190 |
| Motor | 4-191 |
| Indicator | 4-192 |
| Camera | 4-193 |
| Display | 4-194 |
| SIM card interface | 4-195 |
| Anonymous page management apparatus | 4-200 |
| Fortieth recording unit | 4-10 |
| Forty-first recording unit | 4-20 |
| Obtaining unit | 4-30 |
| Swap-in unit | 4-40 |
| Parameter obtaining unit | 4-182 |
| Storage unit | 4-183 |
| Page recording unit | 4-181 |
| Interrupt unit | 4-50 |

In the following specific embodiments, this application is further described with reference to the accompanying drawings.

DESCRIPTION OF EMBODIMENTS

To make the objectives, technical solutions, and advantages of embodiments of this application clearer, the following clearly and completely describes the technical solutions in embodiments of this application with reference to accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

Terms used in the following embodiments are merely intended to describe specific embodiments, but are not intended to limit this application. As used in the specification and appended claims of this application, the terms "a", "one", "the", "the foregoing", and "this" of singular forms are intended to also include plural forms, for example, "one or more", unless otherwise clearly specified in the context. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects.

Reference to "an embodiment", "some embodiments", or the like described in this specification indicates that one or more embodiments of this application include a specific feature, structure, or characteristic described with reference to embodiments. Therefore, in this specification, statements, such as "in an embodiment", "in some embodiments", "in some other embodiments", and "in other embodiments", that appear at different places do not necessarily mean referring to a same embodiment. Instead, the statements mean "one or more but not all of the embodiments", unless otherwise specifically emphasized in another manner. The terms "include", "have", and their variants all mean "include but are not limited to", unless otherwise specifically emphasized. The term "connection" includes a direct connection and an indirect connection, unless otherwise indicated.

In embodiments of this application, "at least one" means one or more, and "a plurality of" means two or more. For example, at least one of a, b, or c may represent seven cases: a, b, c, a and b, a and c, b and c, and a, b and c. Unless otherwise defined, all technical and scientific terms used in this specification have same meanings as those usually understood by a person skilled in the art of this application. Terms used in the specification of this application are merely for the purpose of describing specific embodiments, but are not intended to limit this application. It should be understood that, unless otherwise stated in this application. "/" means or. For example, A/B may represent A or B. The term "and/or" in this application describes an association relationship for describing associated objects and represents that three relationships may exist. For example, A and/or B may represent the following three cases: Only A exists, both A and B exist, and only B exists. The character "/" in this specification indicates an "or" relationship between the associated objects. For example, A/B indicates A or B.

In embodiments of this application, words such as "first" and "second" are merely used to distinguish between different objects, but cannot be understood as indicating or implying relative importance, and cannot be understood as indicating or implying a sequence. For example, a first application, a second application, and the like are used to distinguish different applications, but are not not used to describe a specific order of applications. A feature limited by "first" or "second" may explicitly or implicitly include one or more of the features.

In embodiments of this application, words such as "tenth" and "eleventh" are merely used to distinguish between different objects, but cannot be understood as indicating or implying relative importance, and cannot be understood as indicating or implying a sequence. For example, a tenth application, an eleventh application, and the like are used to distinguish between different applications, but are not used to describe a specific order of applications. A feature limited by "tenth" or "eleventh" may explicitly or implicitly include one or more of the features.

In the following descriptions, terms "fiftieth" and "fifty-first" are merely intended for the purpose of description, and shall not be understood as an implication or implication of relative importance or implicit indication of a quantity of indicated technical features. Therefore, a feature limited by "fiftieth" or "fifty-first" may explicitly or implicitly include one or more of the features.

In the following descriptions, terms "sixtieth" and "sixty-first" are merely intended for the purpose of description, and shall not be understood as an implication or implication of relative importance or implicit indication of a quantity of indicated technical features. Therefore, a feature limited by "sixtieth" or "sixty-first" may explicitly or implicitly include one or more of the features.

In the descriptions of embodiments of this application, the word such as "example" or "for example" is used to represent giving an example, an illustration, or a description. Any embodiment or design solution described as an "example" or "for example" in embodiments of this application should not be explained as having more advantages than another embodiment or design solution. Exactly, use of the word such as "example" or "for example" is intended to present a related concept in a specific manner.

Embodiments of this application disclose a memory management method, an electronic device, and a computer-readable storage medium, to improve stability of an operating system, avoid frame freezing in the electronic device, and improve user experience.

The memory management method provided in embodiments of this application may be applied to an electronic device. The electronic device may also be referred to as user equipment (User Equipment, UE), a mobile station (Mobile Station, MS), a mobile terminal (Mobile Terminal), or the like. Optionally, the electronic device may have a capability of communicating with one or more core networks through a radio access network (Radio Access Network, RAN). For example, the electronic device may be a mobile phone (or referred to as a "cellular" phone), a computer with a mobile property, or the like.

FIG. 1-1 is a schematic diagram of a structure of an electronic device 1-100.

The electronic device 1-100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality. AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 1-100 may include a processor 1-110, an external memory interface 1-201-120, an internal memory 1-121, a universal serial bus (universal serial bus, USB) port 1-130, a charging management module 1-140, a power management module 1-141, a battery 1-142, an antenna 1-1, an antenna 1-2, a mobile communications module 1-150, a wireless communications module 1-160, an audio module 1-170, a speaker 1-170A, a receiver 1-170B, a microphone 1-170C, a headset jack 1-170D, a sensor module 1-180, a button 1-190, a motor 1-191, an indicator 1-192, a camera 1-193, a display 1-194, a subscriber identification module (subscriber identification module, SIM) card interface 1-195, and the like. The sensor module 1-180 may include a pressure sensor 1-180A, a gyro sensor 1-180B, a barometric pressure sensor 1-180C, a magnetic sensor 1-180D, an acceleration sensor 1-180E, a distance sensor 1-180F, an optical proximity sensor 1-180G, a fingerprint sensor 1-180H, a temperature sensor 1-180J, a touch sensor 1-180K, an ambient light sensor 1-180L, a bone conduction sensor 1-180M, and the like.

It may be understood that the structure shown in this embodiment of this application does not constitute a specific limitation on the electronic device 1-100. In some other embodiments of this application, the electronic device 1-100 may include more or fewer components than those shown in the figure, or combine some components, or split some components, or have different component arrangements. The components shown in the figure may be implemented by hardware, software, or a combination of software and hardware.

The processor 1-110 may include one or more processing units. For example, the processor 1-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 1-110, and is configured to store instructions and data. In some embodiments, the memory in the processor 1-110 is a cache. The memory may store instructions or data that has been used or cyclically used by the processor 1-110. If the processor 1-110 needs to use the instructions or the data again, the processor may directly invoke the instructions or the data from the memory. This avoids repeated access, reduces waiting time of the processor 1-110, and improves system efficiency.

In some embodiments, the processor 1-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus. USB) port, and/or the like.

The I2C interface is a two-way synchronization serial bus, and includes a serial data line (serial data line, SDA) and a serial clock line (serial clock line, SCL). In some embodiments, the processor 1-110 may include a plurality of groups of I2C buses. The processor 1-110 may be separately coupled to the touch sensor 1-180K, a charger, a flash, the camera 1-193, and the like through different I2C bus interfaces. For example, the processor 1-110 may be coupled to the touch sensor 1-180K through an I2C interface, so that the processor 1-110 communicates with the touch sensor 1-180K through the I2C bus interface, to implement a touch function of the electronic device 1-100.

The I2S interface may be used for audio communication. In some embodiments, the processor 1-110 may include a plurality of groups of I2S buses. The processor 1-110 may be coupled to the audio module 1-170 through the I2S bus, to implement communication between the processor 1-110 and the audio module 1-170. In some embodiments, the audio module 1-170 may transfer an audio signal to the wireless communications module 1-160 through the I2S interface, to implement a function of answering a call by using a Bluetooth headset.

The PCM interface may also be used for audio communication, and samples, quantizes, and codes an analog signal. In some embodiments, the audio module 1-170 may be coupled to the wireless communications module 1-160 through a PCM bus interface. In some embodiments, the audio module 1-170 may alternatively transfer an audio signal to the wireless communications module 1-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 1-110 to the wireless communications module 1-160. For example, the processor 1-110 communicates with a Bluetooth module in the wireless communications module 1-160 through the UART interface, to implement a Bluetooth function. In some embodiments, the audio module 1-170 may transfer an audio signal to the wireless communications module 1-160 through the UART interface, to implement a function of playing music by using a Bluetooth headset.

The MIPI may be configured to connect the processor 1-110 to a peripheral component such as the display 1-194 or the camera 1-193. The MIPI includes a camera serial interface (camera serial interface, CSI), a display serial interface (display serial interface, DSI), and the like. In some embodiments, the processor 1-110 communicates with the camera 1-193 through the CSI, to implement a photographing function of the electronic device 1-100. The processor 1-110 communicates with the display 1-194 through the DSI, to implement a display function of the electronic device 1-100.

The GPIO interface may be configured by using software. The GPIO interface may be configured as a control signal or a data signal. In some embodiments, the GPIO interface may be configured to connect the processor 1-110 to the camera 1-193, the display 1-194, the wireless communications module 1-160, the audio module 1-170, the sensor module 1-180, and the like. The GPIO interface may alternatively be configured as an I2C interface, an I2S interface, a UART interface, an MIPI, or the like.

The USB port 1-130 is a port that conforms to a USB standard specification, and may be specifically a mini USB port, a micro USB port, a USB Type-C port, or the like. The USB port 1-130 may be configured to connect to a charger to charge the electronic device 1-100, or may be configured to transmit data between the electronic device 1-100 and a peripheral device, or may be configured to connect to a headset for playing an audio through the headset. The port may alternatively be configured to connect to another electronic device such as an AR device.

It may be understood that an interface connection relationship between modules in this embodiment of this application is merely an example for description, and does not constitute a limitation on the structure of the electronic device 1-100. In some other embodiments of this application, the electronic device 1-100 may alternatively use an interface connection manner different from that in the foregoing embodiment, or a combination of a plurality of interface connection manners.

The charging management module 1-140 is configured to receive a charging input from a charger. The charger may be a wireless charger or a wired charger. In some embodiments of wired charging, the charging management module 1-140 may receive a charging input from the wired charger through the USB port 1-130. In some embodiments of wireless charging, the charging management module 1-140 may receive a wireless charging input through a wireless charging coil of the electronic device 1-100. When charging the battery 1-142, the charging management module 1-140 may further supply power to the electronic device by using the power management module 1-141.

The power management module 1-141 is configured to connect to the battery 1-142, the charging management module 1-140, and the processor 1-110. The power management module 1-141 receives an input of the battery 1-142 and/or an input of the charging management module 1-140, and supplies power to the processor 1-110, the internal memory 1-121, the display 1-194, the camera 1-193, the wireless communications module 1-160, and the like. The power management module 1-141 may be further configured to monitor parameters such as a battery capacity, a battery cycle count, and a battery health status (electricity leakage or impedance). In some other embodiments, the power management module 1-141 may alternatively be disposed in the processor 1-110. In some other embodiments, the power management module 1-141 and the charging management module 1-140 may alternatively be disposed in a same device.

A wireless communication function of the electronic device 1-100 may be implemented by using the antenna 1-1, the antenna 1-2, the mobile communications module 1-150, the wireless communications module 1-160, the modem processor, the baseband processor, and the like.

The antenna 1-1 and the antenna 1-2 are configured to: transmit and receive electromagnetic wave signals. Each antenna in the electronic device 1-100 may be configured to cover one or more communication frequency bands. Different antennas may be further multiplexed, to increase antenna utilization. For example, the antenna 1-1 may be multiplexed as a diversity antenna in a wireless local area network. In some other embodiments, the antenna may be used in combination with a tuning switch.

The mobile communications module 1-150 may provide a wireless communication solution that includes 2G/3G/4G/5G or the like and that is applied to the electronic device 1-100. The mobile communications module 1-150 may include at least one filter, a switch, a power amplifier, a low noise amplifier (low noise amplifier, LNA), and the like. The mobile communications module 1-150 may receive an electromagnetic wave through the antenna 1-1, perform processing such as filtering or amplification on the received electromagnetic wave, and transmit the electromagnetic wave to the modem processor for demodulation. The mobile communications module 1-150 may further amplify a signal modulated by the modem processor, and convert an amplified signal into an electromagnetic wave for radiation through the antenna 1-1. In some embodiments, at least some functional modules in the mobile communications module 1-150 may be disposed in the processor 1-110. In some embodiments, at least some functional modules in the mobile communications module 1-150 may be disposed in a same device as at least some modules in the processor 1-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 1-170A, the receiver 1-170B, or the like), or displays an image or a video through the display 1-194. In some embodiments, the modem processor may be an independent device. In some other embodiments, the modem processor may be independent of the processor 1-110, and is disposed in a same device as the mobile communications module 1-150 or another functional module.

The wireless communications module 1-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 1-100. The wireless communications module 1-160 may be one or more components that integrate at least one communications processor module. The wireless communications module 1-160 receives an electromagnetic wave through the antenna 1-2, performs frequency modulation and filtering processing on the electromagnetic wave signal, and sends a processed signal to the processor 1-110. The wireless communications module 1-160 may further receive a to-be-sent signal from the processor 1-110, perform frequency modulation and amplification on the signal, and convert a processed signal into an electromagnetic wave for radiation through the antenna 1-2.

In some embodiments, the antenna 1-1 and the mobile communications module 1-150 in the electronic device 1-100 are coupled, and the antenna 1-2 and the wireless communications module 1-160 in the electronic device 1-100 are coupled, so that the electronic device 1-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution. LTE), BT, a GNSS, a WLAN, NFC, FM, an IR technology, and/or the like. The GNSS may include a global positioning system (global positioning system. GPS), a global navigation satellite system (global navigation satellite system. GLONASS), a BeiDou navigation satellite system (BeiDou navigation satellite system, BDS), a quasi-zenith satellite system (quasi-zenith satellite system. QZSS), and/or a satellite based augmentation system (satellite based augmentation system, SBAS).

The electronic device 1-100 may implement a display function through the GPU, the display 1-194, the application processor, and the like. The GPU is a microprocessor for image processing, and is connected to the display 1-194 and the application processor. The GPU is configured to: perform mathematical and geometric calculation, and render an image. The processor 1-110 may include one or more GPUs that execute program instructions to generate or change display information.

The display 1-194 is configured to display an image, a video, and the like. The display 1-194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 1-100 may include one or N displays 1-194, where N is a positive integer greater than 1.

The electronic device 1-100 may implement a photographing function through the ISP, the camera 1-193, the video codec, the GPU, the display 1-194, the application processor, and the like.

The ISP is configured to process data fed back by the camera 1-193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 1-193.

The camera 1-193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 1-100 may include one or N cameras 1-193, where N is a positive integer greater than 1.

The digital signal processor is configured to process a digital signal, and may further process another digital signal in addition to a digital image signal. For example, when the electronic device 1-100 selects a frequency, the digital signal processor is configured to perform Fourier transform or the like on frequency energy.

The video codec is configured to: compress or decompress a digital video. The electronic device 1-100 may support one or more video codecs. In this way, the electronic device 1-100 may play or record videos in a plurality of coding formats, for example, moving picture experts group (moving picture experts group, MPEG)-1, MPEG-2, MPEG-3, and MPEG-4.

The NPU is a neural-network (neural-network. NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 1-100, such as image recognition, facial recognition, speech recognition, and text understanding.

The internal memory 1-121 may include one or more random access memories (random access memory, RAM) and one or more non-volatile memories (non-volatile memory, NVM).

The random access memory may include a static random access memory (static random access memory. SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory. DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by using the processor 1-110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 1-110.

The external memory interface 1-120 may be configured to connect to an external non-volatile memory, to extend a storage capability of the electronic device 1-100. The external non-volatile memory communicates with the processor 1-110 through the external memory interface 1-120, to implement a data storage function. For example, files such as music and videos are stored in the external non-volatile memory.

The electronic device 1-100 may implement audio functions, for example, music playing and recording, by using the audio module 1-170, the speaker 1-170A, the receiver 1-170B, the microphone 1-170C, the headset jack 1-170D, the application processor, and the like.

The audio module 1-170 is configured to convert digital audio information into an analog audio signal for output, and is also configured to convert an analog audio input into a digital audio signal. The audio module 1-170 may be further configured to: code and decode an audio signal. In some embodiments, the audio module 1-170 may be disposed in the processor 1-110, or some functional modules in the audio module 1-170 are disposed in the processor 1-110.

The speaker 1-170A, also referred to as a "horn", is configured to convert an electrical audio signal into a sound signal. The electronic device 1-100 may be used to listen to music or answer a call in a hands-free mode over the speaker 1-170A.

The receiver 1-170B, also referred to as an "earpiece", is configured to convert an electrical audio signal into a sound signal. When a call is answered or speech information is received through the electronic device 1-100, the receiver 1-170B may be put close to a human ear to listen to a voice.

The microphone 1-170C, also referred to as a "mike" or a "mic", is configured to convert a sound signal into an electrical signal. When making a call or sending voice information, a user may make a sound near the microphone 1-170C through the mouth of the user, to input the sound signal to the microphone 1-170C. At least one microphone 1-170C may be disposed in the electronic device 1-100. In some other embodiments, two microphones 1-170C may be disposed in the electronic device 1-100, to implement a noise reduction function in addition to collecting a sound signal. In some other embodiments, three, four, or more microphones 1-170C may alternatively be disposed in the electronic device 1-100, to collect a sound signal, reduce noise, identify a sound source, implement a directional recording function, and the like.

The headset jack 1-170D is configured to connect to a wired headset. The headset jack 1-170D may be the USB port 1-130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 1-180A is configured to sense a pressure signal, and may convert the pressure signal into an electrical signal. In some embodiments, the pressure sensor 1-180 Amay be disposed on the display 1-194. There are many types of pressure sensors 1-180A, for example, a resistive pressure sensor, an inductive pressure sensor, and a capacitive pressure sensor. The capacitive pressure sensor may include at least two parallel plates with conductive materials. When a force is applied to the pressure sensor 1-180A, capacitance between electrodes changes. The electronic device 1-100 determines pressure intensity based on the change of the capacitance. When a touch operation is performed on the display 1-194, the electronic device 1-100 detects intensity of the touch operation based on the pressure sensor 1-180A. The electronic device 1-100 may also calculate a touch location based on a detection signal of the pressure sensor 1-180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 1-180B may be configured to determine a motion posture of the electronic device 1-100. In some embodiments, an angular velocity of the electronic device 1-100 around three axes (that is, axes x, y, and z) may be determined through the gyro sensor 1-180B. The gyro sensor 1-180B may be configured to implement image stabilization during photographing. For example, when the shutter is pressed, the gyro sensor 1-180B detects an angle at which the electronic device 1-100 jitters, calculates, based on the angle, a distance for which a lens module needs to compensate, and allows the lens to cancel the jitter of the electronic device 1-100 through reverse motion, to implement image stabilization. The gyro sensor 1-180B may also be used in a navigation scenario and a motion-sensing gaming scenario.

The barometric pressure sensor 1-180C is configured to measure barometric pressure. In some embodiments, the electronic device 1-100 calculates an altitude based on a value of the barometric pressure measured by the barometric pressure sensor 1-180C, to assist in positioning and navigation.

The magnetic sensor 1-180D includes a Hall sensor. The electronic device 1-100 may detect opening and closing of a flip leather case by using the magnetic sensor 1-180D. In some embodiments, when the electronic device 1-100 is a clamshell phone, the electronic device 1-100 may detect opening and closing of a flip cover by using the magnetic sensor 1-180D. Further, a feature such as unlocking upon opening of the flip cover is set based on a detected opening or closing state of the flip cover.

The acceleration sensor 1-180E may detect magnitudes of accelerations of the electronic device 1-100 in various directions (usually on three axes), and may detect a magnitude and a direction of gravity when the electronic device 1-100 is still. The acceleration sensor may be further configured to recognize a posture of the electronic device, and is used in an application such as switching between landscape mode and portrait mode or a pedometer.

The distance sensor 1-180F is configured to measure a distance. The electronic device 1-100 may measure the distance in an infrared manner or a laser manner. In some embodiments, in a photographing scenario, the electronic device 1-100 may measure a distance through the distance sensor 1-180F to implement quick focusing.

The optical proximity sensor 1-180G may include, for example, a light-emitting diode (LED) and an optical detector, for example, a photodiode. The light-emitting diode may be an infrared light-emitting diode. The electronic device 1-100 emits infrared light by using the light-emitting diode. The electronic device 1-100 detects infrared reflected light from a nearby object by using the photodiode. When detecting sufficient reflected light, the electronic device 1-100 may determine that there is an object near the electronic device 1-100. When detecting insufficient reflected light, the electronic device 1-100 may determine that there is no object near the electronic device 1-100. The electronic device 1-100 may detect, by using the optical proximity sensor 1-180G, that the user holds the electronic device 1-100 close to an ear to make a call, to turn off a screen for power saving. The optical proximity sensor 1-180G may also be used in a flip cover mode or a pocket mode to automatically perform screen unlocking or locking.

The ambient light sensor 1-180L is configured to sense ambient light brightness. The electronic device 1-100 may adaptively adjust brightness of the display 1-194 based on the sensed ambient light brightness. The ambient light sensor 1-180L may also be configured to automatically adjust white balance during photographing. The ambient light sensor 1-180L may further cooperate with the optical proximity sensor 1-180G to detect whether the electronic device 1-100 is in a pocket, to avoid an accidental touch.

The fingerprint sensor 1-180H is configured to obtain a fingerprint. The electronic device 1-100 may use a feature of the obtained fingerprint to implement fingerprint-based unlocking, application lock access, fingerprint-based photographing, fingerprint-based call answering, and the like.

The temperature sensor 1-180J is configured to detect a temperature. In some embodiments, the electronic device 1-100 executes a temperature processing policy by using the temperature detected by the temperature sensor 1-180J. For example, when the temperature reported by the temperature sensor 1-180J exceeds a threshold, the electronic device 1-100 lowers performance of a processor near the temperature sensor 1-180J, to reduce power consumption for thermal protection. In some other embodiments, when the temperature is less than another threshold, the electronic device 1-100 heats the battery 1-142 to prevent the electronic device 1-100 from being abnormally powered off because of a low temperature. In some other embodiments, when the temperature is less than still another threshold, the electronic device 1-100 boosts an output voltage of the battery 1-142 to avoid abnormal shutdown caused by a low temperature.

The touch sensor 1-180K is also referred to as a "touch component". The touch sensor 1-180K may be disposed on the display 1-194, and the touch sensor 1-180K and the display 1-194 form a touchscreen. The touch sensor 1-180K is configured to detect a touch operation performed on or near the touch sensor. The touch sensor may transfer a detected touch operation to the application processor, to determine a type of a touch event. A visual output related to the touch operation may be provided through the display 1-194. In some other embodiments, the touch sensor 1-180K may alternatively be disposed on a surface of the electronic device 1-100 and is located at a location different from that of the display 1-194.

The bone conduction sensor 1-180M may obtain a vibration signal. In some embodiments, the bone conduction sensor 1-180M may obtain a vibration signal of a vibration bone of a human vocal-cord part. The bone conduction sensor 1-180M may also be in contact with a body pulse to receive a blood pressure beating signal. In some embodiments, the bone conduction sensor 1-180M may also be disposed in a headset, to form a bone conduction headset. The audio module 1-170 may obtain a voice signal through parsing based on the vibration signal that is of the vibration bone of the vocal part and that is obtained by the bone conduction sensor 1-180M, to implement a voice function. The application processor may parse heart rate information based on the blood pressure beating signal obtained by the bone conduction sensor 1-180M, to implement a heart rate detection function.

The button 1-190 includes a power button, a volume button, and the like. The button 1-190 may be a mechanical button, or may be a touch button. The electronic device 1-100 may receive a key input, and generate a key signal input related to a user setting and function control of the electronic device 1-100.

The motor 1-191 may generate a vibration prompt. The motor 1-191 may be configured to provide an incoming call vibration prompt and a touch vibration feedback. For example, touch operations performed on different applications (for example, photographing and audio playing) may correspond to different vibration feedback effects. The motor 1-191 may also correspond to different vibration feedback effects for touch operations performed on different areas of the display 1-194. Different application scenarios (for example, a time reminder scenario, an information receiving scenario, an alarm clock scenario, and a game scenario) may also correspond to different vibration feedback effects. The touch vibration feedback effect may also be customized.

The indicator 1-192 may be an indicator light, and may be configured to indicate a charging status and a power change, or may be configured to indicate a message, a missed call, a notification, and the like.

The SIM card interface 1-195 is configured to connect to a SIM card. The SIM card may be inserted into the SIM card interface 1-195 or removed from the SIM card interface 1-195, to implement contact with or separation from the electronic device 1-100. The electronic device 1-100 may support one or N SIM card interfaces, where N is a positive integer greater than 1. The SIM card interface 1-195 may support a nano-SIM card, a micro-SIM card, a SIM card, and the like. A plurality of cards may be simultaneously inserted into a same SIM card interface 1-195. The plurality of cards may be of a same type or of different types. The SIM card interface 1-195 is compatible with different types of SIM cards. The SIM card interface 1-195 is also compatible with an external storage card. The electronic device 1-100 interacts with a network through the SIM card, to implement functions such as calling and data communication. In some embodiments, the electronic device 1-100 uses an eSIM, that is, an embedded SIM card. The eSIM card may be embedded in the electronic device 1-100, and cannot be separated from the electronic device 1-100. A software system of the electronic device 1-100 may use a layered architecture, an event-driven architecture, a microkernel architecture, a micro service architecture, or a cloud architecture. In this embodiment of this application, an Android system with a layered architecture is used as an example to describe a software structure of the electronic device 1-100.

Figures 1, 2:
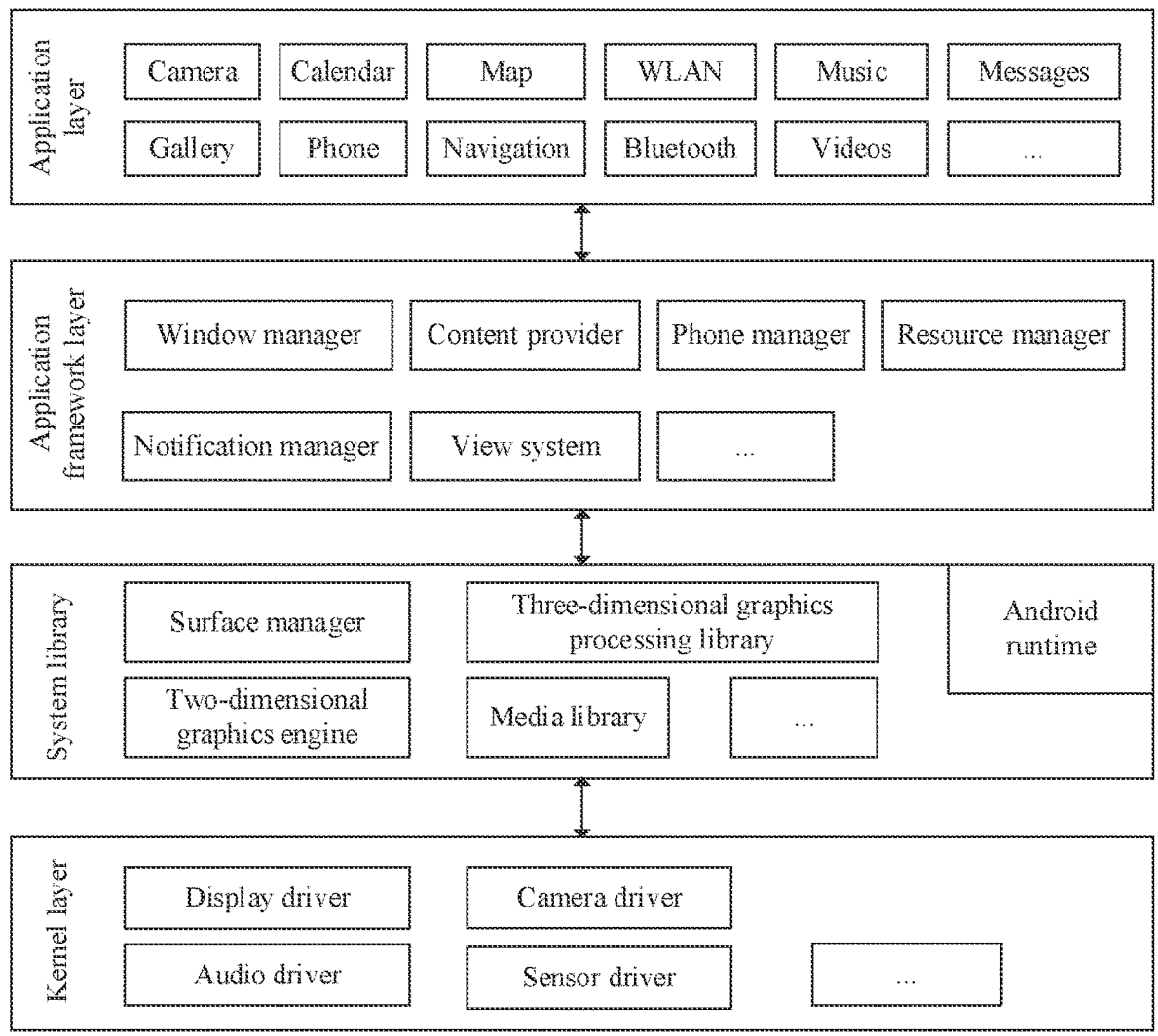

FIG. 1-2 is a block diagram of a software structure of an electronic device 1-100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 1-2, the application packages may include applications such as Camera. Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 1-2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and received, a browsing history and a browsing bookmark, an address book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide communication functions of the electronic device 1-100, for example, management of a call status (including answering or declining).

The resource manager provides, for an application, various resources such as a localized character string, an icon, a picture, a layout file, and a video file.

The notification manager enables an application to display notification information in a status bar, and may be configured to convey a notification message. The displayed notification information may disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an announcement is produced, the electronic device vibrates, or an indicator light blinks.

The Android runtime includes a core library and a virtual machine. The Android runtime is responsible for scheduling and management of the Android system.

The core library includes two parts: a function that needs to be invoked by Java language, and a core library of Android.

The application layer and the application framework layer run on a virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 1-100 with reference to a photographing scenario.

When the touch sensor 1-180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, a camera driver is started by invoking the kernel layer, and a static image or a video is captured through the camera 1-193.

Based on the hardware structure of the electronic device, embodiments of a memory management method in this application are provided.

This application provides a memory management method.

Figures 1, 2, 3:
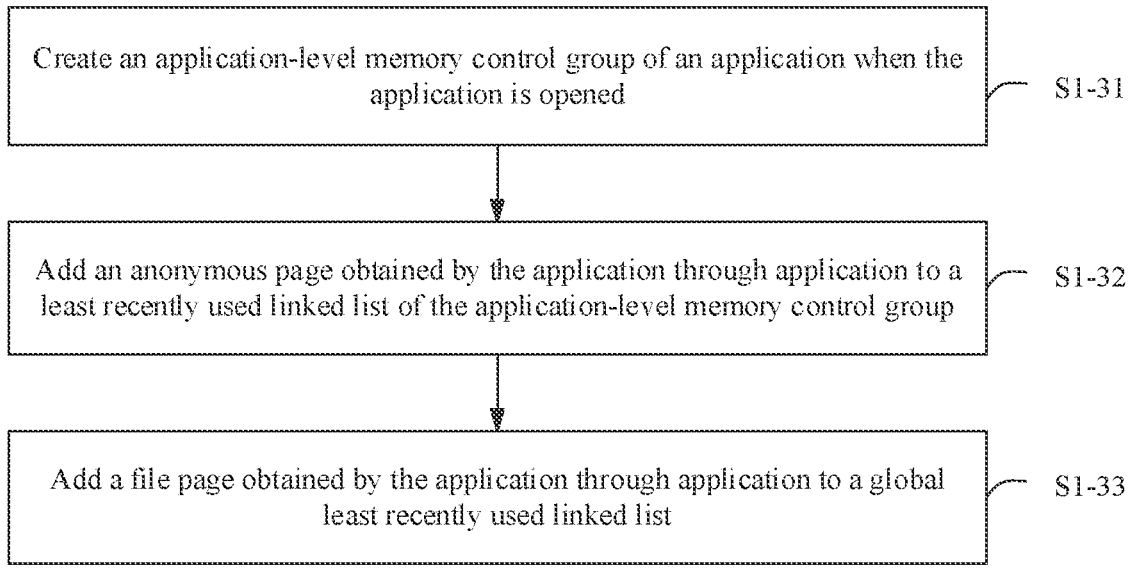

FIG. 1-3 is a flowchart of a memory management method according to an embodiment of this application. The memory management method is performed by an electronic device 1-100, and the memory management method may include but is not limited to the following steps.

Step S1-31: An electronic device creates an application-level memory control group of an application when the application is opened.

The memory control group may be configured to manage a memory unit corresponding to the application, and may be created in memory in a form of an object, including a method for managing a memory unit (for example, controlling a reclamation parameter of the memory unit) and related information for describing a memory resource. For example, the related information may include physical memory usage of a current memory control group, a memory active state of the current memory control group, and the like. The memory unit may be in a unit of a page, and a size of a page may be 4 KB bytes. This application proposes an application-level memory control group, which may be created when an application is opened, and may include memory information of a process of the application, and the process of the application is managed based on the memory information, so that memory management can be more targeted, overheads of a memory management structure can be reduced, user experience can be improved, and memory reclamation efficiency can be improved.

An application is a minimum unit for interacting with a user in the electronic device 1-100. Specifically, the electronic device 1-100 may implement a requirement service for the user by using the application. For example, a user may play a game by using a game application, may watch a video by using a video application, or may play music by using a music application.

The electronic device 1-100 may include one or more applications, where a plurality of means two or more. For example, applications such as a browser, a shopping application, a game application, and a music application may be installed on the electronic device 1-100, and memory needs to be applied for to open and run each application. In an embodiment, the electronic device 1-100 may create an application-level memory control group corresponding to an application when the application is opened.

A first application in this embodiment of this application may be one of system applications of the electronic device, or may be one of third-party applications of the electronic device. Specifically, this may be determined based on an actual use requirement, and is not limited in this embodiment of this application.

For example, if the application may be a browser, the electronic device 1-100 may create, when the browser is opened, an application-level memory control group memcg1 corresponding to the browser. Therefore, a kernel manages related memory of the browser based on the application-level memory control group memcg1. For example, the application may alternatively be a game application. When the game application is opened, the electronic device 1-100 may create an application-level memory control group memcg2 corresponding to the game application, and then a kernel may manage related memory of the game application based on the application-level memory control group memcg2.

In an implementation, a user mode may create a folder (that is, a memory control group) in a directory of a control group (control group, cgroup), and the folder is created in a unit of an application, that is, all processes of the application may be added to the folder. Therefore, an application-level memory control group may be created when a plurality of applications of the electronic device 1-100 are opened. Therefore, in this embodiment of this application, when the plurality of applications of the electronic device 1-100 are opened, respective corresponding application-level memory control groups may be created, that is, the application-level memory control groups are created in a dimension of an application.

It may be understood that the foregoing listed applications are examples, and may be specifically determined based on an actual use situation. This is not limited in this embodiment of this application.

Step S1-32: Add an anonymous page obtained by the application through application to a least recently used linked list of the application-level memory control group.

A file page (File-backed Page) may be a cache of data on a disk in memory, and data stored on the file page may be found in the disk. The anonymous page (Anonymous Page) may be a memory page dynamically allocated by an application without a corresponding disk file.

When the application is opened, the application applies to a system for a memory resource, and the kernel may add an anonymous page obtained by the application through application to the least recently used (Least Recently Used, LRU) linked list of the application-level memory control group. For example, when immediately obtaining the anonymous page through application, the application may add the anonymous page to an application-level memory control group corresponding to the application. Least recently used may be a memory management algorithm, which is used for memory management and reclamation control, and is used to select a least recently used page for reclamation.

For example, the application is a shopping application. If a user opens a shopping application of the electronic device 1-100, a corresponding application-level memory control group memcg3 is created for the shopping application, and the shopping application further applies to a system for a memory resource. In this case, when the shopping application immediately obtains an anonymous page through application, the electronic device 1-100 may add the anonymous page obtained through application to an LRU linked list in the application-level memory control group memcg3 for management.

Therefore, the corresponding application-level memory control group is created for the application (which may be the shopping application herein), and the anonymous page obtained by the application through application is added to the application-level memory control group corresponding to the application. Therefore, in this embodiment of this application, the anonymous page of the application may be managed based on the application-level memory control group, and/or a reclamation rank of the anonymous page may be controlled based on a status of the application, and/or a reclamation proportion of the anonymous page may be controlled based on the application-level memory control group, and/or memory usage of the application managed by the application-level memory control group may be controlled.

In an embodiment, a reclamation rank of the anonymous page may be controlled based on a status of the application, that is, an application that is first reclaimed may be controlled based on a status of the application. Specifically, in this embodiment of this application, the reclamation rank of the anonymous page of the application may be determined based on a frozen state and/or an active state and/or a foreground state of the application. For example, if an application 1 is in a frozen state, and an application 2 is in an active state, an anonymous page of the application 1 may be first reclaimed based on the frozen state of the application 1, and then an anonymous page of the application 2 is reclaimed, that is, an anonymous page of an application in a more active state is reclaimed later.

In an embodiment, a reclamation proportion of the anonymous page may be controlled based on the application-level memory control group. For example, a corresponding application-level memory control group memcg1 is created when an application 1 is opened, and a corresponding application-level memory control group memcg2 is created when an application 2 is opened. If the reclamation proportion of the anonymous page is controlled to be 60% in the application-level memory control group memcg1, and an LRU linked list 1 in the application 1 includes 1 to 100 anonymous pages, only 60 anonymous pages can be sequentially reclaimed at the tail of the LRU linked list 1 during memory reclamation. If the reclamation proportion of the anonymous page is controlled to be 70% in the application-level memory control group memcg2, and an LRU linked list 2 in the application 2 includes 1 to 100 anonymous pages, only 70 anonymous pages can be sequentially reclaimed at the tail of the LRU linked list 2 during memory reclamation. It may be understood that, in an embodiment, an application in a more active state has a lower reclamation proportion of an anonymous page of the application.

Step S1-33: Add a file page obtained by the application through application to a global least recently used linked list.

As described above, when the application is opened, the application applies to the system for a memory resource, and the electronic device 1-100 adds the anonymous page obtained through application to the application-level memory control group corresponding to the application. In this embodiment of this application, the electronic device 1-100 further adds the file page obtained by the application through application to the global LRU linked list. For example, the application may add the file page to the global LRU linked list immediately after obtaining the file page through application.

For example, at a first time, a user may open a shopping application of the electronic device 1-100, and the electronic device 1-100 creates a corresponding application-level memory control group memcg3 for the shopping application. In this case, the shopping application may load library files such as so and lib from a disk, and a file page obtained by the shopping application through application may be added to the global LRU linked list. At a second time, the user may open a gallery application of the electronic device 1-100, and the electronic device 1-100 creates a corresponding application-level memory control group memcg4 for the gallery application. When the user browses a photo, the gallery application may load a file such as a photo from a disk, and a file page obtained by the gallery application through application may be added to the global LRU linked list. After the application is used for a period of time, the system may perform reclamation based on locations of the library file and the photo file in the global LRU linked list.

It may be understood that the LRU linked list may include an active (active) linked list and an inactive (inactive) linked list, and all pages for memory reclamation are obtained from the inactive linked list. In other words, in the memory control group corresponding to the first application, two LRU linked lists are used to manage anonymous pages, and two global LRU linked lists are used to manage file pages.

Specifically, in this embodiment of this application, when the application obtains the anonymous page and the file page through application, the anonymous page obtained through application is added to the active linked list of the application-level memory control group corresponding to the application, and the file page obtained through application is added to the global active linked list. When memory in the memory control group is reclaimed, the cold data at the tail of the inactive linked list is first reclaimed. When an anonymous page in the inactive linked list is referenced for a preset quantity of times, the anonymous page may be extracted from the inactive linked list and placed into the active linked list. When anonymous pages in the inactive linked list are insufficient, the system may continue to scan the active linked list, and migrate some anonymous pages to the inactive linked list.

In a possible implementation, the memory control group may be created based on a process identifier (process identifier, pid), and each process id manages an LRU linked list of the process id, that is, the memory control group is created in a dimension of a process. However, if the memory control group is created based on the process id, a power consumption waste is caused to the electronic device 1-100, affecting user experience. It may be understood that an application is a minimum unit for interacting with the user in the electronic device 1-100. From a perspective of the user, the application is an operation object. From a perspective of a requirement, the application is a bearer of a resource requirement. Therefore, in the technical solutions of this application, the application-level memory control group is created in a dimension of an application. That is, an application-level memory control group is created for each application. According to the technical solutions of this application, the anonymous page can be managed based on the application, memory, power consumption, and performance consumption can be controlled, and reclamation efficiency is improved.

In a possible implementation embodiment, each process may correspond to one memory control group. However, this consumes huge system resources. In addition, the file page is a cache or buffer area of a disk file, and is mainly featured in sharing. Therefore, if file pages are managed based on the memory control group, hot and cold file pages are unevenly distributed. In addition, during out of memory, the memory is obtained through reclamation. Uneven distribution of hot and cold file pages leads to frequent reclamation of hot file pages, which easily causes system freezing and severely affects user experience. Therefore, in the technical solutions provided in this embodiment of this application, a corresponding application-level memory control group is created for an application, and an anonymous page obtained by the application through application is added to an LRU linked list of the application-level memory control group, and a file page obtained by the application through application is added to a global LRU linked list. Therefore, in this embodiment of this application, the anonymous page can be managed in a dimension of an application, memory, power consumption, and performance can be controlled, memory reclamation efficiency can be further improved, system freezing can be reduced, and user experience can be improved.

Based on the method described in the foregoing embodiment, the following further describes the memory management method in this application in detail. FIG. 1-4 is another schematic flowchart of a memory management method according to an embodiment of this application. The method may include but is not limited to the following steps.

Step S1-41: Create, when a process of an application is started, based on an application identifier corresponding to the process, an application-level memory control group corresponding to the application.

It may be understood that the process is an application running in memory, and is a basic unit for a system to allocate and schedule resources. Each process has independent memory space.

It may be understood that each application has an application identifier (for example, a package name), which may be used to uniquely identify the application. The application identifier of the application may be obtained in many manners. For example, the application identifier of the application may be determined by querying configuration information of the application. For another example, the application identifier of the application may be determined based on a process identifier of the application.

In an embodiment, one application may include a plurality of processes. That is, the application may include a plurality of processes. When a process of the application is started, the application-level memory control group corresponding to the first application is created based on an application identifier corresponding to the process. For example, in an embodiment, the electronic device 1-100 may create, based on a package name corresponding to the process, an application-level memory control group corresponding to the application.

For example, the application is a browser. It is assumed that a process 1 of the browser starts to be started. If an application-level memory control group memcg1 corresponding to an application identifier APP1 corresponding to the process 1 does not exist, the application-level memory control group memcg1 corresponding to the browser is created. If the application-level memory control group memcg1 corresponding to the application identifier APP1 corresponding to the process 1 already exists, the browser does not need to re-create the application-level memory control group memcg1. In this case, the process 1 is added to the application-level memory control group memcg1 of the browser, and the process 1 is managed based on the application-level memory control group memcg1, where a memory resource of the process 1 may be added to an LRU linked list of the application-level memory control group memcg1. Then, if a process 2 of the browser is started, because the browser includes the process 1 and the process 2, the process 2 and the process 1 belong to a same application identifier APP1. In this case, the application-level memory control group memcg1 is created for the application identifier APP1 corresponding to the process 2. Therefore, when the process 2 is started, the process 2 is directly added to the application-level memory control group memcg1 corresponding to the browser, and a memory resource of the process 2 is added to an LRU linked list of the application-level memory control group memcg2.

Step S1-42: Add an anonymous page of the process to a least recently used linked list of the memory control group, and reclaim the anonymous page based on the least recently used linked list; and add a file page of the process to a global least recently used linked list of a memory node, and reclaim the file page based on the global least recently used linked list.

In an embodiment, if the application-level memory control group corresponding to the application is created for the application identifier corresponding to the process, the anonymous page obtained by the first process through application may be added to the LRU linked list of the memory control group, and the file page obtained by the first process through application may be added to the global LRU linked list of the memory node.

For example, the first application is a browser. It is assumed that a process 1 of the browser starts to be started. If an application-level memory control group memcg1 is created for an application identifier APP1 corresponding to the web page 1, an anonymous page obtained by the process 1 through application is added to the application-level memory control group memcg1 of the browser, and a file page obtained by the process 1 through application is added to the global LRU linked list. Then, if a process 2 of the browser is started, because the process 2 and the process 1 belong to a same application identifier APP1, the application-level memory control group memcg1 is created for the application identifier APP1 corresponding to the process 2. Therefore, when the process 2 is started, an anonymous page obtained by the process 2 through application is directly added to the application-level memory control group memcg1 of the browser, and therefore the anonymous pages of the process 1 and the process 2 may be reclaimed based on the least recently used linked list, a file page obtained by the process 2 through application is added to the global LRU linked list, and the file pages of the process 1 and the process 2 may be reclaimed based on the global least recently used linked list.

Step S1-43: Delete the process from the application-level memory control group if the process is destroyed.

In this embodiment of this application, the process may be deleted from the application-level memory control group of the application if the process of the application is destroyed.

It is assumed that the application includes a process 1, a process 2, and a process 3. When memory resources of a system are insufficient and memory needs to be reclaimed, the system may choose to kill the process 1 and the process 2, and delete the process 1 and the process 2 from the memory control group corresponding to the application, so that some anonymous pages and file pages of the application can be released, to meet a memory requirement of the system.

Step S1-44: Delete the application-level memory control group if the application is destroyed.

In this embodiment of this application, the memory control group corresponding to the application is deleted if the application is destroyed. For example, if all processes in the memory control group of the application are destroyed, anonymous pages of the processes may be deleted from the least recently used linked list of the application-level memory control group and released, and file pages of the processes may be deleted from the global least recently used linked list and released.

For example, three processes are created after the user opens the browser, that is, the browser may include a process 1, a process 2, and a process 3, and the process 1, the process 2, and the process 3 are all added to the application-level memory control group memcg1 of the browser. When the user chooses to exit the browser, the process 1, the process 2, and the process 3 in the memory control group of the first application are destroyed, and a kernel deletes the application-level memory control group memcg1 of the browser. In this case, memory occupied by the browser may also be released.

FIG. 1-5 is another schematic flowchart of a memory management method according to an embodiment of this application. The memory management method may include but is not limited to the following steps.

Step S1-51: Create a memory control group based on a whitelist.

In this embodiment of this application, when the electronic device 1-100 is started, the memory control group may be created based on the whitelist. Therefore, a critical system process in the whitelist may be added to the memory control group.

Step S1-52: When a system process is started, determine, based on a process name of the system process, whether the system process is a whitelist process.

The system process may include processes required by a system to manage a computer individual and complete various operations, for example, an additional program process started and executed by a user. In these processes, some system processes, such as critical system services and frequently used system services, need to be invoked for system running. If the processes are missing, running of the entire system is affected.

In this embodiment of this application, when the system process or a system service is started, it may be determined, based on the process name of the system process, whether the system process is the whitelist process. For example, the whitelist may include a process name 1 of a system process 1, a process 2 of a system process 2, and a process name 3 of a system process 3. When the system process 1 is started, if it is determined that the process name 1 of the system process 1 is in the whitelist, it may be determined that the system process 1 is the whitelist process. When the system process 2 is started, if it is determined that the process name 2 of the system process 2 is in the whitelist, it may be determined that the system process 2 is the whitelist process. When a system process 4 is started, if it is determined that a process name 4 of the system process 4 is not in the whitelist, it may be determined that the system process 4 is not the whitelist process.

Step S1-53: Add the system process to the memory control group.

In this embodiment of this application, if it is determined, based on the process name of the system process, that the system process is the whitelist process, the whitelist process is added to the memory control group, that is, some critical system services and frequently used system services are added to the whitelist, to prevent the system from reclaiming these system processes by mistake, which affects user experience.

In an embodiment, if it is determined that the system process is the whitelist process, an anonymous page of the whitelist process may be added to a least recently used linked list of the memory control group, and the anonymous page of the whitelist process may be reclaimed based on the least recently used linked list. In addition, a file page of the whitelist process may be further added to a global least recently used linked list of a memory node, so that the file page of the whitelist process can be reclaimed based on the global least recently used linked list.

FIG. 1-6 is a scenario diagram of memory management according to an embodiment of this application.

In this embodiment of this application, when an application of the electronic device 1-100 is opened, an application-level memory control group of the application may be created based on a package name of the application. Therefore, in some embodiments of this application, one application-level memory control group is created for each application. For example, each application performs memory management based on a corresponding application-level memory control group.

In this embodiment of this application, when the application of the electronic device 1-100 is deleted, the application-level memory control group corresponding to the package name of the application may be deleted, and memory corresponding to the application-level memory control group of the application may be released.

FIG. 1-7 is a more specific scenario diagram of memory management according to an embodiment of this application.

The following describes, with reference to FIG. 1-7 by using an example in which an application is a news application, a memory management solution disclosed in this application.

When a process 1 of the news application is created, the electronic device 1-100 creates an application-level memory control group memcg1 based on a package name of the news application. Then, a kernel adds an anonymous page obtained by the news application through application to the application-level memory control group memcg1, and adds a file page obtained by the news application through application to a global LRU linked list. It may be understood that, in an embodiment, when another application such as a music application of the electronic device is opened, a corresponding application-level memory control group memcg2 may also be created, an anonymous page obtained by the music application through application is added to the application-level memory control group memcg2, and a file page obtained by the music application through application is added to the global LRU linked list.

If a process 2 of the news application is created, the process 2 is added to the application-level memory control group memcg1 of the news application, and an anonymous page obtained by the process 2 through application is added to the application-level memory control group memcg1, and a file page obtained by the process 2 through application is added to the global LRU linked list.

If the process 2 of the news application is destroyed, the process 2 is deleted from the application-level memory control group memcg1 of the news application, an anonymous page of the process 2 is deleted from an application-level memory control group memcg2 of the news application, and a file page of the process 2 is also deleted from the global LRU linked list.

When the news application exits, these processes in the application-level memory control group memcg1 of the news application are destroyed, and the kernel deletes the application-level memory control group memcg1 of the news application. In this case, the file page and the anonymous page corresponding to the news application are also released.

Therefore, according to this embodiment of this application, the anonymous page can be managed in a dimension of an application, and memory, power consumption, and performance consumption can be controlled, so that refined memory management can be implemented.

FIG. 1-8 is a scenario diagram of memory management according to an embodiment of this application.

In this embodiment of this application, a plurality of parameter setting interfaces are customized for an application-level memory control group of each application. Therefore, a user mode may set a reclamation priority of the application, maximum memory usage of the application, a reclamation parameter of the application, and the like by setting parameters.

Specifically, the user mode may correspondingly control a reclamation rank of the application-level memory control group in kernel space by setting a parameter of the application-level memory control group of the application. For example, the user mode may set a corresponding reclamation priority based on importance of the application. Therefore, when memory reclamation needs to be performed, the reclamation rank of the application-level memory control group in the kernel space is controlled based on the reclamation priority of the application. Specifically, the user mode may further control a reclamation proportion of the application-level memory control group in the kernel space based on a parameter of the application-level memory control group.

It may be understood that, as a kernel of a computing device, an operating system is independent of a common application, and may access protected memory space and have permission to access an underlying hardware device. To ensure that a user process does not directly operate a kernel and ensure kernel security, the operating system divides addressing space (the addressing space may be a part of space in memory of the computing device, or may be virtual storage space) into two parts. One part is kernel space, and the kernel space is protected memory space and is used to store kernel code and data; and the other part is user space and is used to store application code and data. When the process executes code of a user program, the process is in a user mode. Correspondingly, when the process calls a system and falls into the kernel code for execution, the process is in a kernel mode. The process in the user mode runs in the user space, and the process in the kernel mode runs in the kernel space.

In an embodiment, the user mode may control behavior of the application-level memory control group in the kernel mode by setting a parameter of the application-level memory control group of the application. For example, the user mode may control memory usage of the application, for example, maximum memory usage of the application, based on the parameter of the application-level memory control group of the application.

For example, an application is a browser. The user mode may set the maximum memory usage of the browser through an interface, that is, may limit a memory size of each application. It is assumed that the maximum memory usage of the browser is 800 MB, but memory used by the browser is 900 MB. In this case, because a file page of the browser is backed up to a disk, the system kernel cleans the file page of the browser and compresses an anonymous page of the browser, to meet a memory requirement.

In a possible implementation, in an embodiment, the following interface may be provided to set the parameter of the application-level memory control group:

Watermark setting interface: The user mode may set a standard watermark of the system memory through the watermark setting interface, and then the kernel performs reclamation to meet the watermark as much as possible to ensure that the system memory is in a healthy state.

Ratio setting interface: The user mode may set reclamation and swap-out ratios of each application based on user habits and application features through the ratio setting interface to control an amount of reclamation and swap-out, reduce invalid reclamation of the application, and improve user experience.

Important score setting interface: The user mode may set a priority and importance of each application based on user habits and application features through the important score setting interface, and determine a reclamation rank of the application in reclamation to improve user experience.

Application memory usage upper limit setting interface: The user mode sets a memory usage upper limit for each application through the application memory usage upper limit setting interface to ensure that each application can use memory properly.

Active compression interface: When an application is in a frozen state, the user mode actively compresses and reclaims an anonymous page of the application through the active compression interface to increase system memory and ensure memory health.

Application memory usage interface: The user mode queries usage of an anonymous page of each application in a system through the application memory usage interface, which is used as a reference for clearing and reclamation.

System status interface: The user mode queries a real-time status of the system through the system status interface, for example, a memory status, a CPU status, an i/O status, and a running status of some key processes of the system.

According to the technical solution in this embodiment of this application, when memory reclamation needs to be performed, the system may reclaim a file page based on a hot or cold status of a global LRU linked list and based on importance of the application, maximum memory usage of the application, a reclamation parameter of the application, and the like, and reclaim an anonymous page based on a parameter specified by a user. Therefore, according to the technical solution in this embodiment of this application, memory reclamation is more targeted, and reclamation efficiency can be further improved.

FIG. 1-9 is a schematic diagram of a structure of a memory management apparatus according to an embodiment of this application. The memory management apparatus may be configured to perform steps of the memory management methods described in FIG. 1-3 to FIG. 1-8. For details, refer to related descriptions in FIG. 1-3 to FIG. 1-8. The details are not described herein again. As shown in FIG. 1-9, the memory management apparatus 1-200 may include a creating module 1-201, a control module 1-202, and a management module 1-203.

In this embodiment of this application, the creating module 1-201 is configured to create an application-level memory control group of a first application when the first application is opened.

The control module 1-202 is configured to add an anonymous page obtained by the application through application to a least recently used linked list of the memory control group, and the control module 1-202 is further configured to add a file page obtained by the application through application to a global least recently used linked list.

The creating module 1-201 may be further configured to create, when a process of the application is started, based on an application identifier corresponding to the process, the application-level memory control group corresponding to the application.

Specifically, if a memory control group corresponding to the application identifier corresponding to the process does not exist, the creating module 1-201 creates the application-level memory control group corresponding to the application.

If the creating module 1-201 has created the application-level memory control group corresponding to the application identifier, the control module 1-202 adds the process to the application-level memory control group, adds an anonymous page of the process to the least recently used linked list of the application-level memory control group, and adds a file page of the process to the global least recently used linked list.

The management module 1-203 is configured to delete the process from the application-level memory control group when the process is destroyed. The management module 1-203 is further configured to delete the application-level memory control group when all processes in the application-level memory control group of the application are destroyed.

In a possible implementation, the management module 1-203 may be further configured to:

manage the anonymous page of the application based on the application-level memory control group; and/or control a reclamation rank of the anonymous page based on a status of the application; and/or control a reclamation proportion of the anonymous page based on the memory control group; and/or control memory usage of the memory control group.

In a possible implementation, the control module 1-202 is further configured to:

add the anonymous page to an active least recently used linked list of the first memory control group when the application obtains the anonymous page through application.

The management module 1-203 is configured to add the file page to a global active least recently used linked list when the application obtains the file page through application.

When memory reclamation needs to be performed, the management module 1-203 is configured to control a reclamation rank of the memory control group in kernel space based on a first parameter of the memory control group.

When memory reclamation needs to be performed, the management module 1-203 is configured to control a reclamation proportion of the memory control group in kernel space based on a second parameter of the memory control group.

The management module 1-203 is further configured to control memory usage of the memory control group in kernel space based on a third parameter of the memory control group. It may be understood that division into the modules in the memory management apparatus is merely used as an example for description. In another embodiment, the memory management apparatus may be divided into different modules based on a requirement, to implement functions of the memory management apparatus.

Implementations of the modules in the memory management apparatus provided in this embodiment of this application may be in a form of a computer program. The computer program may run on an electronic device or a server. For specific implementations of the modules in this embodiment of this application, refer to corresponding descriptions of the method embodiments shown in FIG. 1-3 to FIG. 1-8. In the memory management apparatus described in FIG. 1-9, the anonymous page can be managed in a refined manner, reclamation pertinence can be improved, and reclamation efficiency can be improved, so that application freezing can be avoided, and user experience can be improved. For specific content, refer to a specific embodiment of the foregoing memory management method. Details are not described herein again.

An embodiment of this application further provides a computer-readable storage medium. The readable storage medium stores computer instructions, and when the instructions are run on a computing device, the computing device is enabled to perform the memory management method provided in the foregoing embodiments.

It is clear that, for a person skilled in the art, this application is not limited to details of the foregoing example embodiments, and this application can be implemented in another specific form without departing from the spirit or basic features of this application. Therefore, appropriate modifications and variations made to the foregoing embodiments shall fall within the protection scope of this application provided that the modifications and variations fall within the essence and spirit of this application.

Embodiments of this application disclose a memory management method, an electronic device, and a computer-readable storage medium, to improve smoothness of an operating system, avoid frame freezing in the electronic device, and improve user experience.

The memory management method provided in embodiments of this application may be applied to an electronic device. The electronic device may also be referred to as user equipment (User Equipment, UE), a mobile station (Mobile Station, MS), a mobile terminal (Mobile Terminal), or the like. Optionally, the electronic device may have a capability of communicating with one or more core networks through a radio access network (Radio Access Network, RAN). For example, the electronic device may be a mobile phone (or referred to as a "cellular" phone), a computer with a mobile property, or the like.

FIG. 2-1 is a schematic diagram of a structure of an electronic device 2-100.

The electronic device 2-100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant. PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 2-100 may include a processor 2-110, an external memory interface 2-120, an internal memory 2-121, a universal serial bus (universal serial bus, USB) port 2-130, a charging management module 2-140, a power management module 2-141, a battery 2-142, an antenna 2-1, an antenna 2-2, a mobile communications module 2-150, a wireless communications module 2-160, an audio module 2-170, a speaker 2-170A, a receiver 2-170B, a microphone 2-170C, a headset jack 2-170D, a sensor module 2-180, a button 2-190, a motor 2-191, an indicator 2-192, a camera 2-193, a display 2-194, a subscriber identification module (subscriber identification module, SIM) card interface 2-195, and the like. The sensor module 2-180 may include a pressure sensor 2-180A, a gyro sensor 2-180B, a barometric pressure sensor 2-180C, a magnetic sensor 2-180D, an acceleration sensor 2-180E, a distance sensor 2-180F, an optical proximity sensor 2-180G, a fingerprint sensor 2-180H, a temperature sensor 2-180J, a touch sensor 2-180K, an ambient light sensor 2-180L, a bone conduction sensor 2-180M, and the like.

It may be understood that the structure shown in this embodiment of this application does not constitute a specific limitation on the electronic device 2-100. In some other embodiments of this application, the electronic device 2-100 may include more or fewer components than those shown in the figure, or combine some components, or split some components, or have different component arrangements. The components shown in the figure may be implemented by hardware, software, or a combination of software and hardware.

The processor 2-110 may include one or more processing units. For example, the processor 2-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 2-110, and is configured to store instructions and data. In some embodiments, the memory in the processor 2-110 is a cache. The memory may store instructions or data that has been used or cyclically used by the processor 2-110. If the processor 2-110 needs to use the instructions or the data again, the processor may directly invoke the instructions or the data from the memory. This avoids repeated access, reduces waiting time of the processor 2-110, and improves system efficiency.

In some embodiments, the processor 2-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 2-110 may include a plurality of groups of I2C buses. The processor 2-110 may be separately coupled to the touch sensor 2-180K, a charger, a flash, the camera 2-193, and the like through different I2C bus interfaces. For example, the processor 2-110 may be coupled to the touch sensor 2-180K through an I2C interface, so that the processor 2-110 communicates with the touch sensor 2-180K through the I2C bus interface, to implement a touch function of the electronic device 2-100.

The I2S interface may be used for audio communication. In some embodiments, the processor 2-110 may include a plurality of groups of I2S buses. The processor 2-110 may be coupled to the audio module 2-170 through the I2S bus, to implement communication between the processor 2-110 and the audio module 2-170. In some embodiments, the audio module 2-170 may transfer an audio signal to the wireless communications module 2-160 through the I2S interface, to implement a function of answering a call by using a Bluetooth headset.

The PCM interface may also be used for audio communication, and samples, quantizes, and codes an analog signal. In some embodiments, the audio module 2-170 may be coupled to the wireless communications module 2-160 through a PCM bus interface. In some embodiments, the audio module 2-170 may alternatively transfer an audio signal to the wireless communications module 2-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 2-110 to the wireless communications module 2-160. For example, the processor 2-110 communicates with a Bluetooth module in the wireless communications module 2-160 through the UART interface, to implement a Bluetooth function. In some embodiments, the audio module 2-170 may transfer an audio signal to the wireless communications module 2-160 through the UART interface, to implement a function of playing music by using a Bluetooth headset.

The MIPI may be configured to connect the processor 2-110 to a peripheral component such as the display 2-194 or the camera 2-193. The MIPI includes a camera serial interface (camera serial interface, CSI), a display serial interface (display serial interface, DSI), and the like. In some embodiments, the processor 2-110 communicates with the camera 2-193 through the CSI, to implement a photographing function of the electronic device 2-100. The processor 2-110 communicates with the display 2-194 through the DSI, to implement a display function of the electronic device 2-100.

The GPIO interface may be configured by using software. The GPIO interface may be configured as a control signal or a data signal. In some embodiments, the GPIO interface may be configured to connect the processor 2-110 to the camera 2-193, the display 2-194, the wireless communications module 2-160, the audio module 2-170, the sensor module 2-180, and the like. The GPIO interface may alternatively be configured as an I2C interface, an I2S interface, a UART interface, an MIPI, or the like.

The USB port 2-130 is a port that conforms to a USB standard specification, and may be specifically a mini USB port, a micro USB port, a USB Type-C port, or the like. The USB port 2-130 may be configured to connect to a charger to charge the electronic device 2-100, or may be configured to transmit data between the electronic device 2-100 and a peripheral device, or may be configured to connect to a headset for playing an audio through the headset. The port may alternatively be configured to connect to another electronic device such as an AR device.

It may be understood that an interface connection relationship between modules in this embodiment of this application is an example for description, and does not constitute a limitation on the structure of the electronic device 2-100. In some other embodiments of this application, the electronic device 2-100 may alternatively use an interface connection manner different from that in the foregoing embodiment, or a combination of a plurality of interface connection manners.

The charging management module 2-140 is configured to receive a charging input from a charger. The charger may be a wireless charger or a wired charger. In some embodiments of wired charging, the charging management module 2-140 may receive a charging input from the wired charger through the USB port 2-130. In some embodiments of wireless charging, the charging management module 2-140 may receive a wireless charging input through a wireless charging coil of the electronic device 2-100. When charging the battery 2-142, the charging management module 2-140 may further supply power to the electronic device by using the power management module 2-141.

The power management module 2-141 is configured to connect to the battery 2-142, the charging management module 2-140, and the processor 2-110. The power management module 2-141 receives an input of the battery 2-142 and/or an input of the charging management module 2-140, and supplies power to the processor 2-110, the internal memory 2-121, the display 2-194, the camera 2-193, the wireless communications module 2-160, and the like. The power management module 2-141 may be further configured to monitor parameters such as a battery capacity, a battery cycle count, and a battery health status (electricity leakage or impedance). In some other embodiments, the power management module 2-141 may alternatively be disposed in the processor 2-110. In some other embodiments, the power management module 2-141 and the charging management module 2-140 may alternatively be disposed in a same device.

A wireless communication function of the electronic device 2-100 may be implemented by using the antenna 2-1, the antenna 2-2, the mobile communications module 2-150, the wireless communications module 2-160, the modem processor, the baseband processor, and the like.

The antenna 2-1 and the antenna 2-2 are configured to: transmit and receive electromagnetic wave signals. Each antenna in the electronic device 2-100 may be configured to cover one or more communication frequency bands. Different antennas may be further multiplexed, to increase antenna utilization. For example, the antenna 2-1 may be multiplexed as a diversity antenna in a wireless local area network. In some other embodiments, the antenna may be used in combination with a tuning switch.

The mobile communications module 2-150 may provide a wireless communication solution that includes 2G/3G/4G/5G or the like and that is applied to the electronic device 2-100. The mobile communications module 2-150 may include at least one filter, a switch, a power amplifier, a low noise amplifier (low noise amplifier, LNA), and the like. The mobile communications module 2-150 may receive an electromagnetic wave through the antenna 2-1, perform processing such as filtering or amplification on the received electromagnetic wave, and transmit the electromagnetic wave to the modem processor for demodulation. The mobile communications module 2-150 may further amplify a signal modulated by the modem processor, and convert an amplified signal into an electromagnetic wave for radiation through the antenna 2-1. In some embodiments, at least some functional modules in the mobile communications module 2-150 may be disposed in the processor 2-110. In some embodiments, at least some functional modules in the mobile communications module 2-150 may be disposed in a same device as at least some modules in the processor 2-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 2-170A, the receiver 2-170B, or the like), or displays an image or a video through the display 2-194. In some embodiments, the modem processor may be an independent device. In some other embodiments, the modem processor may be independent of the processor 2-110, and is disposed in a same device as the mobile communications module 2-150 or another functional module.

The wireless communications module 2-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 2-100. The wireless communications module 2-160 may be one or more components that integrate at least one communications processor module. The wireless communications module 2-160 receives an electromagnetic wave through the antenna 2-2, performs frequency modulation and filtering processing on the electromagnetic wave signal, and sends a processed signal to the processor 2-110. The wireless communications module 2-160 may further receive a to-be-sent signal from the processor 2-110, perform frequency modulation and amplification on the signal, and convert a processed signal into an electromagnetic wave for radiation through the antenna 2-2.

In some embodiments, the antenna 2-1 and the mobile communications module 2-150 in the electronic device 2-100 are coupled, and the antenna 2-2 and the wireless communications module 2-160 in the electronic device 2-100 are coupled, so that the electronic device 2-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE). BT, a GNSS, a WLAN. NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system. QZSS), and/or a satellite based augmentation system (satellite based augmentation system, SBAS).

The electronic device 2-100 may implement a display function through the GPU, the display 2-194, the application processor, and the like. The GPU is a microprocessor for image processing, and is connected to the display 2-194 and the application processor. The GPU is configured to: perform mathematical and geometric calculation, and render an image. The processor 2-110 may include one or more GPUs that execute program instructions to generate or change display information.

The display 2-194 is configured to display an image, a video, and the like. The display 2-194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 2-100 may include one or N displays 2-194, where N is a positive integer greater than 1.

The electronic device 2-100 may implement a photographing function through the ISP, the camera 2-193, the video codec, the GPU, the display 2-194, the application processor, and the like.

The ISP is configured to process data fed back by the camera 2-193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 2-193.

The camera 2-193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 2-100 may include one or N cameras 2-193, where N is a positive integer greater than 1.

The digital signal processor is configured to process a digital signal, and may further process another digital signal in addition to a digital image signal. For example, when the electronic device 2-100 selects a frequency, the digital signal processor is configured to perform Fourier transform or the like on frequency energy.

The video codec is configured to: compress or decompress a digital video. The electronic device 2-100 may support one or more video codecs. In this way, the electronic device 2-100 may play or record videos in a plurality of coding formats, for example, moving picture experts group (moving picture experts group, MPEG)-1, MPEG-2. MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 2-100, such as image recognition, facial recognition, speech recognition, and text understanding.

The internal memory 2-121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by using the processor 2-110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 2-110.

The external memory interface 2-120 may be configured to connect to an external non-volatile memory, to extend a storage capability of the electronic device 2-100. The external non-volatile memory communicates with the processor 2-110 through the external memory interface 2-120, to implement a data storage function. For example, files such as music and videos are stored in the external non-volatile memory.

The electronic device 2-10 may implement audio functions, for example, music playing and recording, by using the audio module 2-170, the speaker 2-170A, the receiver 2-170B, the microphone 2-170C, the headset jack 2-170D, the application processor, and the like.

The audio module 2-170 is configured to convert digital audio information into an analog audio signal for output, and is also configured to convert an analog audio input into a digital audio signal. The audio module 2-170 may be further configured to: code and decode an audio signal. In some embodiments, the audio module 2-170 may be disposed in the processor 2-110, or some functional modules in the audio module 2-170 are disposed in the processor 2-110.

The speaker 2-170A, also referred to as a "horn", is configured to convert an electrical audio signal into a sound signal. The electronic device 2-100 may be used to listen to music or answer a call in a hands-free mode over the speaker 2-170A.

The receiver 2-170B, also referred to as an "earpiece", is configured to convert an electrical audio signal into a sound signal. When a call is answered or speech information is received through the electronic device 2-100, the receiver 2-170B may be put close to a human ear to listen to a voice.

The microphone 2-170C, also referred to as a "mike" or a "mic", is configured to convert a sound signal into an electrical signal. When making a call or sending voice information, a user may make a sound near the microphone 2-170C through the mouth of the user, to input the sound signal to the microphone 2-170C. At least one microphone 2-170C may be disposed in the electronic device 2-100. In some other embodiments, two microphones 2-170C may be disposed in the electronic device 2-100, to implement a noise reduction function in addition to obtaining a sound signal. In some other embodiments, three, four, or more microphones 2-170C may alternatively be disposed in the electronic device 2-100, to obtain a sound signal, reduce noise, identify a sound source, implement a directional recording function, and the like.

The headset jack 2-170D is configured to connect to a wired headset. The headset jack 2-170D may be the USB port 2-130, or may be a 3.5 mm open mobile terminal platform (open mobile terminal platform. OMTP) standard interface or a cellular telecommunications industry association of the USA (cellular telecommunications industry association of the USA, CTIA) standard interface.

The pressure sensor 2-180A is configured to sense a pressure signal, and may convert the pressure signal into an electrical signal. In some embodiments, the pressure sensor 2-180A may be disposed on the display 2-194. There are many types of pressure sensors 2-180A, for example, a resistive pressure sensor, an inductive pressure sensor, and a capacitive pressure sensor. The capacitive pressure sensor may include at least two parallel plates with conductive materials. When a force is applied to the pressure sensor 2-180A, capacitance between electrodes changes. The electronic device 2-100 determines pressure intensity based on the change of the capacitance. When a touch operation is performed on the display 2-194, the electronic device 2-100 detects intensity of the touch operation based on the pressure sensor 2-180A. The electronic device 2-100 may also calculate a touch location based on a detection signal of the pressure sensor 2-180A. In some embodiments, touch operations that are performed at a same touch location but have different touch operation intensity may correspond to different operation instructions. For example, when a touch operation whose touch operation intensity is less than a tenth pressure threshold is performed on a Messages icon, an instruction for viewing an SMS message is executed. When a touch operation whose touch operation intensity is greater than or equal to the tenth pressure threshold is performed on the Messages icon, an instruction for creating a new SMS message is executed.

The gyro sensor 2-180B may be configured to determine a motion posture of the electronic device 2-100. In some embodiments, an angular velocity of the electronic device 2-100 around three axes (that is, axes x, y, and z) may be determined through the gyro sensor 2-180B. The gyro sensor 2-180B may be configured to implement image stabilization during photographing. For example, when the shutter is pressed, the gyro sensor 2-180B detects an angle at which the electronic device 2-100 jitters, calculates, based on the angle, a distance for which a lens module needs to compensate, and allows the lens to cancel the jitter of the electronic device 2-100 through reverse motion, to implement image stabilization. The gyro sensor 2-180B may also be used in a navigation scenario and a motion-sensing gaming scenario.

The barometric pressure sensor 2-180C is configured to measure barometric pressure. In some embodiments, the electronic device 2-100 calculates an altitude based on a value of the barometric pressure measured by the barometric pressure sensor 2-180C, to assist in positioning and navigation.

The magnetic sensor 2-180D includes a Hall sensor. The electronic device 2-100 may detect opening and closing of a flip leather case by using the magnetic sensor 2-180D. In some embodiments, when the electronic device 2-100 is a clamshell phone, the electronic device 2-100 may detect opening and closing of a flip cover by using the magnetic sensor 2-180D. Further, a feature such as unlocking upon opening of the flip cover is set based on a detected opening or closing state of the flip cover.

The acceleration sensor 2-180E may detect magnitudes of accelerations of the electronic device 2-100 in various directions (usually on three axes), and may detect a magnitude and a direction of gravity when the electronic device 2-100 is still. The acceleration sensor may be further configured to recognize a posture of the electronic device, and is used in an application such as switching between landscape mode and portrait mode or a pedometer.

The distance sensor 2-180F is configured to measure a distance. The electronic device 2-100 may measure the distance in an infrared manner or a laser manner. In some embodiments, in a photographing scenario, the electronic device 2-100 may measure a distance through the distance sensor 2-180F to implement quick focusing.

The optical proximity sensor 2-180G may include, for example, a light-emitting diode (LED) and an optical detector, for example, a photodiode. The light-emitting diode may be an infrared light-emitting diode. The electronic device 2-100 emits infrared light by using the light-emitting diode. The electronic device 2-100 detects infrared reflected light from a nearby object by using the photodiode. When detecting sufficient reflected light, the electronic device 2-100 may determine that there is an object near the electronic device 2-100. When detecting insufficient reflected light, the electronic device 2-100 may determine that there is no object near the electronic device 2-100. The electronic device 2-100 may detect, by using the optical proximity sensor 2-180G, that the user holds the electronic device 2-100 close to an ear to make a call, to turn off a screen for power saving. The optical proximity sensor 2-180G may also be used in a flip cover mode or a pocket mode to automatically perform screen unlocking or locking.

The ambient light sensor 2-180L is configured to sense ambient light brightness. The electronic device 2-100 may adaptively adjust brightness of the display 2-194 based on the sensed ambient light brightness. The ambient light sensor 2-180L may also be configured to automatically adjust white balance during photographing. The ambient light sensor 2-180L may further cooperate with the optical proximity sensor 2-180G to detect whether the electronic device 2-100 is in a pocket, to avoid an accidental touch.

The fingerprint sensor 2-180H is configured to obtain a fingerprint. The electronic device 2-100 may use a feature of the obtained fingerprint to implement fingerprint-based unlocking, application lock access, fingerprint-based photographing, fingerprint-based call answering, and the like.

The temperature sensor 2-180J is configured to detect a temperature. In some embodiments, the electronic device 2-100 executes a temperature processing policy by using the temperature detected by the temperature sensor 2-180J. For example, when the temperature reported by the temperature sensor 2-180J exceeds a threshold, the electronic device 2-100 lowers performance of a processor near the temperature sensor 2-180J, to reduce power consumption for thermal protection. In some other embodiments, when the temperature is less than another threshold, the electronic device 2-100 heats the battery 2-142 to prevent the electronic device 2-100 from being abnormally powered off because of a low temperature. In some other embodiments, when the temperature is less than still another threshold, the electronic device 2-100 boosts an output voltage of the battery 2-142 to avoid abnormal shutdown caused by a low temperature.

The touch sensor 2-180K is also referred to as a "touch component". The touch sensor 2-180K may be disposed on the display 2-194, and the touch sensor 2-180K and the display 2-194 form a touchscreen. The touch sensor 2-180K is configured to detect a touch operation performed on or near the touch sensor. The touch sensor may transfer a detected touch operation to the application processor, to determine a type of a touch event. A visual output related to the touch operation may be provided through the display 2-194. In some other embodiments, the touch sensor 2-180K may alternatively be disposed on a surface of the electronic device 2-100 and is located at a location different from that of the display 2-194.

The bone conduction sensor 2-180M may obtain a vibration signal. In some embodiments, the bone conduction sensor 2-180M may obtain a vibration signal of a vibration bone of a human vocal-cord part. The bone conduction sensor 2-180M may also be in contact with a body pulse to receive a blood pressure beating signal. In some embodiments, the bone conduction sensor 2-180M may also be disposed in a headset, to form a bone conduction headset. The audio module 2-170 may obtain a voice signal through parsing based on the vibration signal that is of the vibration bone of the vocal part and that is obtained by the bone conduction sensor 2-180M, to implement a voice function. The application processor may parse heart rate information based on the blood pressure beating signal obtained by the bone conduction sensor 2-180M, to implement a heart rate detection function.

The button 2-190 includes a power button, a volume button, and the like. The button 2-190 may be a mechanical button, or may be a touch button. The electronic device 2-100 may receive a key input, and generate a key signal input related to a user setting and function control of the electronic device 2-100.

The motor 2-191 may generate a vibration prompt. The motor 2-191 may be configured to provide an incoming call vibration prompt and a touch vibration feedback. For example, touch operations performed on different applications (for example, photographing and audio playing) may correspond to different vibration feedback effects. The motor 2-191 may also correspond to different vibration feedback effects for touch operations performed on different areas of the display 2-194. Different application scenarios (for example, a time reminder scenario, an information receiving scenario, an alarm clock scenario, and a game scenario) may also correspond to different vibration feedback effects. The touch vibration feedback effect may also be customized.

The indicator 2-192 may be an indicator light, and may be configured to indicate a charging status and a power change, or may be configured to indicate a message, a missed call, a notification, and the like.

The SIM card interface 2-195 is configured to connect to a SIM card. The SIM card may be inserted into the SIM card interface 2-195 or removed from the SIM card interface 2-195, to implement contact with or separation from the electronic device 2-100. The electronic device 2-100 may support one or N SIM card interfaces, where N is a positive integer greater than 1. The SIM card interface 2-195 may support a nano-SIM card, a micro-SIM card, a SIM card, and the like. A plurality of cards may be simultaneously inserted into a same SIM card interface 2-195. The plurality of cards may be of a same type or of different types. The SIM card interface 2-195 is compatible with different types of SIM cards. The SIM card interface 2-195 is also compatible with an external storage card. The electronic device 2-100 interacts with a network through the SIM card, to implement functions such as calling and data communication. In some embodiments, the electronic device 2-100 uses an eSIM, that is, an embedded SIM card. The eSIM card may be embedded in the electronic device 2-100, and cannot be separated from the electronic device 2-100. A software system of the electronic device 2-100 may use a layered architecture, an event-driven architecture, a microkernel architecture, a micro service architecture, or a cloud architecture. In this embodiment of this application, an Android system with a layered architecture is used as an example to describe a software structure of the electronic device 2-100.

FIG. 2-2 is a block diagram of a software structure of an electronic device 2-100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2-2, the application packages may include applications such as Camera, Gallery, Calendar. Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2-2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and received, a browsing history and a browsing bookmark, an address book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide communication functions of the electronic device 2-100, for example, management of a call status (including answering or declining).

The resource manager provides, for an application, various resources such as a localized character string, an icon, a picture, a layout file, and a video file.

The notification manager enables an application to display notification information in a status bar, and may be configured to convey a notification message. The displayed notification information may disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an announcement is produced, the electronic device vibrates, or an indicator light blinks.

The Android runtime includes a core library and a virtual machine. The Android runtime is responsible for scheduling and management of the Android system.

The core library includes two parts: a function that needs to be invoked by Java language, and a core library of Android.

The application layer and the application framework layer run on a virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 2-100 with reference to a photographing scenario.

When the touch sensor 2-180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, a camera driver is started by invoking the kernel layer, and a static image or a video is captured through the camera 2-193.

Based on the hardware structure of the electronic device 2-100, embodiments of a memory management method in this application are provided.

This application provides a memory management method.

FIG. 2-3 is a flowchart of a memory management method according to an embodiment of this application. The memory management method may be performed by an electronic device 2-100, and the memory management method may include but is not limited to the following steps.

Step S2-31: When an application is opened, the electronic device creates a memory control group of the application, and sets an important score of the memory control group to a preset important score.

The memory control group is configured to manage a memory unit corresponding to the application, and may be created in memory in a form of an object, including a method for managing a memory unit (for example, controlling a reclamation parameter of the memory unit) and related information for describing a memory resource. For example, the related information may include physical memory usage of a current memory control group, a memory active state of the current memory control group, and the like. The memory unit may be in a unit of a page, and a size of a page may be 4 KB bytes. This application proposes an application-level memory control group, which may be created when an application is opened, and may include memory information of a process of the application, and the process of the application is managed based on the memory information, so that memory management can be more targeted, overheads of a memory management structure can be reduced, user experience can be improved, and memory reclamation efficiency can be improved.

The electronic device 2-100 may create the memory control group of the application when the application is opened. The electronic device 2-100 may implement a requirement service for a user by using the application. For example, the user may play a game by using a game application, may watch a video by using a video application, or may play music by using a music application. For example, the application may be a browser. The electronic device 2-100 may create a memory control group 1 of the browser when the browser is opened. Therefore, a kernel may manage related memory of the browser based on the memory control group 1. For example, the application may alternatively be a game application. When the game application is opened, the electronic device 2-100 creates a memory control group 2 corresponding to the game application, and then a kernel may manage related memory of the game application based on the memory control group 2.

Therefore, when a plurality of applications of the electronic device 2-100 are opened, respective corresponding memory control groups may be created. In an implementation, a user mode may create a folder (that is, a memory control group) in a directory of a control group (control group, cgroup), and the folder is created in a unit of an application, that is, all processes of the application may be added to the folder. Therefore, a memory control group may be created when a plurality of applications of the electronic device 2-100 are opened. An application in this embodiment of this application may be one of system applications of the electronic device 2-100, or may be one of third-party applications of the electronic device. Specifically, this may be determined based on an actual use requirement, and is not limited in this embodiment of this application. It may be understood that the foregoing listed applications are examples, and may be specifically determined based on an actual use situation. This is not limited in this embodiment of this application.

In an implementation, when a tenth application of the electronic device 2-100 is opened, a system sets an important score (important score) of a tenth memory control group to a tenth preset value.

In an implementation, a plurality of applications have respective preset importance scores, and corresponding preset importance scores are assigned to the plurality of applications when the applications are opened. The important score may be used to represent a user attention degree of an application. A smaller important score indicates a higher user attention degree of an application. For example, if an important score of an application 1 is higher than an important score of an application 2, it may be determined that a user attention degree of the application 2 is higher than a user attention degree of the application 1.

In a specific implementation process, a kernel mode may provide a tenth interface of a memory control group, where the tenth interface may be used to configure an important score of each memory control group. A process in a kernel mode runs in kernel space. Correspondingly, when the process calls a system and falls into kernel code for execution, the process is in a kernel mode.

In an example in this application, assuming that a user opens a chat application of the electronic device 2-100, the system creates a memory control group for the chat application, and sets an initial important score of the memory control group. The chat software is in an active state after being opened. Therefore, the electronic device 2-100 may correspondingly update an important score of the chat software based on an active time ratio of the chat software, a use frequency of the application, and the like. It may be understood that, in different scenarios, the chat application has different states, and the memory control group may have different important scores. Therefore, the electronic device 2-100 may correspondingly update an important score of each memory control group based on a status of each application.

In a possible design, the memory control group may be set in the following specific implementations:

1. When the application is in the foreground, the system may set the important score of the memory control group of the application to a foreground default value. For example, the foreground default value may be 0, or may be another value. It may be understood that a foreground state of the application may be a state of the application that is visible to the user and that can interact with the user.

2. When the application is in the background, the system may set the important score of the memory control group of the application to a background default value. For example, the background default value may be 300, or may be another value. It may be understood that, that the application is in a background state may mean that the application is invisible to the user and is still in a running state.

3. When the application is in an active state, the system may adjust the important score of the memory control group of the application based on an active time ratio and a use frequency of the application. It may be understood that the active state of the application may include a foreground active state and a background active state.

4. When the application is in a frozen state, the system may adjust the important score of the memory control group of the application based on a quantity of times of freezing and unfreezing and memory usage of the application. It may be understood that the frozen state of the application may be a state in which the application is in a background and is invisible to the user, and a process of the application cannot apply for memory and cannot perform an activity.

Step S2-32: A memory control group linked list sorts a plurality of memory control groups based on important scores of the plurality of memory control groups.

It may be understood that the memory control group linked list is used to manage at least one memory control group, that is, may sort the plurality of memory control groups based on the important scores of the plurality of memory control groups. The memory control group linked list may sort the memory control groups of the applications in descending order based on the important scores, that is, a memory control group with a larger important score is closer to the front of the memory control group linked list.

For example, the electronic device 2-100 may open an application 1 and an application 2, creates a memory control group 1 when the application 1 is opened, and creates a memory control group 2 when the application 2 is opened. It is assumed that initial important scores of both the memory control group 1 and the memory control group 2 are 2 to 200. As statuses of the application 1 and the application 2 change, the important scores of both the memory control group 1 and the memory control group 2 change correspondingly. For example, at a moment, the user switches the application 1 to the foreground for running, and switches the application 2 to the background for running. In this case, the important score of the memory control group 1 may be updated to 0, and the important score of the memory control group 2 may be updated to 300. Therefore, the memory control group linked list performs sorting based on the important scores of the memory control group 1 and the memory control group 2.

In an embodiment, when a status of an application changes, an important score of a memory control group may be correspondingly updated, and after the important score of the memory control group is updated, the memory control group linked list may update a rank of the memory control group.

FIG. 2-6 is a schematic diagram in which a memory control group linked list sorts a plurality of memory control groups based on an important score system.

Descriptions are provided below by using a memory control group 1 of an application 1, a memory control group 2 of an application 2, a memory control group 3 of an application 3, and a memory control group 4 of an application 4 as examples. Assuming that an important score of the memory control group 1 is 900, an important score of the memory control group 2 is 500, an important score of the memory control group 3 is 2 to 200, and an important score of the memory control group 4 is 0, the memory control group linked list places the memory control group 1 at a head location, then sequentially places the memory control group 2 and the memory control group 3, and places the memory control group 4 at a tail location.

Step S2-33: When memory reclamation needs to be performed, a reclamation mechanism may perform memory reclamation based on a sequence of the plurality of memory control groups in the memory control group linked list.

First, the system has a determining condition for memory reclamation, that is, determines when to perform memory reclamation, and may passively reclaim memory when a system enters a low-memory state, that is, may use a reclamation mechanism specified by the system, or a user may actively reclaim memory by invoking an interface, that is, a reclamation mechanism created by the user.

When memory reclamation is triggered, the reclamation mechanism may perform memory reclamation on the plurality of memory control groups based on the sequence of the plurality of memory control groups in the memory control group linked list, that is, based on the important scores of the plurality of memory control groups in the memory control group linked list. It may be understood that the reclamation mechanism may be a kswapd reclamation mechanism or a direct-reclaim reclamation mechanism, or may be a memory reclamation mechanism in any other form. The reclamation mechanism may be a mechanism in which a kernel reclaims memory when free memory of a system is less than a threshold. An existing mechanism in the kernel may include a kswapd reclamation mechanism, a direct-reclaim reclamation mechanism, or the like.

During memory reclamation, memory occupied by the application may be released, that is, an anonymous page (anonymous page) of the memory control group in the memory control group linked list may be reclaimed to reduce memory usage as much as possible, and data occupying the memory is swapped to an external storage for memory reclamation. The anonymous page may be a page without a file background, for example, a heap, a stack, or a data segment, and does not exist in a form of a file.

In an implementation, before memory reclamation, a target reclamation amount may be set based on a memory requirement of the system. Then, the reclamation mechanism performs memory reclamation based on the target reclamation amount. If memory resources of the system are insufficient, when memory reclamation is triggered, the reclamation mechanism compresses anonymous pages in the plurality of memory control groups based on important scores of the plurality of memory control groups in the memory control group linked list and a compression ratio, places compressed data into a swap area, and releases space occupied by the data in the swap area. If an amount of data in the swap area reaches a preset watermark, the reclamation mechanism swaps the data from the swap area to an external storage based on a swap-out ratio, to implement memory reclamation. The preset watermark may be a ratio of an amount of compressed data in the swap area to a size of swap space, and the preset watermark may be an upper limit of a capacity of a control swap area.

For example, if memory resources of the system are insufficient, a target reclamation amount (for example, may be 50 MB) is set, and three applications, specifically, an application 1, an application 2, and an application 3, are opened when the electronic device 2-100 runs. A memory control group 1 of the application 1 includes a compression ratio 1 and a swap-out ratio 1, a memory control group 2 of the application 2 includes a compression ratio 2 and a swap-out ratio 2, and a memory control group 3 of the application 3 includes a compression ratio 3 and a swap-out ratio 3. When memory reclamation needs to be performed, the reclamation mechanism compresses an anonymous page 1 in the memory control group 1 based on the compression ratio 1, the reclamation mechanism compresses an anonymous page 2 in the memory control group 2 based on the compression ratio 2, and the reclamation mechanism further compresses an anonymous page 3 in the memory control group 3 based on the compression ratio 3. In this way, the anonymous pages of the memory control group 1, the memory control group 2, and the memory control group 3 are compressed, so that a tenth compression amount (for example, may be 30 MB) is compressed in total. The reclamation mechanism further places the compressed data into the swap area until an amount of data in the swap area reaches a preset watermark, where the data may be some data segments, stacks, and the like in a process. The reclamation mechanism may swap the data from the swap area to the external storage based on the swap-out ratio, and swap out a tenth swap-out amount (for example, may be 20 MB) in total. Therefore, memory reclaimed by the reclamation mechanism can meet a memory requirement of the system.

In a possible embodiment, when memory reclamation needs to be performed, the system may sequentially reclaim anonymous pages from the memory control group. The memory control groups are sorted based on creation time points, that is, a memory control group that is created earlier is more likely to be reclaimed. Reclamation performed in this sequence is improper. Some memory control groups that are ranked at a front location may be immediately used by applications corresponding to the memory control groups after being reclaimed. As a result, anonymous pages are switched between being reclaimed and being used in a short period of time, causing fluctuation. However, when a bump rate is high, system memory reclamation efficiency is low, and a low-memory state is easily entered, resulting in frame freezing. Therefore, in the memory management method provided in this embodiment of this application, when memory resources of the system are insufficient, memory reclamation is implemented, and system smoothness is improved.

It may be understood that, in a possible implementation, in each state of the memory control group, hot and cold degrees of anonymous pages of the memory control group are different. Therefore, proportions of anonymous pages that can be reclaimed are different. For example, if some applications do not perform any operation in the background, anonymous pages of the applications can be completely reclaimed, and if some applications process messages in the background, only some anonymous pages can be reclaimed. If the anonymous pages are reclaimed, the applications immediately apply for memory again. As a result, the anonymous pages are switched between being reclaimed and being used in a short period of time, causing fluctuation and increasing a bump rate of the anonymous page.

However, the foregoing implementation may have the following problems: Because a cold opening sequence of applications cannot represent a user attention degree of an application, if anonymous pages are reclaimed in this sequence, a bump rate is high and reclamation efficiency is low. In addition, when attention degrees of applications are the same, sorting based on sizes of the anonymous pages of the memory control group can indeed enable a reclamation procedure to exit in advance, to reduce an over-reclamation rate. However, in general, a user attention degree is not related to a size of an anonymous page of a memory control group, and therefore the sorting also increases a bump rate of the anonymous page.

Therefore, according to the memory management method provided in this embodiment of this application, the system may set the important score of the memory control group to a preset value, and update the important score of the memory control group based on a status of the application. A smaller important score indicates a higher user attention degree of the application. Therefore, the memory control group linked list may sort the plurality of memory control groups based on the important scores of the plurality of memory control groups. When memory reclamation needs to be performed, the reclamation mechanism performs memory reclamation on a plurality of tenth memory control groups based on a sequence of a plurality of memory control groups in the memory control group linked list. In this embodiment of this application, a reclamation sequence of memory control groups of applications can be adjusted based on a running status of an application, to improve memory reclamation efficiency, expand equivalent memory, improve smoothness of an operating system, avoid frame freezing in an electronic device, and improve user experience.

Figures 1, 2, 3, 4:
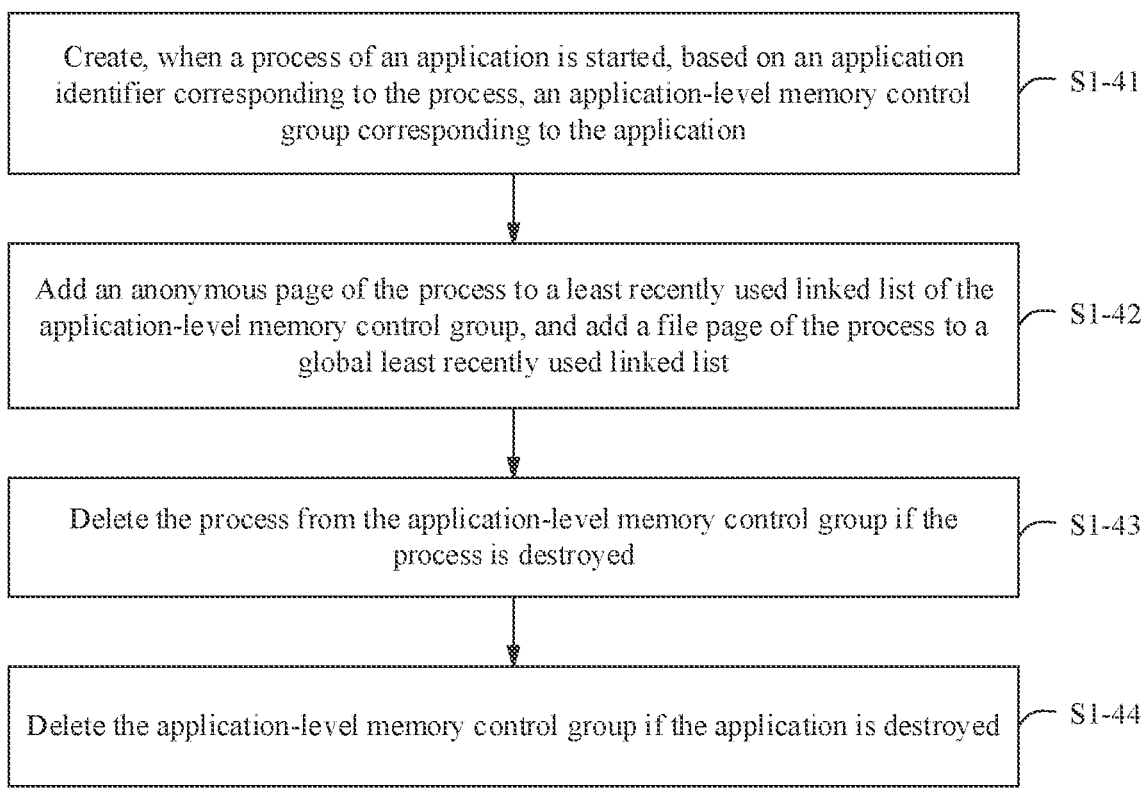

Refer to FIG. 2-4. In some embodiments of this application, step S2-33 in which the reclamation mechanism performs memory reclamation on the plurality of memory control groups based on the sequence of the plurality of memory control groups in the memory control group linked list may include the following specific steps:

Step S2-41: The reclamation mechanism performs memory compression on the memory control group based on a compression ratio, and places compressed data into the swap area.

In an implementation, the electronic device 2-100 sets a compression ratio for the memory control group of the application, and sets the compression ratio to a preset compression ratio when the application is opened. The compression ratio is used to represent a ratio between a sum of amounts of data in the swap area and the external storage and a sum of amounts of data in the memory, the swap area, and external storage. It may be understood that a compression upper limit may be controlled based on the compression ratio. In some implementations, the electronic device 2-100 may update the compression ratio of the memory control group based on a status of the application. In a specific implementation process, an upper layer may provide an eleventh interface of a memory control group, where the eleventh interface may be used to configure a compression ratio of each memory control group.

Therefore, when memory resources of the system are insufficient, the reclamation mechanism starts to perform memory reclamation. That is, the reclamation mechanism traverses the memory control group linked list, scans memory data of the memory control group, performs memory compression on the memory control group based on the compression ratio, places compressed data into the swap area, and releases space occupied by the data in the swap area. A compression upper limit is controlled based on the compression ratio.

Step S2-42: If an amount of data in the swap area reaches a preset watermark, the reclamation mechanism swaps the data from the swap area to the external storage based on a swap-out ratio.

If the amount of data in the swap area reaches the preset threshold, for example, the amount of data in the swap area reaches 30% of total memory, the reclamation mechanism swaps the data from the swap area to the external storage (for example, a disk) based on the swap-out ratio. The swap-out ratio is used to represent a ratio between an amount of swapped-out data and a sum of amounts of data in the swap area and the external storage. A swap-out upper limit is controlled based on the swap-out ratio.

It may be understood that, in some possible implementations, memory active degrees of each memory control group are different in different states. For example, when some applications process network messages in the background or are in a sleep state, memory hot and cold ratios of these applications are different. However, the foregoing implementation may have the following problems: If memory is reclaimed based on a fixed ratio, memory reclamation efficiency is low, and power consumption is also very high.

Therefore, according to the memory management method provided in this embodiment of this application, when a status of the application changes, the important score, the compression ratio, and the swap-out ratio of the memory control group corresponding to the application are correspondingly adjusted, and the memory control group linked list also modifies a sequence of the memory control groups. Therefore, in the memory management method provided in this embodiment of this application, a problem of insufficient accuracy of memory reclamation caused by improper sorting and reclamation proportions of memory control groups can be avoided, to further improve user experience.

Compared with an existing memory compression technology, this embodiment of this application improves an effective compression ratio, and can reduce memory bumps caused by incorrect compression and over-compression.

As shown in FIG. 2-5, the memory may include a normal use area and a swap area. When memory resources of the system are insufficient, the reclamation mechanism starts to perform memory reclamation. The reclamation mechanism starts to compress data in the normal use area and places the compressed data into the swap area. If an amount of data in the swap area reaches a watermark, the data in the swap area is swapped to the external storage.

Therefore, in the memory management method provided in this embodiment of this application, when memory resources of a system are insufficient, memory reclamation can be implemented, and system smoothness can be improved.

FIG. 2-6 are schematic diagram of a structure of a memory control group linked list according to an embodiment of this application. As shown in FIG. 2-6, the memory control group linked list may include a plurality of memory control groups that are sequentially sorted.

For example, when the electronic device runs, four applications are opened, which are specifically an application 1, an application 2, an application 3, and an application 4. When being opened, the application 1, the application 2, the application 3, and the application 4 each apply to a system for a memory resource. Therefore, the electronic device may add an anonymous page obtained through application to a memory control group corresponding to the application. That is, when the application 1 is opened, a memory control group 1 is created, and an anonymous page 1 obtained through application is added to the memory control group 1. When the application 2 is opened, a memory control group 2 is created, and an anonymous page 2 obtained through application is added to the memory control group 2. When the application 3 is opened, a memory control group 3 is created, and an anonymous page 3 obtained through application is added to the memory control group 3. When the application 4 is opened, a memory control group 4 is created, and an anonymous page 4 obtained through application is added to the memory control group 4.

An upper layer (that is, an application layer) may update, based on a status of the application, an important score, a compression ratio, and a swap-out ratio of the memory control group corresponding to the application. For example, the upper layer may update an important score 1, a compression ratio 1, and a swap-out ratio 1 of the memory control group 1 in real time based on a status of the application 1, the upper layer may also update an important score 2, a compression ratio 2, and a swap-out ratio 2 of the memory control group 2 in real time based on a status of the application 2, and the upper layer may further update an important score 3, a compression ratio 3, and a swap-out ratio 3 of the memory control group 3 in real time based on a status of the application 3.

As described above, the important score 1 is greater than the important score 2, and the important score 2 is greater than the important score 3. Therefore, based on a sequence of memory control groups in a memory control group linked list, a reclamation mechanism may preferentially reclaim the anonymous page 1 in the memory control group 1, reclaim the anonymous page 2 in the memory control group 2, and then reclaim the anonymous page 3 in the memory control group 3. Specifically, the reclamation mechanism may preferentially compress the anonymous page 1 in the memory control group 1, compress the anonymous page 2 in the memory control group 2, and then compress the anonymous page 3 in the memory control group 3. The reclamation mechanism preferentially swaps data in the memory control group 1 from a swap area to an external storage, swaps data in the memory control group 2 from the swap area to the external storage, and then swaps data in the memory control group 3 from the swap area to the external storage.

When memory reclamation needs to be performed, the reclamation mechanism may perform memory reclamation on a plurality of memory control groups based on important scores of the plurality of memory control groups in the memory control group linked list. That is, the reclamation mechanism may control a compression sequence and a swap-out sequence of the memory control groups of the applications based on a sequence of important scores of the applications in the memory control group linked list. The reclamation mechanism may compress the anonymous page 1 in the memory control group 1 based on the compression ratio 1, the reclamation mechanism compresses the anonymous page 2 in the memory control group 2 based on the compression ratio 2, and the reclamation mechanism further compresses the anonymous page 3 in the memory control group 3 based on the compression ratio 3. The reclamation mechanism may further place the compressed data into the swap area until an amount of data in the swap area reaches a preset watermark, and the reclamation mechanism may swap the data from the swap area to the external storage based on the swap-out ratio. For example, when the amount of data in the swap area reaches the preset watermark, the reclamation mechanism may swap the data in the memory control group 1 from the swap area to the external storage based on the swap-out ratio 1, and the reclamation mechanism may further swap the data in the memory control group 2 from the swap area to the external storage based on the swap-out ratio 2.

FIG. 2-7 is a schematic diagram of a change of a sequence of memory control groups in a memory control group linked list when an application of an electronic device 2-100 is opened.

In this embodiment of this application, descriptions are provided by using an example in which an application opened by the electronic device 2-100 is news software.

It can be learned that, before the news software is opened, in the memory control group linked list, a memory control group 1, a memory control group 2, a memory control group 3, a memory control group 4, a memory control group 5, and a memory control group 6 are sorted in descending order.

When the news software is opened, an important score of a memory control group in the news software is 300, and a compression ratio of the memory control group is 30. In this case, an important score of a memory control group 3 of an application 3 of the electronic device is 900, and an important score of a memory control group 3 of an application 4 is 2 to 200. Therefore, in the memory control group linked list, the memory control group of the news software is ranked between the memory control group 3 and the memory control group 4 based on the important score of the memory control group of the news software.

When the news software is in an active state, an upper layer updates the important score and the compression ratio of the memory control group of the news software in a timely manner, the important score of the memory control group of the news software is updated to 2 to 200, and the compression ratio of the memory control group is updated to 20. In this case, the important score of the memory control group 4 of the application 4 is 2 to 200, and an important score of a memory control group 5 of an application 5 is 2 to 100. Because the news software is in an active state at this time, in the memory control group linked list, the memory control group of the news software is ranked between the memory control group 4 and the memory control group 5 based on the important score of the memory control group of the news software.

When the news software is switched to the background, the upper layer updates the important score and the compression ratio of the memory control group of the news software in a timely manner, the important score of the memory control group of the news software is updated to 900, and the compression ratio of the memory control group is updated to 90. In this case, the important score of the memory control group 3 of the application 3 is 900, and the important score of the memory control group 4 of the application 4 is 2 to 200. Therefore, in the memory control group linked list, the memory control group of the news software is ranked between the memory control group 3 and the memory control group 4 based on the important score of the memory control group of the news software.

When the news software is frozen, the upper layer updates the important score and the compression ratio of the memory control group of the news software in a timely manner, the important score of the memory control group of the news software is updated to 2 to 1000, and the compression ratio of the memory control group is updated to 2 to 100. In this case, the important score of the memory control group 2 of the application 2 is 2 to 1000, and the important score of the memory control group 4 of the application 3 is 900. Therefore, in the memory control group linked list, the memory control group of the news software is ranked between the memory control group 2 and the memory control group 3 based on the important score of the memory control group of the news software.

When the news software is switched to the foreground again, the upper layer updates the important score and the compression ratio of the memory control group of the news software in a timely manner, the important score of the memory control group of the news software is updated to 0, and the compression ratio of the memory control group is updated to 0. In this case, an important score of a memory control group 6 of an application 6 is 0. Therefore, in the memory control group linked list, the memory control group of the news software is ranked after the memory control group 6 based on the important score of the memory control group of the news software.

In the technical solution of this embodiment of this application, when an application is opened, a corresponding memory control group is created accordingly, and an initial important score, an initial compression ratio, and an initial swap-out ratio may be set by using a system. After being opened, the application is in an active state. The important score, the compression ratio, and the swap-out ratio are adjusted based on an active time ratio and a use frequency of the application. When the application is switched to the background, the important score, the compression ratio, and the swap-out ratio can be adjusted based on a background time ratio and a background event policy. When the application is frozen in the background, the important score, the compression ratio, and the swap-out ratio are adjusted based on factors such as a quantity of times of freezing and unfreezing and memory usage. When the application is switched to the foreground again, the important score is decreased, and the compression ratio and the swap-out ratio can be adjusted synchronously.

When a status of the application changes, the important score, the compression ratio, and the swap-out ratio of the memory control group corresponding to the application are correspondingly adjusted, and the memory control group linked list also adjusts a sequence of a plurality of memory control groups.

FIG. 2-8 is a schematic diagram of performing memory reclamation on a plurality of memory control groups in a memory control group linked list.

In this embodiment of this application, descriptions are provided by using an example in which a tenth application opened by an electronic device is news software.

When the news software is switched to the foreground for running, an important score of a memory control group of the news software is 0, and in the memory control group linked list, a memory control group 1, a memory control group 2, a memory control group 3, a memory control group 4, a memory control group 5, a memory control group 6, and the memory control group of the news software are sorted in descending order.

An important score of the memory control group 1 is 2 to 1000, and a compression ratio of the memory control group 1 is 2 to 100. An important score of the memory control group 2 is 2 to 1000, and a compression ratio of the memory control group 2 is 2 to 100. An important score of the memory control group 3 is 900, and a compression ratio of the memory control group 3 is 90. An important score of the memory control group 4 is 2 to 200, and a compression ratio of the memory control group 4 is 20. An important score of the memory control group 5 is 2 to 100, and a compression ratio of the memory control group 5 is 10. An important score of the memory control group 6 is 0, and a compression ratio of the memory control group 6 is 0.

Therefore, when memory reclamation needs to be performed, a reclamation mechanism may traverse a plurality of memory control groups in a sequence of the plurality of memory control groups in the memory control group linked list, and a memory control group with a high important score is preferentially scanned, that is, memory of the memory control group 1, the memory control group 2, and the memory control group 3 is preferentially reclaimed. For example, the reclamation mechanism may preferentially compress and swap out the memory control group with the high important score. That is, reclamation does not stop until 2% to 100% of the memory control group 1 is reclaimed, reclamation does not stop until 2% to 100% of the memory control group 2 is reclaimed, reclamation does not stop until 90% of the memory control group 3 is reclaimed, and reclamation does not stop until 20% of the memory control group 4 is reclaimed. The memory control group 5 is not reclaimed because scanning stops when enough pages are found. If important scores of the memory control group 5 and the memory control group 6 are both 0, memory of the memory control group 5 and the memory control group 6 is not reclaimed.

FIG. 2-9 is a flowchart of a memory compression method according to an embodiment of this application. The method includes the following steps.

Step S2-91: Calculate a tenth compression amount.

In an implementation, the tenth compression amount is a target compression amount of this memory reclamation.

Step S2-92: Determine whether an eleventh compression amount is less than the tenth compression amount; and perform step S2-93 if the eleventh compression amount is less than the tenth compression amount, or end the process if the eleventh compression amount is not less than the tenth compression amount.

The eleventh compression amount is a quantity of memory control groups that are of applications and that are compressed by the reclamation mechanism, and the quantity of compressed memory control groups is compared with the target compression amount, to determine whether the quantity of compressed memory control groups meets a requirement.

Step S2-93: Determine whether there is an untraversed application in a memory control group linked list; and perform step S2-94 if there is the untraversed application in the memory control group linked list, or end the process if there is no untraversed application in the memory control group linked list.

In an implementation, when the eleventh compression amount is less than the tenth compression amount, it indicates that compressed memory does not meet a requirement. Therefore, whether there is an untraversed application in the memory control group linked list needs to be determined again.

Step S2-94: Select a next application.

When the eleventh compression amount is less than the tenth compression amount, that is, the compressed memory does not reach the target compression amount, a next untraversed application may be selected.

Step S2-95: Calculate a compression amount based on a compression ratio of an application.

In this embodiment of this application, an anonymous page of a memory control group of the application is compressed based on a compression ratio of the memory control group of the application.

Step S2-96: Compress data into a swap area.

In an implementation, the data may include related data segments, stacks, and the like in a process.

Step S2-97: Collect statistic about the compression amount again.

According to this embodiment of this application, during memory compression, an application with a high reclamation rate is preferentially traversed based on a sequence of memory control groups in the memory control group linked list, and the traversal exits when a total compression amount reaches the target compression amount. For traversed applications, if a compression amount ratio of a single application reaches a compression ratio of the application, compression of the application is terminated, and a next application in the memory control group linked list is compressed instead. Compared with an existing memory compression technology, the technical solution in this embodiment of this application improves an effective compression ratio, and effectively reduces memory bumps caused by incorrect compression and over-compression.

FIG. 2-10 is a flowchart of a memory swap-out method according to an embodiment of this application. The method includes the following steps.

Step S2-101: Input a tenth swap-out amount.

In this embodiment of this application, the tenth swap-out amount is a target swap-out amount of this memory reclamation.

Step S2-102: Set an eleventh swap-out amount to 0. Step S2-103: Determine whether the tenth swap-out amount is greater than the eleventh swap-out amount; and perform step S2-104 if the tenth swap-out amount is greater than the eleventh swap-out amount, or end the process if the tenth swap-out amount is not greater than the eleventh swap-out amount.

In this embodiment of this application, the eleventh swap-out amount is a quantity of memory control groups that are of applications and that are compressed by the reclamation mechanism, and the quantity of swapped-out memory control groups is compared with the target swap-out amount, to determine whether the quantity of swapped-out memory control groups reaches the target swap-out amount.

Step S2-104: Determine whether there is an untraversed application; and perform step S2-105 if there is the untraversed application, or end the process if there is no untraversed application.

Step S2-105: Select a next application based on a sorting result in a memory control group linked list.

In an embodiment, when the quantity of swapped-out memory control groups does not reach the target swap-out amount, the next application is selected based on the sorting result in the memory control group linked list.

Step S2-106: Calculate a swap-out amount based on a swap-out ratio of an application.

Step S2-107: Swap out data based on a least recently used linked list.

It may be understood that, in an implementation, the data may include related data segments, stacks, and the like in a process.

Step S2-108: Collect statistics about the eleventh swap-out amount.

In this embodiment of this application, an external storage may be used to expand internal storage space, to effectively increase a size of equivalent memory.

In this embodiment of this application, the quantity of swapped-out memory control groups may be accumulated, so that the quantity of swapped-out memory control groups may be counted into the eleventh swap-out amount.

In this embodiment of this application, when memory is swapped out, data of an inactive application is selected as much as possible based on a sequence of memory control groups in the memory control group linked list for swap-out, and hot and cold separation is performed on data in the swap area by using a least recently used (Least Recently Used, LRU) algorithm. Data that is frequently accessed is placed at the head of the LRU linked list, and data that is not frequently accessed is placed at the tail of the LRU linked list. During swap-out, cold data is chosen to be swapped from the tail of the LRU linked list. In this way, hot data is retained in the swap area as much as possible, to ensure application performance and improve memory usage. The least recently used (Least Recently Used, LRU) algorithm may be an algorithm for memory management, and is an important linked list used by a kernel for memory management and reclamation control. Each LRU linked list may belong to a different memory control group.

In this embodiment of this application, when an application is used, batch swap-in is performed, and data of applications in the external storage is read into the swap area in descending order of access frequencies, to avoid frequent I/O caused when the data in the swap area needs to be used in a running process of the application, and improve application smoothness.

Therefore, compared with an existing memory swapping technology, the technical solution in this embodiment of this application improves I/O efficiency, and reduces an I/O data amount and a quantity of I/O times, so as to implement more efficient memory swapping and reduce a life loss of a storage device caused by memory swapping.

In some possible implementations, the memory control group may be managed based on a sequence in which a user opens the application. However, this may cause an excessively high anonymous page bump rate and low reclamation efficiency. According to the technical solution provided in this embodiment of this application, a reclamation sequence of memory control groups of applications may be adjusted, so that memory reclamation is more accurate and efficient, and power consumption and performance consumption can be controlled.

FIG. 2-11 is a schematic diagram of a structure of a memory management apparatus according to an embodiment of this application. The memory reclamation apparatus may be configured to perform steps of the memory management methods described in FIG. 2-3 to FIG. 2-10. For details, refer to related descriptions in FIG. 2-3 to FIG. 2-10. The details are not described herein again. As shown in FIG. 2-11, the memory management apparatus 2-200 may include a creating module 2-201, a control module 2-202, and a reclamation module 2-203.

In this embodiment of this application, the control module 2-202 may respectively adjust an important score of a tenth memory control group and an important score of an eleventh memory control group based on a status of a tenth application and a status of an eleventh application.

Therefore, a memory control group linked list may sort the tenth memory control group and the eleventh memory control group based on the important scores of the tenth memory control group and the eleventh memory control group.

The control module 2-202 may be further configured to update the important score of the memory control group based on the status of the application.

When memory reclamation needs to be performed, the reclamation module 2-203 may perform memory reclamation on the tenth memory control group and the eleventh memory control group based on a sequence of the tenth memory control group and the eleventh memory control group in the memory control group linked list.

In some possible implementation embodiments, the creating module 2-201 may be configured to create a memory control group of an application when the application is opened.

For example, the creating module 2-201 may create the tenth memory control group of the tenth application when the tenth application is opened. The creating module 2-201 may further create the eleventh memory control group of the eleventh application when the eleventh application is opened. The control module 2-202 may be further configured to set an important score of the memory control group to a preset value.

In an embodiment, the reclamation module 2-203 may be further configured to: perform memory compression on the tenth memory control group based on a compression ratio, and place compressed data into a swap area. The reclamation module 2-203 may be further configured to: perform memory compression on the eleventh memory control group based on a compression ratio, and place compressed data into a swap area.

The reclamation module 2-203 is further configured to control a compression sequence and a swap-out sequence of the tenth memory control group and the eleventh memory control group based on the sequence of the tenth memory control group and the eleventh memory control group in the memory control group linked list.

Specifically, in a possible implementation, the reclamation module 2-203 may perform memory compression on the memory control group based on a compression ratio, and place compressed data into a swap area.

If an amount of data in the swap area reaches a preset watermark, the reclamation module 2-203 may swap the data from the swap area to an external storage based on the swap-out ratio.

In a possible implementation, if a compression amount ratio of the application reaches the compression ratio, the reclamation module 2-203 terminates compression on the application, and continues to perform compression based on a sequence of memory control groups in the memory control group linked list, that is, may select a next application in the memory control group linked list for compression.

In a possible implementation, if a swap-out amount ratio of the application reaches the swap-out ratio, the reclamation module 2-203 terminates swap-out on the application, and continues to perform swap-out based on a sequence of memory control groups in the memory control group linked list.

When a status of the application changes, the control module 2-202 may update an important score and/or a compression ratio and/or a swap-out ratio of a memory control group of the application.

For example, when the application is in the foreground, the control module 2-202 may set the important score of the memory control group of the application to a foreground default value. It may be understood that, in a possible implementation, the foreground default value may be set to 0, or may be another value.

When the application is in an unfrozen state, the control module 2-202 may set the important score of the memory control group of the application to an important score obtained when the application is active before the application is frozen.

When the application is in an active state, the control module 2-202 may adjust the important score of the memory control group of the application based on an active time ratio and a use frequency of the application.

When the application is in a frozen state, the control module 2-202 may adjust the important score of the memory control group of the application based on a quantity of times of freezing and unfreezing and memory usage of the application.

It may be understood that division into the modules in the memory management apparatus is merely used as an example for description. In another embodiment, the memory management apparatus may be divided into different modules based on a requirement, to implement functions of the memory management apparatus.

Implementations of the modules in the memory management apparatus provided in this embodiment of this application may be in a form of a computer program. The computer program may run on an electronic device or a server. For specific implementations of the modules in this embodiment of this application, refer to corresponding descriptions of the method embodiments shown in FIG. 2-3 to FIG. 2-10. In the memory management apparatus described in FIG. 2-11, a problem of insufficient accuracy of memory reclamation caused by improper sorting and reclamation proportions of memory control groups can be avoided, to improve user experience. For specific content, refer to a specific embodiment of the foregoing memory management method. Details are not described herein again.

An embodiment of this application further provides a computer-readable storage medium. The readable storage medium stores computer instructions, and when the instructions are run on a computing device, the computing device is enabled to perform the memory management method provided in the foregoing embodiments.

It is clear that, for a person skilled in the art, this application is not limited to details of the foregoing example embodiments, and this application can be implemented in another specific form without departing from the spirit or basic features of this application. Therefore, appropriate modifications and variations made to the foregoing embodiments shall fall within the protection scope of this application provided that the modifications and variations fall within the essence and spirit of this application.

With development of terminal technologies, terminal devices become indispensable items in people's daily life. Memory management is one of core technologies of a terminal device system, and plays a key role in improving user experience and stability of system running. However, in a process of using a terminal device, as a quantity of opened applications increases, increasingly more processes run, and increasingly more memory is occupied. As a result, available memory of a system decreases. When memory is insufficient, a series of problems, such as frame freezing, a running error, and a crash. Therefore, how to efficiently manage memory, reclaim memory in a timely manner, and improve user experience is an important topic to which R&D personnel pay attention.

It may be understood that a memory status of a current embedded device such as a mobile terminal is increasingly different from a memory status of a fixed terminal or a server. A memory management and control policy applicable to a server may not work well on a mobile terminal device. In addition, new user experience of the mobile terminal also poses a new requirement for memory management and control. For example, a camera device configuration upgrade has an increasingly high requirement for memory. In this case, Android (Android) has made a lot of adjustments to a memory requirement feature of the mobile terminal. Currently, an Android memory management method is mainly memory watermark management and control based on MemFree. In this solution, a memory watermark does not include memory that can be obtained through quick reclamation. When MemFree is low, memory pressure is already very high, and an occasion for triggering reclamation and kill is delayed, which not only affects application keepalive, but may even cause a panic due to out of memory (Out Of Memory, OOM), affecting user experience. MemFree refers to an amount of free memory, indicating a capacity of remaining memory space that is not allocated and that is in a free state in the entire memory space of the system. MemUsed=MemTotal−MemFree, where MemUsed indicates used memory. For example, a total size of memory space of an electronic device is 4G, where 3G is allocated to one or more running processes for use, and the other 1G is in a free state. In this case, a current amount of free memory of the electronic device is 1G. MemTotal refers to a total amount of memory. From a time point at which the system is powered on to a time point at which the system is booted, some memory needs to be reserved for a BIOS or the like, some memory needs to be reserved for a kernel, and remaining memory that can be used by the system is MemTotal. This value is usually fixed during system running.

In addition, there is also a memory management method based on MemAvailable. In the method, a watermark is maintained mainly through kill. However, if the watermark is set to a large value, overkill may easily occur when memory pressure is low, affecting keepalive. If the watermark is set to a small value, a same problem as the MemFree watermark management and control still occurs when memory pressure is too high. For example, in a scenario in which a large amount of memory is required and a high speed is required, for example, in a scenario such as a camera or a game, overkill may occur due to out of memory, or even an application fails to respond due to a slow memory allocation speed, which severely affects user experience. In addition, settings of a MemAvailable watermark are sensitive. Different devices have different memory requirements. Therefore, it is difficult to unify watermarks. In addition, in the second method, in addition to kill, some memory reclamation actions are also performed. However, only an upper layer unidirectionally guides memory reclamation, and consequently a unified closed-loop cannot be formed, and efficiency and an effect of memory reclamation cannot be ensured. This may easily cause a power consumption problem caused by frequent reclamation start, a reclamation efficiency problem caused by reclamation idleness, and a refault problem caused by excessive reclamation. As a result, the memory watermark cannot be effectively maintained, which causes higher pressure on the system. MemAvailable refers to an amount of available memory. Some memory in the system can be reclaimed although the memory is used. For example, some of cache/buffer and slab can be reclaimed. Therefore, MemFree cannot represent all available memory. The memory that can be reclaimed plus MemFree is the available memory of the system, that is, MemAvailable-MemFree+Buffers+Cached, which is calculated by the kernel by using a specific algorithm and is an estimated value.

Embodiments of this application provide a memory management method and apparatus, an electronic device, and a computer-readable storage medium, to resolve problems that memory management efficiency is low, memory is not supplied in a timely manner, and a quantity of keepalive applications is small.

It may be understood that the memory management method provided in embodiments of this application may be performed by the memory management apparatus provided in embodiments of this application, or the electronic device integrated with the memory management apparatus. The memory management apparatus may be implemented by using hardware or software. The electronic device may also be referred to as user equipment (User Equipment, UE), a mobile station (Mobile Station, MS), a mobile terminal (Mobile Terminal), or the like. Optionally, the electronic device may have a capability of communicating with one or more core networks through a radio access network (Radio Access Network, RAN). For example, the electronic device may be a mobile phone (or referred to as a "cellular" phone), a tablet computer, a palmtop computer, a notebook computer, or a desktop computer. An operating system of the electronic device may include but is not limited to a Linux system, an Android (Android) system, an iOS operating system, a Symbian (Symbian) operating system, a BlackBerry (BlackBerry) operating system, a Windows Phone 8 operating system, and the like. It may be understood that the memory management method provided in embodiments of this application is mainly applied to an electronic device having an Android operating system.

For example, a mobile phone is the foregoing electronic device. FIG. 3-1 is a schematic diagram of a structure of an electronic device 3-100.

As shown in FIG. 3-1, the electronic device 3-100 may include a processor 3-110, an external memory interface 3-120, an internal memory 3-121, a universal serial bus (universal serial bus, USB) port 3-130, a charging management module 3-140, a power management module 3-141, a battery 3-142, an antenna 3-1, an antenna 3-2, a mobile communications module 3-150, a wireless communications module 3-160, an audio module 3-170, a speaker 3-170A, a receiver 3-170B, a microphone 3-170C, a headset jack 3-170D, a sensor module 3-180, a button 3-190, a motor 3-191, an indicator 3-192, a camera 3-193, a display 3-194, a subscriber identification module (subscriber identification module, SIM) card interface 3-195, and the like. The sensor module 3-180 may include a pressure sensor 3-180A, a gyro sensor 3-180B, a barometric pressure sensor 3-180C, a magnetic sensor 3-180D, an acceleration sensor 3-180E, a distance sensor 3-180F, an optical proximity sensor 3-180G, a fingerprint sensor 3-180H, a temperature sensor 3-1801, a touch sensor 3-180K, an ambient light sensor 3-180L, a bone conduction sensor 3-180M, and the like.

It may be understood that the structure shown in this embodiment of this application does not constitute a specific limitation on the electronic device 3-100. In some other embodiments of this application, the electronic device 3-100 may include more or fewer components than those shown in the figure, or combine some components, or split some components, or have different component arrangements. The components shown in the figure may be implemented by hardware, software, or a combination of software and hardware.

The processor 3-110 may include one or more processing units. For example, the processor 3-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 3-110, and is configured to store instructions and data. In some embodiments, the memory in the processor 3-110 is a cache. The memory may store instructions or data that has been used or cyclically used by the processor 3-110. If the processor 3-110 needs to use the instructions or the data again, the processor may directly invoke the instructions or the data from the memory. This avoids repeated access, reduces waiting time of the processor 3-110, and improves system efficiency.

In some embodiments, the processor 3-110 may include one or more interfaces. The interface may include an inter-integrated circuit (inter-integrated circuit, I2C) interface, an inter-integrated circuit sound (inter-integrated circuit sound. I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface. MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 3-110 may include a plurality of groups of I2C buses. The processor 3-110 may be separately coupled to the touch sensor 3-180K, a charger, a flash, the camera 3-193, and the like through different I2C bus interfaces. For example, the processor 3-110 may be coupled to the touch sensor 3-180K through an I2C interface, so that the processor 3-110 communicates with the touch sensor 3-180K through the I2C bus interface, to implement a touch function of the electronic device 3-100.

The I2S interface may be used for audio communication. In some embodiments, the processor 3-110 may include a plurality of groups of I2S buses. The processor 3-110 may be coupled to the audio module 3-170 through the I2S bus, to implement communication between the processor 3-110 and the audio module 3-170. In some embodiments, the audio module 3-170 may transfer an audio signal to the wireless communications module 3-160 through the I2S interface, to implement a function of answering a call by using a Bluetooth headset.

The PCM interface may also be used for audio communication, and samples, quantizes, and codes an analog signal. In some embodiments, the audio module 3-170 may be coupled to the wireless communications module 3-160 through a PCM bus interface. In some embodiments, the audio module 3-170 may alternatively transfer an audio signal to the wireless communications module 3-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 3-110 to the wireless communications module 3-160. For example, the processor 3-110 communicates with a Bluetooth module in the wireless communications module 3-160 through the UART interface, to implement a Bluetooth function. In some embodiments, the audio module 3-170 may transfer an audio signal to the wireless communications module 3-160 through the UART interface, to implement a function of playing music by using a Bluetooth headset.

The MIPI may be configured to connect the processor 3-110 to a peripheral component such as the display 3-194 or the camera 3-193. The MIPI includes a camera serial interface (camera serial interface, CSI), a display serial interface (display serial interface, DSI), and the like. In some embodiments, the processor 3-110 communicates with the camera 3-193 through the CSI, to implement a photographing function of the electronic device 3-100. The processor 3-110 communicates with the display 3-194 through the DSI, to implement a display function of the electronic device 3-100.

The GPIO interface may be configured by using software. The GPIO interface may be configured as a control signal or a data signal. In some embodiments, the GPIO interface may be configured to connect the processor 3-110 to the camera 3-193, the display 3-194, the wireless communications module 3-160, the audio module 3-170, the sensor module 3-180, and the like. The GPIO interface may alternatively be configured as an I2C interface, an I2S interface, a UART interface, an MIPI, or the like.

The USB port 3-130 is a port that conforms to a USB standard specification, and may be specifically a mini USB port, a micro USB port, a USB Type-C port, or the like. The USB port 3-130 may be configured to connect to a charger to charge the electronic device 3-100, or may be configured to transmit data between the electronic device 3-100 and a peripheral device, or may be configured to connect to a headset for playing an audio through the headset. The port may alternatively be configured to connect to another electronic device such as an AR device.

It may be understood that an interface connection relationship between modules in this embodiment of this application is merely an example for description, and does not constitute a limitation on the structure of the electronic device 3-100. In some other embodiments of this application, the electronic device 3-100 may alternatively use an interface connection manner different from that in the foregoing embodiment, or a combination of a plurality of interface connection manners.

The charging management module 3-140 is configured to receive a charging input from a charger. The charger may be a wireless charger or a wired charger. In some embodiments of wired charging, the charging management module 3-140 may receive a charging input from the wired charger through the USB port 3-130. In some embodiments of wireless charging, the charging management module 3-140 may receive a wireless charging input through a wireless charging coil of the electronic device 3-100. When charging the battery 3-142, the charging management module 3-140 may further supply power to the electronic device by using the power management module 3-141.

The power management module 3-141 is configured to connect to the battery 3-142, the charging management module 3-140, and the processor 3-110. The power management module 3-141 receives an input of the battery 3-142 and/or an input of the charging management module 3-140, and supplies power to the processor 3-110, the internal memory 3-121, the display 3-194, the camera 3-193, the wireless communications module 3-160, and the like. The power management module 3-141 may be further configured to monitor parameters such as a battery capacity, a battery cycle count, and a battery health status (electricity leakage or impedance). In some other embodiments, the power management module 3-141 may alternatively be disposed in the processor 3-110. In some other embodiments, the power management module 3-141 and the charging management module 3-140 may alternatively be disposed in a same device.

A wireless communication function of the electronic device 3-100 may be implemented by using the antenna 3-1, the antenna 3-2, the mobile communications module 3-150, the wireless communications module 3-160, the modem processor, the baseband processor, and the like.

The antenna 3-1 and the antenna 3-2 are configured to: transmit and receive electromagnetic wave signals. Each antenna in the electronic device 3-100 may be configured to cover one or more communication frequency bands. Different antennas may be further multiplexed, to increase antenna utilization. For example, the antenna 3-1 may be multiplexed as a diversity antenna in a wireless local area network. In some other embodiments, the antenna may be used in combination with a tuning switch.

The mobile communications module 3-150 may provide a wireless communication solution that includes 2G/3G/4G5G or the like and that is applied to the electronic device 3-100. The mobile communications module 3-150 may include at least one filter, a switch, a power amplifier, a low noise amplifier (low noise amplifier, LNA), and the like. The mobile communications module 3-150 may receive an electromagnetic wave through the antenna 3-1, perform processing such as filtering or amplification on the received electromagnetic wave, and transmit the electromagnetic wave to the modem processor for demodulation. The mobile communications module 3-150 may further amplify a signal modulated by the modem processor, and convert an amplified signal into an electromagnetic wave for radiation through the antenna 3-1. In some embodiments, at least some functional modules in the mobile communications module 3-150 may be disposed in the processor 3-110. In some embodiments, at least some functional modules in the mobile communications module 3-150 may be disposed in a same device as at least some modules in the processor 3-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 3-170A, the receiver 3-170B, or the like), or displays an image or a video through the display 3-194. In some embodiments, the modem processor may be an independent device. In some other embodiments, the modem processor may be independent of the processor 3-110, and is disposed in a same device as the mobile communications module 3-150 or another functional module.

The wireless communications module 3-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like and that is applied to the electronic device 3-100. The wireless communications module 3-160 may be one or more components that integrate at least one communications processor module. The wireless communications module 3-160 receives an electromagnetic wave through the antenna 3-2, performs frequency modulation and filtering processing on the electromagnetic wave signal, and sends a processed signal to the processor 3-110. The wireless communications module 3-160 may further receive a to-be-sent signal from the processor 3-110, perform frequency modulation and amplification on the signal, and convert a processed signal into an electromagnetic wave for radiation through the antenna 3-2.

In some embodiments, the antenna 3-1 and the mobile communications module 3-150 in the electronic device 3-100 are coupled, and the antenna 3-2 and the wireless communications module 3-160 in the electronic device 3-100 are coupled, so that the electronic device 3-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 3-100 may implement a display function through the GPU, the display 3-194, the application processor, and the like. The GPU is a microprocessor for image processing, and is connected to the display 3-194 and the application processor. The GPU is configured to: perform mathematical and geometric calculation, and render an image. The processor 3-110 may include one or more GPUs that execute program instructions to generate or change display information.

The display 3-194 is configured to display an image, a video, and the like. The display 3-194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 3-100 may include one or N displays 3-194, where N is a positive integer greater than 1.

The electronic device 3-100 may implement a photographing function through the ISP, the camera 3-193, the video codec, the GPU, the display 3-194, the application processor, and the like.

The ISP is configured to process data fed back by the camera 3-193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 3-193.

The camera 3-193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 3-100 may include one or N cameras 3-193, where N is a positive integer greater than 1.

The digital signal processor is configured to process a digital signal, and may further process another digital signal in addition to a digital image signal. For example, when the electronic device 3-100 selects a frequency, the digital signal processor is configured to perform Fourier transform or the like on frequency energy.

The video codec is configured to: compress or decompress a digital video. The electronic device 3-100 may support one or more video codecs. In this way, the electronic device 3-100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 3-100, such as image recognition, facial recognition, speech recognition, and text understanding.

The internal memory 3-121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (universal flash storage, UFS), an embedded multimedia card (embedded multimedia Card, eMMC), and the like according to storage specifications.

The random access memory may be directly read and written by using the processor 3-110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 3-110.

The external memory interface 3-120 may be configured to connect to an external non-volatile memory, to extend a storage capability of the electronic device 3-100. The external non-volatile memory communicates with the processor 3-110 through the external memory interface 3-120, to implement a data storage function. For example, files such as music and videos are stored in the external non-volatile memory.

The electronic device 3-100 may implement audio functions, for example, music playing and recording, by using the audio module 3-170, the speaker 3-170A, the receiver 3-170B, the microphone 3-170C, the headset jack 3-170D, the application processor, and the like.

The audio module 3-170 is configured to convert digital audio information into an analog audio signal for output, and is also configured to convert an analog audio input into a digital audio signal. The audio module 3-170 may be further configured to: code and decode an audio signal. In some embodiments, the audio module 3-170 may be disposed in the processor 3-110, or some functional modules in the audio module 3-170 are disposed in the processor 3-110.

The speaker 3-170A, also referred to as a "horn", is configured to convert an electrical audio signal into a sound signal. The electronic device 3-100 may be used to listen to music or answer a call in a hands-free mode over the speaker 3-170A.

The receiver 3-170B, also referred to as an "earpiece", is configured to convert an electrical audio signal into a sound signal. When a call is answered or speech information is received through the electronic device 3-100, the receiver 3-170B may be put close to a human ear to listen to a voice.

The microphone 3-170C, also referred to as a "mike" or a "mic", is configured to convert a sound signal into an electrical signal. When making a call or sending voice information, a user may make a sound near the microphone 3-170C through the mouth of the user, to input the sound signal to the microphone 3-170C. At least one microphone 3-170C may be disposed in the electronic device 3-100. In some other embodiments, two microphones 3-170C may be disposed in the electronic device 3-100, to implement a noise reduction function in addition to collecting a sound signal. In some other embodiments, three, four, or more microphones 3-170C may alternatively be disposed in the electronic device 3-100, to collect a sound signal, reduce noise, identify a sound source, implement a directional recording function, and the like.

The headset jack 3-170D is configured to connect to a wired headset. The headset jack 3-170D may be the USB port 3-130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 3-180A is configured to sense a pressure signal, and may convert the pressure signal into an electrical signal. In some embodiments, the pressure sensor 3-180A may be disposed on the display 3-194. There are many types of pressure sensors 3-180A, for example, a resistive pressure sensor, an inductive pressure sensor, and a capacitive pressure sensor. The capacitive pressure sensor may include at least two parallel plates with conductive materials. When a force is applied to the pressure sensor 3-180A, capacitance between electrodes changes. The electronic device 3-100 determines pressure intensity based on the change of the capacitance. When a touch operation is performed on the display 3-194, the electronic device 3-100 detects intensity of the touch operation based on the pressure sensor 3-180A. The electronic device 3-100 may also calculate a touch location based on a detection signal of the pressure sensor 3-180A. In some embodiments, touch operations that are performed at a same touch location but have different touch operation intensity may correspond to different operation instructions. For example, when a touch operation whose touch operation intensity is less than a thirty-first pressure threshold is performed on a Messages icon, an instruction for viewing an SMS message is executed. When a touch operation whose touch operation intensity is greater than or equal to the thirty-first pressure threshold is performed on the Messages icon, an instruction for creating a new SMS message is executed.

The gyro sensor 3-180B may be configured to determine a motion posture of the electronic device 3-100. In some embodiments, an angular velocity of the electronic device 3-100 around three axes (that is, axes x, y, and z) may be determined through the gyro sensor 3-180B. The gyro sensor 3-180B may be configured to implement image stabilization during photographing. For example, when the shutter is pressed, the gyro sensor 3-180B detects an angle at which the electronic device 3-100 jitters, calculates, based on the angle, a distance for which a lens module needs to compensate, and allows the lens to cancel the jitter of the electronic device 3-100 through reverse motion, to implement image stabilization. The gyro sensor 3-180B may also be used in a navigation scenario and a motion-sensing gaming scenario.

The barometric pressure sensor 3-180C is configured to measure barometric pressure. In some embodiments, the electronic device 3-100 calculates an altitude based on a value of the barometric pressure measured by the barometric pressure sensor 3-180C, to assist in positioning and navigation.

The magnetic sensor 3-180D includes a Hall sensor. The electronic device 3-100 may detect opening and closing of a flip leather case by using the magnetic sensor 3-180D. In some embodiments, when the electronic device 3-100 is a clamshell phone, the electronic device 3-100 may detect opening and closing of a flip cover by using the magnetic sensor 3-180D. Further, a feature such as automatic unlocking upon opening of the flip cover is set based on a detected opening or closing state of the flip cover.

The acceleration sensor 3-180E may detect magnitudes of accelerations of the electronic device 3-100 in various directions (usually on three axes), and may detect a magnitude and a direction of gravity when the electronic device 3-100 is still. The acceleration sensor may be further configured to recognize a posture of the electronic device, and is used in an application such as switching between landscape mode and portrait mode or a pedometer.

The distance sensor 3-180F is configured to measure a distance. The electronic device 3-100 may measure the distance in an infrared manner or a laser manner. In some embodiments, in a photographing scenario, the electronic device 3-100 may measure a distance through the distance sensor 3-180F to implement quick focusing.

The optical proximity sensor 3-180G may include, for example, a light-emitting diode (LED) and an optical detector, for example, a photodiode. The light-emitting diode may be an infrared light-emitting diode. The electronic device 3-100 emits infrared light by using the light-emitting diode. The electronic device 3-100 detects infrared reflected light from a nearby object by using the photodiode. When detecting sufficient reflected light, the electronic device 3-100 may determine that there is an object near the electronic device 3-100. When detecting insufficient reflected light, the electronic device 3-100 may determine that there is no object near the electronic device 3-100. The electronic device 3-100 may detect, by using the optical proximity sensor 3-180G, that the user holds the electronic device 3-100 close to an ear to make a call, to automatically turn off a screen for power saving. The optical proximity sensor 3-180G may also be used in a flip cover mode or a pocket mode to automatically perform screen unlocking or locking.

The ambient light sensor 3-180L is configured to sense ambient light brightness. The electronic device 3-100 may adaptively adjust brightness of the display 3-194 based on the sensed ambient light brightness. The ambient light sensor 3-180L may also be configured to automatically adjust white balance during photographing. The ambient light sensor 3-180L may further cooperate with the optical proximity sensor 3-180G to detect whether the electronic device 3-100 is in a pocket, to avoid an accidental touch.

The fingerprint sensor 3-180H is configured to collect a fingerprint. The electronic device 3-100 may use a feature of the collected fingerprint to implement fingerprint-based unlocking, application lock access, fingerprint-based photographing, fingerprint-based call answering, and the like.

The temperature sensor 3-180J is configured to detect a temperature. In some embodiments, the electronic device 3-100 executes a temperature processing policy by using the temperature detected by the temperature sensor 3-180W. For example, when the temperature reported by the temperature sensor 3-180J exceeds a threshold, the electronic device 3-100 lowers performance of a processor near the temperature sensor 3-180J, to reduce power consumption for thermal protection. In some other embodiments, when the temperature is less than another threshold, the electronic device 3-100 heats the battery 3-142 to prevent the electronic device 3-100 from being abnormally powered off because of a low temperature. In some other embodiments, when the temperature is less than still another threshold, the electronic device 3-100 boosts an output voltage of the battery 3-142 to avoid abnormal shutdown caused by a low temperature.

The touch sensor 3-180K is also referred to as a "touch component". The touch sensor 3-180K may be disposed on the display 3-194, and the touch sensor 3-180K and the display 3-194 form a touchscreen. The touch sensor 3-180K is configured to detect a touch operation performed on or near the touch sensor. The touch sensor may transfer a detected touch operation to the application processor, to determine a type of a touch event. A visual output related to the touch operation may be provided through the display 3-194. In some other embodiments, the touch sensor 3-180K may alternatively be disposed on a surface of the electronic device 3-100 and is located at a location different from that of the display 3-194.

The bone conduction sensor 3-180M may obtain a vibration signal. In some embodiments, the bone conduction sensor 3-180M may obtain a vibration signal of a vibration bone of a human vocal-cord part. The bone conduction sensor 3-180M may also be in contact with a body pulse to receive a blood pressure beating signal. In some embodiments, the bone conduction sensor 3-180M may also be disposed in a headset, to form a bone conduction headset. The audio module 3-170 may obtain a voice signal through parsing based on the vibration signal that is of the vibration bone of the vocal part and that is obtained by the bone conduction sensor 3-180M, to implement a voice function. The application processor may parse heart rate information based on the blood pressure beating signal obtained by the bone conduction sensor 3-180M, to implement a heart rate detection function.

The button 3-190 includes a power button, a volume button, and the like. The button 3-190 may be a mechanical button, or may be a touch button. The electronic device 3-100 may receive a key input, and generate a key signal input related to a user setting and function control of the electronic device 3-100.

The motor 3-191 may generate a vibration prompt. The motor 3-191 may be configured to provide an incoming call vibration prompt and a touch vibration feedback. For example, touch operations performed on different applications (for example, photographing and audio playing) may correspond to different vibration feedback effects. The motor 3-191 may also correspond to different vibration feedback effects for touch operations performed on different areas of the display 3-194. Different application scenarios (for example, a time reminder scenario, an information receiving scenario, an alarm clock scenario, and a game scenario) may also correspond to different vibration feedback effects. The touch vibration feedback effect may also be customized.

The indicator 3-192 may be an indicator light, and may be configured to indicate a charging status and a power change, or may be configured to indicate a message, a missed call, a notification, and the like.

The SIM card interface 3-195 is configured to connect to a SIM card. The SIM card may be inserted into the SIM card interface 3-195 or removed from the SIM card interface 3-195, to implement contact with or separation from the electronic device 3-100. The electronic device 3-100 may support one or N SIM card interfaces, where N is a positive integer greater than 1. The SIM card interface 3-195 may support a nano-SIM card, a micro-SIM card, a SIM card, and the like. A plurality of cards may be simultaneously inserted into a same SIM card interface 3-195. The plurality of cards may be of a same type or of different types. The SIM card interface 3-195 is compatible with different types of SIM cards. The SIM card interface 3-195 is also compatible with an external storage card. The electronic device 3-100 interacts with a network through the SIM card, to implement functions such as calling and data communication. In some embodiments, the electronic device 3-100 uses an eSIM, that is, an embedded SIM card. The eSIM card may be embedded in the electronic device 3-100, and cannot be separated from the electronic device 3-100.

With reference to the accompanying drawings, the following describes, in detail by using an example in which an execution body is an electronic device 3-100, a memory management method provided in embodiments of this application.

FIG. 3-2a(1) and FIG. 3-2a(2) are a schematic flowchart of a memory management method according to an embodiment of this application. As shown in FIG. 3-2a(1) and FIG. 3-2a(2), the memory management method may include S3-20 to S3-211.

Step S3-20: Create a memory statistical value and a memory pressure level.

It may be understood that the memory statistical value is used to represent remaining available memory in system memory of an electronic device, and is usually represented by a watermark (watermark) parameter. For example, a lower memory watermark indicates less remaining available system memory. A watermark (watermark) is an array in a memory management zone, and the memory watermark usually includes three watermark values, that is, WMARK_HIGH (high watermark), WMARK_LOW (low watermark), and WMARK_MIN (minimum watermark), where WMARK_HIGH>WMARK_LOW>WMARK_MIN. Usually, the watermark needs to be checked before a page (page) is allocated. For example, when a free page is greater than WMARK_HIGH, it indicates that a system memory status of the electronic device is ideal, and memory reclamation does not need to be performed temporarily. When the free page is less than WMark_LOW, it indicates that the system memory of the electronic device is insufficient, and memory reclamation needs to be performed. When the free page is less than WMark_MIN, it indicates that the system memory of the electronic device is seriously insufficient. For example, there are few available free pages in a memory domain, and therefore memory reclamation needs to be accelerated.

It may be understood that available memory in this embodiment of this application includes two parts, for example, thirty-first memory and thirty-second memory. The thirty-first memory refers to free memory of a system. The free memory is memory that is not used by the system, that is, MemFree. The thirty-second memory is occupied memory that can be converted into the thirty-first memory through reclamation. The occupied memory is mainly memory occupied by a currently running process and service and memory occupied by running a kernel.

It may be understood that, refer to Formula (1). The memory watermark defined in this embodiment of this application may be obtained by using Formula (1).

$$\text{buffer}=\text{freemem}+\alpha*\text{inactive\_file}+\beta*\text{active\_file}+\text{ion\_cache} \quad (1)$$

Buffer is an amount of buffer memory, which is also referred to as write-buffer and is usually used in a write operation. Cache is an amount of cache memory, which is also referred to as read-cache and is usually used in a read operation.

In this embodiment of this application, the parameter buffer is the memory watermark. The parameter freemem is free memory in the thirty-first memory. The parameter inactive_file is inactive file memory. The parameter active_file is active file memory. The parameter ion_cache is available memory (cache) of an ION memory manager. The cache (cache) stores read data. If the data is hit (required data is found) during re-reading, a hard disk does not need to be read. If the data is not hit, a hard disk is read. The parameters inactive_file, active_file, and ion_cache jointly constitute occupied memory that can be supplied through reclamation in the thirty-second memory. The parameters α and β are adjustable parameters. Specifically, the parameters α and β may be correspondingly adjusted according to specifications of different products, that is, different proportions or discounts are selected.

It may be understood that, in this embodiment of this application, the thirty-first memory and the thirty-second memory are not limited. For example, the thirty-second memory may alternatively be other occupied memory that can be supplied or reclaimed, and is not limited to the inactive file memory and/or the active file memory.

It may be understood that, according to Formula (1), the memory statistical value is created by comprehensively considering supply of memory that can be quickly reclaimed, and an adjustable parameter for supply of a file page (file page) is provided, so that the memory statistical value is set more properly. That is, the memory statistical value can more effectively reflect an available memory supply capability, and more effectively reflect a memory pressure status.

It may be understood that, in this embodiment of this application, the memory statistical value includes a thirty-first memory statistical value, a thirty-second memory statistical value, and a thirty-third memory statistical value. The thirty-first memory statistical value corresponds to WMARK_High in the watermark (watermark), and is collectively referred to as high_buffer below. The thirty-second memory statistical value may correspond to WMARK_LOW in the watermark (watermark), and is collectively referred to as low_buffer below. The thirty-third memory statistical value corresponds to WMARK_MIN in the watermark (watermark), and is collectively referred to as min_buffer below. The thirty-second memory statistical value is less than the thirty-first memory statistical value. The thirty-third memory statistical value is less than the thirty-second memory statistical value.

It may be understood that, in this embodiment of this application, the memory pressure level includes a thirty-first level, a thirty-second level, and a thirty-third level. The electronic device may further preset the memory pressure level. For example, the thirty-first level corresponds to a low level, the thirty-second level corresponds to a medium level, and the thirty-third level corresponds to a high level. The high level (critical_level_press) indicates that memory pressure is high, the medium level (medium_level_press) indicates that memory pressure is moderate, and the low level (low_level_press) indicates that memory pressure is low. That is, the memory pressure of the thirty-third level is higher than the memory pressure of the thirty-second level, and the memory pressure of the thirty-second level is higher than the memory pressure of the thirty-first level. The memory pressure level may be determined based on a current memory statistical value of the system. For example, if the current memory statistical value of the system is less than the thirty-second memory statistical value, it may be determined that a current memory pressure level of the system is the thirty-first level (for example, the low level). After system memory is reclaimed, if the current memory statistical value of the system is less than the thirty-first memory statistical value, it may be determined that a current memory pressure level of the system is a thirty-second level (for example, the medium level). When the current memory statistical value of the system is less than the thirty-third memory statistical value, it may be determined that a current memory pressure level of the system is the thirty-third level (for example, the high level).

Optionally, the memory statistical value may be statically preset. Specifically, there are the following cases:

(1) Configure the Memory Statistical Value According to a Product Specification.

For a 2G/3G/4G/6G random access memory (Random Access Memory. RAM) product, the memory statistical value varies accordingly with the available memory of the system. For example, for a 3G RAM product, the memory statistical value may be configured to be 600 MB; and for a 4G RAM product, the memory statistical value may be configured to be 700 MB.

(2) Configure a Minimum Memory Statistical Value Based on an Application Scenario.

Memory consumption varies with applications and scenarios. Therefore, to configure a proper memory statistical value, Manner (1) has some disadvantages, which may cause frame freezing when a third-party application is started because the application is not considered. To resolve this problem, the top third-party applications in an application market may be analyzed in offline manner to obtain maximum memory usage information of each application in each scenario, and set the memory statistical value to maximum occupied memory of the application.

For another example, considering that screen-off background power consumption needs to be reduced in a screen-off scenario, and a memory impact scenario caused by centralized application wakeup at a screen-on moment needs to be resolved, the memory statistical value may be set to two different values in the screen-off scenario and the screen-on scenario respectively, and a memory statistical value in the screen-off scenario is less than a memory statistical value in the screen-on scenario. For example, a thirty-first memory statistical value in the screen-off scenario is less than a thirty-first memory statistical value in the screen-on scenario. A thirty-second memory statistical value in the screen-off scenario is less than a thirty-second memory statistical value in the screen-on scenario. A thirty-third memory statistical value in the screen-off scenario is less than a thirty-third memory statistical value in the screen-on scenario.

(3) Configure the Memory Statistical Value Based on Historical Occupied Memory of a System Running Process.

Because each user has characteristics of the user, after a terminal is used for a long time, applications installed and running on the terminal are inconsistent, and therefore the memory statistical value may be configured based on the historical occupied memory of the system running process. Specifically, historical status information (procstats) of memory usage during running of each process may be queried when the terminal is not used by the user (for example, at midnight), to obtain maximum memory usage information (for example, an application name and maximum occupied memory). Further, the maximum occupied memory is compared with a current memory statistical value of the system. If the maximum occupied memory is greater than the current memory statistical value of the system, the maximum occupied memory is selected as a new memory statistical value of the system.

(4) Configure the Memory Statistical Value Through Cloud Delivery.

A cloud server may collect, based on an identifier of the terminal, information about memory occupied by all applications running on the terminal in each scenario, form a form by using information such as a name of an application whose occupied memory is greater than a preset value (for example, 300 MB) and a current running scenario of the application, and push the form to the terminal periodically (for example, every month). After receiving the form, the terminal traverses application information in the form and a local application list, determines maximum memory usage information of applications installed on the terminal, and further compares maximum occupied memory with a current memory statistical value of the system; and if the maximum occupied memory is greater than the current memory statistical value of the system, selects the maximum occupied memory as a new memory statistical value of the system.

Optionally, the memory statistical value may alternatively be dynamically configured.

Specifically, an application that is most likely to run next may be predicted based on information such as a user use habit, an application use history, a use frequency, and use duration according to a prediction algorithm by using a user behavior analysis algorithm, and an application list is formed, to obtain maximum memory that needs to be used by an application in the application list, and compare the maximum memory with a current memory statistical value of the system. If the maximum memory is greater than the current memory statistical value of the system, the maximum memory is selected as a new memory statistical value of the system.

Step S3-21: Monitor the current memory statistical value of the system.

Step S3-22: Determine whether the current memory statistical value of the system is less than the thirty-second memory statistical value low_buffer, and if it is determined that the current memory statistical value of the system is less than the thirty-second memory statistical value low_buffer, perform step S3-23, or if it is determined that the current memory statistical value of the system is not less than the thirty-second memory statistical value low_buffer, perform step S3-21, that is, continue to monitor the current memory statistical value of the system.

Step S3-23: When it is determined that the current memory statistical value of the system is less than the thirty-second memory statistical value low_buffer, wake up an anonymous page compression thread, to prepare to reclaim memory.

It may be understood that, when performing memory compression processing, the kernel usually selects an anonymous page as an object of memory compression processing. The anonymous page is a memory page of heap memory dynamically allocated by an application. The anonymous page may be accessed again and cannot be directly reclaimed. Therefore, the memory cannot be directly released. Therefore, memory compression is used to indirectly release occupied memory space. For example, an anonymous page in an allocated memory page is first determined, a specific quantity of memory pages is selected from all anonymous pages as a target memory page, and the target memory page is compressed, to increase free memory.

Step S3-24: Determine that the current memory pressure level of the system is the thirty-first level and report a thirty-first level pressure event (for example, a low level pressure (low_level_press) event) to an upper layer.

Step S3-25: The upper layer receives the low level pressure (low_level_press) event, and configures a reclamation parameter and delivers the reclamation parameter to the anonymous page compression thread based on an application feature, to indicate the anonymous page compression thread to reclaim memory.

Step S3-26: Receive the reclamation parameter, and start compression processing based on the reclamation parameter by using the anonymous page compression thread, to reclaim memory, that is, reclaim the thirty-second memory, so as to convert the thirty-second memory into the thirty-first memory.

It may be understood that the upper layer may be a native layer or an application framework (FWK) layer.

It may be understood that the reclamation parameter includes but is not limited to a quantity of target memory pages, a priority of reclaiming a target memory page, a memory reclamation ratio (ratio), and/or the like. The quantity of target memory pages may be determined based on the current memory statistical value of the system and the thirty-second memory statistical value low_buffer. For example, an amount of to-be-reclaimed memory is determined based on a difference between the thirty-second memory statistical value low_buffer and the current memory statistical value of the system, and then a quantity of required target memory pages is calculated based on the amount of to-be-reclaimed memory and an expected compression ratio.

In this way, the anonymous page compression thread may start compression processing based on the reclamation parameter. For example, the target memory page is compressed, and the compressed memory page is written into memory compression space in memory space, to release some memory space occupied by the target memory page. Subsequently, when the system needs to use the memory page again, the system finds the compressed memory page from the memory compression space, decompresses the compressed memory page, and then uses a decompressed memory page.

For example, it is assumed that the current memory statistical value of the system is 10M, and the thirty-second memory statistical value low_buffer is 20M. Therefore, it can be learned that memory space that needs to be released is 10M. Assuming that the expected compression rate is 50%, it can be learned through calculation that a size of memory on which compression processing needs to be performed is 10M/50%=20M. Then, 20M target memory pages are obtained from the anonymous page, and compression processing is performed on these memory pages, to obtain 10M memory space. The compression rate is a ratio of a size of a compressed memory page to a size of an original memory page. The expected compression rate may be a preset empirical value.

Step S3-27: After one time of memory reclamation is completed through anonymous compression, determine whether the current memory statistical value of the system is less than the thirty-first memory statistical value high_buffer; and if it is determined that the current memory statistical value of the system is less than the thirty-first memory statistical value high_buffer, perform step S3-28, or if it is determined that the current memory statistical value of the system is not less than the thirty-first memory statistical value high_buffer, perform step S3-21, that is, continue to monitor the current memory statistical value of the system.

Step S3-28: When it is determined that the current memory statistical value of the system is less than the thirty-first memory statistical value high_buffer, determine that the current memory pressure level of the system is the thirty-second level and report a thirty-second level pressure event (for example, a medium level pressure (medium_level_press) event) to the upper layer by using the anonymous page compression thread.

Step S3-29: The upper layer receives the medium level pressure (medium_level_press) event, and adjusts (for example, decreases) the memory statistical value.

It may be understood that, usually, when the anonymous page compression thread ends reclamation, the thirty-first memory statistical value high_buffer may be reached, so that the system has sufficient idle resources to maintain a large memory statistical value for subsequent opening of an application, for example, opening of a camera.

In addition, memory reclamation is performed by using the anonymous page compression thread, so that the memory statistical value reaches the thirty-first memory statistical value high_buffer, that is, the memory statistical value reaches a high level. This may also effectively avoid a power consumption problem caused by frequent reclamation start, a reclamation efficiency problem caused by reclamation idleness, a refault problem caused by excessive reclamation, and the like.

It may be understood that, in this embodiment of this application, when the anonymous page compression thread ends reclamation, if the current memory statistical value of the system still does not reach the specified thirty-first memory statistical value high_buffer, the memory statistical value is adjusted, for example, the memory statistical value is decreased.

Step S3-210: Determine whether the current memory statistical value of the system is less than the thirty-third memory statistical value min_buffer; and if it is determined that the current memory statistical value of the system is less than the thirty-third memory statistical value min_buffer, perform step S3-211, or if it is determined that the current memory statistical value of the system is not less than the thirty-third memory statistical value min_buffer, perform step S3-26, that is, continue to start the anonymous page compression thread to perform memory reclamation.

Step S3-211: When it is determined that the current memory statistical value of the system is less than the thirty-third memory statistical value min_buffer, report the medium level pressure (medium_level_press) event again, reclaim the thirty-second memory by killing (kill) a process, and perform step S3-21, that is, continue to monitor the current memory statistical value of the system.

It may be understood that, in this embodiment of this application, when the upper layer receives a preset quantity of times (for example, n times) of medium level pressure (medium_level_press) events within a time window A, the memory statistical value is gradually decreased to the thirty-third memory statistical value min_buffer. That the upper layer decreases the memory statistical value means that when receiving a medium level pressure (medium_level_press) event, the upper layer decreases both the thirty-second memory statistical value low_buffer and the thirty-first memory statistical value high_buffer based on a current memory statistical value of the system, where a decreased value is a difference between the thirty-first memory statistical value high_buffer and the current memory statistical value of the system. If the thirty-third memory statistical value min_buffer still cannot be maintained after memory reclamation performed by the anonymous page compression process, that is, the current memory statistical value of the system is still less than the thirty-third memory statistical value min_buffer, when the medium level pressure (medium_level_press) event is reported again, the thirty-second memory is reclaimed by killing (kill) a process.

It may be understood that, when it is determined that a trigger condition for killing a process is met, for example, when the current memory statistical value of the system is still less than the thirty-third memory statistical value min_buffer, a quantity of processes that need to be killed and a target process that needs to be killed may be further determined based on the thirty-third memory statistical value min_buffer and the current memory statistical value of the system, that is, which process or processes to be killed are determined. That is, when it is determined that the trigger condition for killing the process is met, a kill process list may be created, and then the process is killed based on a sequence of processes in the kill process list, until the current memory statistical value of the system reaches the thirty-third memory statistical value min_buffer.

The kill process list is a dynamic two-dimensional table obtained after sorting is performed based on importance of an application, a process priority, and/or another factor (for example, a size and distribution of an anonymous page of an application), and includes processes of one or more applications. That is, the kill process list may include one or more applications, and one application may include one or more processes. The kill process list is a list obtained after sorting is performed based on importance of an application, a process priority, and/or another factor.

Specifically, a manner of creating the kill process list specifically includes but is not limited to the following steps:

(1) Determine a score of a key element of each application that currently runs in the background, where the key element includes one or more of the following: a process priority, a user use habit, a process-occupied system resource, and an application association relationship.

(2) Perform weighted calculation on scores of all key elements of each application, to obtain importance of the application.

(3) Sort all applications based on importance of all the applications.

(4) Sort, based on process priorities, processes included in each sorted application, to generate the kill process list.

In this embodiment of this application, each application that runs in the terminal background may include one or more processes, and the key element of each application includes one or more of the following: the process priority, the user use habit, the process-occupied system resource, and the application association relationship. Each key factor has a corresponding score. When the kill process list is created based on the key elements (the process priority, the user use habit, the process-occupied system resource, and the application association relationship) of the applications, a process that needs to be processed can be subsequently determined from the kill process list based on a memory requirement. In this way, a killable process queue can be accurately selected, and a probability of incorrectly killing/killing more/killing fewer processes is reduced.

The system evaluates importance of each process, and the importance of the process also represents a process priority. Usually, importance is represented by a value oom_adj (out of memory adjust) and assigned to each process. The system determines which processes need to be terminated based on oom_adj. Usually, the score of oom_adj is provided by the system and can be allocated by the system based on a current running status of the application. Usually, a larger score of oom_adj indicates a higher probability that the process is selected and terminated by the system, and a lower process priority.

The user use habit may include but is not limited to a use time record of the application, an accumulated quantity of use times of the application, duration of using the application each time, and accumulated use duration. Based on the user use habit, related process information may be determined, for example, which processes are processes of an application that is frequently used by the user, which processes are processes of an application that is used by the user for a long time, or which processes are processes of an application that is recently used by the user.

An application importance model may be obtained through learning by using a model such as a random forest, and the kill process list is obtained based on an application use frequency, a size and distribution of an anonymous page of an application, and/or another factor. When a process is killed, an application that needs to be killed is obtained based on a status of an anonymous page of an application in the kill process list and a quantity of applications that need to be killed.

It is clear that, as shown in FIG. 3-2a(1) and FIG. 3-2a(2), the memory statistical value includes a thirty-first memory statistical value, a thirty-second memory statistical value, and a thirty-third memory statistical value. The thirty-second memory statistical value is less than the thirty-first memory statistical value. The thirty-third memory statistical value is less than the thirty-second memory statistical value. In this way, the current memory statistical value of the system is compared with the preset thirty-first memory statistical value, thirty-second memory statistical value, and thirty-third memory statistical value, so that different memory management policies can be used based on a comparison result.

Figures 1, 3:
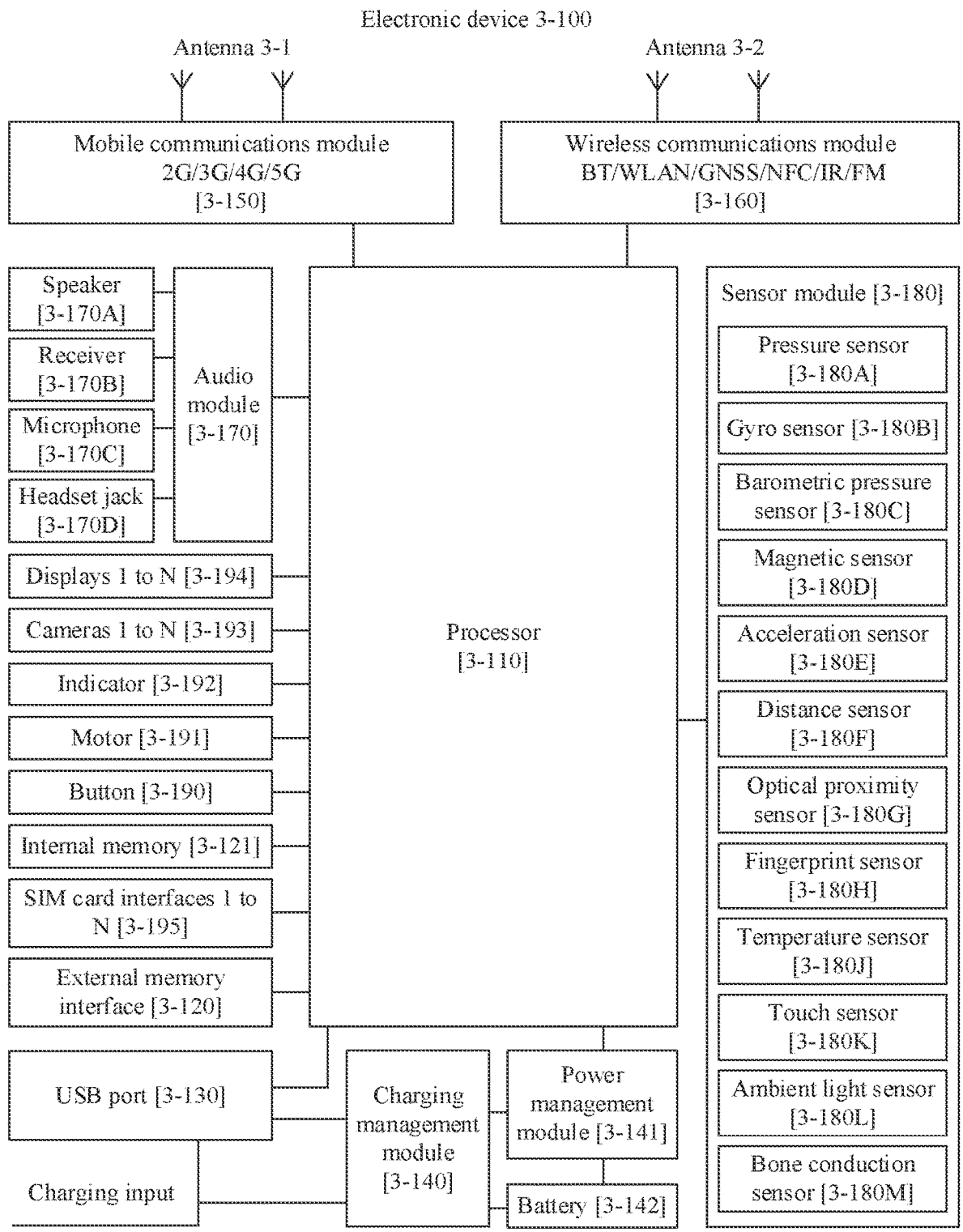
Figures 2B, 3:
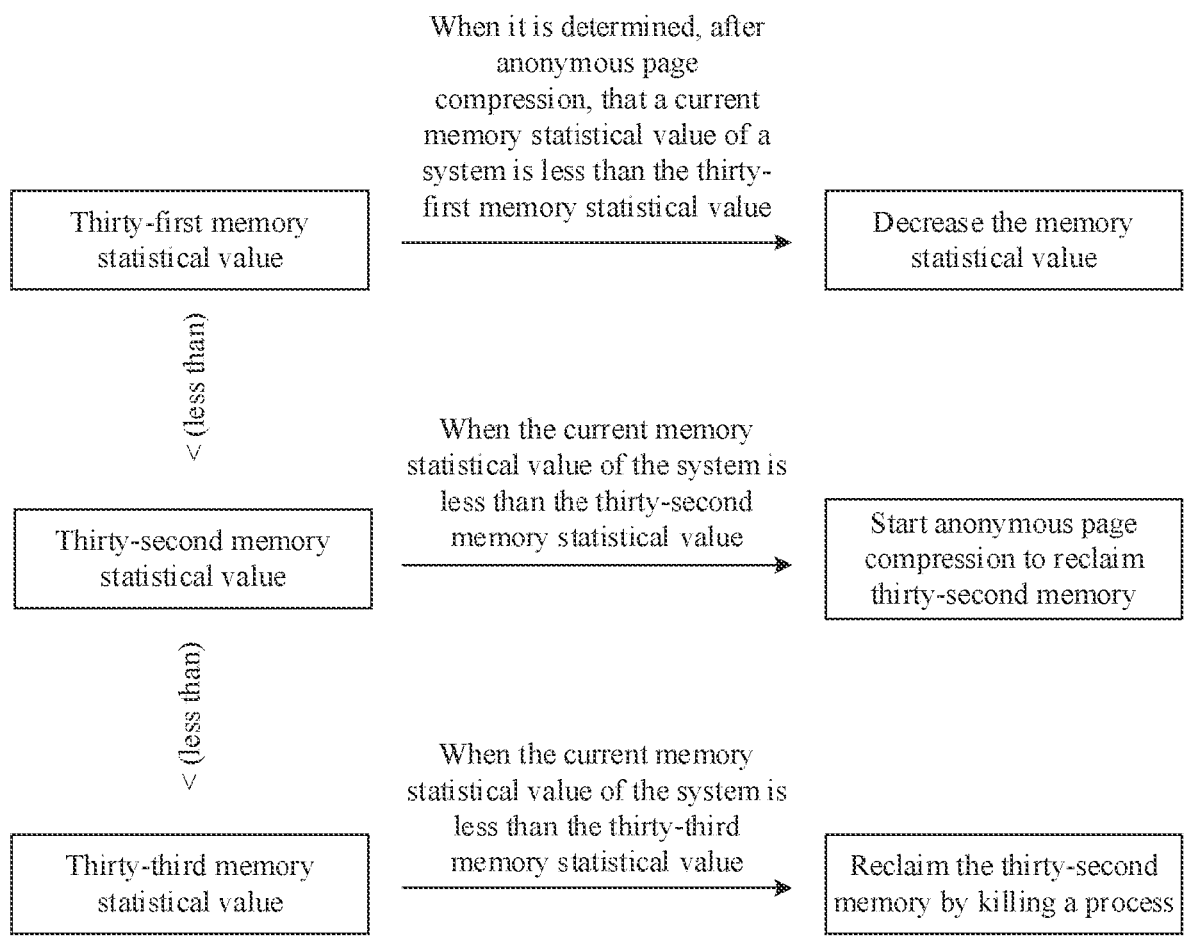
Figure 3:
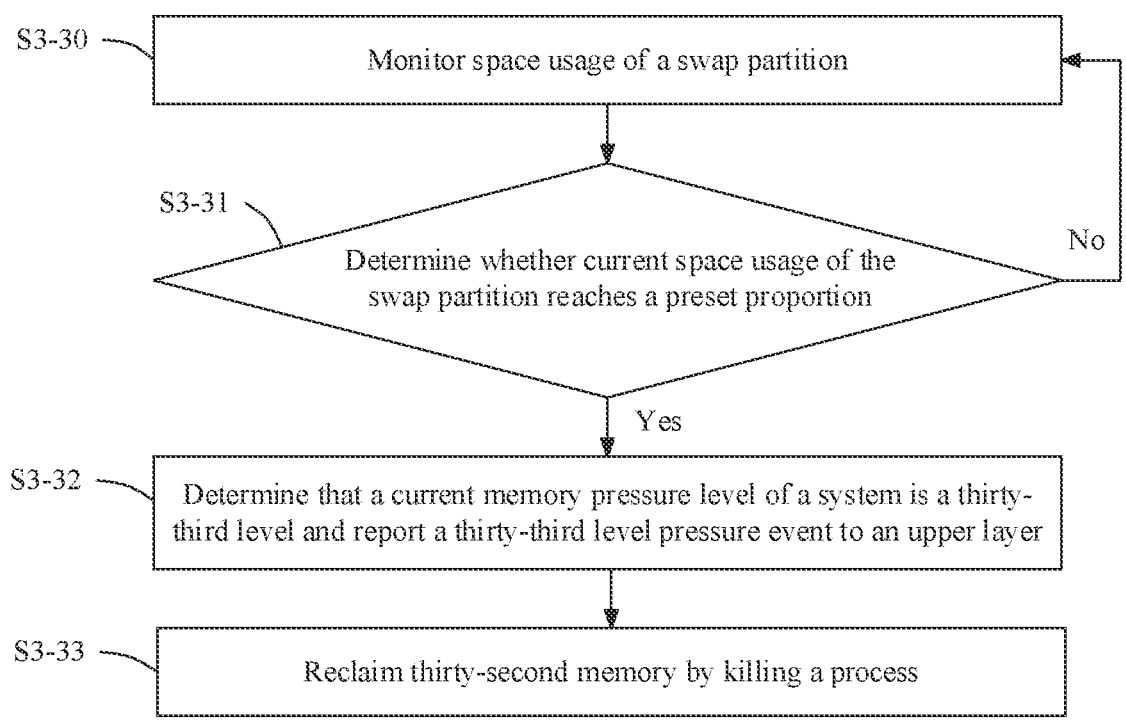
Figures 3, 4:
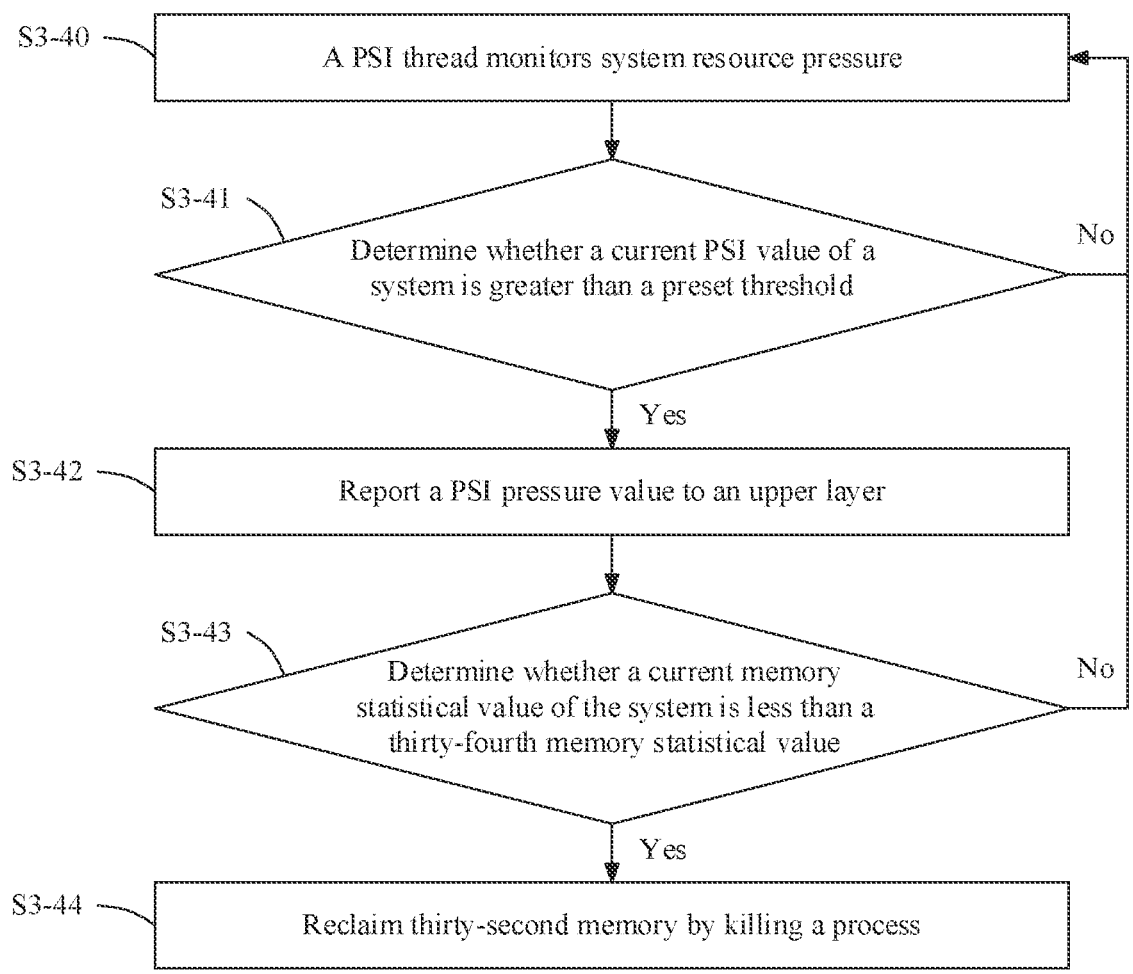
Figures 3, 4, 5:
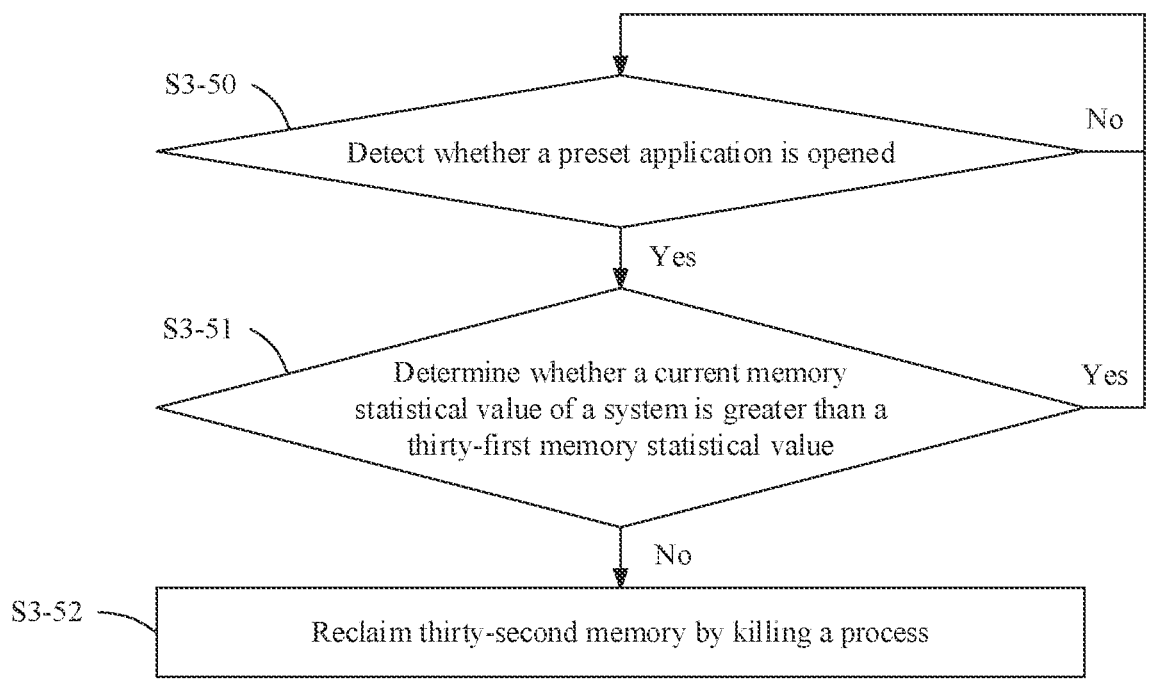
Figures 3, 4, 5, 6:
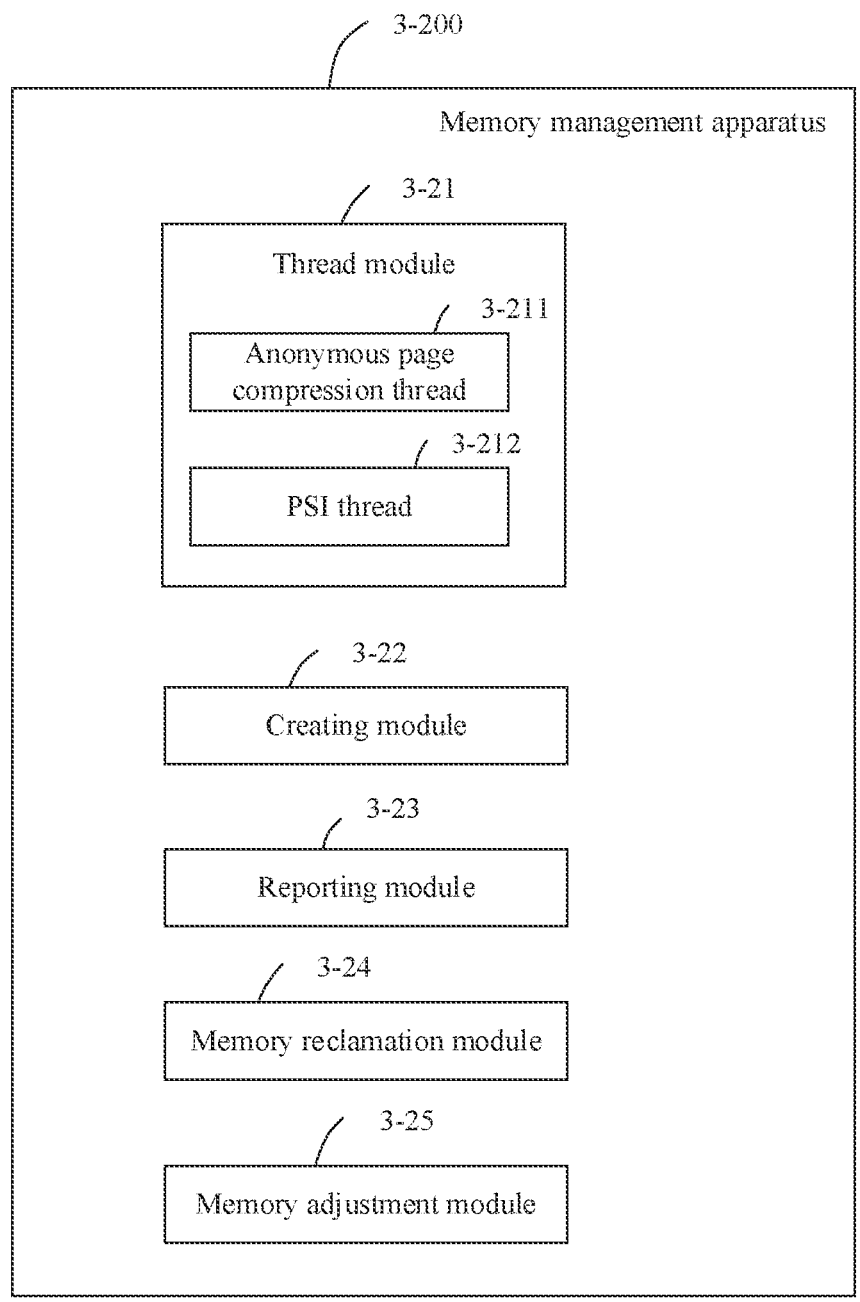
Figures 3, 4, 5, 6, 7:
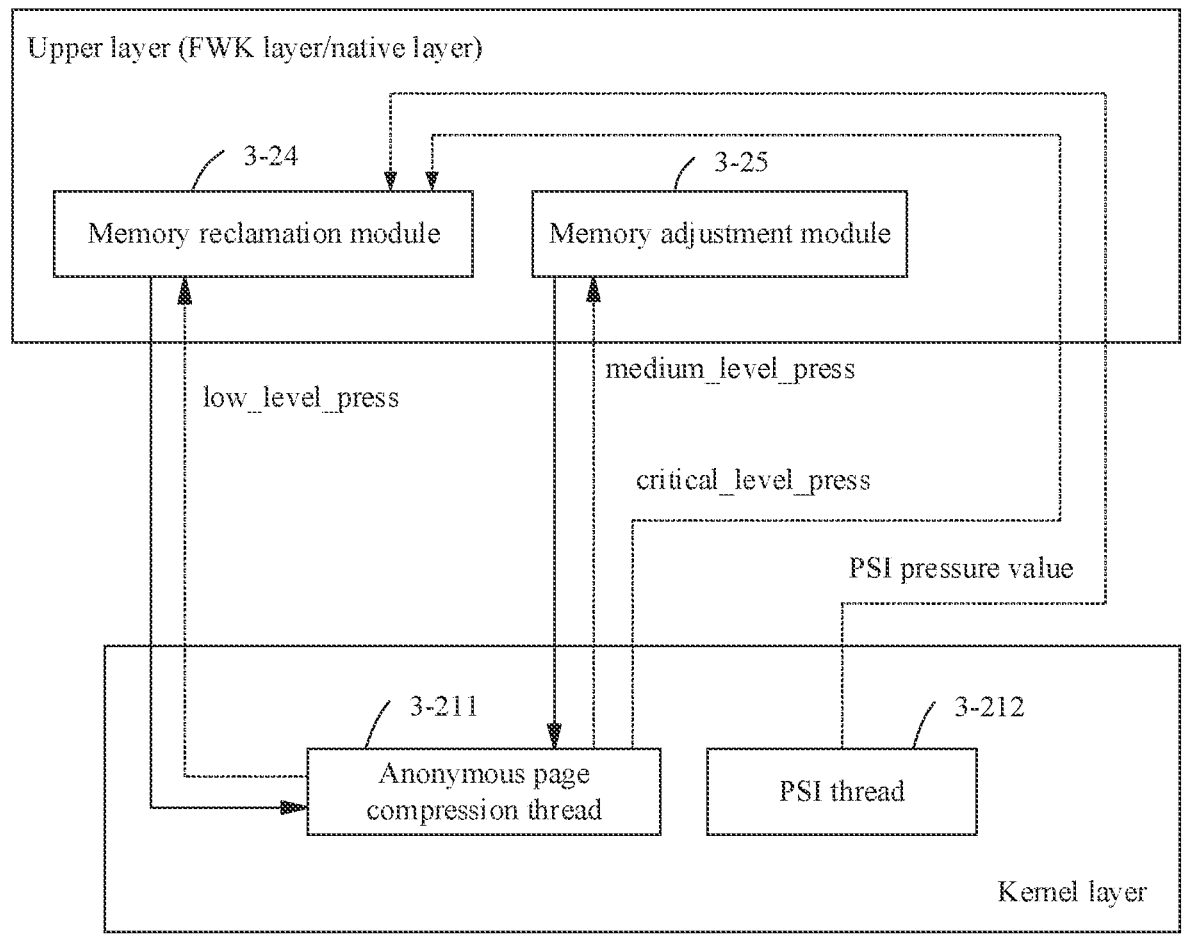
Figures 3, 4, 5, 6, 7, 8, 8A:
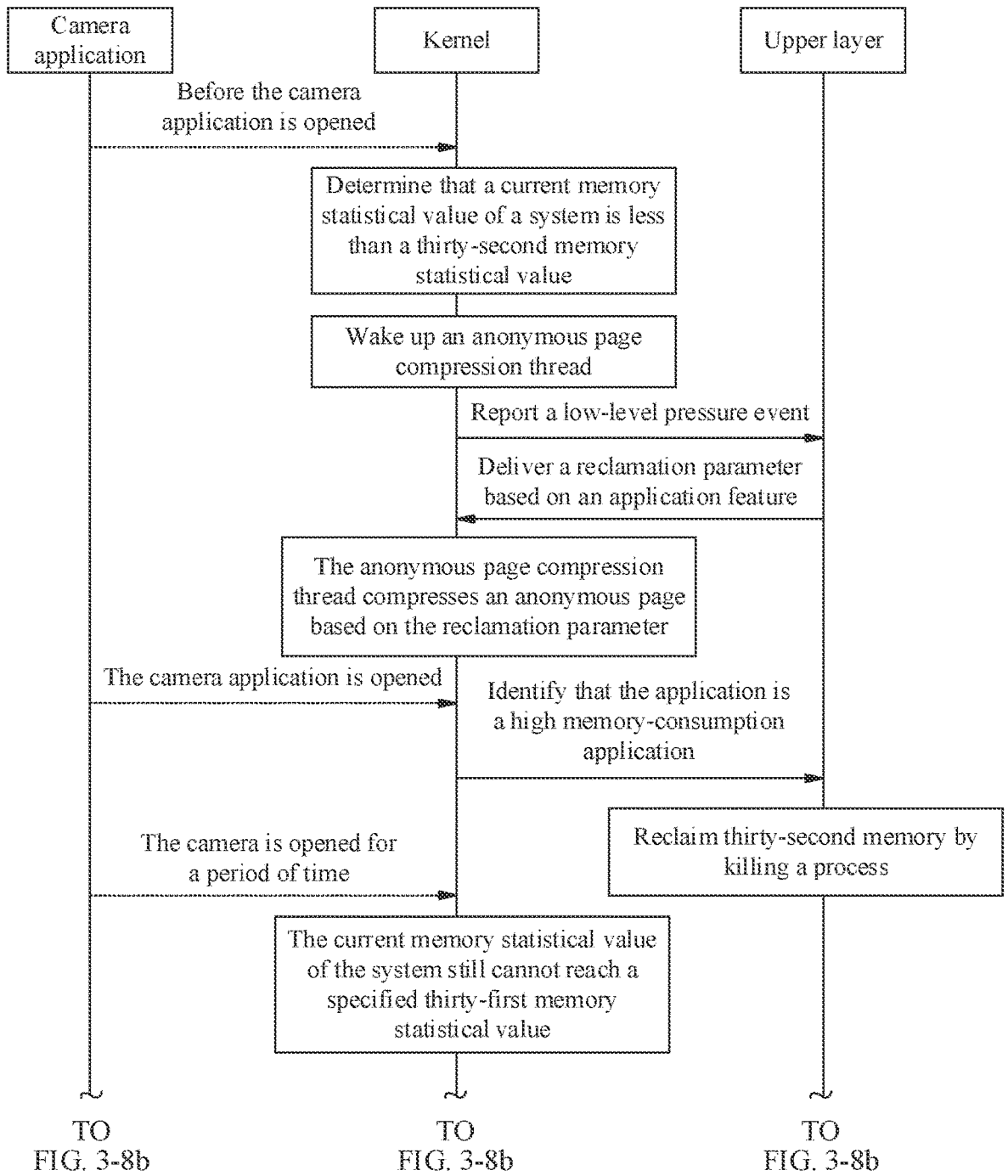
Figures 3, 4, 5, 6, 7, 8, 8B:
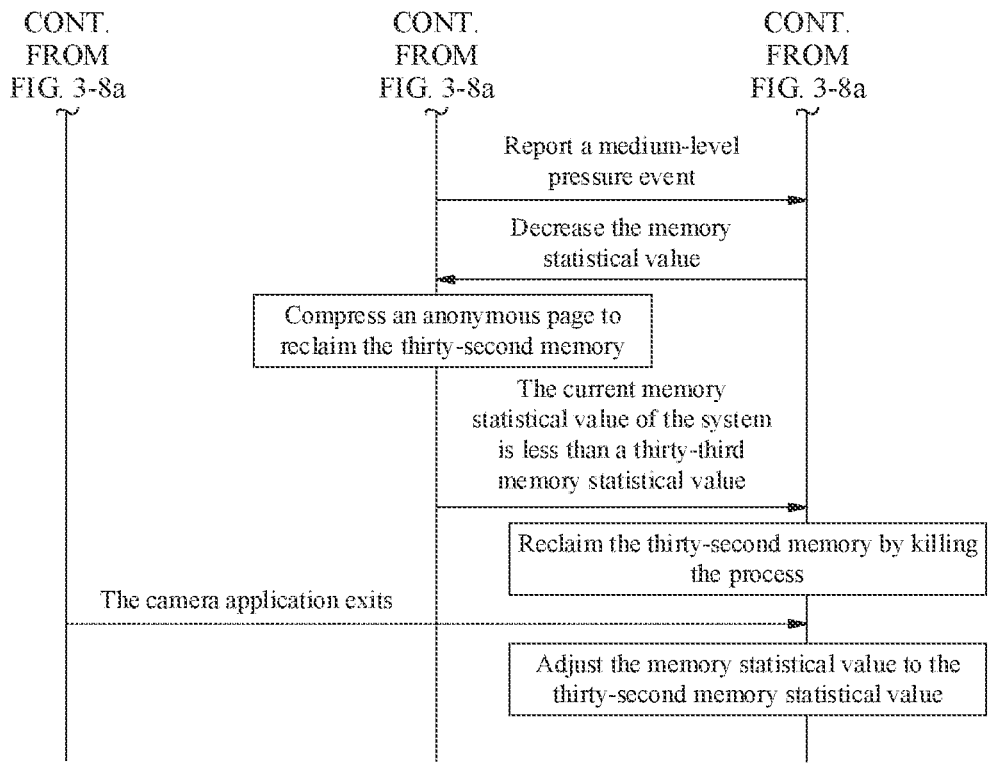
Figures 3, 4, 5, 6, 7, 8, 9:
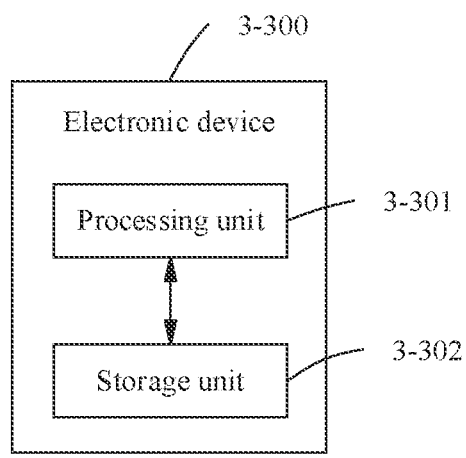
Figures 1, 4:
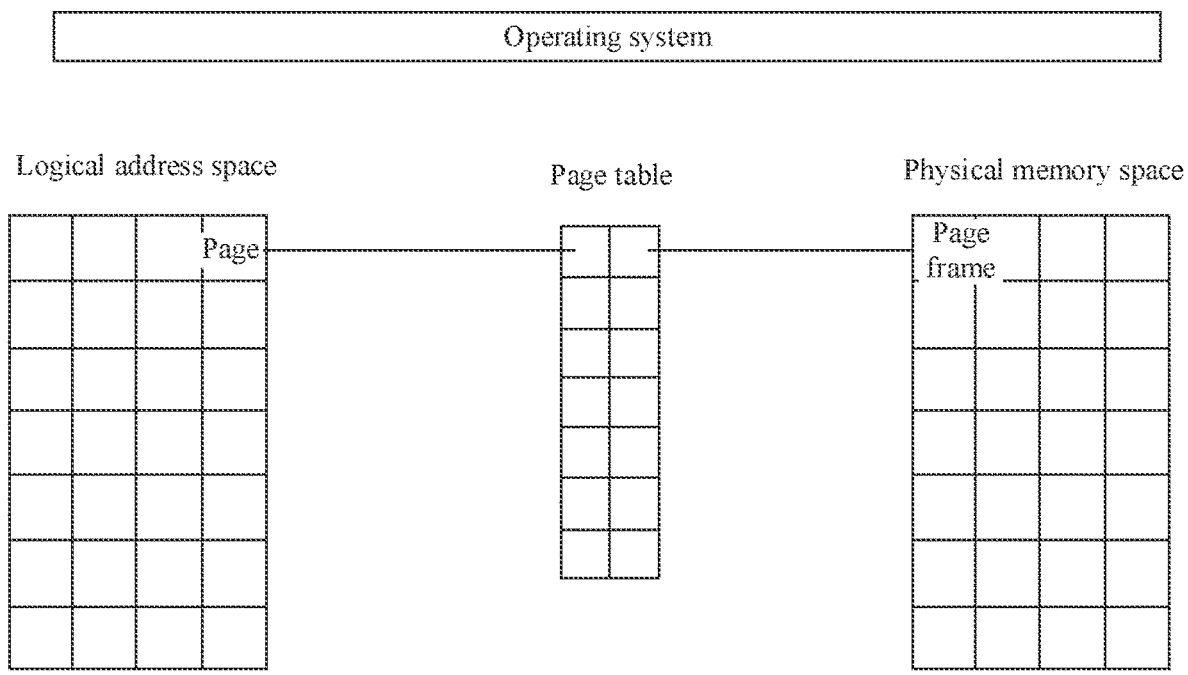
Figures 2, 4:
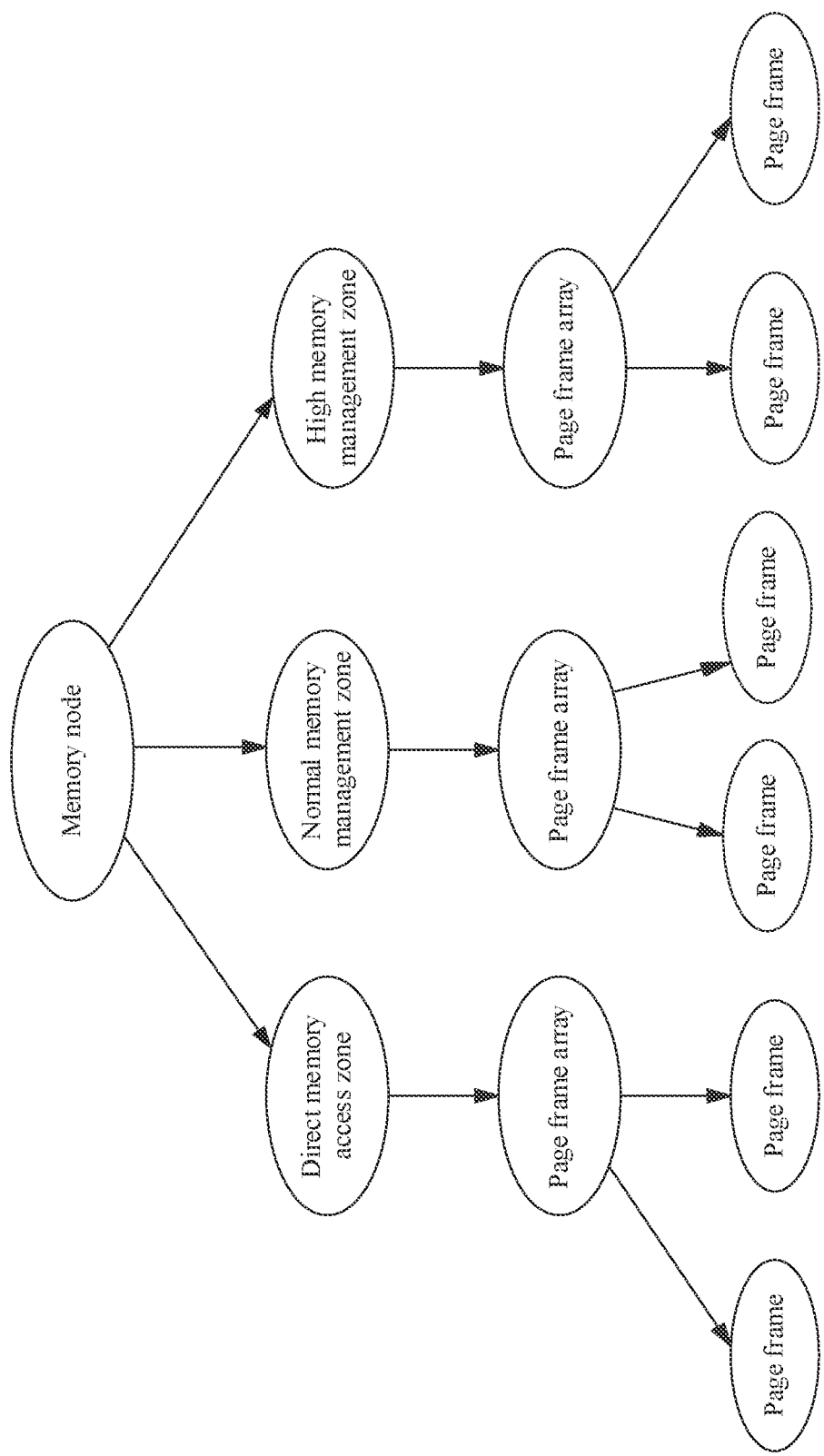
Figures 3, 4:
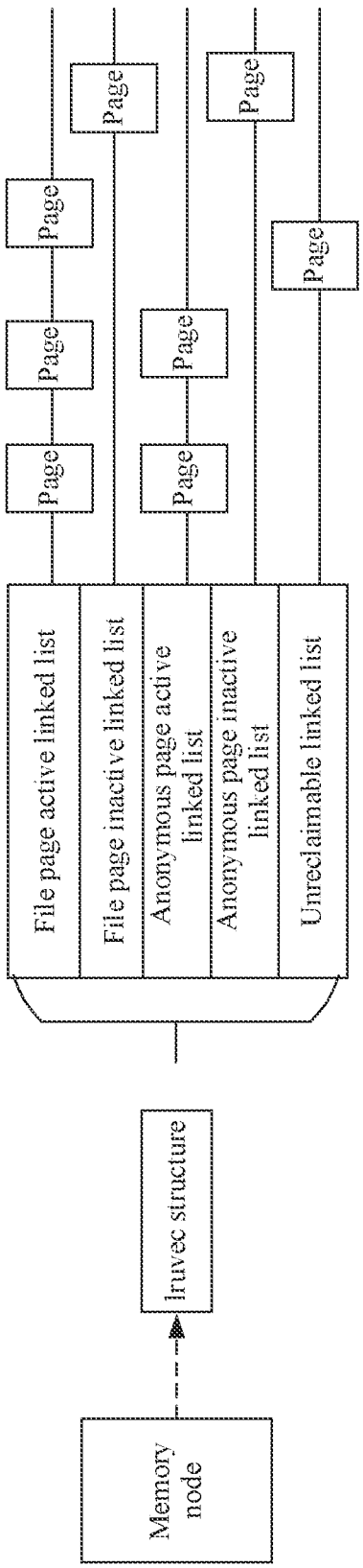
Figure 4:
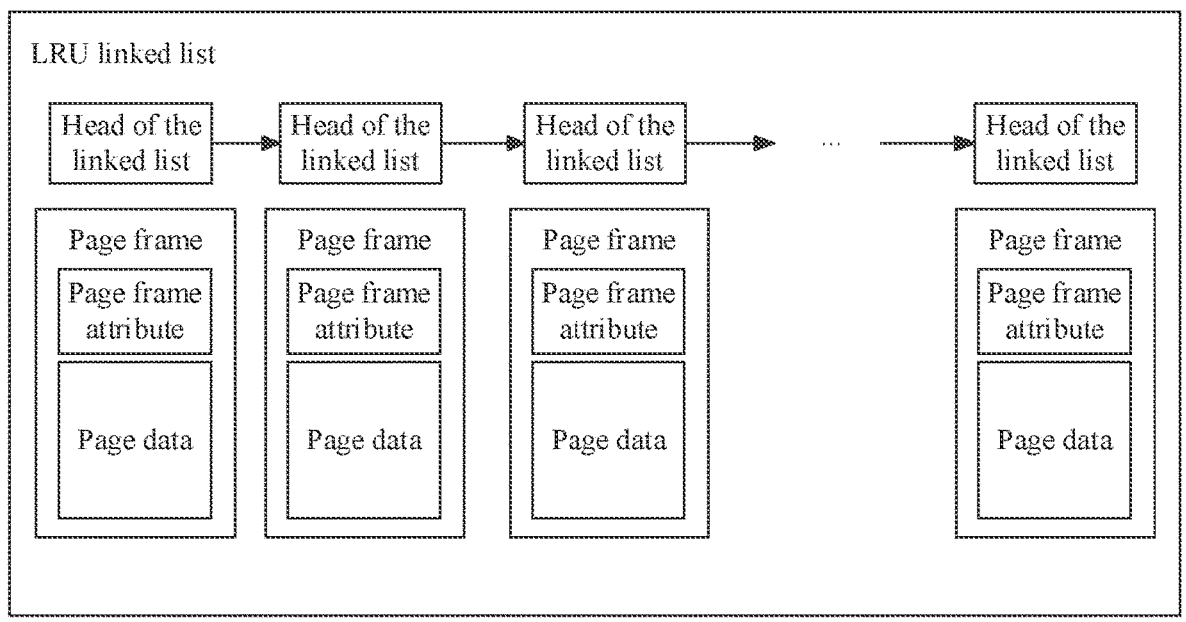
Figures 4, 5:
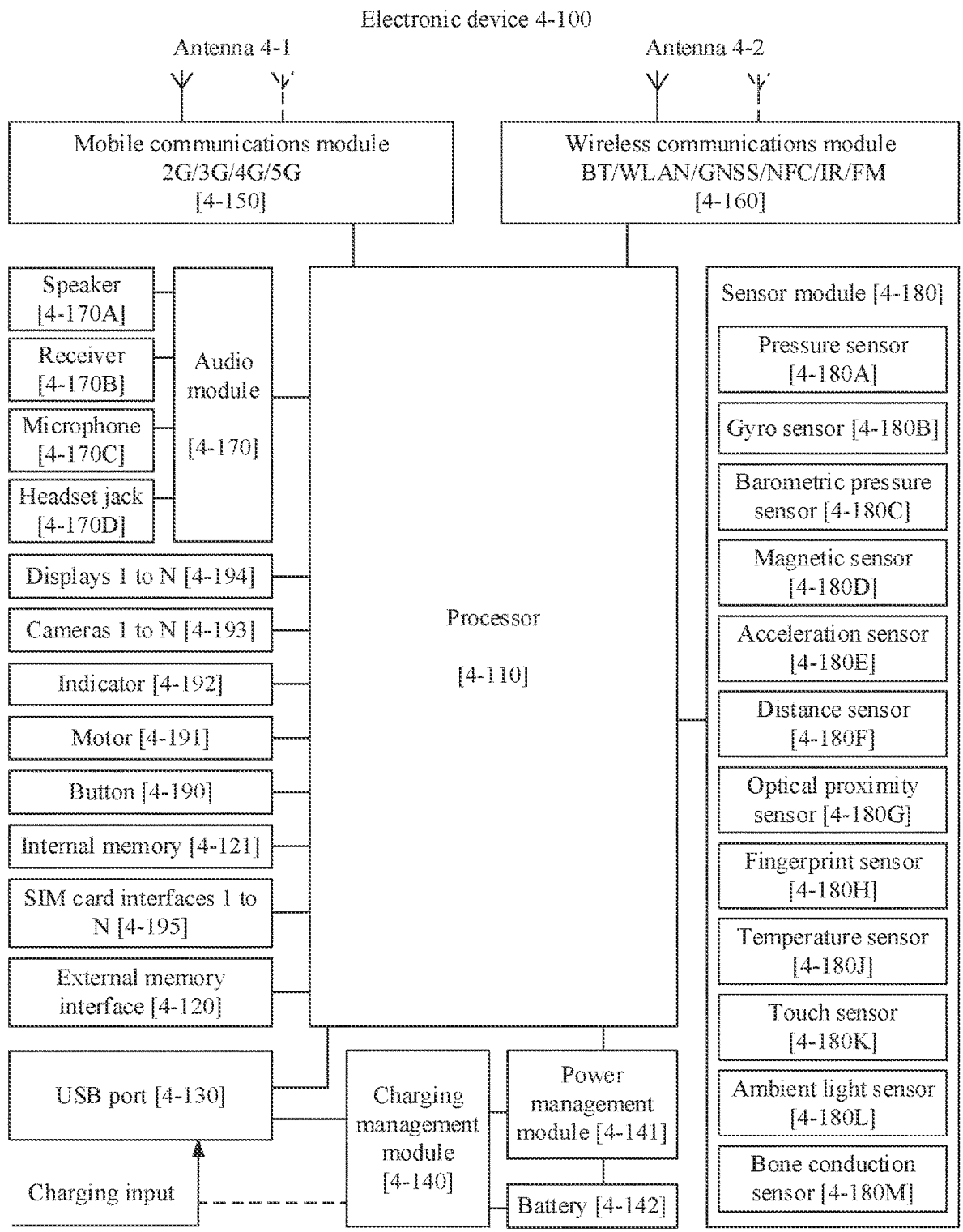
Figures 4, 5, 6:
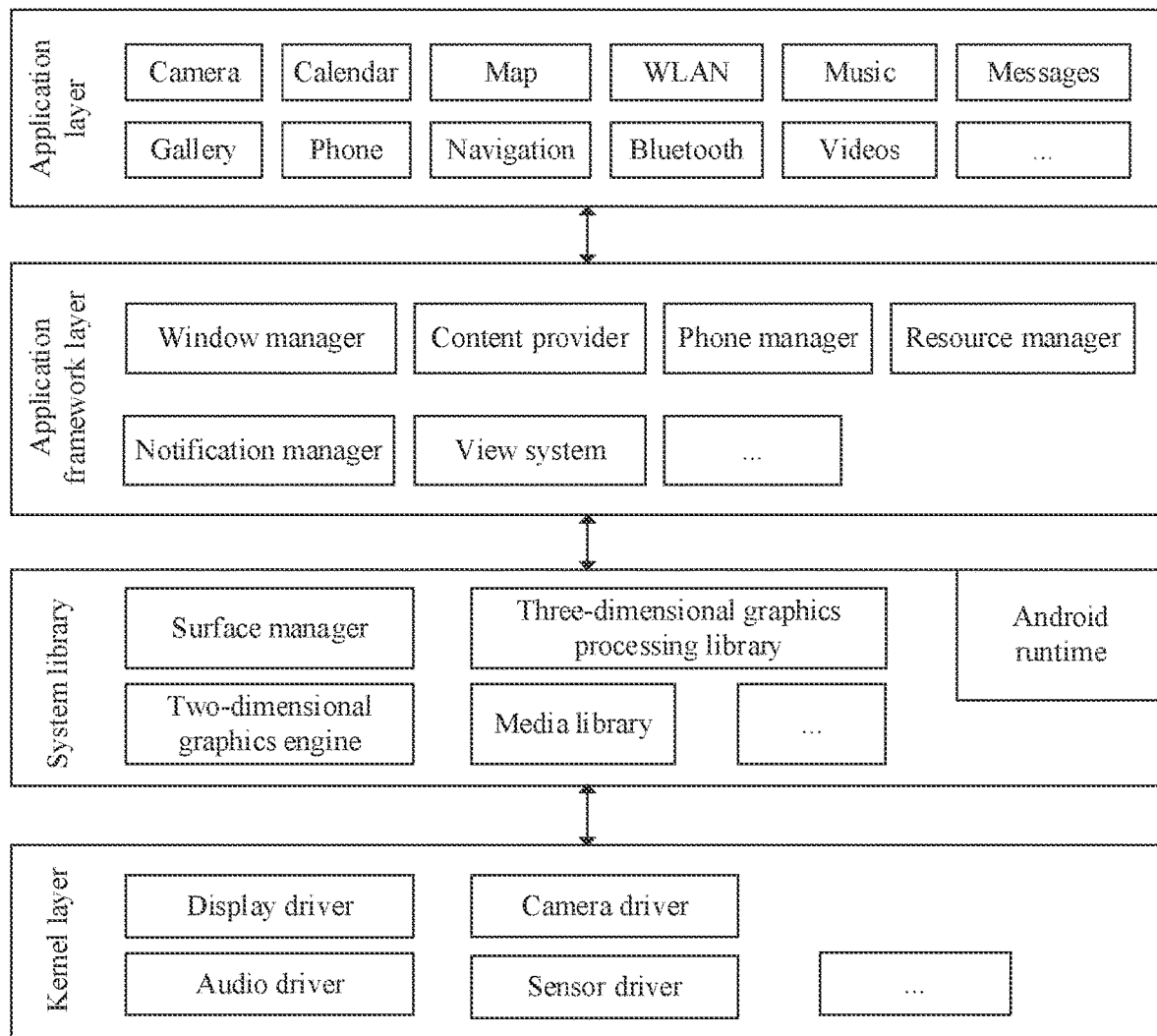
Figures 4, 5, 6, 7, 7A:
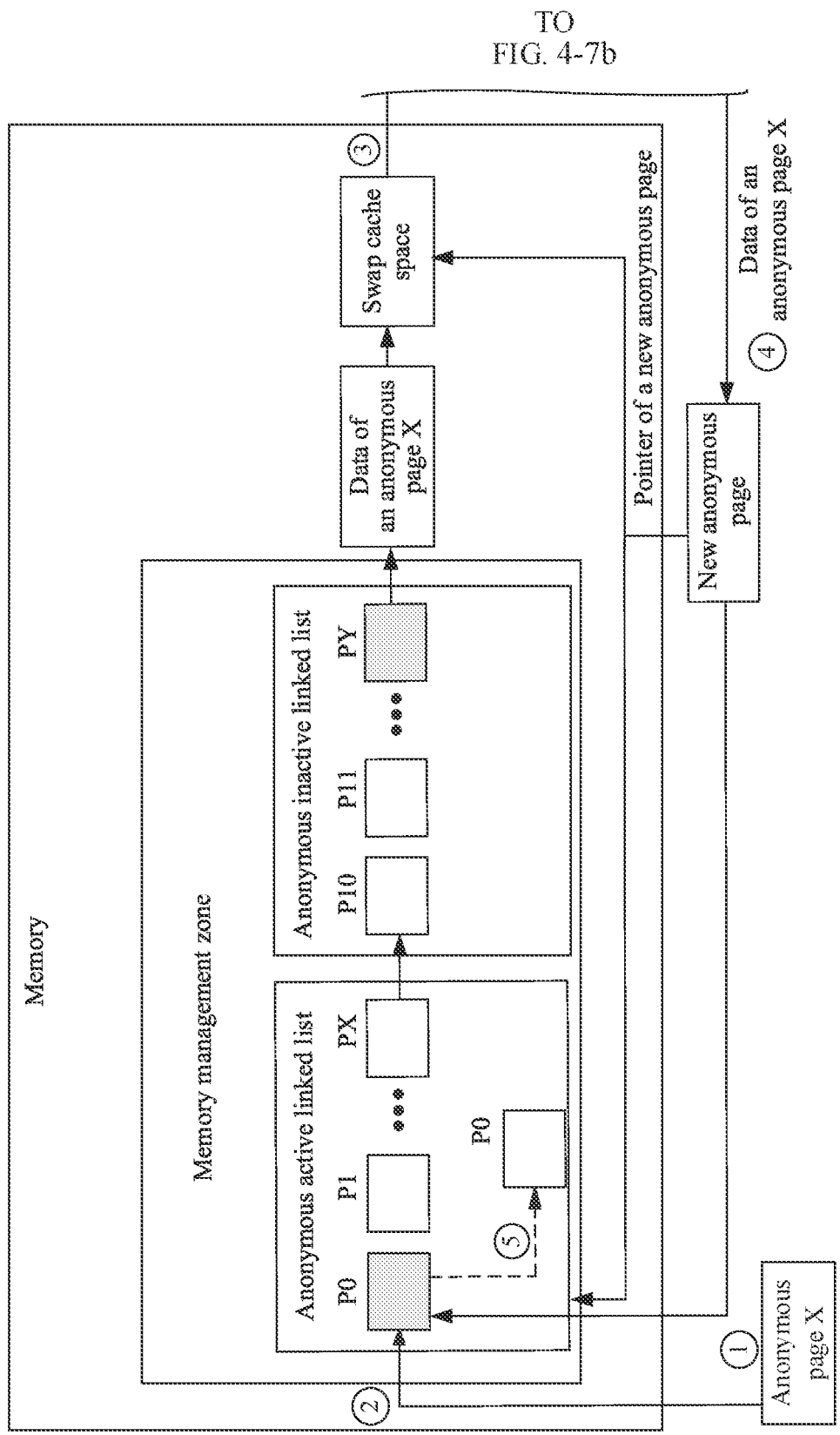
Figures 4, 5, 6, 7, 7A, 7B:
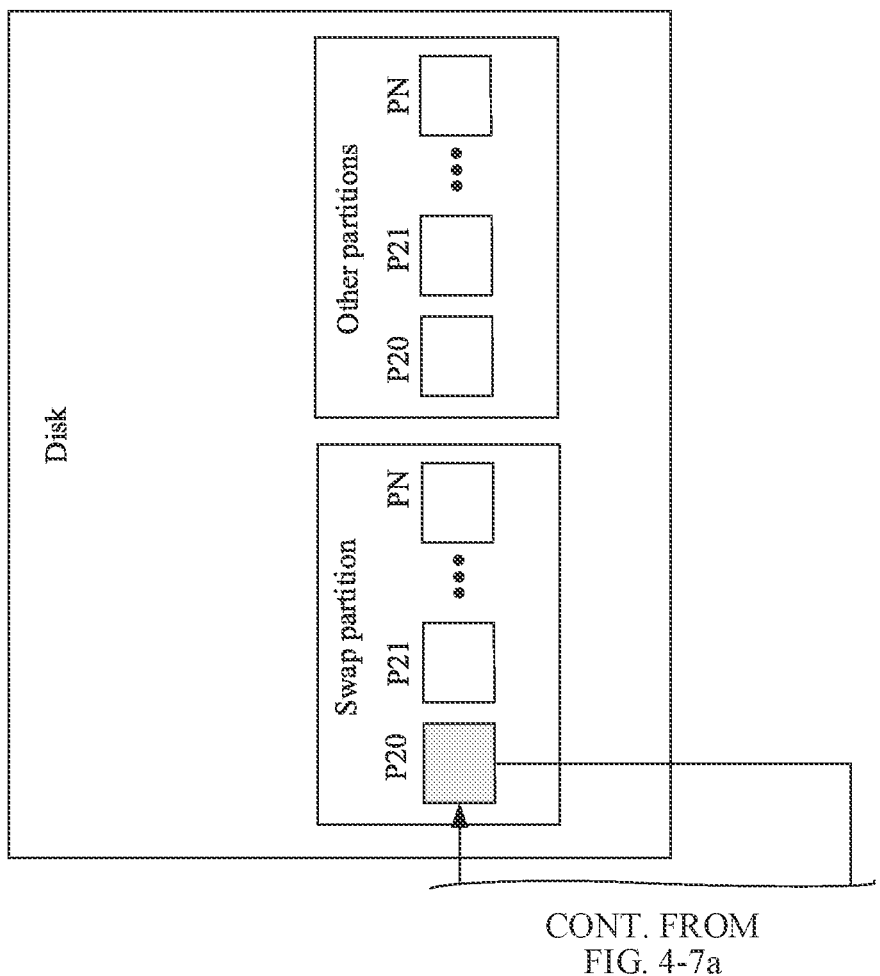
Figures 4, 5, 6, 7, 8:
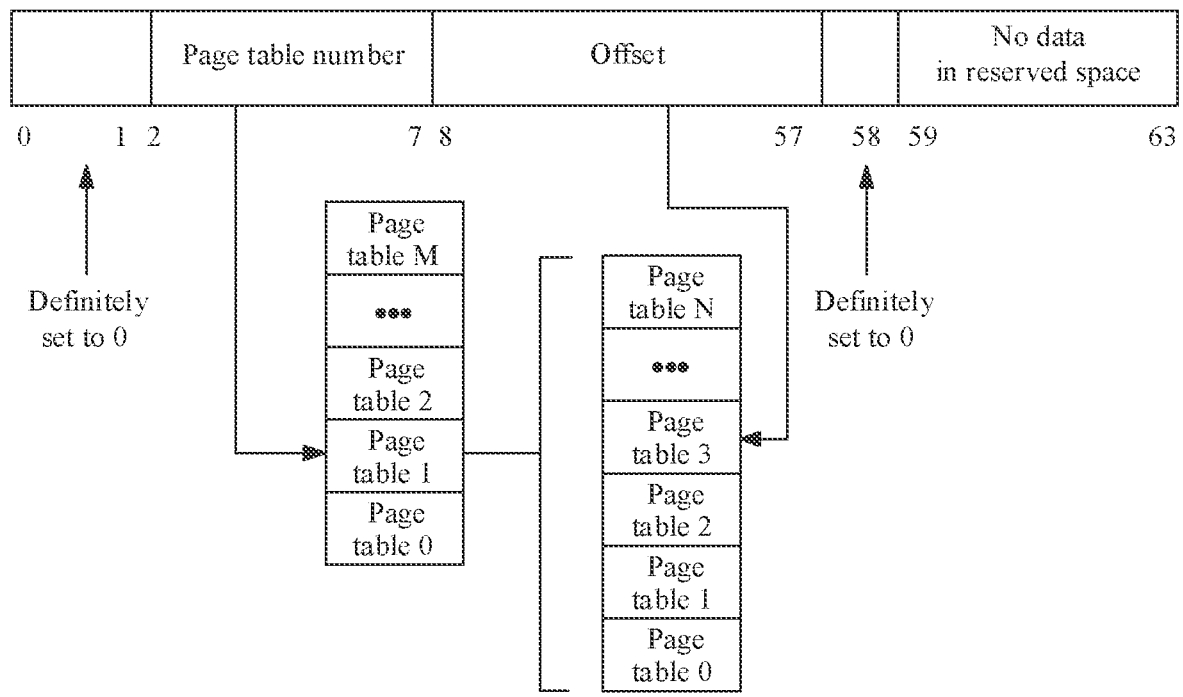
Figures 4, 5, 6, 7, 8, 9:
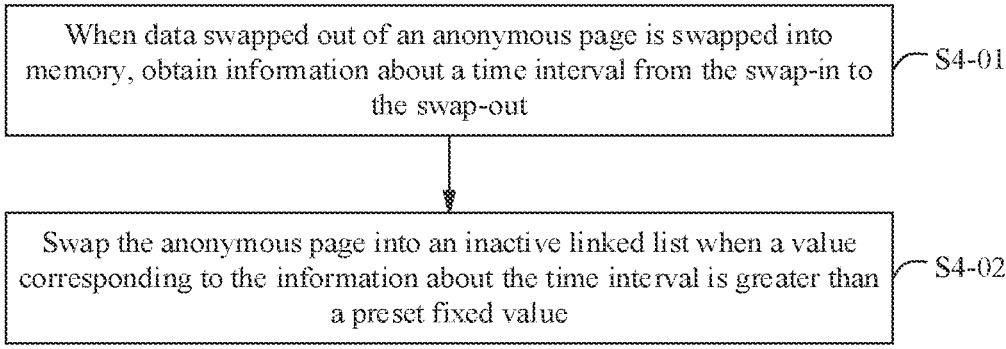
Figures 4, 5, 6, 7, 8, 9, 10, 10A:
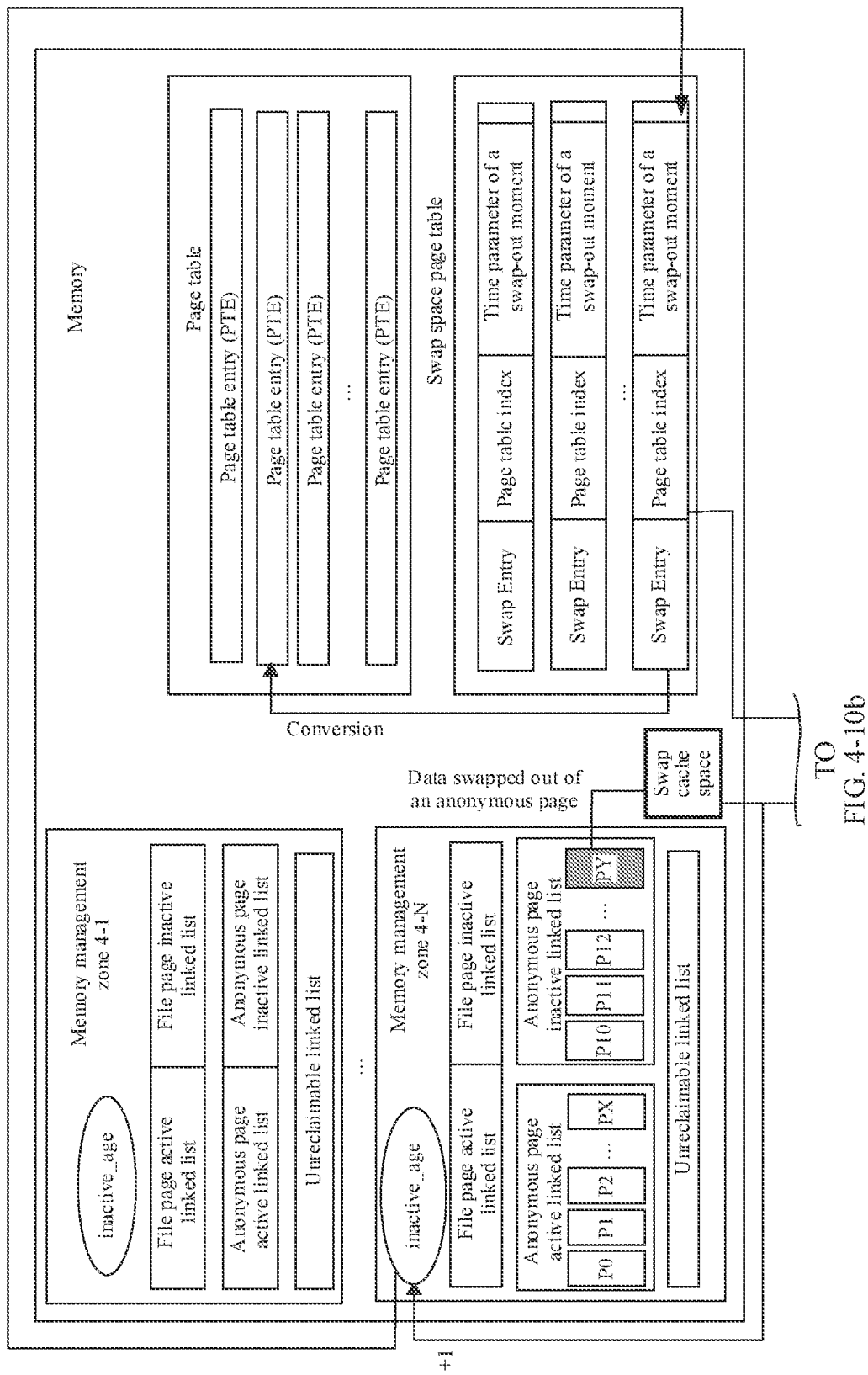
Figures 4, 5, 6, 7, 8, 9, 10, 10B:
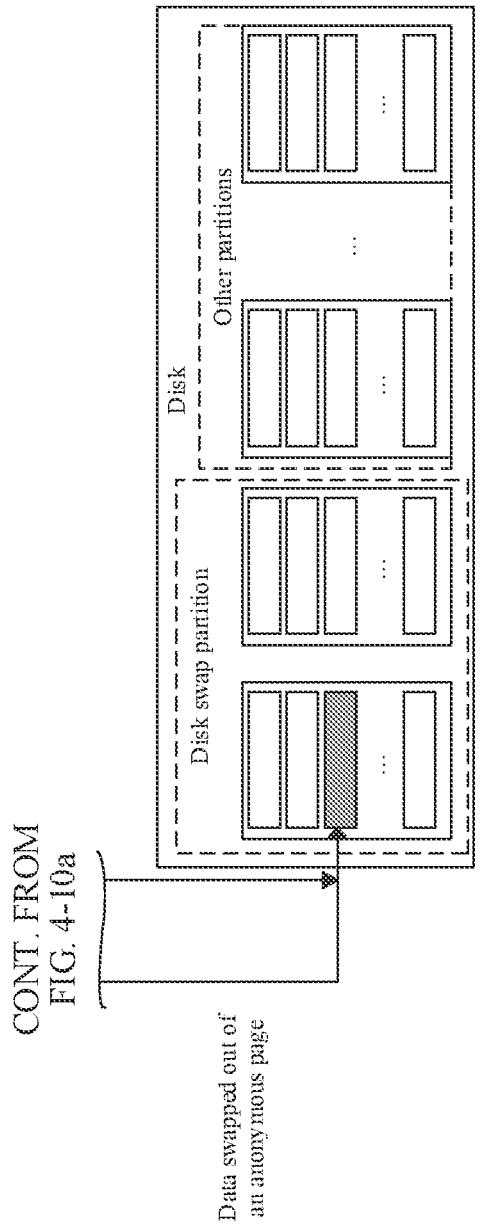
Figures 4, 5, 6, 7, 8, 9, 10, 11:
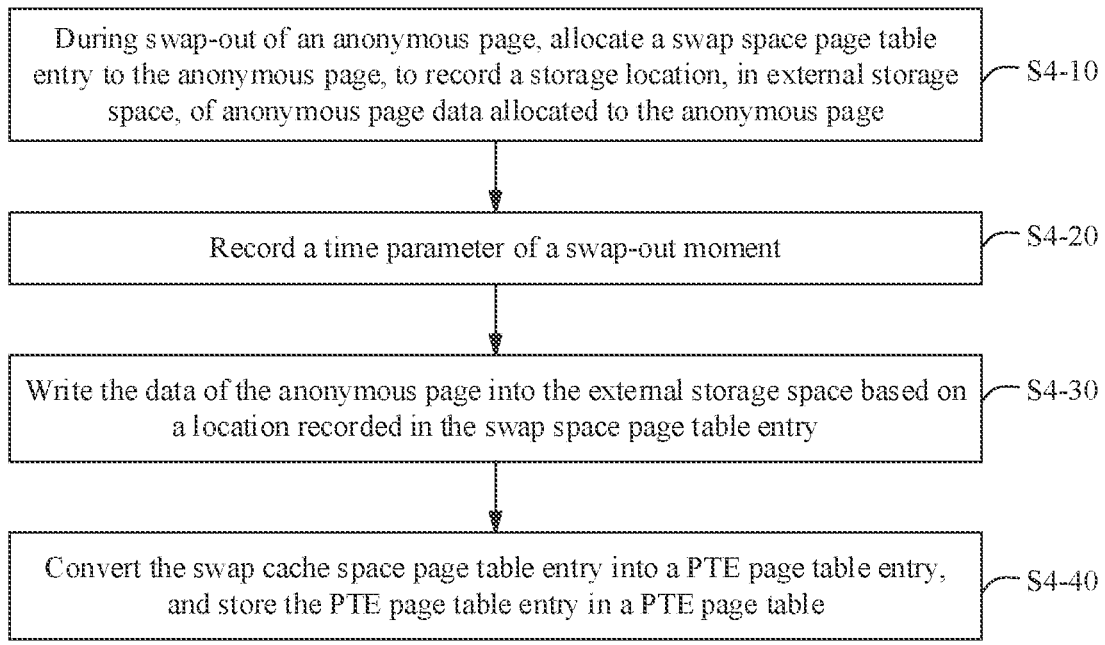
Figures 4, 5, 6, 7, 8, 9, 10, 11, 12, 12A:
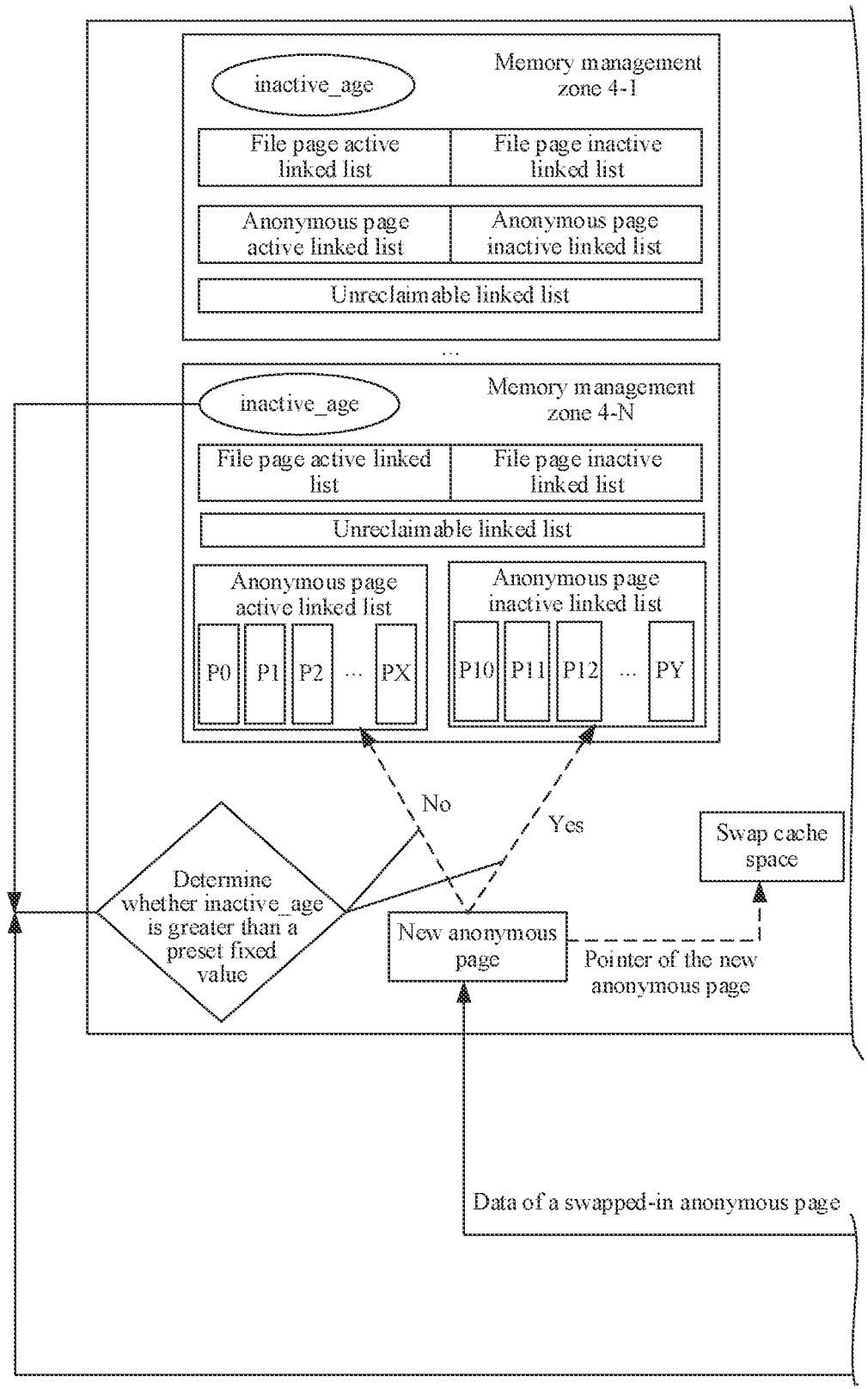
Figures 4, 5, 6, 7, 8, 9, 10, 11, 12, 12B:
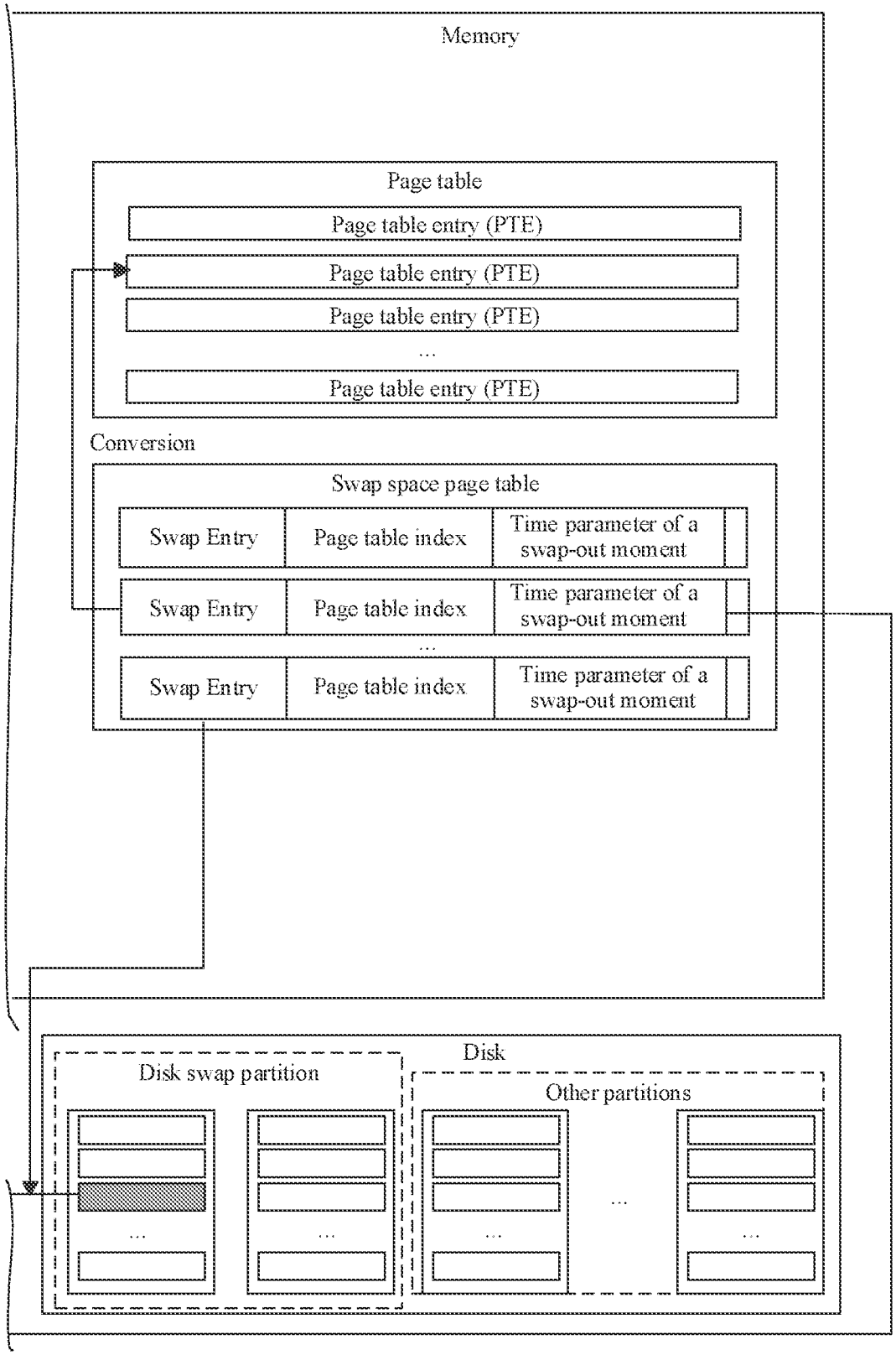
Figures 4, 5, 6, 7, 8, 9, 10, 11, 12, 13:
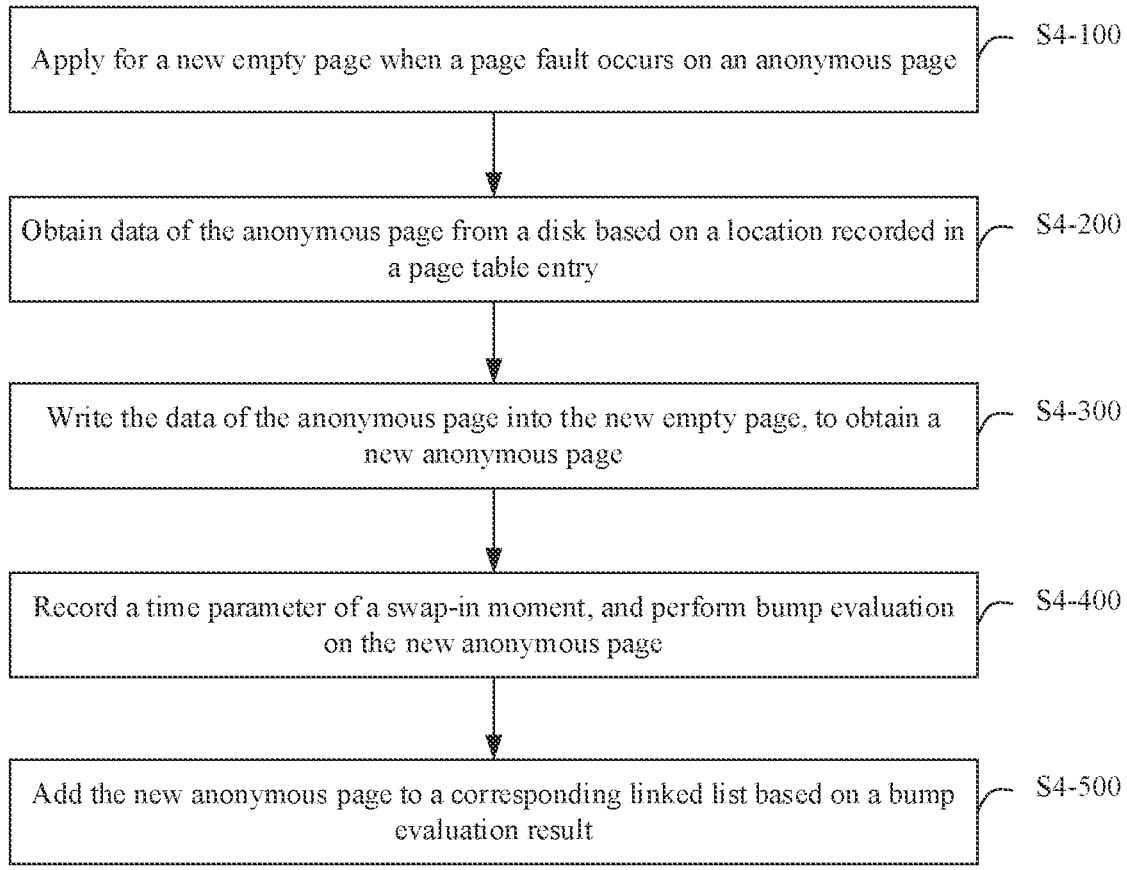
Figures 4, 5, 6, 7, 8, 9, 10, 11, 12, 13, 14:
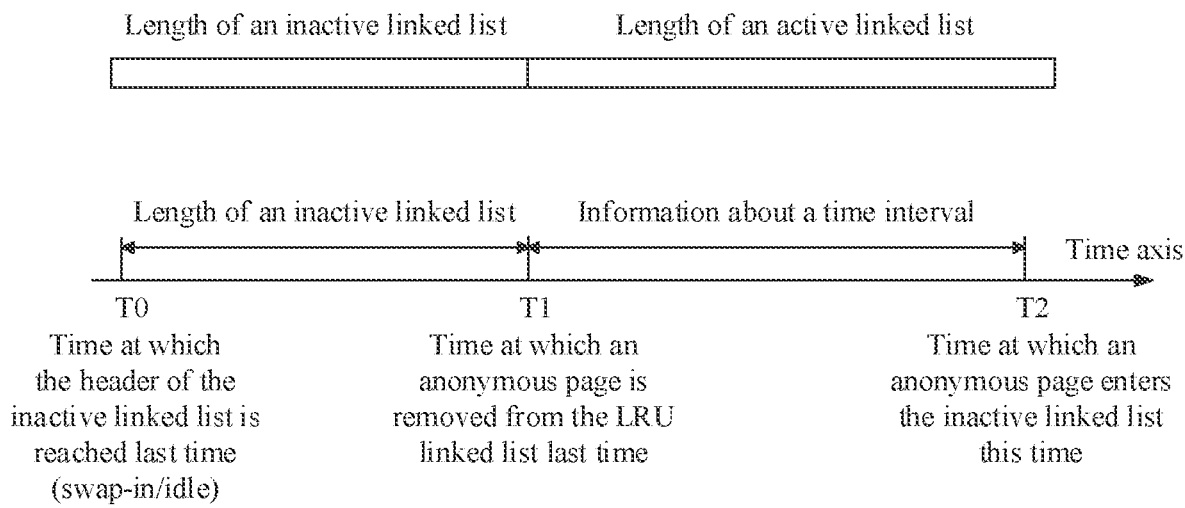
Figures 4, 5, 6, 7, 8, 9, 10, 11, 12, 13, 14, 15:
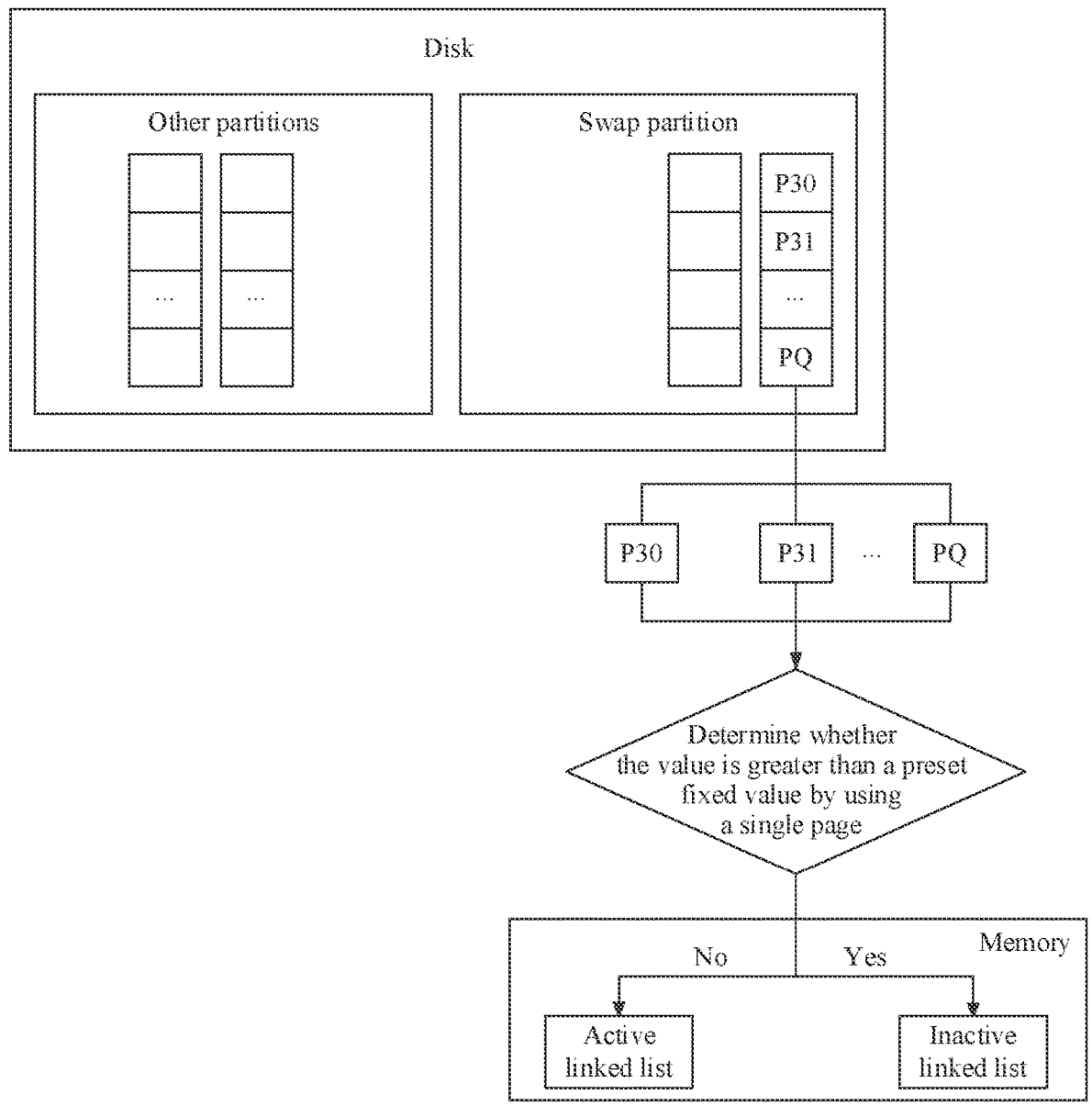
Figures 4, 5, 6, 7, 8, 9, 10, 11, 12, 13, 14, 15, 16:
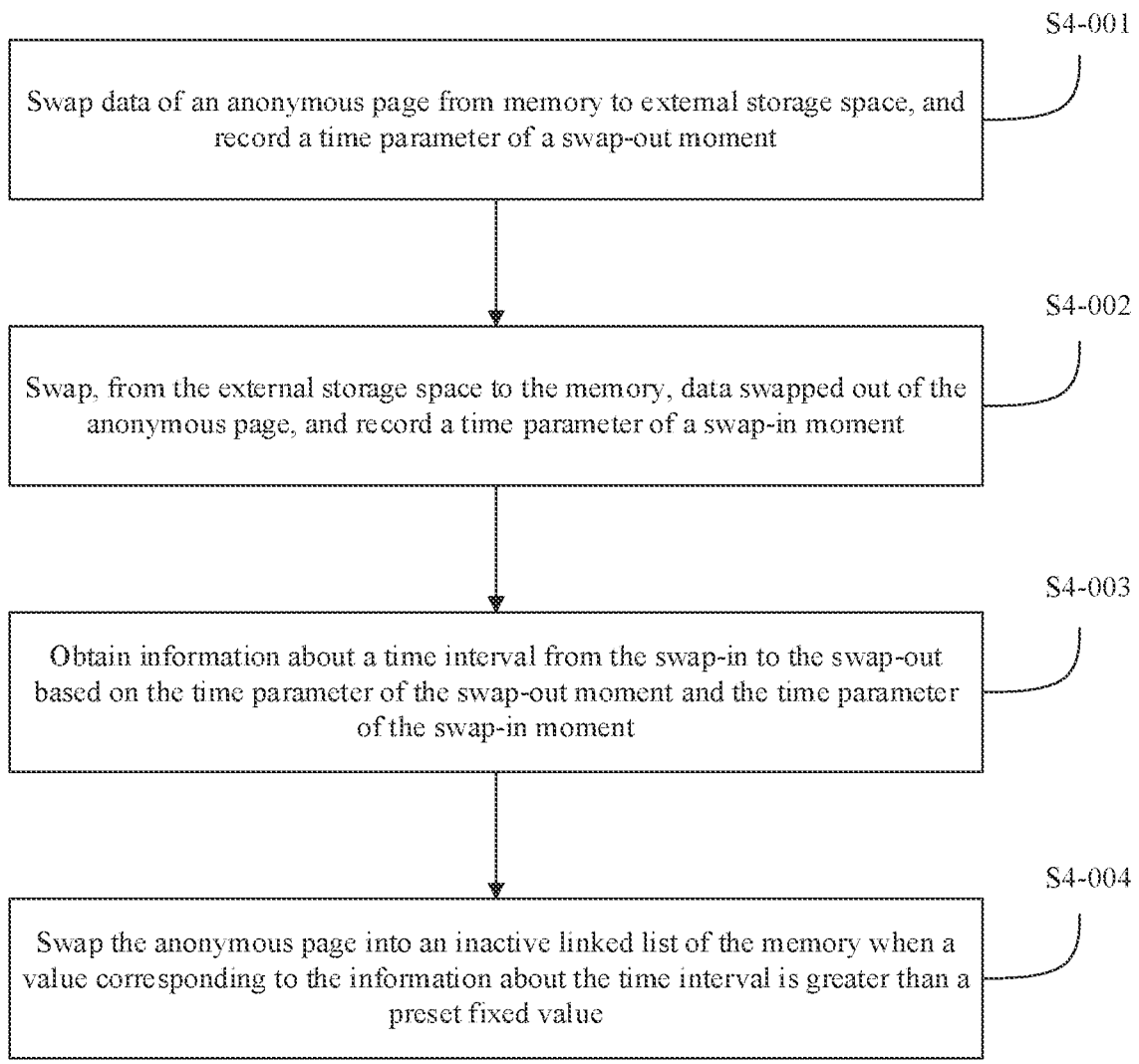
Figures 4, 5, 6, 7, 8, 9, 10, 11, 12, 13, 14, 15, 16, 17:
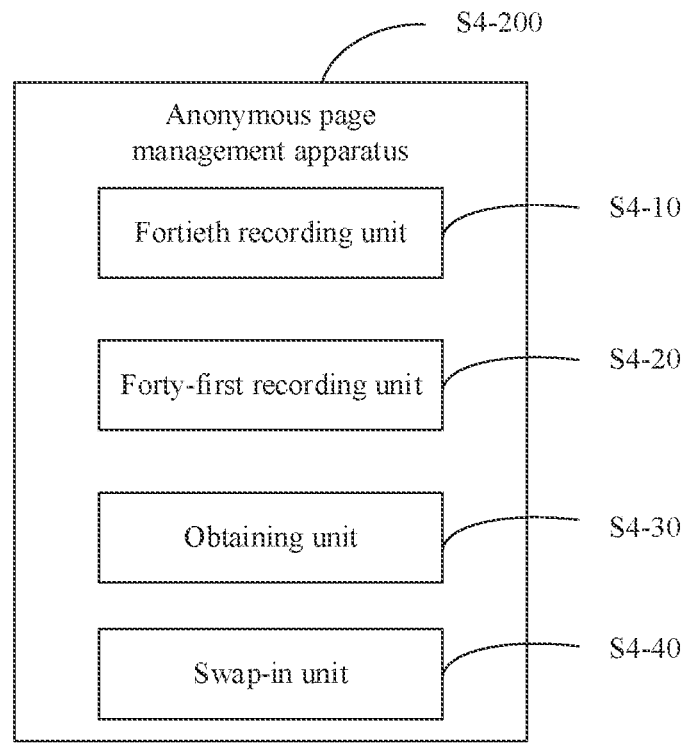
Figures 4, 5, 6, 7, 8, 9, 10, 11, 12, 13, 14, 15, 16, 17, 18:
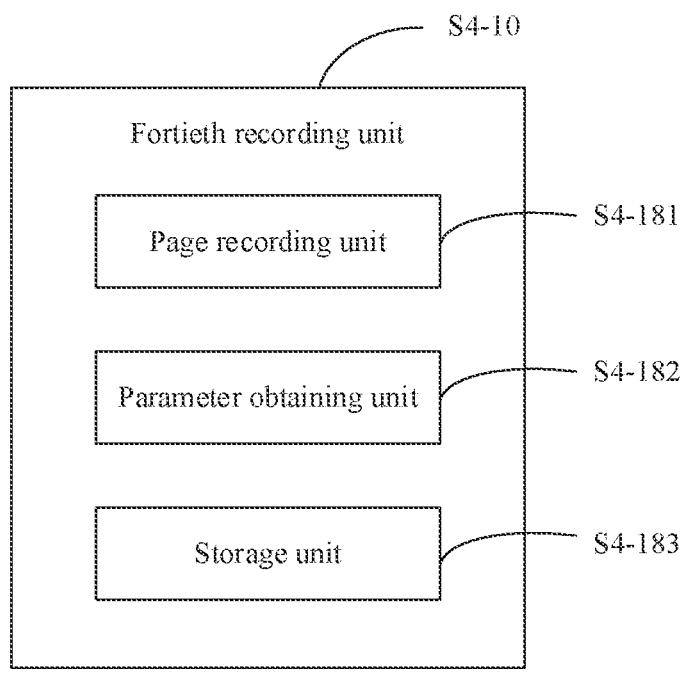
Figures 4, 5, 6, 7, 8, 9, 10, 11, 12, 13, 14, 15, 16, 17, 18, 19:
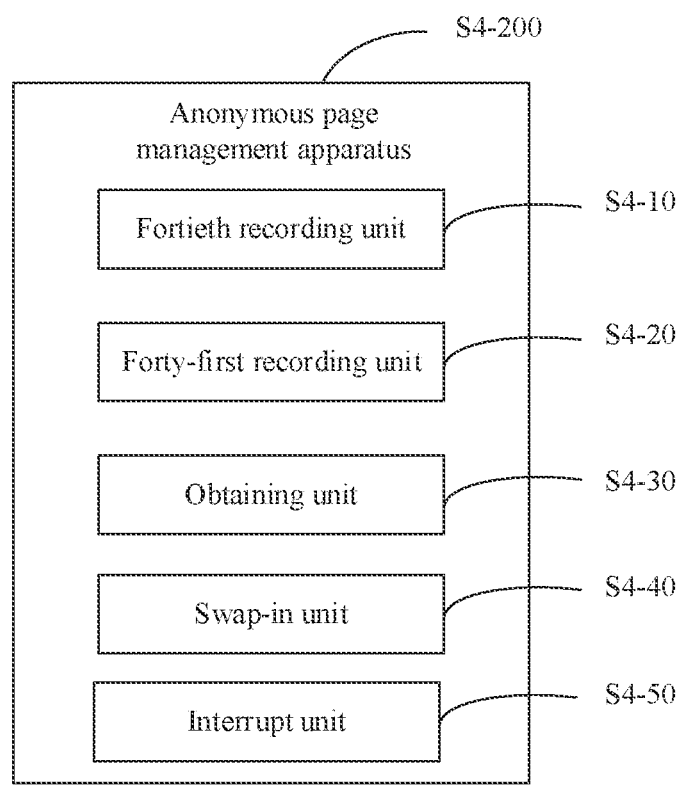
Figures 1, 5:
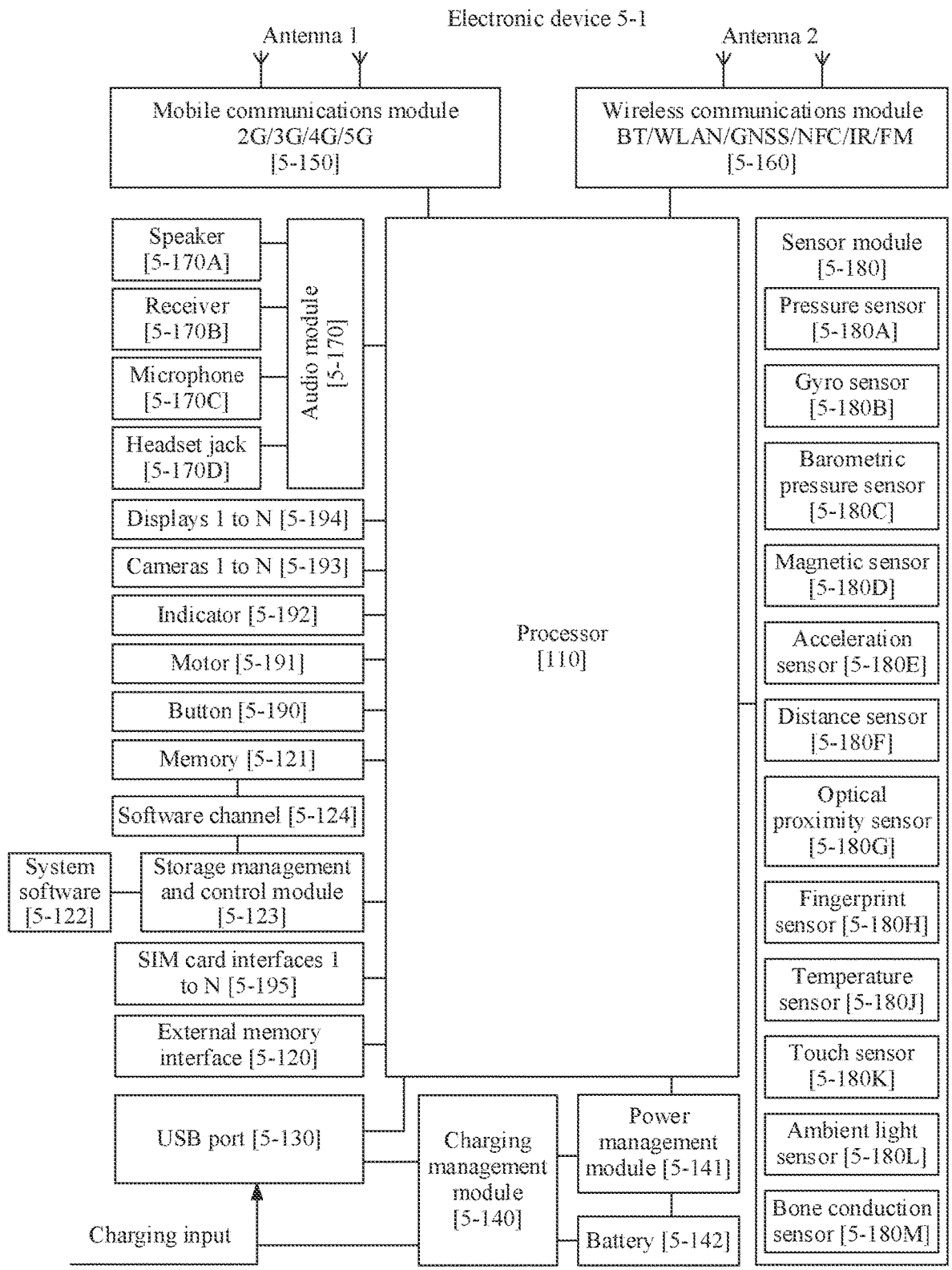
Figures 2, 5:
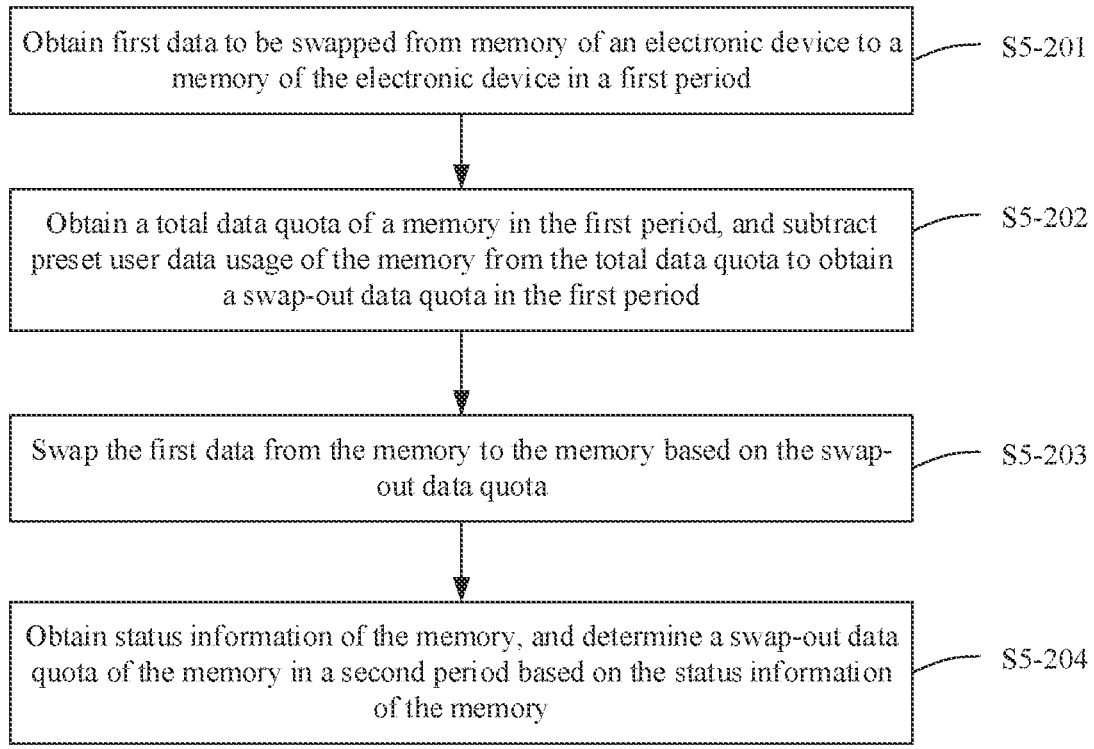
Figures 3, 5:
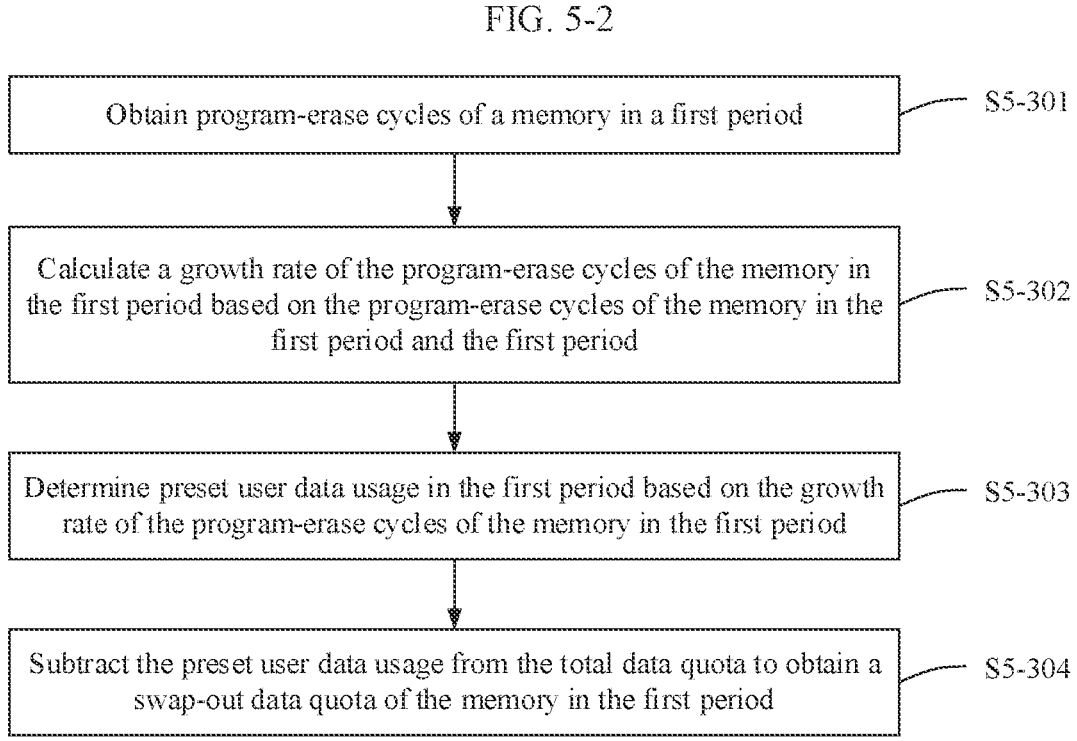
Figures 4, 5:
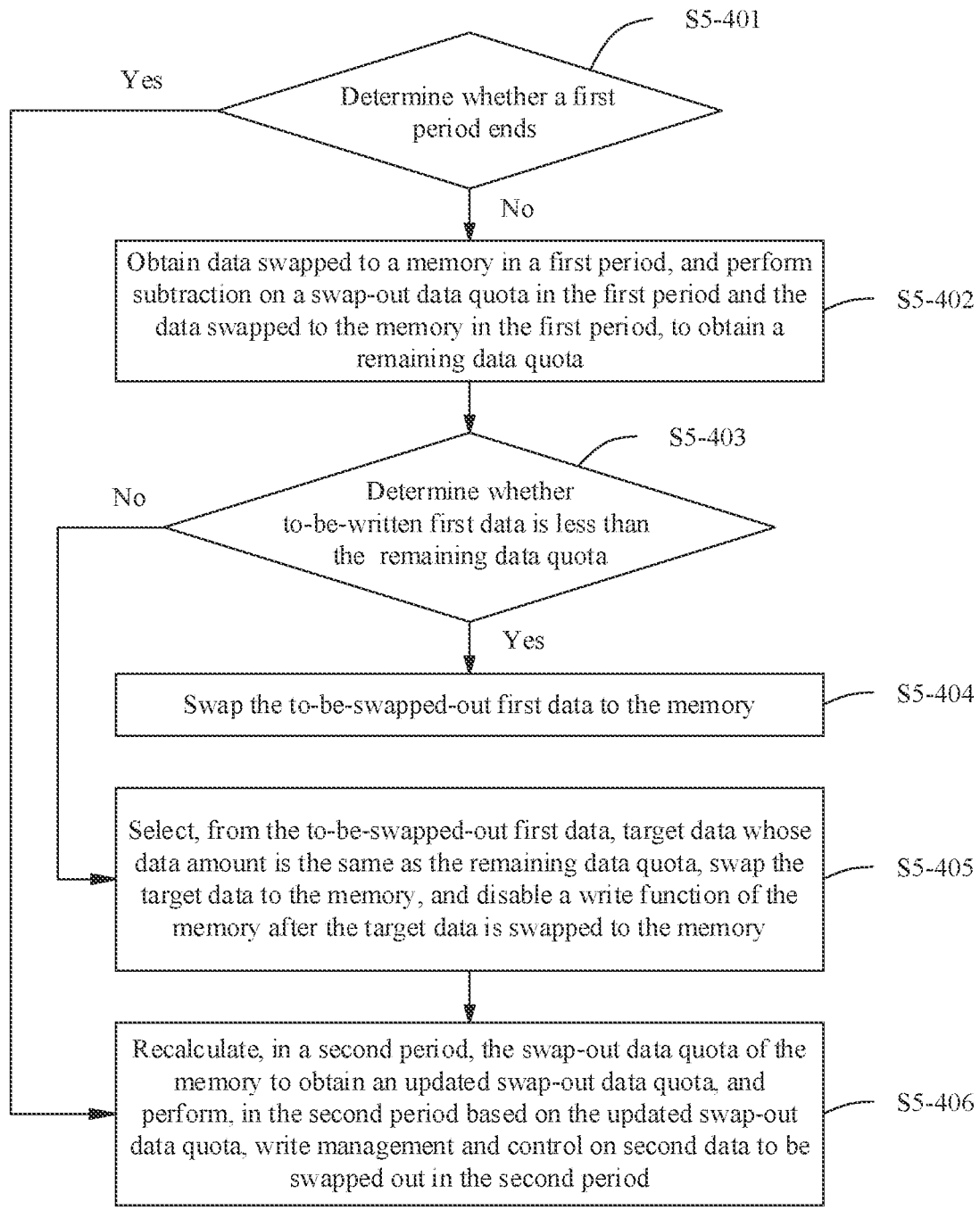
Figure 5:
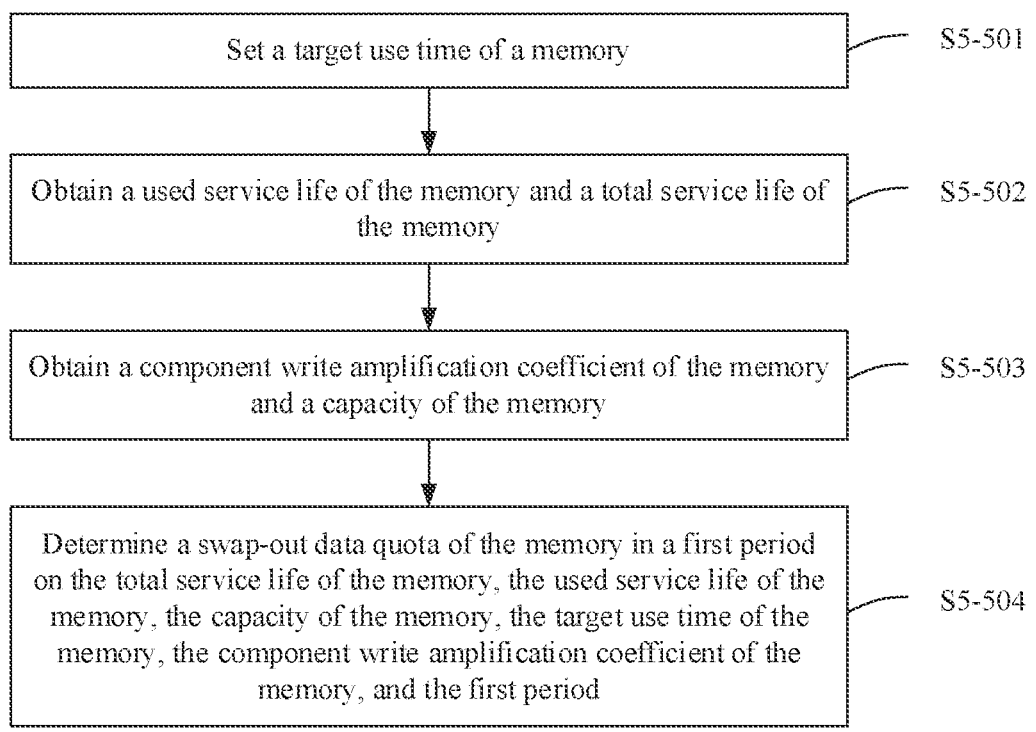
Figures 5, 6:
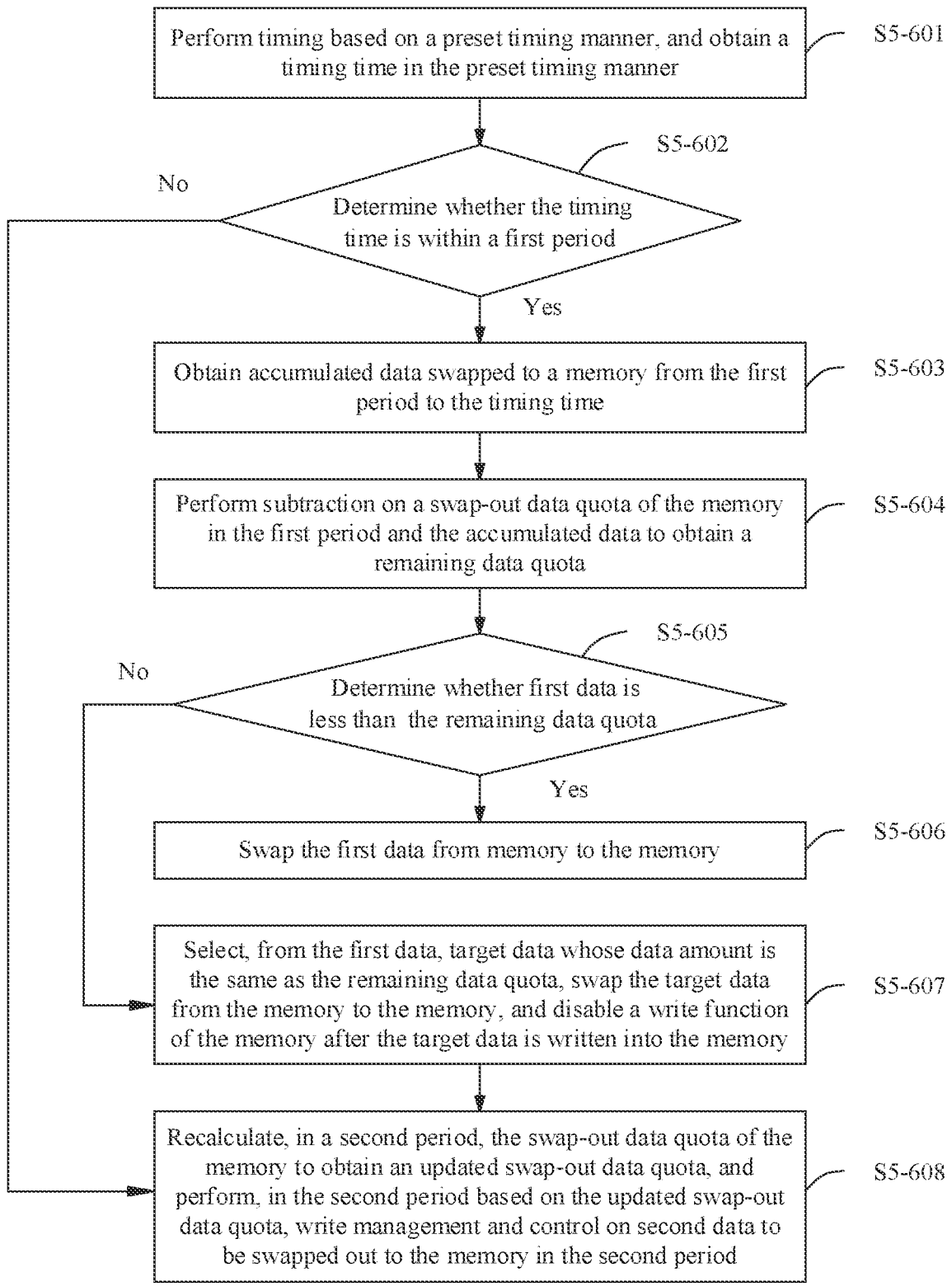
Figures 5, 6, 7, 7A:
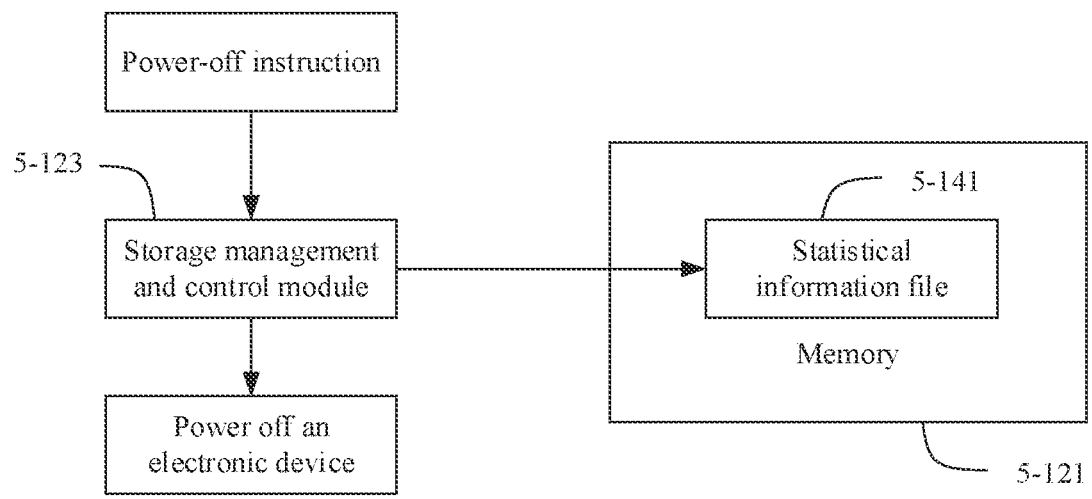
Figures 5, 6, 7, 7B:
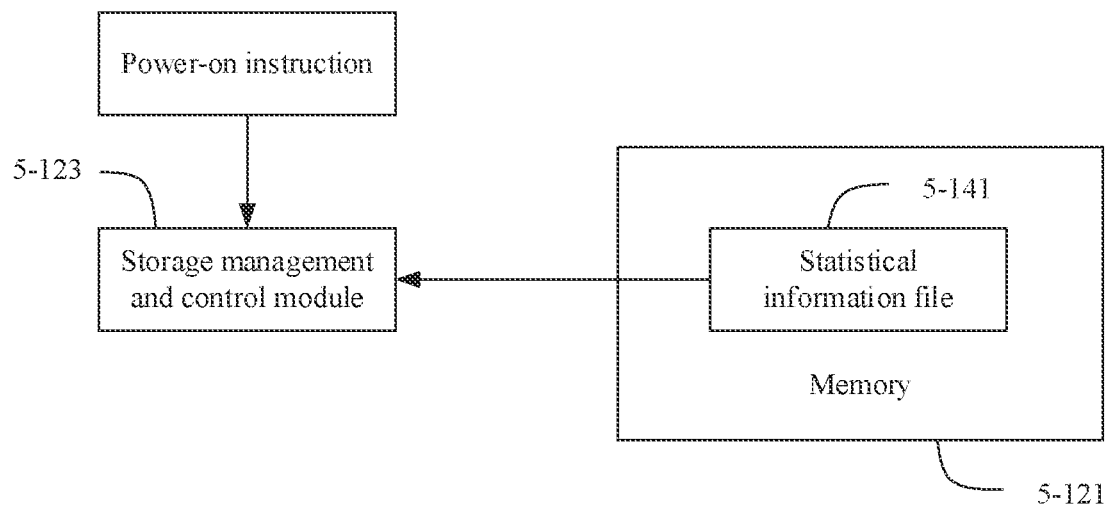
Figures 5, 6, 7, 8:
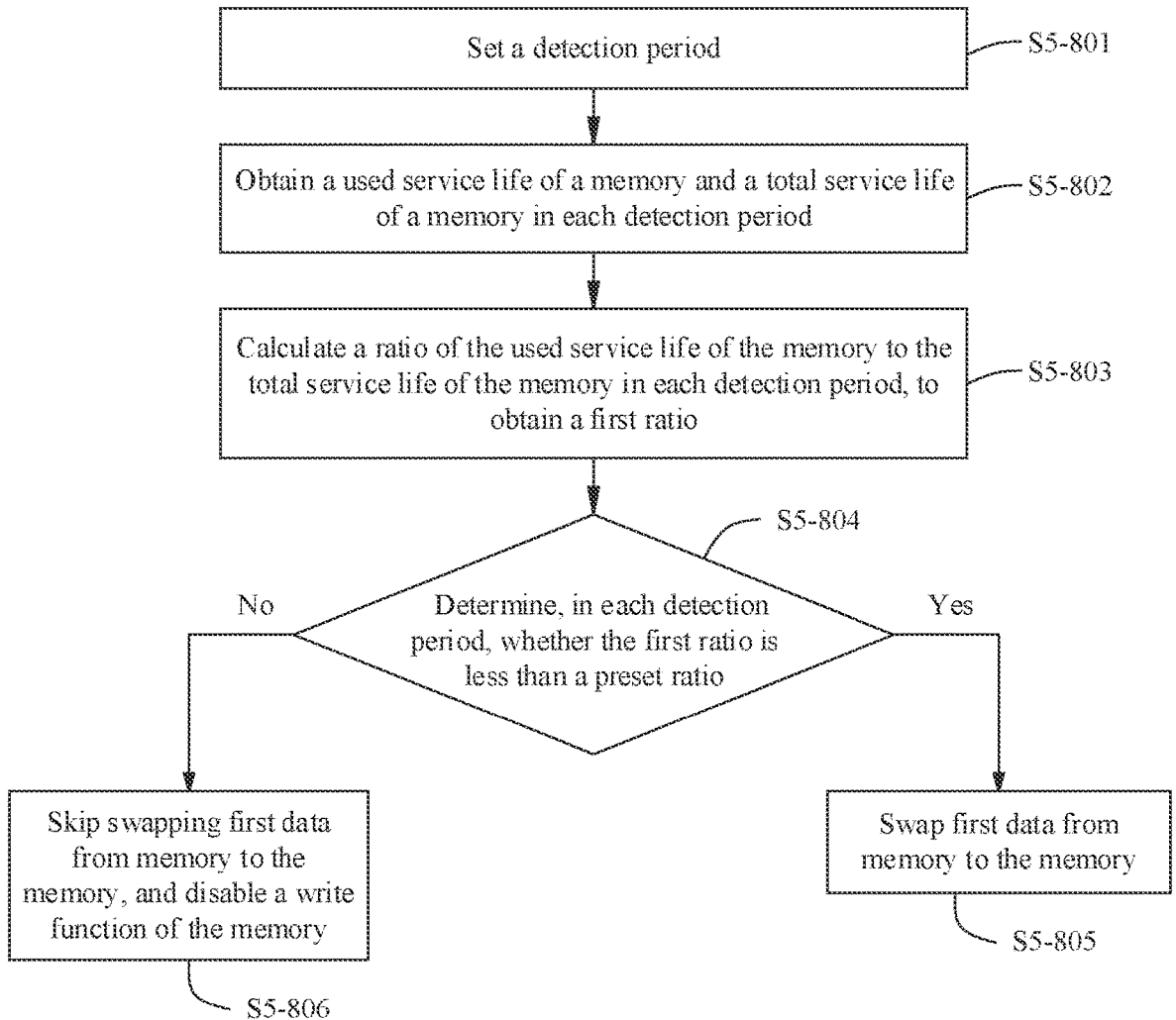
Figures 1, 6:
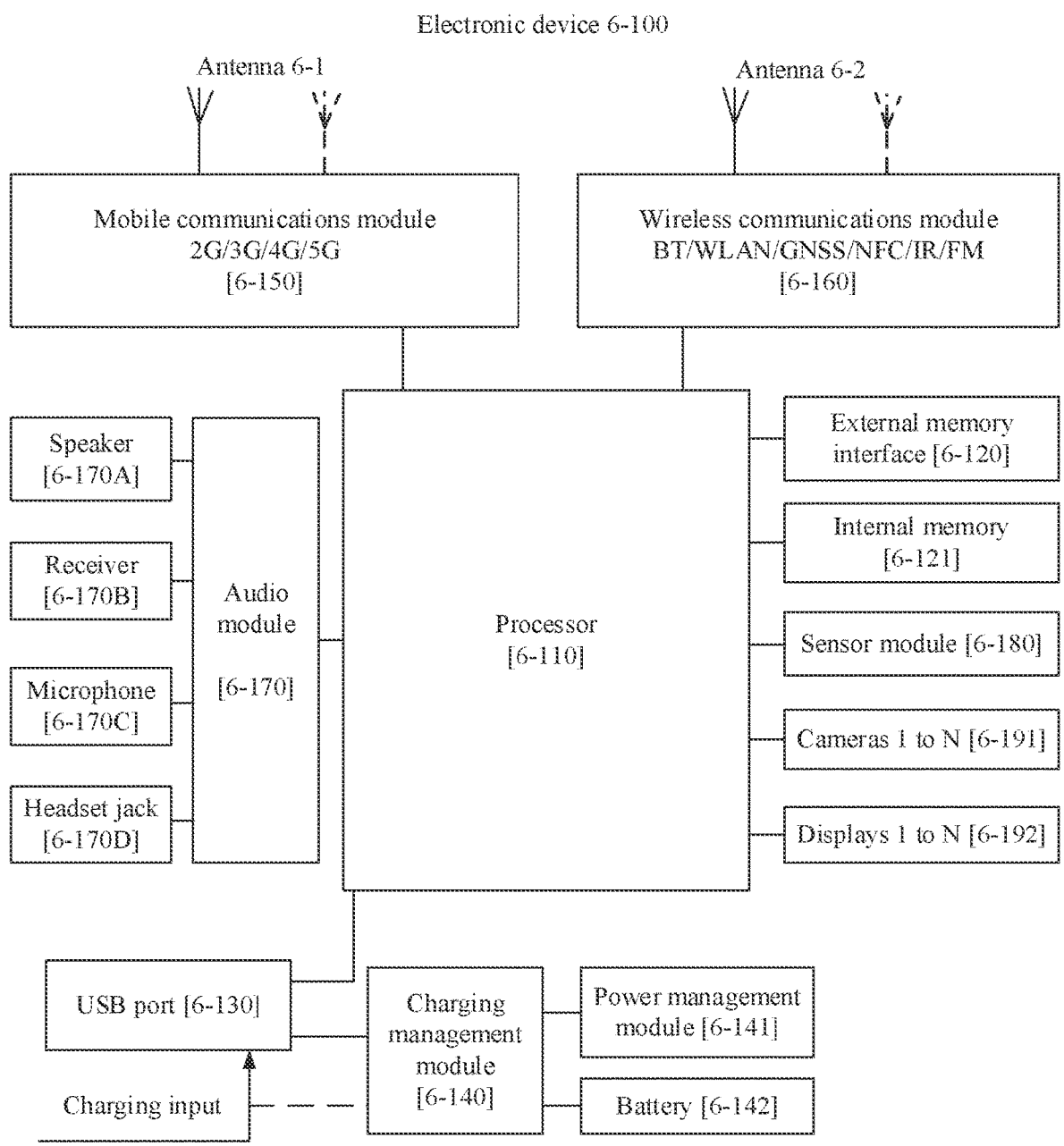
Figures 2, 6:
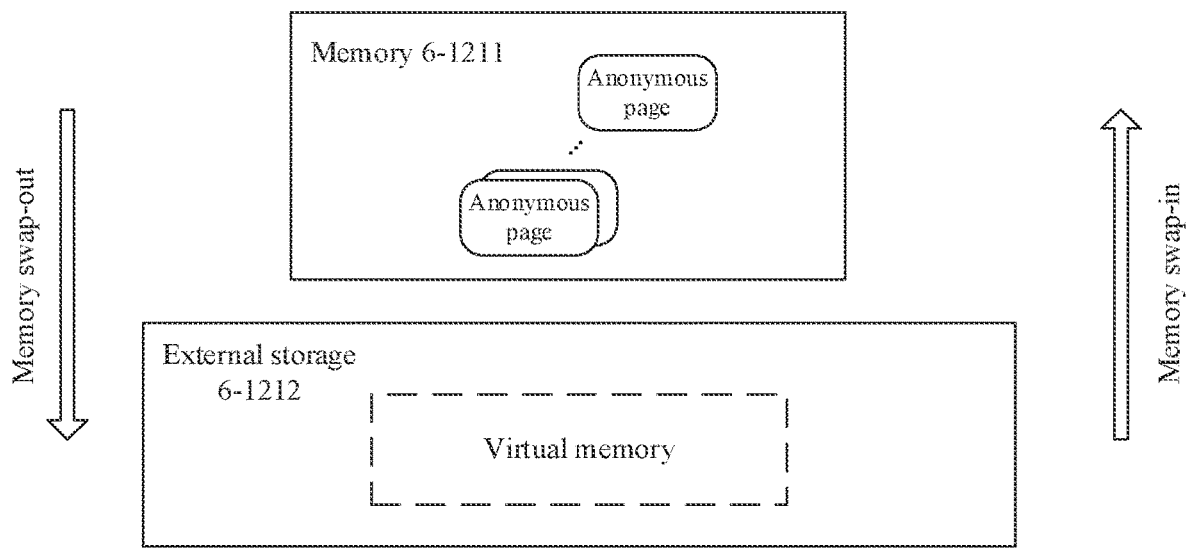
Figures 3, 6:
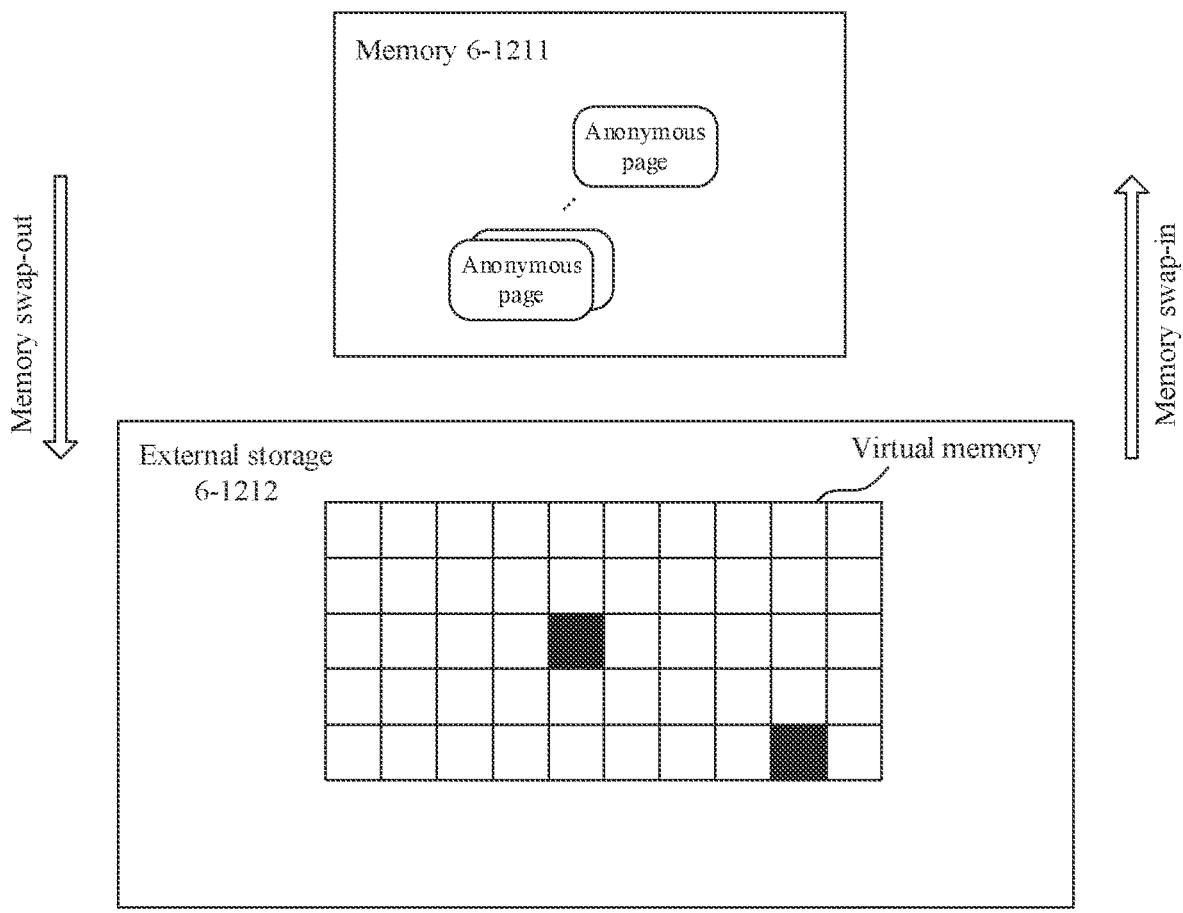
Figures 4, 6:
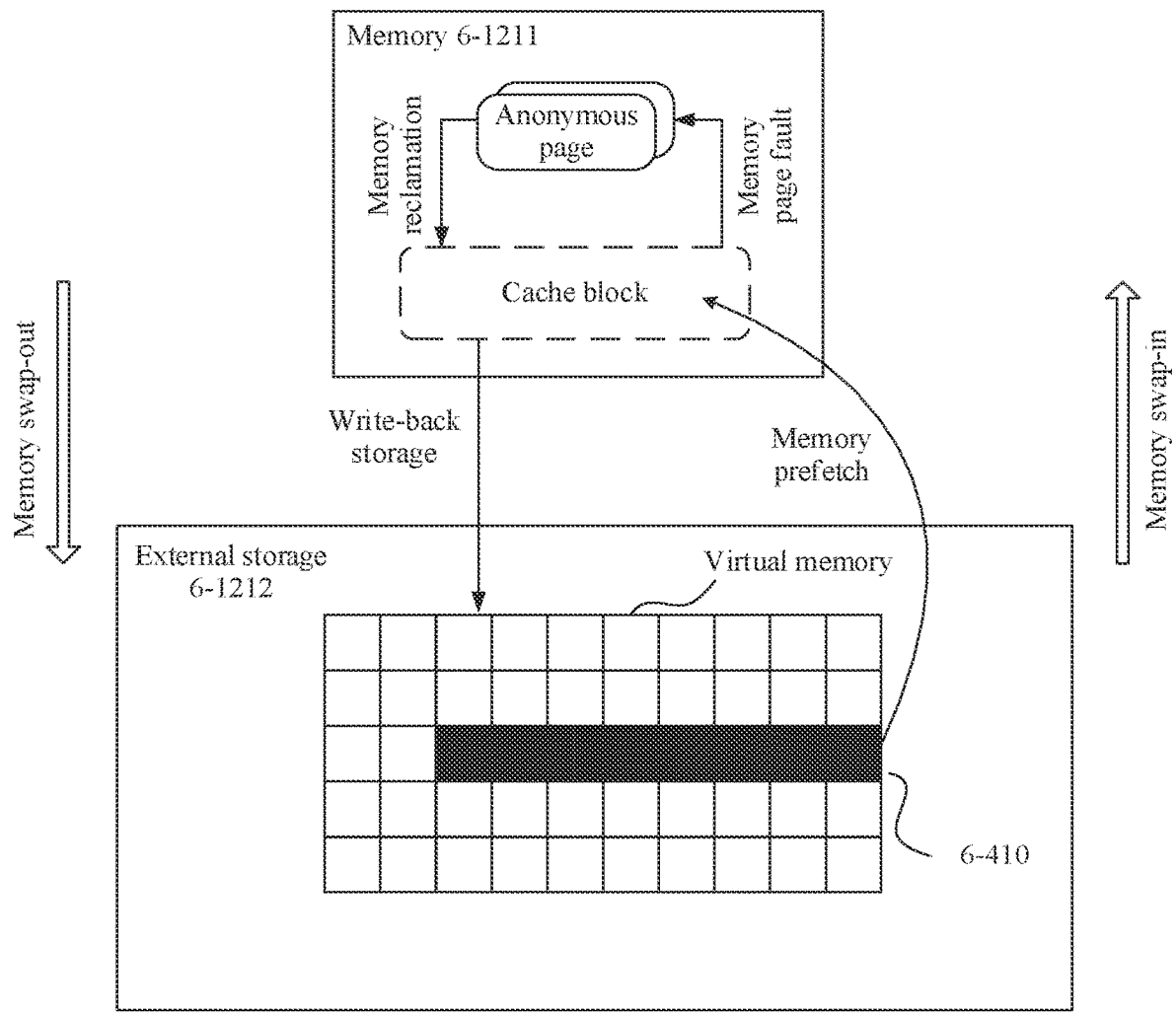
Figures 5, 6:
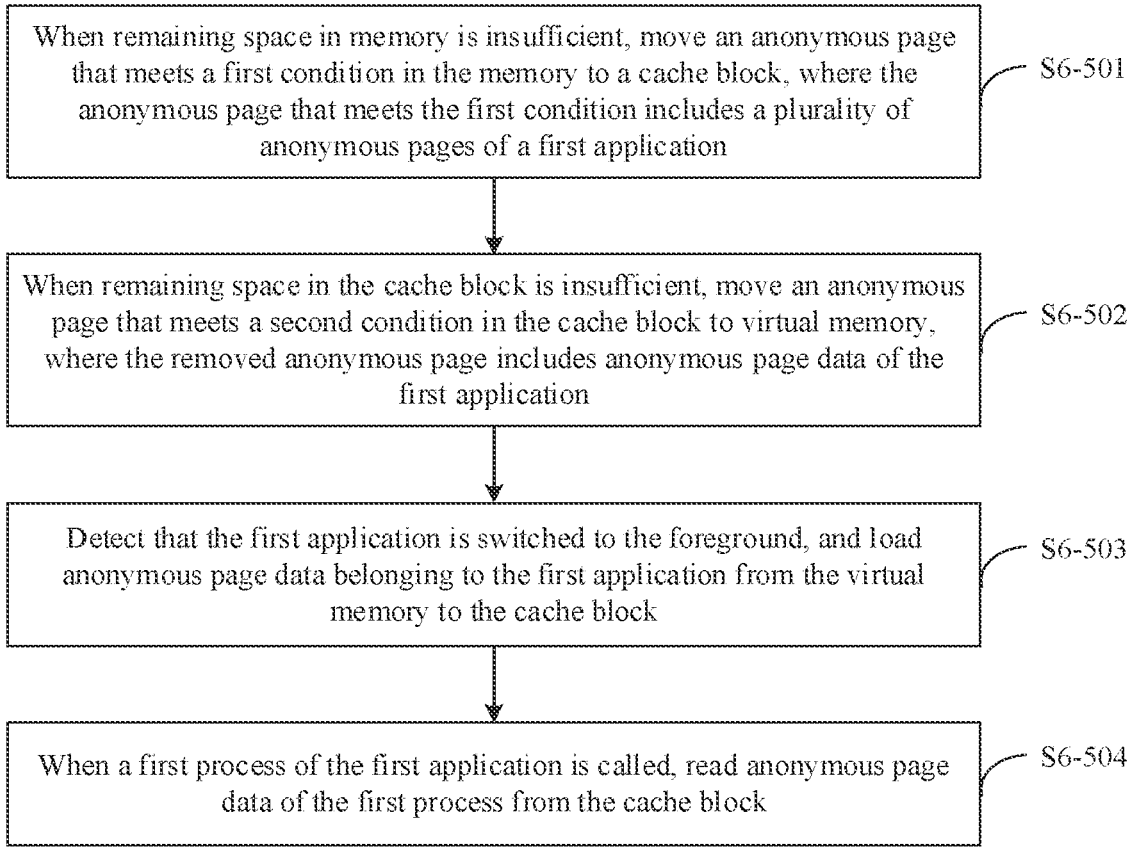
Figure 6:
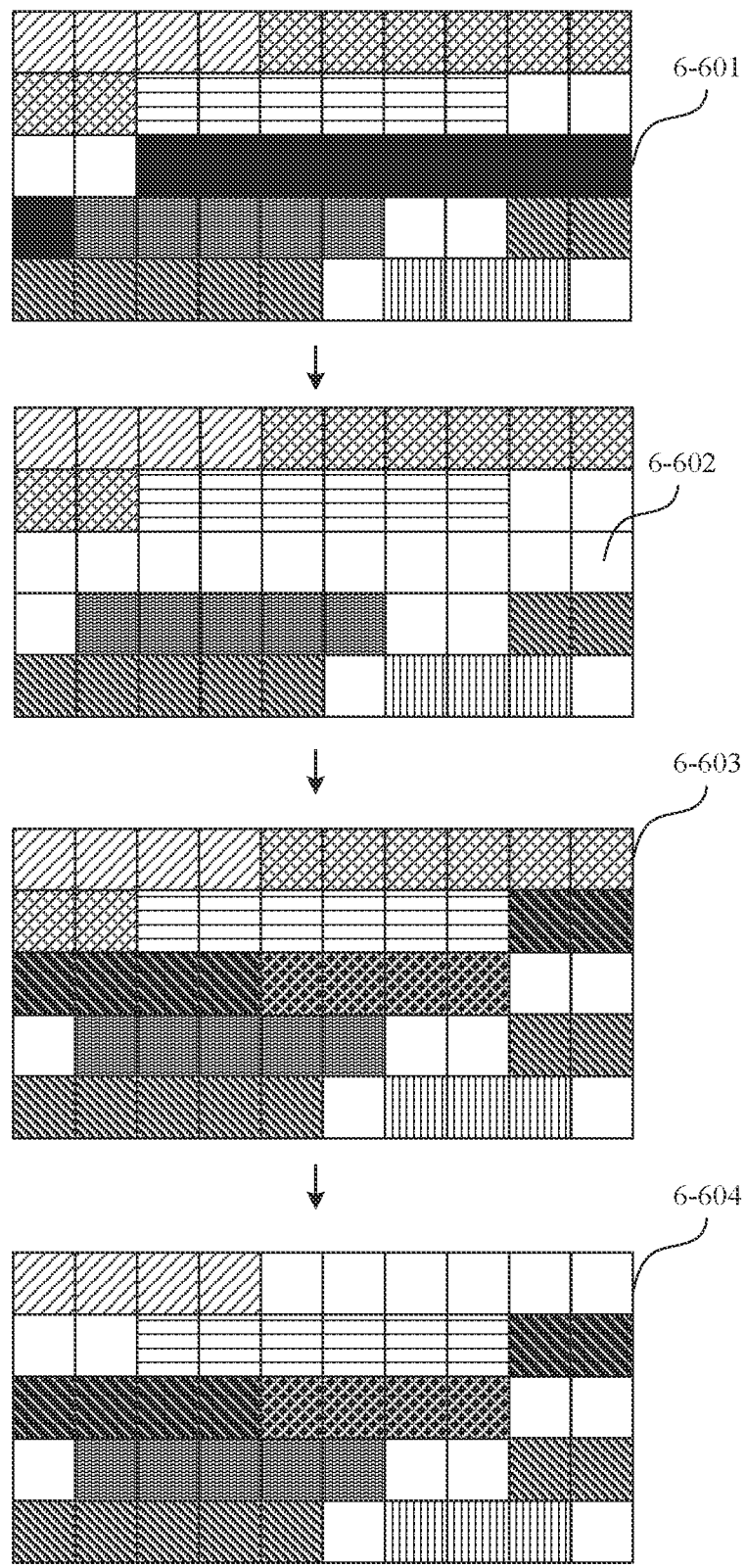
Figures 6, 7:
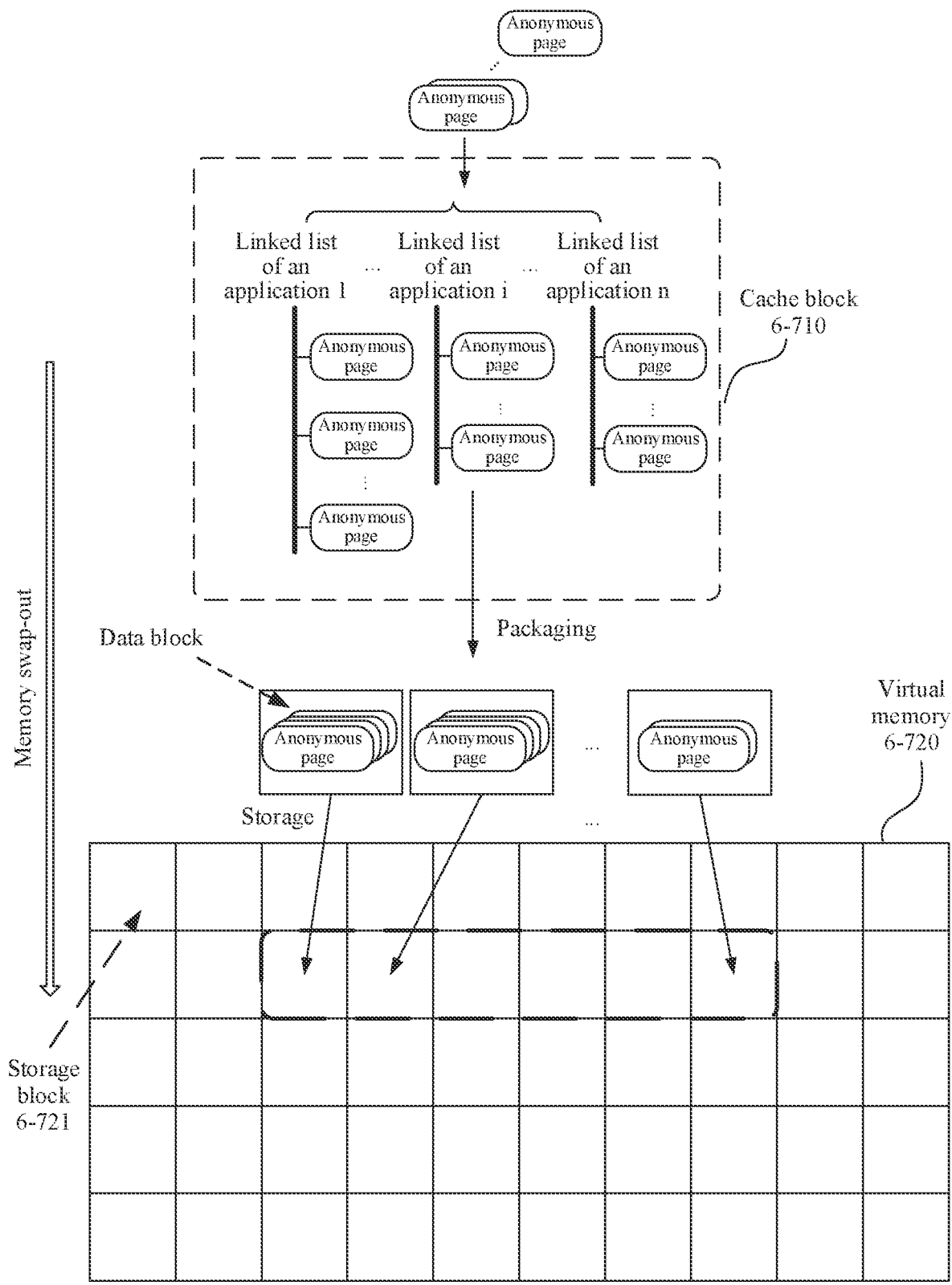
Figures 6, 7, 8:
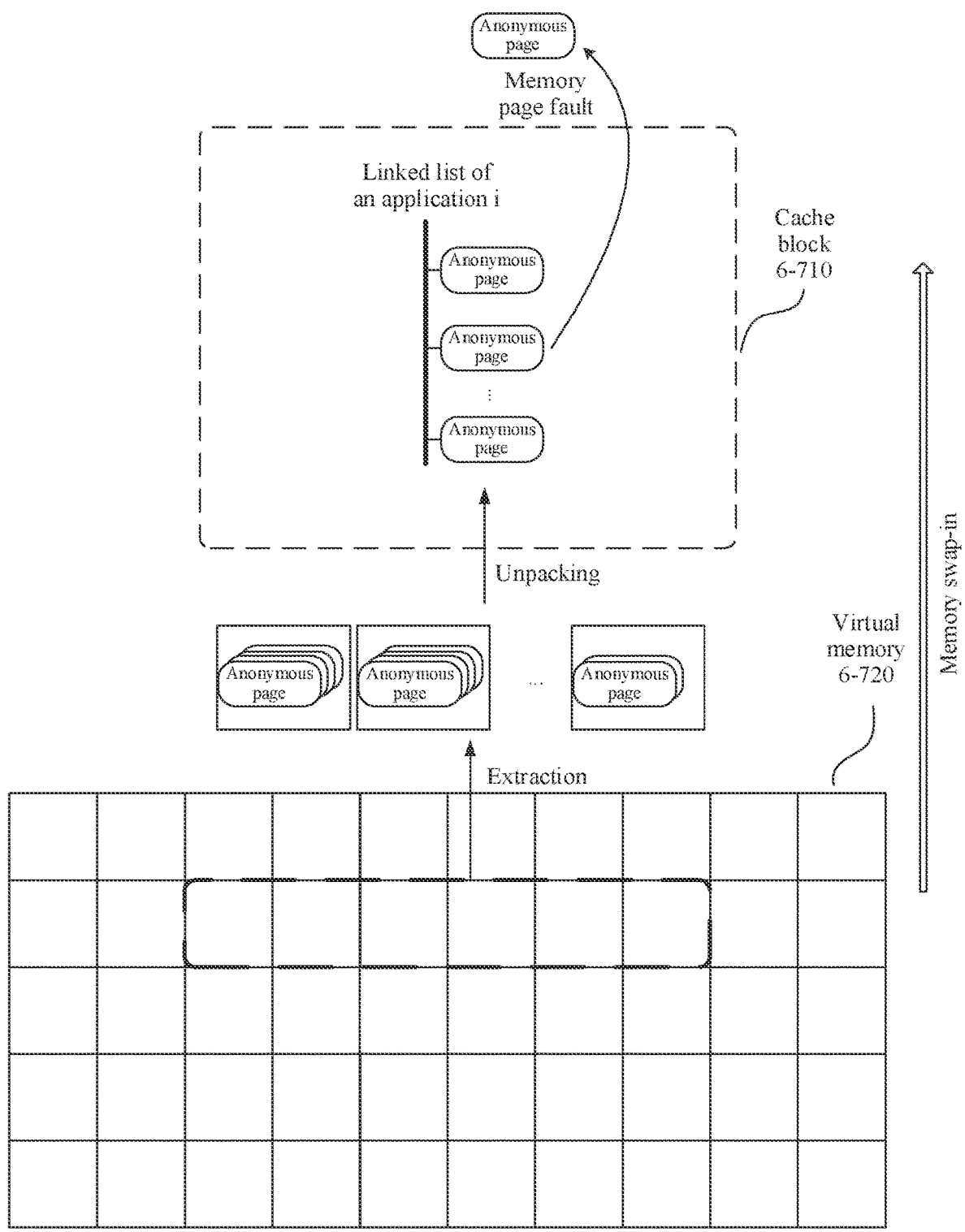
Figures 6, 7, 8, 9:
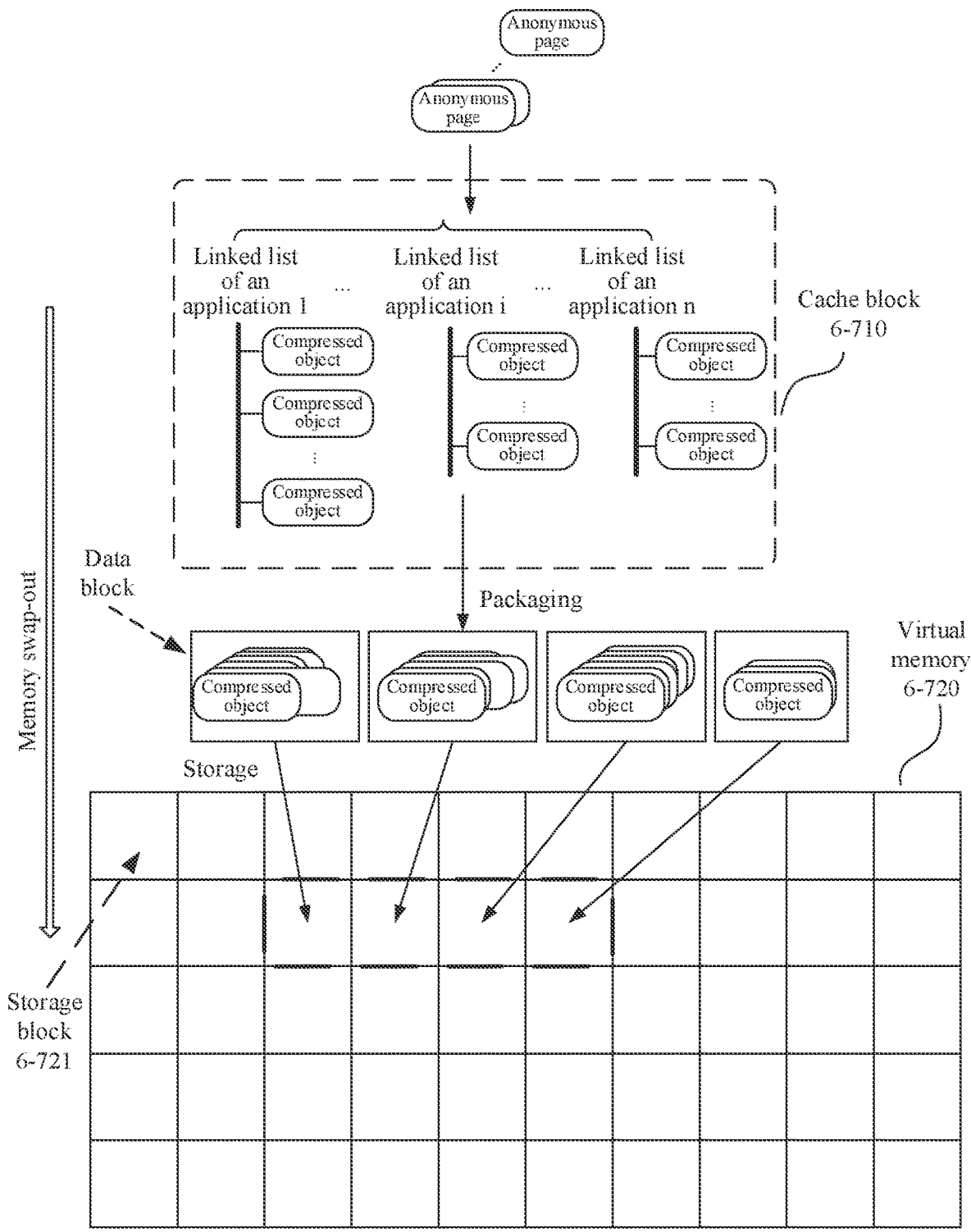
Figures 6, 7, 8, 9, 10:
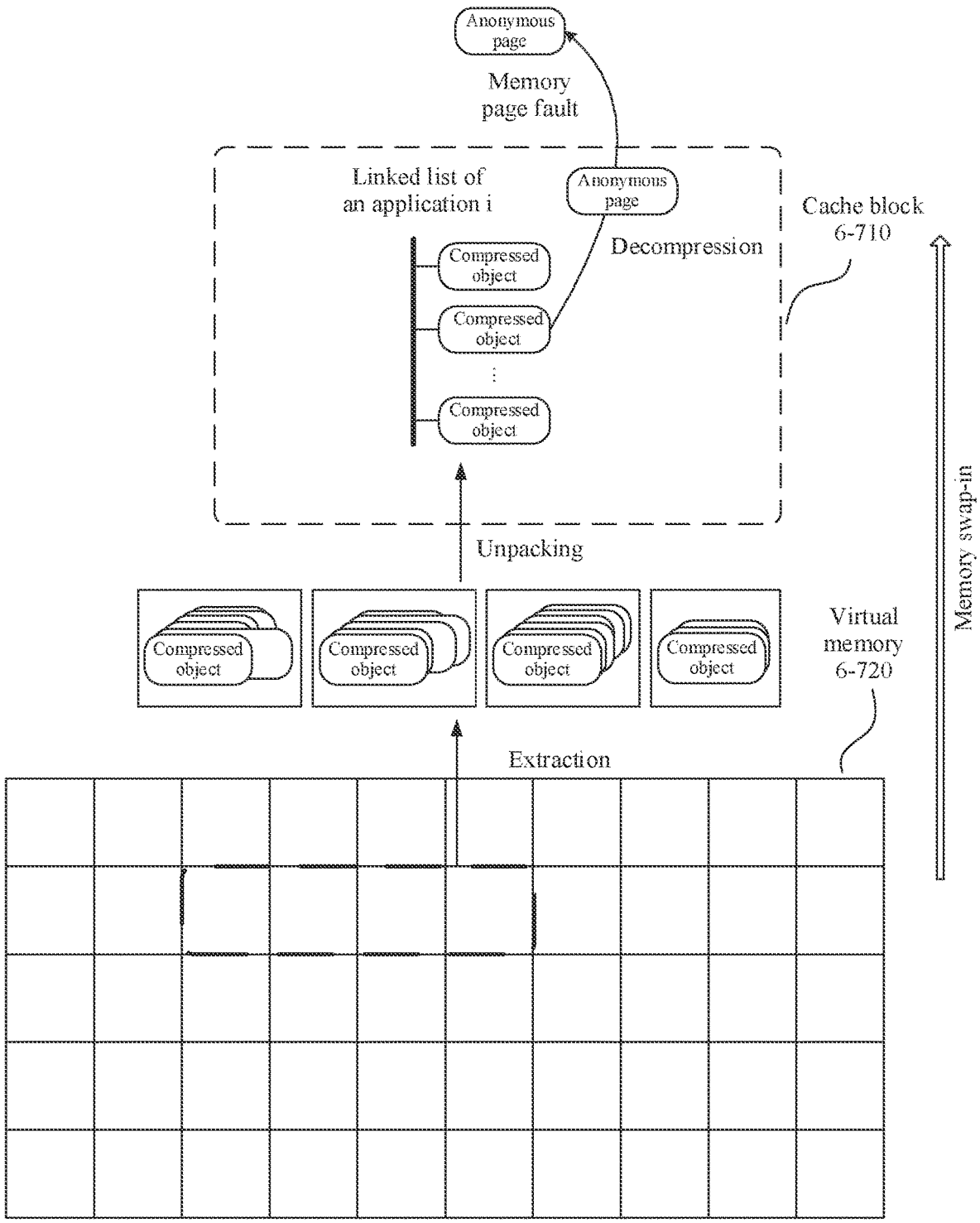
Figures 6, 7, 8, 9, 10, 11:
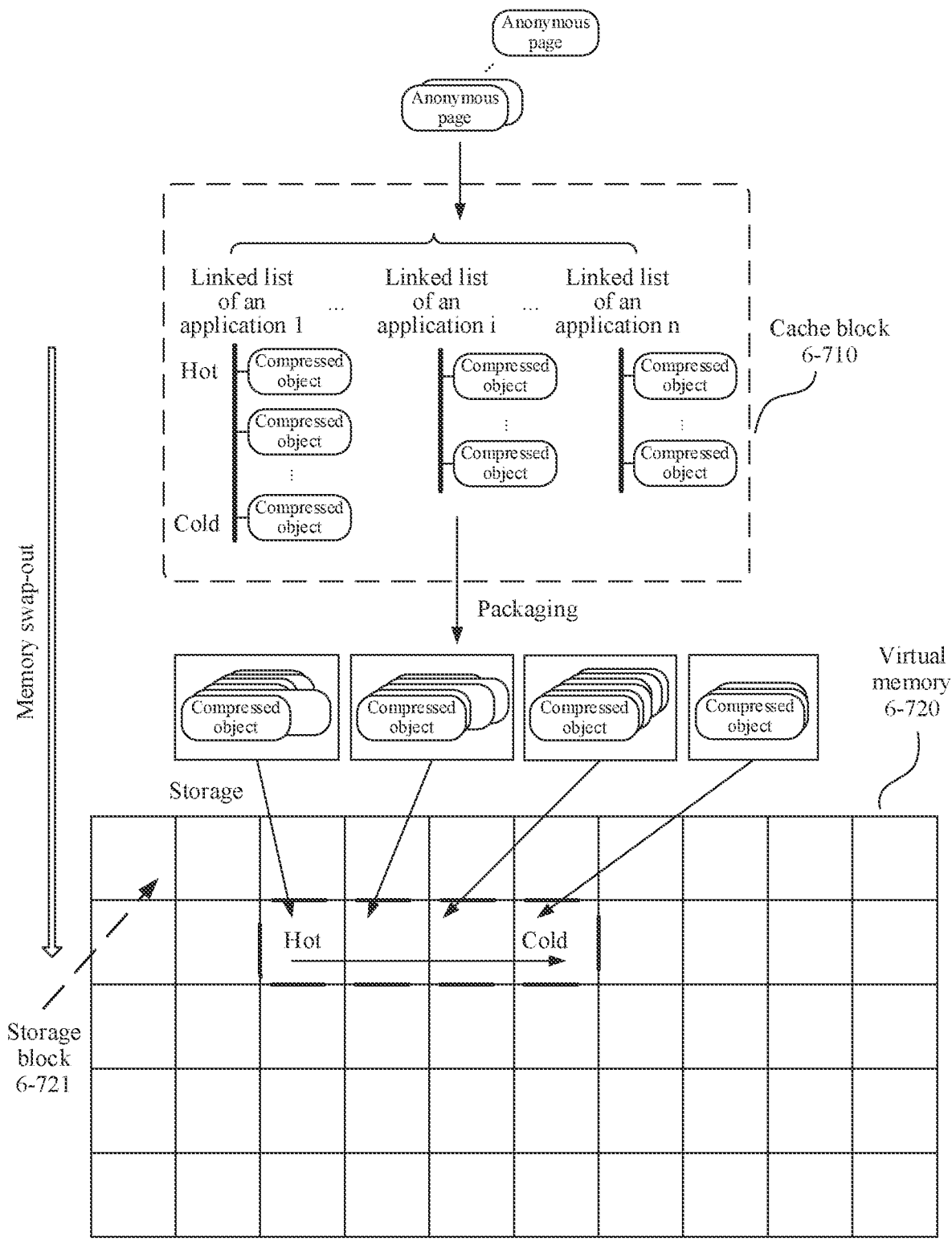
Figures 6, 7, 8, 9, 10, 11, 12:
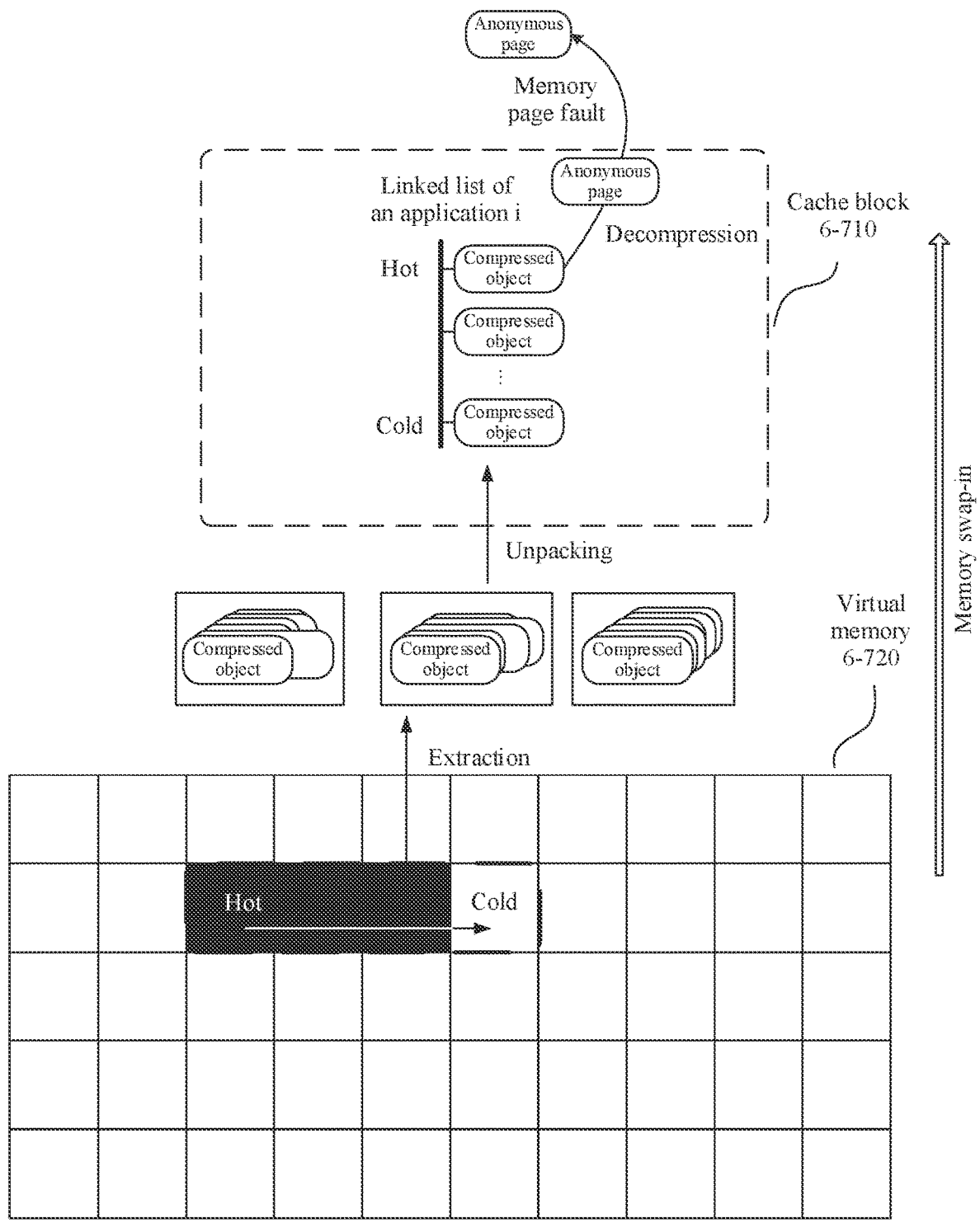
Figures 6, 7, 8, 9, 10, 11, 12, 13:
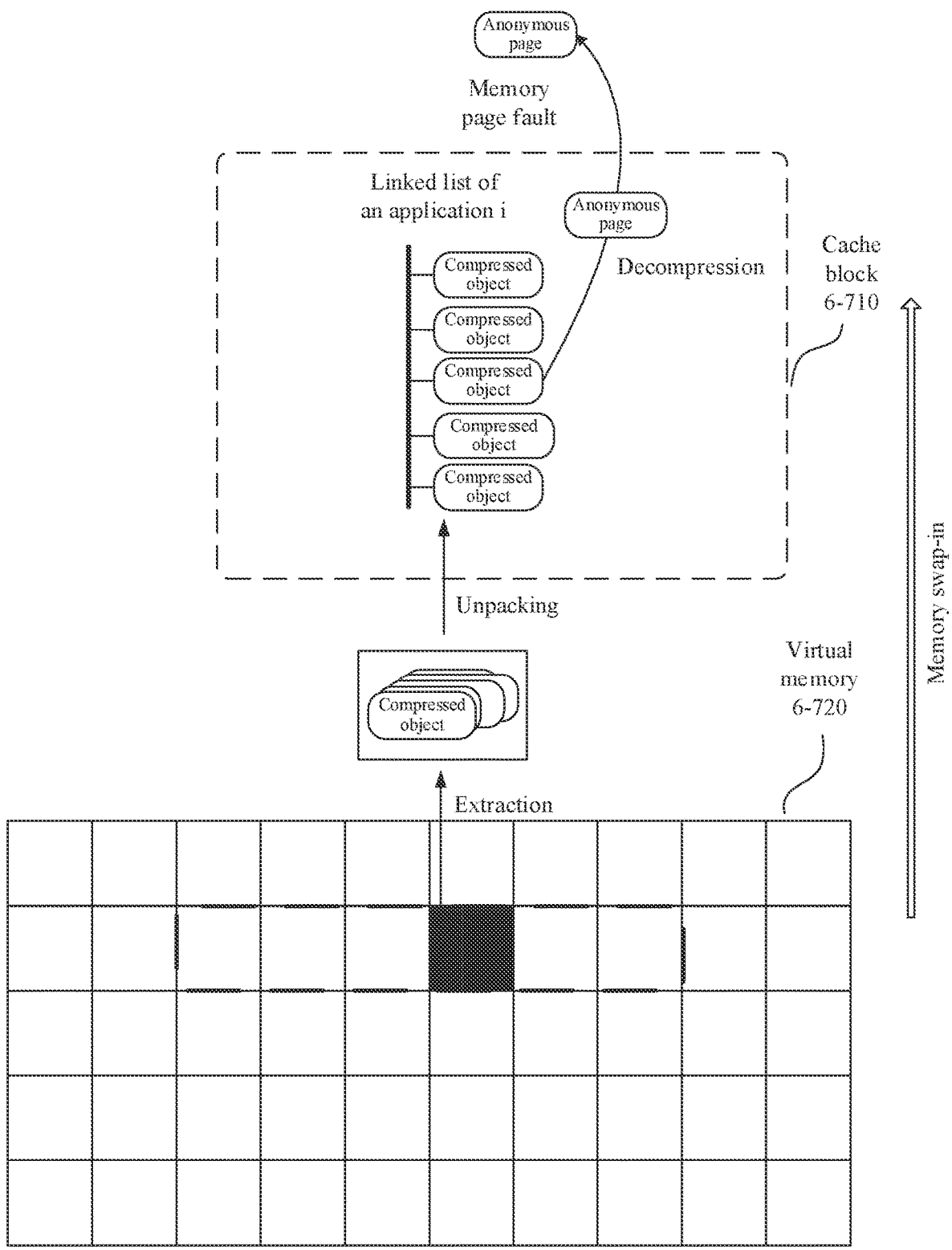
Figures 6, 7, 8, 9, 10, 11, 12, 13, 14:
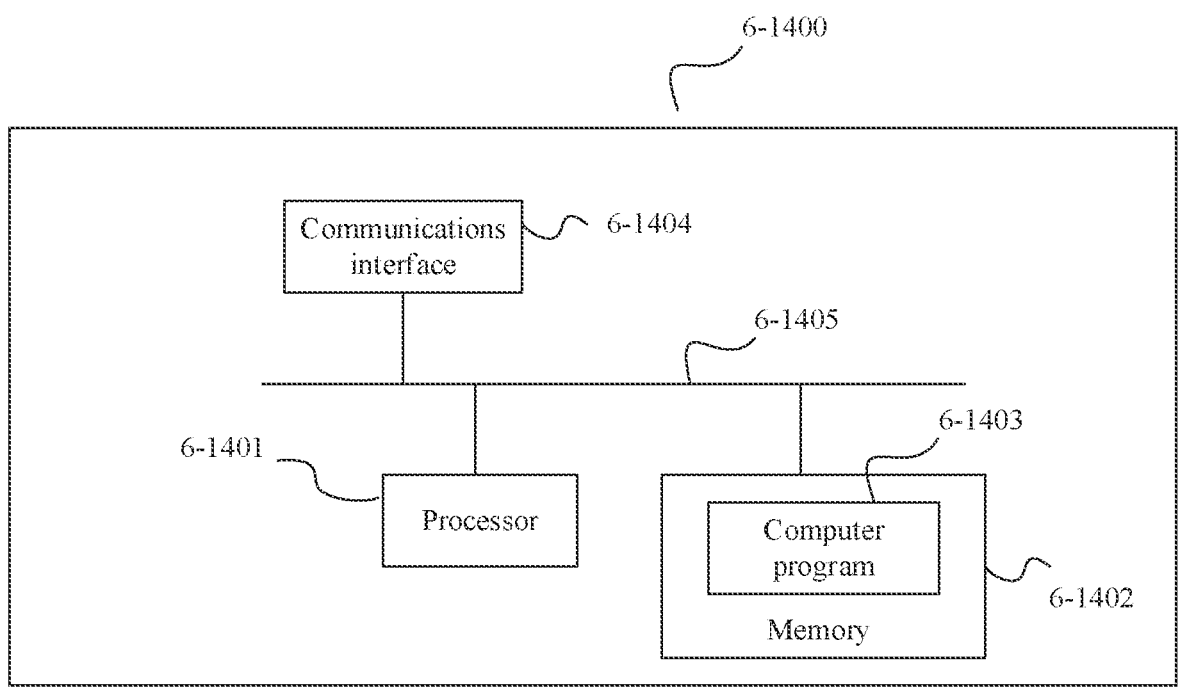
Figures 1, 7:
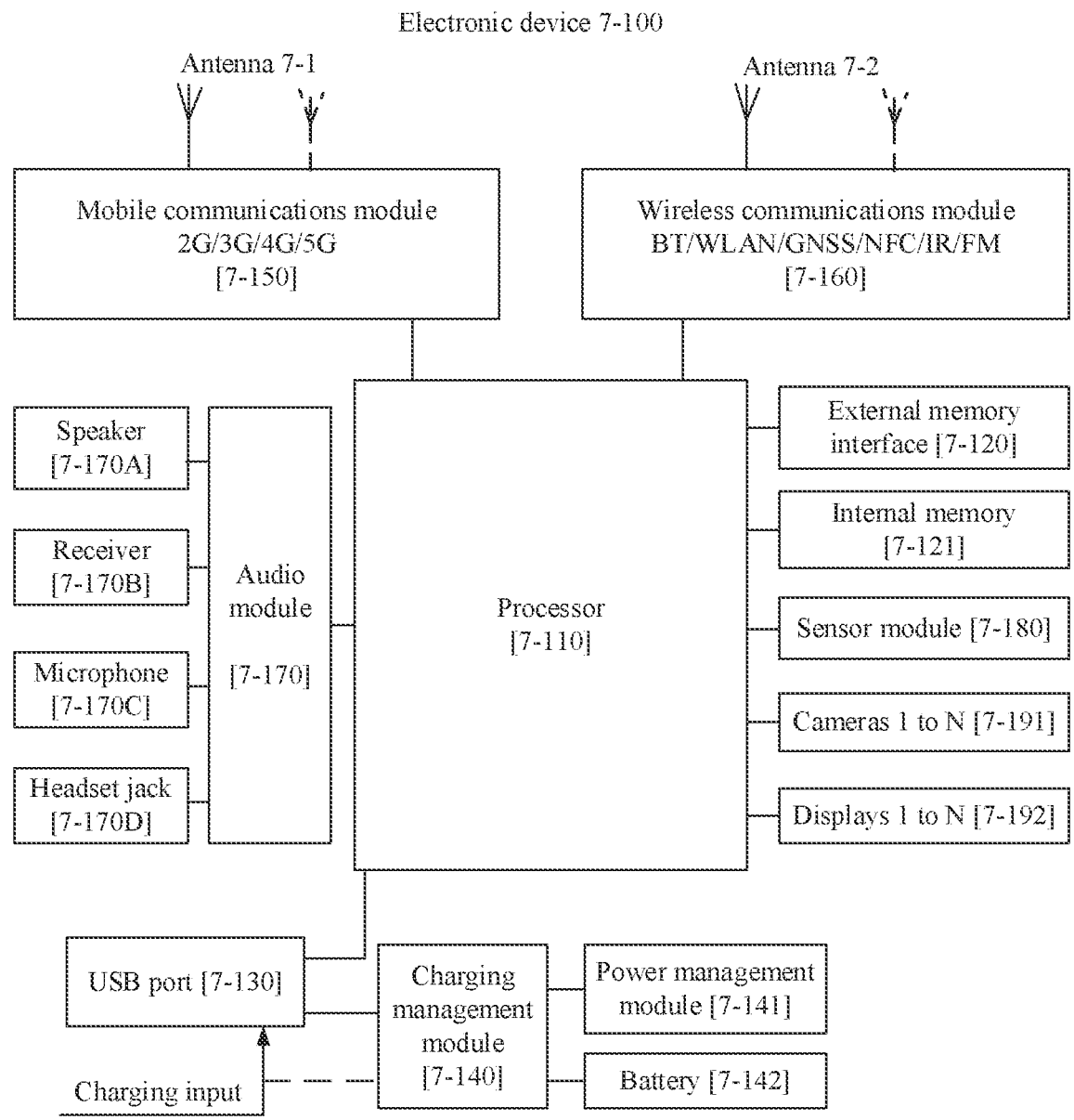
Figures 2, 7:
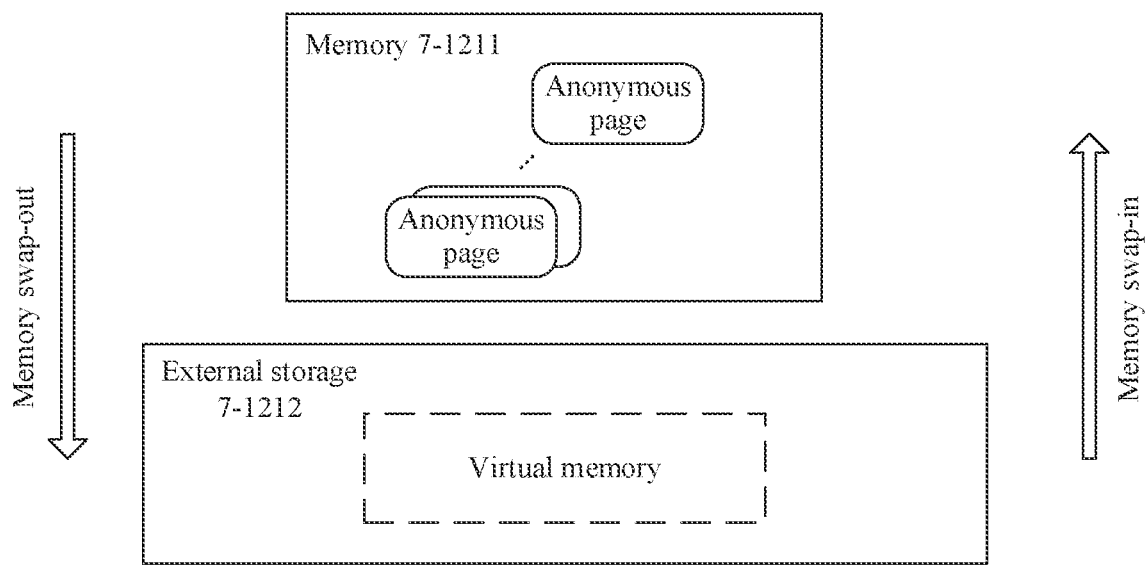
Figures 3, 7:
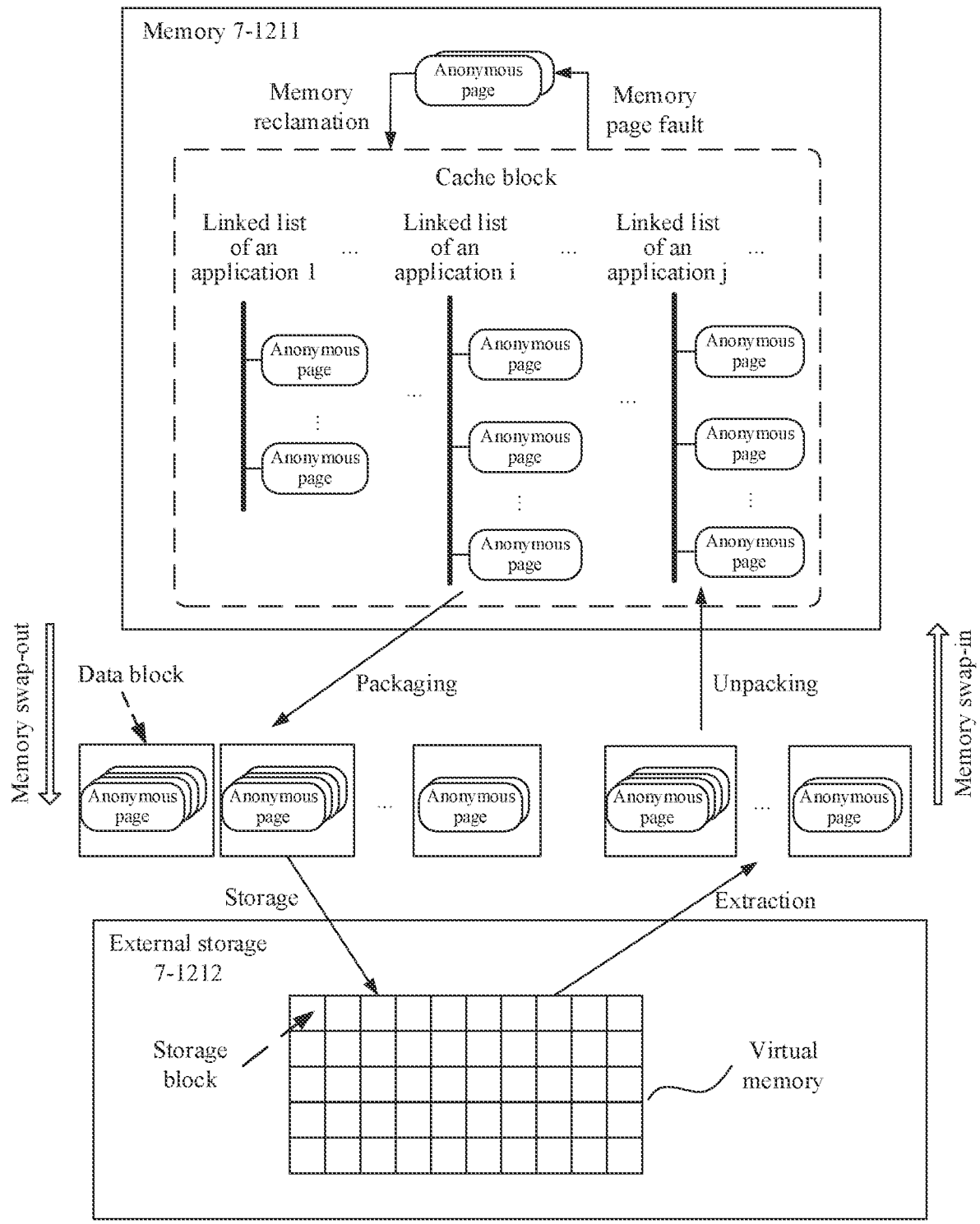
Figures 4, 7:
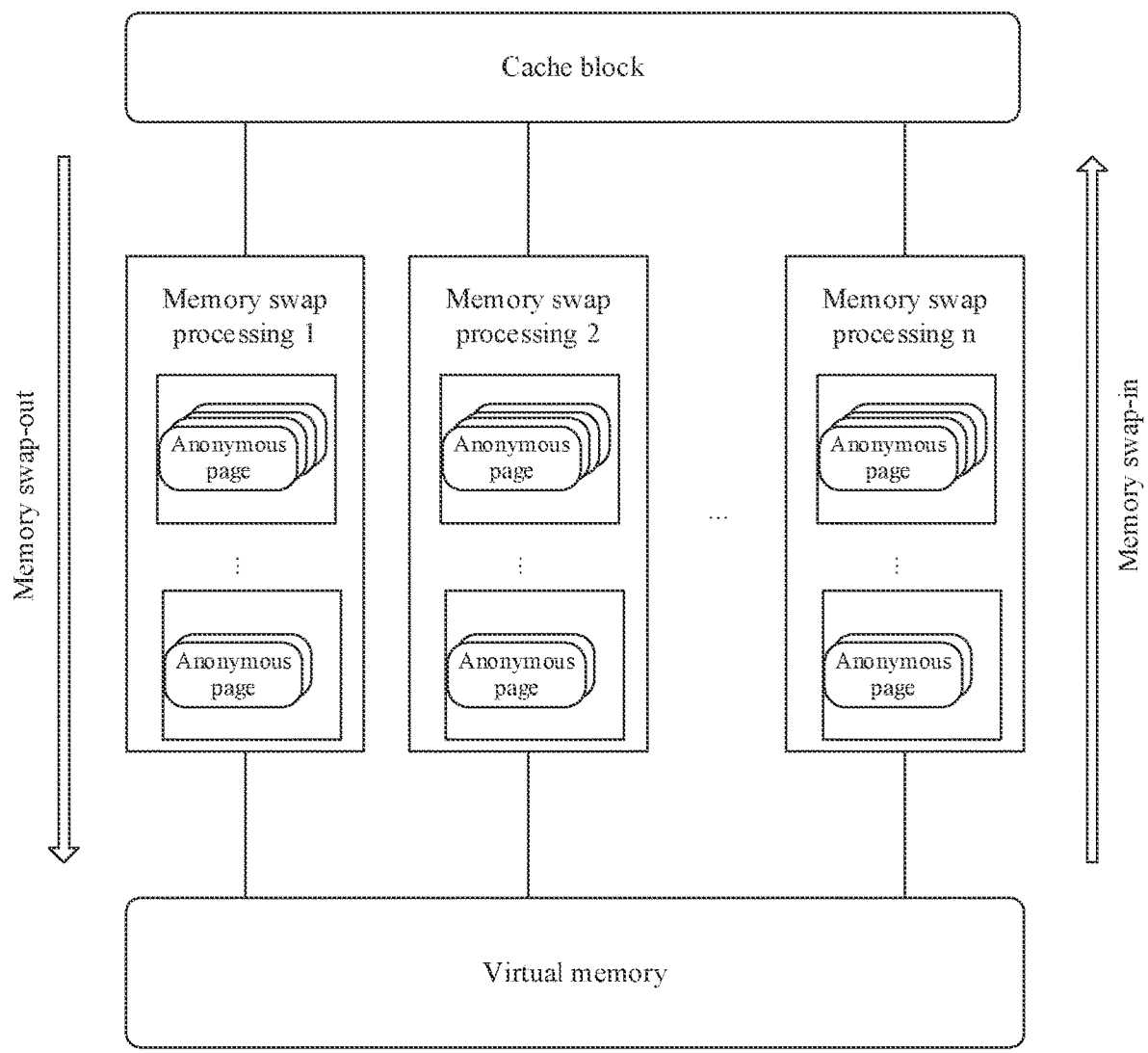
Figures 5, 7:
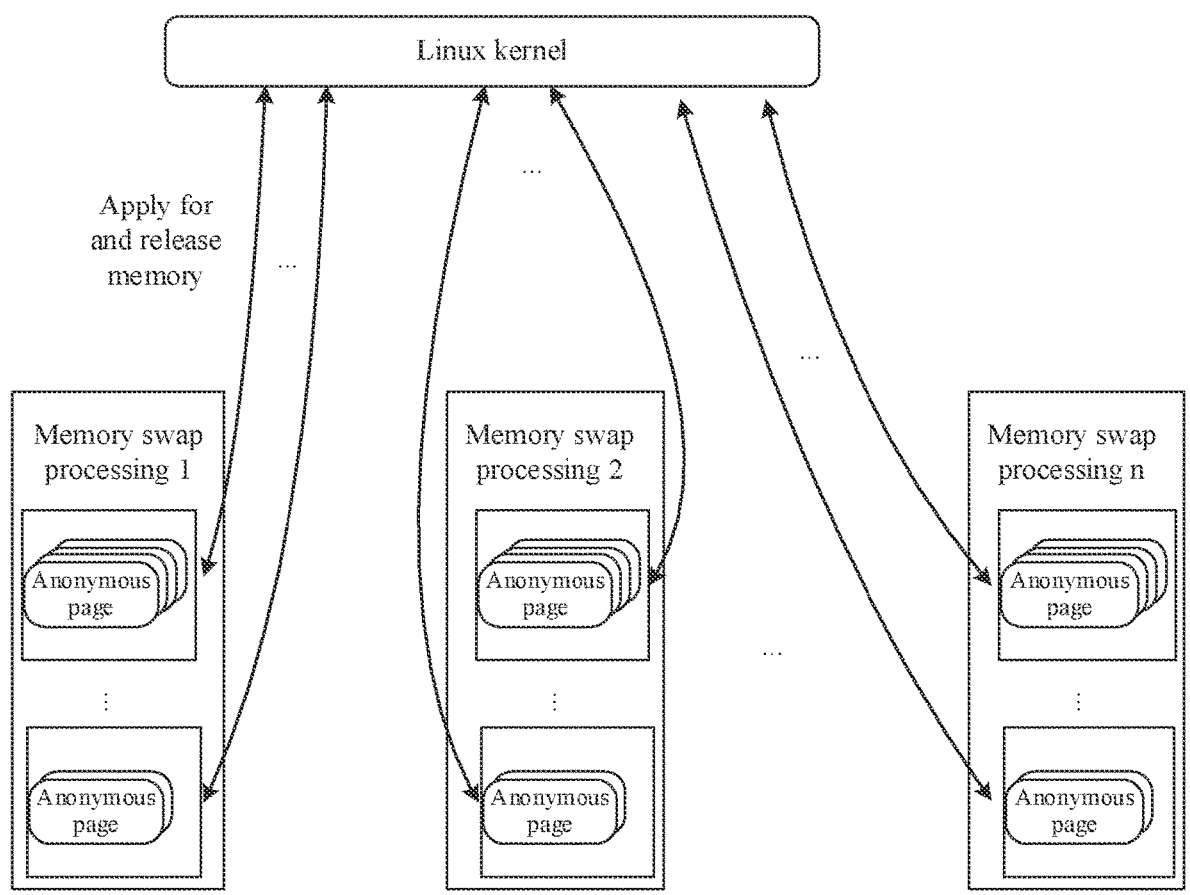
Figures 6, 7:
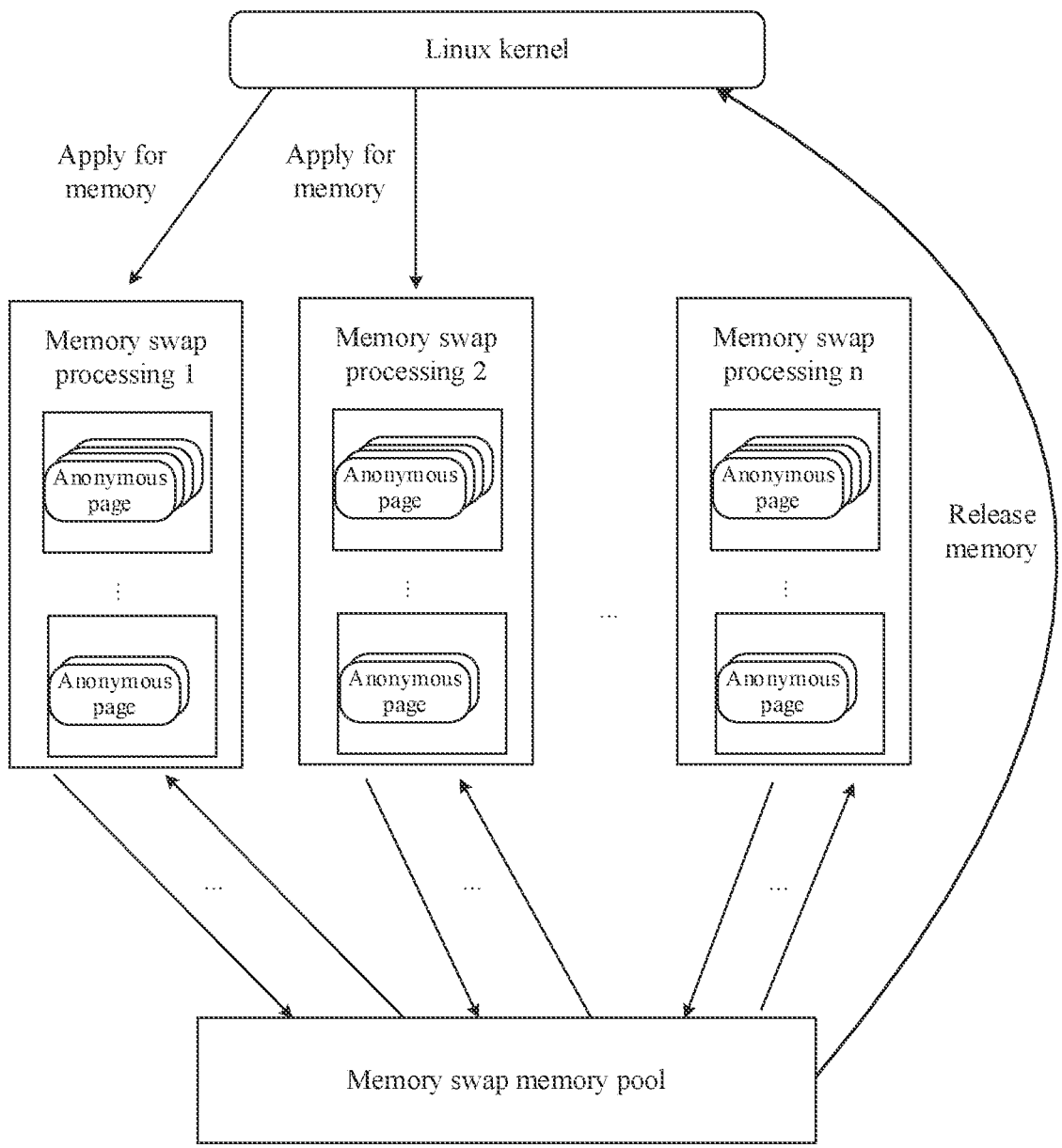
Figure 7:
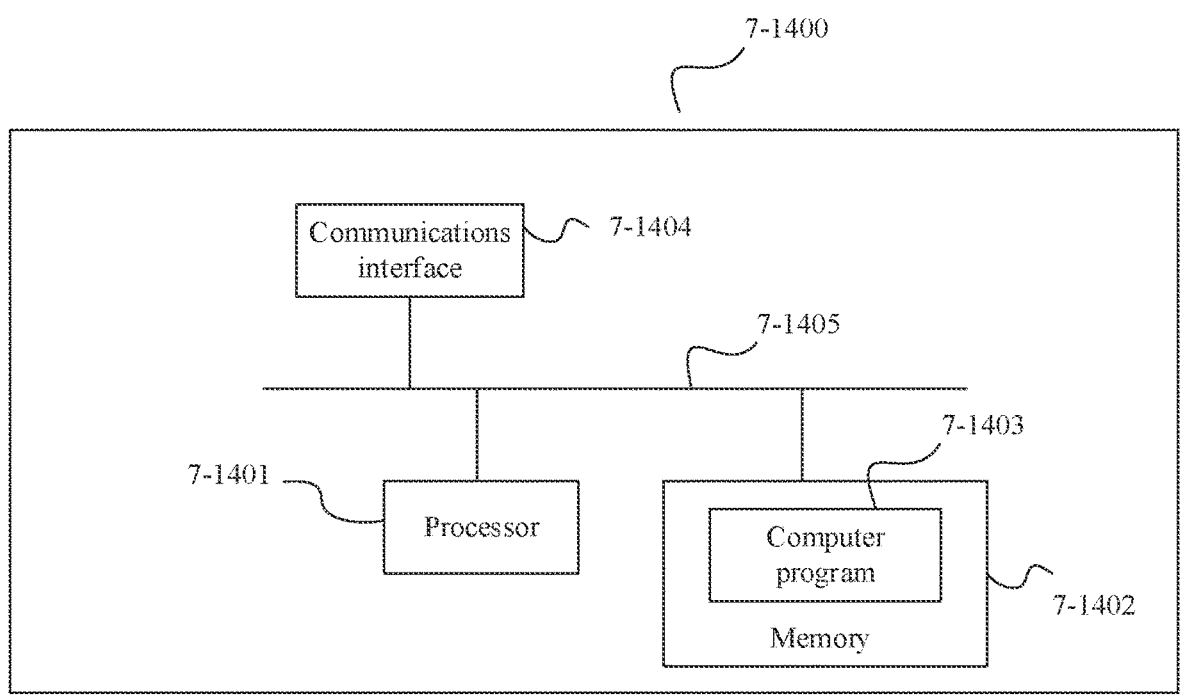

For example, refer to FIG. 3-2*b*. When it is determined that the current memory statistical value of the system is less than the thirty-second memory statistical value, anonymous page compression may be started to reclaim the thirty-second memory, so as to convert the thirty-second memory into the thirty-first memory.

The memory statistical value may be decreased when it is determined, after anonymous page compression, that the current memory statistical value of the system is less than the thirty-first memory statistical value.

When it is determined that the current memory statistical value of the system is less than the thirty-third memory statistical value, the thirty-second memory may be reclaimed by killing a process, to convert the thirty-second memory into the thirty-first memory until the current memory statistical value of the system is not less than the thirty-third memory statistical value.

FIG. 3-3 is a schematic flowchart of another memory management method according to an embodiment of this application. As shown in FIG. 3-3, based on FIG. 3-2*a*(1) and FIG. 3-2*a*(2), the memory management method may further include steps S3-30 to S3-33.

Step S3-30: Monitor space usage of a swap partition.

In this embodiment of this application, the swap partition is a swap area. Usually, the memory may include a normal use area and a swap area. When memory resources of the system are insufficient, the reclamation mechanism starts to perform memory reclamation. The reclamation mechanism starts to compress data in the normal use area and places the compressed data into the swap area. If an amount of data in the swap area reaches a watermark, the data in the swap area is swapped to the external storage.

Step S3-31: Determine whether current space usage of the swap partition reaches a preset proportion; and if it is determined that the current space usage of the swap partition reaches the preset proportion, perform step S3-32, or if it is determined that the current space usage of the swap partition does not reach the preset proportion, perform step S3-30, that is, continue to monitor the space usage of the swap partition.

Step S3-32: When it is determined that the current space usage of the swap partition reaches the preset proportion, determine that the current memory pressure level of the system is the thirty-third level and report a thirty-third level pressure event (for example, a high level pressure (critical_level_press) event) to the upper layer.

Step S3-33: The upper layer reclaims the thirty-second memory based on the high level pressure (critical_level_press) event by killing a process.

It may be understood that, when the space usage of the swap partition reaches the preset proportion when the anonymous page compression thread is started, it is difficult to continue to reclaim memory through anonymous page compression for the memory statistical value. In this case, the anonymous page compression thread reports the high level pressure (critical_level_press) event, to trigger the upper layer to reclaim the thirty-second memory by killing the process.

For example, if cold anonymous pages of a large quantity of applications are previously reclaimed, and space of the swap partition is full, when a current round of reclamation ends, the anonymous page compression thread reports a high level pressure (critical_level_press) event, to directly trigger the upper layer to reclaim the thirty-second memory by killing the process.

It may be understood that reclaiming the thirty-second memory by killing the process in step S3-33 is similar to reclaiming the thirty-second memory by killing the process in step S3-211 in FIG. 3-2*a*(2), and corresponding concepts are also similar. Details are not described herein again.

FIG. 3-4 is a schematic flowchart of another memory management method according to an embodiment of this application. As shown in FIG. 3-4, based on FIG. 3-2*a*(1) and FIG. 3-2*a*(2) and/or FIG. 3-3, the memory management method may further include steps S3-40 to S3-44.

Step S3-40: A pressure stall information (Pressure Stall Information, PSI) thread monitors system resource pressure. PSI provides a method for evaluating system resource pressure. A system resource may include a CPU resource, an I/O resource, and the like. Once resource contention occurs, a delay may be increased, and therefore a user experiences frame freezing. There are two consequences if there is no accurate method to detect a resource pressure degree of a system. One is that a resource user overrestrains and does not fully use the system resources. The other is that resource contention often occurs, and overuse of resources leads to a long waiting delay. An accurate detection method can help the resource user determine an appropriate workload, and can also help a system formulate an efficient resource scheduling policy, to maximize system resource utilization and improve user experience. Therefore, in 2018, Facebook opened a set of Linux kernel components and related tools to resolve important computing cluster management problems. PSI is an important resource measurement tool, to provide a method for detecting system resource contention in real time, and is presented in a form of a contention waiting time, which can comprehensively determine current system pressure and provide simple and accurate decision-making for a user and a resource scheduler. Specifically, the PSI is used to aggregate task delays into resource pressure indicators, and the indicators reflect problems in terms of workload health and resource utilization. It may be understood that, in this embodiment of this application, an indicator considered by the PSI thread is usually a speed provided for an application. In one case, a large-memory-consumption application consumes a large amount of memory in a short period of time, for example, consumes 2 GB memory. However, in the foregoing manner (for example, memory is reclaimed through anonymous page compression), a memory reclamation speed is slow. Therefore, the PSI thread may be used to trigger detection of system resource pressure. PSI statistical data (that is, a PSI value) can provide an early warning for impending resource shortages, so that more proactive and detailed responses can be implemented.

Step S3-41: Determine whether a current PSI value of the system is greater than a preset threshold; and if it is determined that the current PSI value of the system is greater than the preset threshold, perform step S3-42, or if it is determined that the current PSI value of the system is not greater than the preset threshold, perform step S3-40, that is, continue to monitor system resource pressure.

Step S3-42: When it is determined that the current PSI value of the system is greater than the preset threshold, the PSI thread reports a PSI pressure value to an upper layer.

Step S3-43: The upper layer receives the PSI pressure value, and determines whether a current memory statistical value of the system is less than a thirty-fourth memory statistical value psi_buffer; and perform step S3-44 if it is determined that the current memory statistical value of the system is less than the thirty-fourth memory statistical value psi_buffer, or perform step S3-40 if it is determined that the current memory statistical value of the system is not less than the thirty-fourth memory statistical value psi_buffer.

Step S3-44: When it is determined that the current memory statistical value of the system is less than the thirty-fourth memory statistical value psi_buffer, reclaim the thirty-second memory by killing a process.

It may be understood that, in this embodiment of this application, when reporting by the PSI thread indicates that a speed of quickly providing system memory for an application is slow, whether the current memory statistical value of the system is less than the thirty-fourth memory statistical value psi_buffer further needs to be determined. When the current memory statistical value of the system is not less than the thirty-fourth memory statistical value psi_buffer, it indicates that the current system can still provide available memory for the application, but a speed of providing the available memory is slow. When the current memory statistical value of the system is less than the thirty-fourth memory statistical value psi_buffer, it indicates that available memory that can be provided by the system for the application is insufficient, and a speed of providing the available memory is slow. In this case, the thirty-second memory is reclaimed directly by killing the process.

It may be understood that the thirty-fourth memory statistical value psi_buffer is less than the thirty-third memory statistical value min_buffer.

It may be understood that reclaiming the thirty-second memory by killing the process in step S3-44 is similar to reclaiming the thirty-second memory by killing the process in step S3-211 in FIG. 3-2a(2) and reclaiming the thirty-second memory by killing the process in step S3-33 in FIG. 3-3, and corresponding concepts are also similar. Details are not described herein again.

Figures 1, 2, 3, 4, 5:
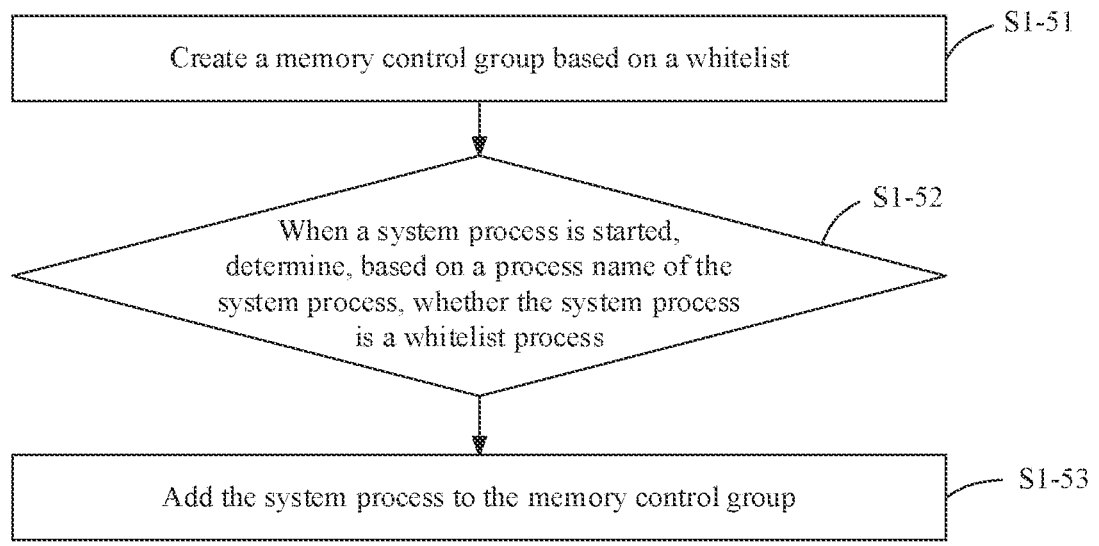

FIG. 3-5 is a schematic flowchart of another memory management method according to an embodiment of this application. As shown in FIG. 3-5, based on FIG. 3-2a(1) and FIG. 3-2a(2), FIG. 3-3, and/or FIG. 3-4, the memory management method may further include steps S3-50 to S3-52.

Step S3-50: Detect whether a preset application is opened; and perform step S3-51 if it is detected that the preset application is opened, or continue to perform step S3-50 if it is not detected that the preset application is opened.

It may be understood that the preset application is an application that consumes a large amount of memory when being opened, for example, an application that consumes a large amount of memory in a short period of time once the preset application is opened. The preset application may be preset and stored.

Step S3-51: When it is detected that the preset application is opened, further determine whether the current memory statistical value of the system is greater than the thirty-first memory statistical value high_buffer; and perform step S3-52 if it is determined that the current memory statistical value of the system is less than the thirty-first memory statistical value high_buffer, or perform step S3-50 if it is determined that the current memory statistical value of the system is not less than the thirty-first memory statistical value high_buffer.

Step S3-52: When it is determined that the current memory statistical value of the system is less than the thirty-first memory statistical value high_buffer, reclaim the thirty-second memory by killing a process.

It may be understood that, in this embodiment of this application, if a memory requirement of an application is too high and PSI pressure reporting is still delayed, the thirty-second memory cannot be reclaimed in a timely manner by killing the process. Therefore, in an opening scenario of an application that requires large memory, for example, Camera is opened, when an opening message is received, reclamation of the thirty-second memory that is performed by killing a process is immediately triggered.

It may be understood that, usually, when a large-memory application (for example, Camera) is opened, a large amount of memory is consumed in a short period of time, and a memory statistical value is decreased. In this case, the anonymous page compression thread is woken up to reclaim memory. However, a process of decreasing the memory statistical value to the thirty-third memory statistical value min_buffer may be slow for camera opening. Therefore, in addition to a kill process triggered by opening of the large-memory application, PSI pressure reporting is a good supplement. When the memory statistical value has a decreasing trend, the thirty-second memory is also reclaimed in a timely manner by killing the process.

It may be understood that reclaiming the thirty-second memory by killing the process in step S3-52 is similar to reclaiming the thirty-second memory by killing the process in step S3-211 in FIG. 3-2a(2), reclaiming the thirty-second memory by killing the process in step S3-33 in FIG. 3-3, and reclaiming the thirty-second memory by killing the process in step S3-44 in FIG. 3-4, and corresponding concepts are also similar. Details are not described herein again.

Refer to FIG. 3-2a(1) and FIG. 3-2a(2) to FIG. 3-5 again. It is clear that, in this embodiment of this application, there are at least the following four cases in which the thirty-second memory is reclaimed by killing a process.

Case 1: When the memory statistical value is gradually decreased to a minimum value, that is, the thirty-third memory statistical value min_buffer, if the current memory statistical value of the system still does not reach the thirty-third memory statistical value min_buffer, the thirty-second memory is reclaimed by killing a process, to maintain the memory statistical value to the thirty-third memory statistical value min_buffer (refer to step S3-211 in FIG. 3-2a(2)).

Case 2. When it is detected that the space usage of the swap partition reaches the preset proportion when the anonymous page compression process compresses memory, it is difficult to continue to reclaim memory through anonymous page compression for the memory statistical value. In this case, a high level pressure (critical-level-press) event is reported, and the thirty-second memory is synchronously reclaimed by killing the process (refer to step S3-33 in FIG. 3-3).

Case 3: A PSI pressure reporting policy is used, that is, detection of the thirty-fourth memory statistical value psi_buffer is directly triggered based on a PSI pressure status, and reclamation of the thirty-second memory that is performed by killing the process is triggered (refer to step S3-44 in FIG. 3-4).

Case 4: The preset application is opened, that is, if the memory requirement of the application is too high and PSI reporting is still delayed, the thirty-second memory cannot be reclaimed in a timely manner by killing the process. Therefore, in an opening scenario of an application that requires large memory, for example, Camera is opened, when an opening message is received, reclamation of the thirty-second memory that is performed by killing the process is immediately triggered (refer to step S3-52 in FIG. 3-5).

It may be understood that, in this embodiment of this application, a time or a sequence of killing processes corresponding to the foregoing four cases is not limited. Provided that any one of the four cases is met, reclamation of the thirty-second memory that is performed by killing the process may be triggered.

FIG. 3-6 is a schematic diagram of a structure of a memory management apparatus according to an embodiment of this application. The memory management apparatus 3-200 may be configured to perform some or all steps of the memory management methods described in FIG. 3-2a(1) and FIG. 3-2a(2) to FIG. 3-5. As shown in FIG. 3-6, the memory management apparatus 3-200 may include a thread module 3-21, a creating module 3-22, a reporting module 3-23, a memory reclamation module 3-24, and a memory adjustment module 3-25.

The thread module 3-21 includes at least an anonymous page compression thread 3-211 and a PSI thread 3-212. The anonymous page compression thread 3-211 is configured to compress an anonymous page, to reclaim thirty-second memory. The PSI thread 3-212 is configured to monitor system resource pressure.

The creating module 3-22 is configured to create a memory statistical value and a memory pressure level.

The memory statistical value is used to represent remaining available memory in system memory. Thirty-first memory is idle memory of a system, and the thirty-second memory is occupied memory that can be converted into the thirty-first memory through reclamation.

The memory statistical value includes a thirty-first memory statistical value, a thirty-second memory statistical value, and a thirty-third memory statistical value. The thirty-second memory statistical value is less than the thirty-first memory statistical value. The thirty-third memory statistical value is less than the thirty-second memory statistical value.

The memory pressure level includes a thirty-first level, a thirty-second level, and a thirty-third level. Memory pressure of the thirty-third level is higher than memory pressure of the thirty-second level, and the memory pressure of the thirty-second level is higher than memory pressure of the thirty-first level.

The reporting module 3-23 is configured to: when a current memory statistical value of the system is less than the thirty-second memory statistical value, determine that a current memory pressure level of the system is the thirty-first level, and report a thirty-first level pressure event. The reporting module 3-23 is further configured to: when a current memory statistical value of the system is less than the thirty-first memory statistical value, determine that a current memory pressure level of the system is the thirty-second level, and report a thirty-second level pressure event.

The memory reclamation module 3-24 is configured to start the anonymous page compression thread 3-211 based on the thirty-first level pressure event, to perform anonymous page compression, so as to reclaim the thirty-second memory.

It may be understood that, in this embodiment of this application, the reporting module 3-23 may report a pressure event by using the anonymous page compression thread 3-211.

The memory adjustment module 3-25 is configured to adjust the memory statistical value based on the thirty-second level pressure event. For example, after memory reclamation is performed by using the anonymous page compression thread 3-211, if the current memory statistical value of the system does not reach the thirty-first memory statistical value high_buffer, a medium-level pressure (medium-level-press) event is received, and the memory statistical value is dynamically adjusted (for example, decreased).

The memory reclamation module 3-24 is further configured to: when the memory statistical value is gradually decreased to a minimum value, that is, the thirty-third memory statistical value min_buffer, and the current memory statistical value of the system still does not reach the thirty-third memory statistical value min_buffer, reclaim the thirty-second memory by killing a process, to convert the thirty-second memory into the thirty-first memory.

It may be understood that, the reporting module 3-23 is further configured to: monitor space usage of a swap area, and when current space usage of the swap area reaches a preset proportion, determine that a current memory pressure level of the system is the thirty-third level, and report a thirty-third level pressure event. The memory reclamation module 3-24 is further configured to reclaim the thirty-second memory based on the thirty-third level pressure event by killing the process, to convert the thirty-second memory into the thirty-first memory.

It may be understood that, the memory statistical value further includes a thirty-fourth memory statistical value, and the reporting module 3-23 is further configured to: monitor system resource pressure by using the PSI thread 3-212, and report a PSI pressure value when a current PSI value of the system is greater than a preset threshold. The memory reclamation module 3-24 is further configured to: w % ben the PSI pressure value is received and the current memory statistical value of the system is less than the thirty-fourth memory statistical value, reclaim the thirty-second memory by killing the process, to convert the thirty-second memory into the thirty-first memory.

It may be understood that the memory reclamation module 3-24 is further configured to detect whether a preset application is opened. When detecting that the preset application is opened and the current memory statistical value of the system is less than the thirty-first memory statistical value, the memory reclamation module 3-24 reclaims the thirty-second memory by killing the process, to convert the thirty-second memory into the thirty-first memory.

It may be understood that the memory reclamation module 3-24 may kill the process by outputting a corresponding kill command and based on the kill command. For example, each process is uniquely identified by a pid. The kill command may include a corresponding pid, so that the memory reclamation module 3-24 can kill a corresponding process based on the process identifier (pid).

It may be understood that division into the modules in the memory management apparatus 3-2000 is merely used as an example for description. In another embodiment, the memory management apparatus 3-200 may be divided into different modules based on a requirement, to implement all or some functions of the memory management apparatus 3-200.

Implementations of the modules in the memory management apparatus provided in this embodiment of this application may be in a form of a computer program. The computer program may run on an electronic device or a server. A program module formed by the computer program may be stored in a memory of the terminal or the server. When the computer program is executed by a processor, the steps described in embodiments of this application are implemented. For specific implementations of the modules in this embodiment of this application, refer to corresponding descriptions of the method embodiments shown in FIG. 3-2a(1) and FIG. 3-2a(2) to FIG. 3-5. In the memory management apparatus described in FIG. 3-6, problems that memory management efficiency is low, memory is not supplied in a timely manner, a quantity of keepalive applications is small, and the like can be effectively resolved. For specific content, refer to a specific embodiment of the foregoing memory management method. Details are not described herein again.

FIG. 3-7 is a schematic diagram of a partial system framework of a memory management apparatus 3-200 according to an embodiment of this application.

It may be understood that, in this embodiment of this application, descriptions are provided by using an example in which the reporting module 3-23 reports pressure by using the anonymous page compression thread 3-211, monitors system resource pressure by using the PSI thread 3-212, and reports a PSI pressure value when a current PSI value of a system is greater than a preset threshold.

The anonymous page compression thread 3-211 and the PSI thread 3-212 are disposed at a lower layer, for example, a kernel layer. The memory reclamation module 3-24 and the memory adjustment module 3-25 are disposed at an upper layer. The upper layer is a native layer or an application framework (FWK) layer.

It may be understood that, when a current memory statistical value of the system is less than the thirty-second memory statistical value low_buffer, the reporting module 3-23 reports a low-level pressure (low-level-press) event by using the anonymous page compression thread 3-211. When the upper layer receives the low-level pressure (low-level-press) event, the memory reclamation module 3-24 may deliver a corresponding reclamation parameter to the anonymous page compression thread 3-211, to indicate the anonymous page compression thread 3-211 to start compression processing, so as to perform memory reclamation.

After the memory reclamation module 3-24 performs one round of reclamation by using the anonymous page compression thread 3-211, if a current memory statistical value of the system does not reach the specified thirty-first memory statistical value high_buffer, the reporting module 3-23 reports a medium-level pressure (medium_level_press) event by using the anonymous page compression thread 3-211. When receiving the medium-level pressure (medium_level_press) event, the upper layer dynamically adjusts the memory statistical value by using the memory adjustment module 3-25.

When the upper layer receives the medium-level pressure (medium_level_press) event for a preset quantity of times (for example, n times) within a time window A, and the memory statistical value is adjusted to a minimum value, that is, is adjusted to the thirty-third memory statistical value min_buffer, if it is detected again that the current memory statistical value of the system still does not reach the thirty-third memory statistical value min_buffer, the reporting module 3-23 reports the medium-level pressure (medium_level_press) event again by using the anonymous page compression thread 3-211. Then, the upper layer outputs a corresponding kill command by using the memory reclamation module 3-24, to reclaim the thirty-second memory by killing a process, so as to adjust the memory statistical value to the thirty-third memory statistical value min_buffer.

In addition, in some embodiments, the reporting module 3-23 may further monitor space usage of a swap partition by using the anonymous page compression thread 3-211. When it is detected that current space usage of the swap partition has reached a specific proportion, it is difficult to continue to reclaim memory through anonymous page compression for the memory statistical value. In this case, the reporting module 3-23 reports a high-level pressure (critical_level_press) event by using the anonymous page compression thread 3-211. When receiving the high-level pressure (medium_level_press) event, the upper layer outputs a corresponding kill command by using the memory reclamation module 3-24, to reclaim the thirty-second memory by killing a process.

In addition, in some embodiments, the reporting module 3-23 may further monitor system resource pressure by using the PSI thread 3-212, and report PSI pressure when detecting that a current PSI pressure value is greater than a preset threshold. The upper layer receives the PSI pressure reporting event, and determines whether the current memory statistical value of the system is less than the thirty-fourth memory statistical value psi_buffer. When determining that the current memory statistical value of the system is less than the thirty-fourth memory statistical value psi_buffer, the upper layer outputs a corresponding kill command by using the memory reclamation module 3-24, to reclaim the thirty-second memory by killing a process.

In addition, in some embodiments, the upper layer may further detect whether a preset application is opened. When detecting that the preset application is opened, the upper layer further determines whether the current memory statistical value of the system is less than the thirty-first memory statistical value high_buffer. When determining that the current memory statistical value of the system is less than the thirty-first memory statistical value high_buffer, the upper layer outputs a corresponding kill command by using the memory reclamation module 3-24, to reclaim the thirty-second memory by killing a process.

It is clear that, the foregoing three levels of memory pressure scenarios, that is, a low level pressure (low-level-press) scenario, a medium level pressure (medium_level_press) scenario, and a high level pressure (critical_level_press) scenario, are closed separately, and a higher-level closed-loop is formed for management and control of a total memory watermark, finally implementing stable management of the memory watermark.

It may be understood that, in the foregoing memory management method, the anonymous page compression thread preliminarily maintains a watermark based on a multi-level memory statistical value, and reports memory pressure based on levels (a low level pressure (low-level-press) scenario, a medium level pressure (medium_level_press) scenario, and a high level pressure (critical_level_press) scenario) of a working status of the anonymous page compression thread. Under different levels of memory pressure, the upper layer performs adjustment, for example, adjusts a memory reclamation parameter, and dynamically adjusts a memory statistical value, to directly trigger a kill process, so that the memory statistical value can be efficiently maintained to improve application keepalive.

It may be understood that this embodiment of this application provides a kill method based on a user behavior model and an application model, to effectively improve kill efficiency and accuracy, maintain the memory statistical value, and improve application keepalive.

In an embodiment of this application, to better describe this application, refer to FIG. 3-8a and FIG. 3-8b. The following describes in detail a specific implementation process of this application by using a scenario in which large memory is required, for example, a scenario in which a camera application is opened as an example.

First, before the camera application is opened, a current memory statistical value of a system is in a monitoring state. If memory consumption exists in the current background or another application is being used, the current memory statistical value of the system may be already less than the thirty-second memory statistical value low_buffer, and the anonymous page compression thread is woken up.

When the anonymous page compression thread is woken up, the anonymous page compression thread reports a low level pressure (low_level_press) event. When the low level pressure (low_level_press) event is received, the upper layer delivers a reclamation parameter based on an application feature, to indicate the anonymous page compression thread to work, that is, compress an anonymous page to reclaim memory. Usually, when the anonymous page compression thread ends reclamation, the thirty-first memory statistical value high_buffer may be reached, to maintain a large memory watermark for subsequent opening of a camera.

When the camera application is opened, it is identified that the application is a large-memory-consumption application. When a camera opening message is received, it is determined whether the current memory statistical value of the system meets the thirty-first memory statistical value high_buffer, that is, it is determined whether the current memory statistical value of the system is less than the thirty-first memory statistical value high_buffer. When it is determined that the current memory statistical value of the system is less than the thirty-first memory statistical value high_buffer, the thirty-second memory is reclaimed by killing the process.

In this case, if a user uses the camera to record a video for a period of time, that is, the camera application is opened for a period of time, when the anonymous page compression thread ends reclamation, if it is determined that the current memory statistical value of the system still does not reach the specified thirty-first memory statistical value high_buffer, the anonymous page compression thread reports a medium level pressure (medium_level_press) event. In this way, when receiving the medium level pressure (medium_level_press) event, the upper layer decreases the memory statistical value based on a memory requirement until the memory statistical value is decreased to the thirty-third memory statistical value min_buffer.

It may be understood that, if the anonymous page compression thread still cannot be maintained after the memory statistical value is reduced to the thirty-third memory statistical value min_buffer, the medium level pressure (medium_level_press) event is reported again, to trigger kill, so that the upper layer calculates, based on the thirty-third memory threshold min_buffer and the current memory statistical value of the system, a quantity of processes that need to be killed, and sequentially kills processes based on a sequence in a killable list to reclaim memory until the current memory statistical value of the system is the thirty-third memory statistical value min_buffer.

Finally, when the camera application exits and switches back to the home screen, the upper layer increases the decreased memory statistical value again to the thirty-second memory statistical value low_buffer, to perform steady-state memory management.

It may be understood that, in some embodiments, when the camera application is opened, the camera consumes a large amount of memory in a short period of time to decrease the memory statistical value. Although the anonymous page compression thread may be woken up to perform memory reclamation, a process of decreasing the memory statistical value to the thirty-third memory statistical value min_buffer may be slow for camera opening. Therefore, in addition to kill triggered by opening of a large-memory application. PSI pressure reporting kill is a good supplement. That is, when the memory statistical value decreases, kill is also triggered in a timely manner.

It may be understood that, in some embodiments, in the foregoing process, if cold anonymous pages of a large quantity of applications are previously reclaimed, and space of the swap partition is full, the anonymous page compression thread in the kernel reports a high level pressure (critical_level_press) event. In this way, when the upper layer receives the high level pressure (critical_level_press) event, kill is also directly triggered.

It is clear that, the memory management method and apparatus in embodiments of this application have at least the following advantages:

(1) A new memory statistical value is created, the memory statistical value is calculated according to Formula (1) to provide an adjustable parameter for a ratio of active and inactive parts of a file page, and an available memory part of ION is added. The newly defined memory statistical value can more effectively reflect an available memory supply capability, and more effectively reflect a memory pressure status.

(2) Based on a multi-level memory statistical value, the multi-level memory statistical value is maintained through parallel compression of the anonymous page. Setting the multi-level memory statistical value can maintain a large memory statistical value when memory pressure is low, and can avoid low-efficiency reclamation or idleness caused because the anonymous page compression thread is frequently woken up when memory pressure is high. In this way, long-term stability of the memory statistical value can be efficiently maintained based on the memory pressure.

(3) A multi-level memory pressure reporting mechanism and a multi-dimensional kill mechanism are used. After memory pressure is reported based on maintenance on the memory statistical value by the anonymous page compression thread, a memory reclamation parameter is chosen to be adjusted, and a memory statistical value and kill are dynamically adjusted based on different levels of reported events, to form closed-loop memory statistical value management. This not only achieves optimal reclamation efficiency, but also provides necessary memory supply means for light-load and heavy-load memory scenarios to increase application keepalive.

(4) In a kill method based on a user behavior model and an application model, different kill methods are selected under different memory pressure, to quickly, effectively, and accurately maintain a target memory statistical value required by a corresponding scenario, and complete closed-loop memory management.

It may be understood that, to implement the foregoing functions, the electronic device includes a corresponding hardware structure and/or software module for performing each function. A person skilled in the art should be easily aware that units, algorithms, and steps in the examples described with reference to embodiments disclosed in this specification can be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

When an integrated unit is used, FIG. 3-9 is a possible schematic diagram of a structure of an electronic device related to the foregoing embodiments. The electronic device 300 includes a processing unit 3-301 and a storage unit 3-302.

The processing unit 3-301 is configured to: control and manage an action of the electronic device 300.

The storage unit 3-302 is configured to store instructions and data of the electronic device 300, where the instructions may be used to perform steps in FIG. 3-2a(1) and FIG. 3-2a(2) to FIG. 3-5 and corresponding embodiments.

An embodiment of this application may further provide a computer storage medium. The computer storage medium stores computer program code, and when the foregoing electronic device executes the computer program code, the electronic device may perform related method steps in FIG. 3-2a(1) and FIG. 3-2a(2) to FIG. 3-5, to implement the method in the foregoing embodiments.

An embodiment of this application may further provide a computer program product. When the computer program product runs on a computer, the computer is enabled to perform related method steps in FIG. 3-2a(1) and FIG. 3-2a(2) to FIG. 3-5, to implement the method in the foregoing embodiments.

It may be understood that the electronic device, the computer storage medium, and the computer program product provided in embodiments of this application each may be configured to perform the corresponding method provided above. Therefore, for beneficial effects that can be achieved by the electronic device, the computer storage medium, and the computer program product, refer to the beneficial effects in the corresponding method provided above. Details are not described herein again.

Based on the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed system and method may be implemented in another manner. For example, the described system embodiments are merely examples. For example, division into the modules or units is merely logical function division, and may be other division in an actual implementation. For example, a plurality of units or components may be combined or may be integrated into another system, or some features may be ignored or not be performed. In addition, the displayed or discussed mutual coupling or direct coupling or communication connection may be implemented through some interfaces. The indirect coupling or communication connection between the apparatuses or units may be implemented in electrical, mechanical, or another form.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a ROM, a magnetic disk, or an optical disc.

It may be understood that a memory status of a current embedded device such as a mobile terminal is increasingly different from a memory status of a fixed terminal or a server. A memory management and control policy applicable to a server may not work well on a mobile terminal device. In addition, new user experience of the mobile terminal also poses a new requirement for memory management and control. For example, a camera device configuration upgrade has an increasingly high requirement for memory. In this case, Android (Android) has made a lot of adjustments to a memory requirement feature of the mobile terminal. Currently, an Android memory management method is mainly memory watermark management and control based on MemFree. In this solution, a memory watermark does not include memory that can be obtained through quick reclamation. When MemFree is low, memory pressure is already very high, and an occasion for triggering reclamation and kill is delayed, which not only affects application keepalive, but may even cause a panic due to out of memory (Out Of Memory, OOM), affecting user experience. MemFree refers to an amount of free memory, indicating a capacity of remaining memory space that is not allocated and that is in a free state in the entire memory space of the system. MemUsed=MemTotal-MemFree, where MemUsed indicates used memory. For example, a total size of memory space of an electronic device is 4G, where 3G is allocated to one or more running processes for use, and the other 1G is in a free state. In this case, a current amount of free memory of the electronic device is 1G. MemTotal refers to a total amount of memory. From a time point at which the system is powered on to a time point at which the system is booted, some memory needs to be reserved for a BIOS or the like, some memory needs to be reserved for a kernel, and remaining memory that can be used by the system is MemTotal. This value is usually fixed during system running.

In addition, there is also a memory management method based on MemAvailable. In the method, a watermark is maintained mainly through kill. However, if the watermark is set to a large value, overkill may easily occur when memory pressure is low, affecting keepalive. If the watermark is set to a small value, a same problem as the MemFree watermark management and control still occurs when memory pressure is too high. For example, in a scenario in which a large amount of memory is required and a high speed is required, for example, in a scenario such as a camera or a game, overkill may occur due to out of memory, or even an application fails to respond due to a slow memory allocation speed, which severely affects user experience. In addition, settings of a MemAvailable watermark are sensitive. Different devices have different memory requirements. Therefore, it is difficult to unify watermarks. In addition, in the second method, in addition to kill, some memory reclamation actions are also performed. However, only an upper layer unidirectionally guides memory reclamation, and consequently a unified closed-loop cannot be formed, and efficiency and an effect of memory reclamation cannot be ensured. This may easily cause a power consumption problem caused by frequent reclamation start, a reclamation efficiency problem caused by reclamation idleness, and a refault problem caused by excessive reclamation. As a result, the memory watermark cannot be effectively maintained, which causes higher pressure on the system. MemAvailable refers to an amount of available memory. Some memory in the system can be reclaimed although the memory is used. For example, some of cache/buffer and slab can be reclaimed. Therefore, MemFree cannot represent all available memory. The memory that can be reclaimed plus MemFree is the available memory of the system, that is, MemAvailable≈MemFree+Buffers+Cached, which is calculated by the kernel by using a specific algorithm and is an estimated value.

Embodiments of this application provide a memory management method and apparatus, an electronic device, and a computer-readable storage medium, to resolve problems that memory management efficiency is low, memory is not supplied in a timely manner, and a quantity of keepalive applications is small.

It may be understood that the memory management method provided in embodiments of this application may be performed by the memory management apparatus provided in embodiments of this application, or the electronic device integrated with the memory management apparatus. The memory management apparatus may be implemented by using hardware or software. The electronic device may also be referred to as user equipment (User Equipment, UE), a mobile station (Mobile Station, MS), a mobile terminal (Mobile Terminal), or the like. Optionally, the electronic device may have a capability of communicating with one or more core networks through a radio access network (Radio Access Network, RAN). For example, the electronic device may be a mobile phone (or referred to as a "cellular" phone), a tablet computer, a palmtop computer, a notebook computer, or a desktop computer. An operating system of the electronic device may include but is not limited to a Linux system, an Android (Android) system, an iOS operating system, a Symbian (Symbian) operating system, a BlackBerry (BlackBerry) operating system, a Windows Phone 8 operating system, and the like. It may be understood that the memory management method provided in embodiments of this application is mainly applied to an electronic device having an Android operating system.

For example, a mobile phone is the foregoing electronic device. FIG. 3-1 is a schematic diagram of a structure of an electronic device 3-100.

As shown in FIG. 3-1, the electronic device 3-100 may include a processor 3-110, an external memory interface 3-120, an internal memory 3-121, a universal serial bus (universal serial bus, USB) port 3-130, a charging management module 3-140, a power management module 3-141, a battery 3-142, an antenna 3-1, an antenna 3-2, a mobile communications module 3-150, a wireless communications module 3-160, an audio module 3-170, a speaker 3-170A, a receiver 3-170B, a microphone 3-170C, a headset jack 3-170D, a sensor module 3-180, a button 3-190, a motor 3-191, an indicator 3-192, a camera 3-193, a display 3-194, a subscriber identification module (subscriber identification module, SIM) card interface 3-195, and the like. The sensor module 3-180 may include a pressure sensor 3-180A, a gyro sensor 3-180B, a barometric pressure sensor 3-180C, a magnetic sensor 3-180D, an acceleration sensor 3-180E, a distance sensor 3-180F, an optical proximity sensor 3-180G, a fingerprint sensor 3-180H, a temperature sensor 3-180J, a touch sensor 3-180K, an ambient light sensor 3-180L, a bone conduction sensor 3-180M, and the like.

It may be understood that the structure shown in this embodiment of this application does not constitute a specific limitation on the electronic device 3-100. In some other embodiments of this application, the electronic device 3-100 may include more or fewer components than those shown in the figure, or combine some components, or split some components, or have different component arrangements. The components shown in the figure may be implemented by hardware, software, or a combination of software and hardware.

The processor 3-110 may include one or more processing units. For example, the processor 3-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 3-110, and is configured to store instructions and data. In some embodiments, the memory in the processor 3-110 is a cache. The memory may store instructions or data that has been used or cyclically used by the processor 3-110. If the processor 3-110 needs to use the instructions or the data again, the processor may directly invoke the instructions or the data from the memory. This avoids repeated access, reduces waiting time of the processor 3-110, and improves system efficiency.

In some embodiments, the processor 3-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/ transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus. USB) port, and/or the like.

The I2C interface is a two-way synchronization serial bus, and includes a serial data line (serial data line, SDA) and a serial clock line (serial clock line, SCL). In some embodiments, the processor 3-110 may include a plurality of groups of I2C buses. The processor 3-110 may be separately coupled to the touch sensor 3-180K, a charger, a flash, the camera 3-193, and the like through different I2C bus interfaces. For example, the processor 3-110 may be coupled to the touch sensor 3-180K through an I2C interface, so that the processor 3-110 communicates with the touch sensor 3-180K through the I2C bus interface, to implement a touch function of the electronic device 3-100.

The I2S interface may be used for audio communication. In some embodiments, the processor 3-110 may include a plurality of groups of I2S buses. The processor 3-110 may be coupled to the audio module 3-170 through the I2S bus, to implement communication between the processor 3-110 and the audio module 3-170. In some embodiments, the audio module 3-170 may transfer an audio signal to the wireless communications module 3-160 through the I2S interface, to implement a function of answering a call by using a Bluetooth headset.

The PCM interface may also be used for audio communication, and samples, quantizes, and codes an analog signal. In some embodiments, the audio module 3-170 may be coupled to the wireless communications module 3-160 through a PCM bus interface. In some embodiments, the audio module 3-170 may alternatively transfer an audio signal to the wireless communications module 3-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 3-110 to the wireless communications module 3-160. For example, the processor 3-110 communicates with a Bluetooth module in the wireless communications module 3-160 through the UART interface, to implement a Bluetooth function. In some embodiments, the audio module 3-170 may transfer an audio signal to the wireless communications module 3-160 through the UART interface, to implement a function of playing music by using a Bluetooth headset.

The MIPI may be configured to connect the processor 3-110 to a peripheral component such as the display 3-194 or the camera 3-193. The MIPI includes a camera serial interface (camera serial interface, CSI), a display serial interface (display serial interface. DSI), and the like. In some embodiments, the processor 3-110 communicates with the camera 3-193 through the CSI, to implement a photographing function of the electronic device 3-100. The processor 3-110 communicates with the display 3-194 through the DSI, to implement a display function of the electronic device 3-100.

The GPIO interface may be configured by using software. The GPIO interface may be configured as a control signal or a data signal. In some embodiments, the GPIO interface may be configured to connect the processor 3-110 to the camera 3-193, the display 3-194, the wireless communications module 3-160, the audio module 3-170, the sensor module 3-180, and the like. The GPIO interface may alternatively be configured as an I2C interface, an I2S interface, a UART interface, an MIPI, or the like.

The USB port 3-130 is a port that conforms to a USB standard specification, and may be specifically a mini USB port, a micro USB port, a USB Type-C port, or the like. The USB port 3-130 may be configured to connect to a charger to charge the electronic device 3-100, or may be configured to transmit data between the electronic device 3-100 and a peripheral device, or may be configured to connect to a headset for playing an audio through the headset. The port may alternatively be configured to connect to another electronic device such as an AR device.

It may be understood that an interface connection relationship between modules in this embodiment of this application is merely an example for description, and does not constitute a limitation on the structure of the electronic device 3-100. In some other embodiments of this application, the electronic device 3-100 may alternatively use an interface connection manner different from that in the foregoing embodiment, or a combination of a plurality of interface connection manners.

The charging management module 3-140 is configured to receive a charging input from a charger. The charger may be a wireless charger or a wired charger. In some embodiments of wired charging, the charging management module 3-140 may receive a charging input from the wired charger through the USB port 3-130. In some embodiments of wireless charging, the charging management module 3-140 may receive a wireless charging input through a wireless charging coil of the electronic device 3-100. When charging the battery 3-142, the charging management module 3-140 may further supply power to the electronic device by using the power management module 3-141.

The power management module 3-141 is configured to connect to the battery 3-142, the charging management module 3-140, and the processor 3-110. The power management module 3-141 receives an input of the battery 3-142 and/or an input of the charging management module 3-140, and supplies power to the processor 3-110, the internal memory 3-121, the display 3-194, the camera 3-193, the wireless communications module 3-160, and the like. The power management module 3-141 may be further configured to monitor parameters such as a battery capacity, a battery cycle count, and a battery health status (electricity leakage or impedance). In some other embodiments, the power management module 3-141 may alternatively be disposed in the processor 3-110. In some other embodiments, the power management module 3-141 and the charging management module 3-140 may alternatively be disposed in a same device.

A wireless communication function of the electronic device 3-100 may be implemented by using the antenna 3-1, the antenna 3-2, the mobile communications module 3-150, the wireless communications module 3-160, the modem processor, the baseband processor, and the like.

The antenna 3-1 and the antenna 3-2 are configured to: transmit and receive electromagnetic wave signals. Each antenna in the electronic device 3-100 may be configured to cover one or more communication frequency bands. Different antennas may be further multiplexed, to increase antenna utilization. For example, the antenna 3-1 may be multiplexed as a diversity antenna in a wireless local area network. In some other embodiments, the antenna may be used in combination with a tuning switch.

The mobile communications module 3-150 may provide a wireless communication solution that includes 2G/3G/4G/5G or the like and that is applied to the electronic device 3-100. The mobile communications module 3-150 may include at least one filter, a switch, a power amplifier, a low noise amplifier (low noise amplifier, LNA), and the like. The mobile communications module 3-150 may receive an electromagnetic wave through the antenna 3-1, perform processing such as filtering or amplification on the received electromagnetic wave, and transmit the electromagnetic wave to the modem processor for demodulation. The mobile communications module 3-150 may further amplify a signal modulated by the modem processor, and convert an amplified signal into an electromagnetic wave for radiation through the antenna 3-1. In some embodiments, at least some functional modules in the mobile communications module 3-150 may be disposed in the processor 3-110. In some embodiments, at least some functional modules in the mobile communications module 3-150 may be disposed in a same device as at least some modules in the processor 3-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 3-170A, the receiver 3-170B, or the like), or displays an image or a video through the display 3-194. In some embodiments, the modem processor may be an independent device. In some other embodiments, the modem processor may be independent of the processor 3-110, and is disposed in a same device as the mobile communications module 3-150 or another functional module.

The wireless communications module 3-160 may provide a wireless communication solution that includes a wireless local area network (wireless local area network. WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 3-100. The wireless communications module 3-160 may be one or more components that integrate at least one communications processor module. The wireless communications module 3-160 receives an electromagnetic wave through the antenna 3-2, performs frequency modulation and filtering processing on the electromagnetic wave signal, and sends a processed signal to the processor 3-110. The wireless communications module 3-160 may further receive a to-be-sent signal from the processor 3-110, perform frequency modulation and amplification on the signal, and convert a processed signal into an electromagnetic wave for radiation through the antenna 3-2.

In some embodiments, the antenna 3-1 and the mobile communications module 3-150 in the electronic device 3-100 are coupled, and the antenna 3-2 and the wireless communications module 3-160 in the electronic device 3-100 are coupled, so that the electronic device 3-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 3-100 may implement a display function through the GPU, the display 3-194, the application processor, and the like. The GPU is a microprocessor for image processing, and is connected to the display 3-194 and the application processor. The GPU is configured to: perform mathematical and geometric calculation, and render an image. The processor 3-110 may include one or more GPUs that execute program instructions to generate or change display information.

The display 3-194 is configured to display an image, a video, and the like. The display 3-194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode. QLED), or the like. In some embodiments, the electronic device 3-100 may include one or N displays 3-194, where N is a positive integer greater than 1.

The electronic device 3-100 may implement a photographing function through the ISP, the camera 3-193, the video codec, the GPU, the display 3-194, the application processor, and the like.

The ISP is configured to process data fed back by the camera 3-193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 3-193.

The camera 3-193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 3-100 may include one or N cameras 3-193, where N is a positive integer greater than 1.

The digital signal processor is configured to process a digital signal, and may further process another digital signal in addition to a digital image signal. For example, when the electronic device 3-100 selects a frequency, the digital signal processor is configured to perform Fourier transform or the like on frequency energy.

The video codec is configured to: compress or decompress a digital video. The electronic device 3-100 may support one or more video codecs. In this way, the electronic device 3-100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 3-100, such as image recognition, facial recognition, speech recognition, and text understanding.

The internal memory 3-121 may include one or more random access memories (random access memory, RAM) and one or more non-volatile memories (non-volatile memory, NVM).

The random access memory may include a static random access memory (static random access memory. SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (universal flash storage, UFS), an embedded multimedia card (embedded multimedia Card, eMMC), and the like according to storage specifications.

The random access memory may be directly read and written by using the processor 3-110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 3-110.

The external memory interface 3-120 may be configured to connect to an external non-volatile memory, to extend a storage capability of the electronic device 3-100. The external non-volatile memory communicates with the processor 3-110 through the external memory interface 3-120, to implement a data storage function. For example, files such as music and videos are stored in the external non-volatile memory.

The electronic device 3-100 may implement audio functions, for example, music playing and recording, by using the audio module 3-170, the speaker 3-170A, the receiver 3-170B, the microphone 3-170C, the headset jack 3-170D, the application processor, and the like.

The audio module 3-170 is configured to convert digital audio information into an analog audio signal for output, and is also configured to convert an analog audio input into a digital audio signal. The audio module 3-170 may be further configured to: code and decode an audio signal. In some embodiments, the audio module 3-170 may be disposed in the processor 3-110, or some functional modules in the audio module 3-170 are disposed in the processor 3-110.

The speaker 3-170A, also referred to as a "horn", is configured to convert an electrical audio signal into a sound signal. The electronic device 3-100 may be used to listen to music or answer a call in a hands-free mode over the speaker 3-170A.

The receiver 3-170B, also referred to as an "earpiece", is configured to convert an electrical audio signal into a sound signal. When a call is answered or speech information is received through the electronic device 3-100, the receiver 3-170B may be put close to a human ear to listen to a voice.

The microphone 3-170C, also referred to as a "mike" or a "mic", is configured to convert a sound signal into an electrical signal. When making a call or sending voice information, a user may make a sound near the microphone 3-170C through the mouth of the user, to input the sound signal to the microphone 3-170C. At least one microphone 3-170C may be disposed in the electronic device 3-100. In some other embodiments, two microphones 3-170C may be disposed in the electronic device 3-100, to implement a noise reduction function in addition to collecting a sound signal. In some other embodiments, three, four, or more microphones 3-170C may alternatively be disposed in the electronic device 3-100, to collect a sound signal, reduce noise, identify a sound source, implement a directional recording function, and the like.

The headset jack 3-170D is configured to connect to a wired headset. The headset jack 3-170D may be the USB port 3-130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 3-180A is configured to sense a pressure signal, and may convert the pressure signal into an electrical signal. In some embodiments, the pressure sensor 3-180A may be disposed on the display 3-194. There are many types of pressure sensors 3-180A, for example, a resistive pressure sensor, an inductive pressure sensor, and a capacitive pressure sensor. The capacitive pressure sensor may include at least two parallel plates with conductive materials. When a force is applied to the pressure sensor 3-180A, capacitance between electrodes changes. The electronic device 3-100 determines pressure intensity based on the change of the capacitance. When a touch operation is performed on the display 3-194, the electronic device 3-100 detects intensity of the touch operation based on the pressure sensor 3-180A. The electronic device 3-100 may also calculate a touch location based on a detection signal of the pressure sensor 3-180A In some embodiments, touch operations that are performed at a same touch location but have different touch operation intensity may correspond to different operation instructions. For example, when a touch operation whose touch operation intensity is less than a thirty-first pressure threshold is performed on a Messages icon, an instruction for viewing an SMS message is executed. When a touch operation whose touch operation intensity is greater than or equal to the thirty-first pressure threshold is performed on the Messages icon, an instruction for creating a new SMS message is executed.

The gyro sensor 3-180B may be configured to determine a motion posture of the electronic device 3-100. In some embodiments, an angular velocity of the electronic device 3-100 around three axes (that is, axes x, y, and z) may be determined through the gyro sensor 3-180B. The gyro sensor 3-180B may be configured to implement image stabilization during photographing. For example, when the shutter is pressed, the gyro sensor 3-180B detects an angle at which the electronic device 3-100 jitters, calculates, based on the angle, a distance for which a lens module needs to compensate, and allows the lens to cancel the jitter of the electronic device 3-100 through reverse motion, to implement image stabilization. The gyro sensor 3-180B may also be used in a navigation scenario and a motion-sensing gaming scenario.

The barometric pressure sensor 3-180C is configured to measure barometric pressure. In some embodiments, the electronic device 3-100 calculates an altitude based on a value of the barometric pressure measured by the barometric pressure sensor 3-180C, to assist in positioning and navigation.

The magnetic sensor 3-180D includes a Hall sensor. The electronic device 3-100 may detect opening and closing of a flip leather case by using the magnetic sensor 3-180D. In some embodiments, when the electronic device 3-100 is a clamshell phone, the electronic device 3-100 may detect opening and closing of a flip cover by using the magnetic sensor 3-180D. Further, a feature such as automatic unlocking upon opening of the flip cover is set based on a detected opening or closing state of the flip cover.

The acceleration sensor 3-180E may detect magnitudes of accelerations of the electronic device 3-100 in various directions (usually on three axes), and may detect a magnitude and a direction of gravity when the electronic device 3-100 is still. The acceleration sensor may be further configured to recognize a posture of the electronic device, and is used in an application such as switching between landscape mode and portrait mode or a pedometer.

The distance sensor 3-180F is configured to measure a distance. The electronic device 3-100 may measure the distance in an infrared manner or a laser manner. In some embodiments, in a photographing scenario, the electronic device 3-100 may measure a distance through the distance sensor 3-180F to implement quick focusing.

The optical proximity sensor 3-180G may include, for example, a light-emitting diode (LED) and an optical detector, for example, a photodiode. The light-emitting diode may be an infrared light-emitting diode. The electronic device 3-100 emits infrared light by using the light-emitting diode. The electronic device 3-100 detects infrared reflected light from a nearby object by using the photodiode. When detecting sufficient reflected light, the electronic device 3-100 may determine that there is an object near the electronic device 3-100. When detecting insufficient reflected light, the electronic device 3-100 may determine that there is no object near the electronic device 3-100. The electronic device 3-100 may detect, by using the optical proximity sensor 3-180G, that the user holds the electronic device 3-100 close to an ear to make a call, to automatically turn off a screen for power saving. The optical proximity sensor 3-180G may also be used in a flip cover mode or a pocket mode to automatically perform screen unlocking or locking.

The ambient light sensor 3-180L is configured to sense ambient light brightness. The electronic device 3-100 may adaptively adjust brightness of the display 3-194 based on the sensed ambient light brightness. The ambient light sensor 3-180L may also be configured to automatically adjust white balance during photographing. The ambient light sensor 3-180L may further cooperate with the optical proximity sensor 3-180G to detect whether the electronic device 3-100 is in a pocket, to avoid an accidental touch.

The fingerprint sensor 3-180H is configured to collect a fingerprint. The electronic device 3-100 may use a feature of the collected fingerprint to implement fingerprint-based unlocking, application lock access, fingerprint-based photographing, fingerprint-based call answering, and the like.

The temperature sensor 3-180J is configured to detect a temperature. In some embodiments, the electronic device 3-100 executes a temperature processing policy by using the temperature detected by the temperature sensor 3-180J. For example, when the temperature reported by the temperature sensor 3-180J exceeds a threshold, the electronic device 3-100 lowers performance of a processor near the temperature sensor 3-180J, to reduce power consumption for thermal protection. In some other embodiments, when the temperature is less than another threshold, the electronic device 3-100 heats the battery 3-142 to prevent the electronic device 3-100 from being abnormally powered off because of a low temperature. In some other embodiments, when the temperature is less than still another threshold, the electronic device 3-100 boosts an output voltage of the battery 3-142 to avoid abnormal shutdown caused by a low temperature.

The touch sensor 3-180K is also referred to as a "touch component". The touch sensor 3-180K may be disposed on the display 3-194, and the touch sensor 3-180K and the display 3-194 form a touchscreen. The touch sensor 3-180K is configured to detect a touch operation performed on or near the touch sensor. The touch sensor may transfer a detected touch operation to the application processor, to determine a type of a touch event. A visual output related to the touch operation may be provided through the display 3-194. In some other embodiments, the touch sensor 3-180K may alternatively be disposed on a surface of the electronic device 3-100 and is located at a location different from that of the display 3-194.

The bone conduction sensor 3-180M may obtain a vibration signal. In some embodiments, the bone conduction sensor 3-180M may obtain a vibration signal of a vibration bone of a human vocal-cord part. The bone conduction sensor 3-180M may also be in contact with a body pulse to receive a blood pressure beating signal. In some embodiments, the bone conduction sensor 3-180M may also be disposed in a headset, to form a bone conduction headset. The audio module 3-170 may obtain a voice signal through parsing based on the vibration signal that is of the vibration bone of the vocal part and that is obtained by the bone conduction sensor 3-180M, to implement a voice function. The application processor may parse heart rate information based on the blood pressure beating signal obtained by the bone conduction sensor 3-180M, to implement a heart rate detection function.

The button 3-190 includes a power button, a volume button, and the like. The button 3-190 may be a mechanical button, or may be a touch button. The electronic device 3-100 may receive a key input, and generate a key signal input related to a user setting and function control of the electronic device 3-100.

The motor 3-191 may generate a vibration prompt. The motor 3-191 may be configured to provide an incoming call vibration prompt and a touch vibration feedback. For example, touch operations performed on different applications (for example, photographing and audio playing) may correspond to different vibration feedback effects. The motor 3-191 may also correspond to different vibration feedback effects for touch operations performed on different areas of the display 3-194. Different application scenarios (for example, a time reminder scenario, an information receiving scenario, an alarm clock scenario, and a game scenario) may also correspond to different vibration feedback effects. The touch vibration feedback effect may also be customized.

The indicator 3-192 may be an indicator light, and may be configured to indicate a charging status and a power change, or may be configured to indicate a message, a missed call, a notification, and the like.

The SIM card interface 3-195 is configured to connect to a SIM card. The SIM card may be inserted into the SIM card interface 3-195 or removed from the SIM card interface 3-195, to implement contact with or separation from the electronic device 3-100. The electronic device 3-100 may support one or N SIM card interfaces, where N is a positive integer greater than 1. The SIM card interface 3-195 may support a nano-SIM card, a micro-SIM card, a SIM card, and the like. A plurality of cards may be simultaneously inserted into a same SIM card interface 3-195. The plurality of cards may be of a same type or of different types. The SIM card interface 3-195 is compatible with different types of SIM cards. The SIM card interface 3-195 is also compatible with an external storage card. The electronic device 3-100 interacts with a network through the SIM card, to implement functions such as calling and data communication. In some embodiments, the electronic device 3-100 uses an eSIM, that is, an embedded SIM card. The eSIM card may be embedded in the electronic device 3-100, and cannot be separated from the electronic device 3-100.

With reference to the accompanying drawings, the following describes, in detail by using an example in which an execution body is an electronic device 3-100, a memory management method provided in embodiments of this application.

FIG. 3-2*a*(1) and FIG. 3-2*a*(2) are a schematic flowchart of a memory management method according to an embodiment of this application. As shown in FIG. 3-2*a*(I) and FIG. 3-2*a*(2), the memory management method may include S3-20 to S3-211.

Step S3-20: Create a memory statistical value and a memory pressure level.

It may be understood that the memory statistical value is used to represent remaining available memory in system memory of an electronic device, and is usually represented by a watermark (watermark) parameter. For example, a lower memory watermark indicates less remaining available system memory. A watermark (watermark) is an array in a memory management zone, and the memory watermark usually includes three watermark values, that is, WMARK_HIGH (high watermark), WMARK_LOW (low watermark), and WMARK_MIN (minimum watermark), where WMARK_HIGH>WMARK_LOW>WMARK_MIN. Usually, the watermark needs to be checked before a page (page) is allocated. For example, when a free page is greater than WMARK_HIGH, it indicates that a system memory status of the electronic device is ideal, and memory reclamation does not need to be performed temporarily. When the free page is less than WMark_LOW, it indicates that the system memory of the electronic device is insufficient, and memory reclamation needs to be performed. When the free page is less than WMark_MIN, it indicates that the system memory of the electronic device is seriously insufficient. For example, there are few available free pages in a memory domain, and therefore memory reclamation needs to be accelerated.

It may be understood that available memory in this embodiment of this application includes two parts, for example, thirty-first memory and thirty-second memory. The thirty-first memory refers to free memory of a system. The free memory is memory that is not used by the system, that is, MemFree. The thirty-second memory is occupied memory that can be converted into the thirty-first memory through reclamation. The occupied memory is mainly memory occupied by a currently running process and service and memory occupied by running a kernel.

It may be understood that, refer to Formula (1). The memory watermark defined in this embodiment of this application may be obtained by using Formula (1).

$$\text{buffer=freemem}+\alpha^*\text{inactive\_file}+\beta^*\text{active\_file}+\text{ion\_cache} \quad (1)$$

Buffer is an amount of buffer memory, which is also referred to as write-buffer and is usually used in a write operation. Cache is an amount of cache memory, which is also referred to as read-cache and is usually used in a read operation.

In this embodiment of this application, the parameter buffer is the memory watermark. The parameter freemem is free memory in the thirty-first memory. The parameter inactive_file is inactive file memory. The parameter active_file is active file memory. The parameter ion_cache is available memory (cache) of an ION memory manager. The cache (cache) stores read data. If the data is hit (required data is found) during re-reading, a hard disk does not need to be read. If the data is not hit, a hard disk is read. The parameters inactive_file, active_file, and ion_cache jointly constitute occupied memory that can be supplied through reclamation in the thirty-second memory. The parameters $\alpha$ and $\beta$ are adjustable parameters. Specifically, the parameters $\alpha$ and $\beta$ may be correspondingly adjusted according to specifications of different products, that is, different proportions or discounts are selected.

It may be understood that, in this embodiment of this application, the thirty-first memory and the thirty-second memory are not limited. For example, the thirty-second memory may alternatively be other occupied memory that can be supplied or reclaimed, and is not limited to the inactive file memory and/or the active file memory.

It may be understood that, according to Formula (1), the memory statistical value is created by comprehensively considering supply of memory that can be quickly reclaimed, and an adjustable parameter for supply of a file page (file page) is provided, so that the memory statistical value is set more properly. That is, the memory statistical value can more effectively reflect an available memory supply capability, and more effectively reflect a memory pressure status.

It may be understood that, in this embodiment of this application, the memory statistical value includes a thirty-first memory statistical value, a thirty-second memory statistical value, and a thirty-third memory statistical value. The thirty-first memory statistical value corresponds to WMARK_High in the watermark (watermark), and is collectively referred to as high_buffer below. The thirty-second memory statistical value may correspond to WMARK_LOW in the watermark (watermark), and is collectively referred to as low_buffer below. The thirty-third memory statistical value corresponds to WMARK_MIN in the watermark (watermark), and is collectively referred to as min_buffer below. The thirty-second memory statistical value is less than the thirty-first memory statistical value. The thirty-third memory statistical value is less than the thirty-second memory statistical value.

It may be understood that, in this embodiment of this application, the memory pressure level includes a thirty-first level, a thirty-second level, and a thirty-third level. The electronic device may further preset the memory pressure level. For example, the thirty-first level corresponds to a low level, the thirty-second level corresponds to a medium level, and the thirty-third level corresponds to a high level. The high level (critical_level_press) indicates that memory pressure is high, the medium level (medium_level_press) indicates that memory pressure is moderate, and the low level (low_level_press) indicates that memory pressure is low. That is, the memory pressure of the thirty-third level is higher than the memory pressure of the thirty-second level, and the memory pressure of the thirty-second level is higher than the memory pressure of the thirty-first level. The memory pressure level may be determined based on a current memory statistical value of the system. For example, if the current memory statistical value of the system is less than the thirty-second memory statistical value, it may be determined that a current memory pressure level of the system is the thirty-first level (for example, the low level). After system memory is reclaimed, if the current memory statistical value of the system is less than the thirty-first memory statistical value, it may be determined that a current memory pressure level of the system is a thirty-second level (for example, the medium level). When the current memory statistical value of the system is less than the thirty-third memory statistical value, it may be determined that a current memory pressure level of the system is the thirty-third level (for example, the high level).

Optionally, the memory statistical value may be statically preset. Specifically, there are the following cases:
(1) Configure the Memory Statistical Value According to a Product Specification.

For a 2G/3G/4G/6G random access memory (Random Access Memory, RAM) product, the memory statistical value varies accordingly with the available memory of the system. For example, for a 3G RAM product, the memory statistical value may be configured to be 600 MB; and for a 4G RAM product, the memory statistical value may be configured to be 700 MB.
(2) Configure a Minimum Memory Statistical Value Based on an Application Scenario.

Memory consumption varies with applications and scenarios. Therefore, to configure a proper memory statistical value, Manner (1) has some disadvantages, which may cause frame freezing when a third-party application is started because the application is not considered. To resolve this problem, the top third-party applications in an application market may be analyzed in offline manner to obtain maximum memory usage information of each application in each scenario, and set the memory statistical value to maximum occupied memory of the application.

For another example, considering that screen-off background power consumption needs to be reduced in a screen-off scenario, and a memory impact scenario caused by centralized application wakeup at a screen-on moment needs to be resolved, the memory statistical value may be set to two different values in the screen-off scenario and the screen-on scenario respectively, and a memory statistical value in the screen-off scenario is less than a memory statistical value in the screen-on scenario. For example, a thirty-first memory statistical value in the screen-off scenario is less than a thirty-first memory statistical value in the screen-on scenario. A thirty-second memory statistical value in the screen-off scenario is less than a thirty-second memory statistical value in the screen-on scenario. A thirty-third memory statistical value in the screen-off scenario is less than a thirty-third memory statistical value in the screen-on scenario.
(3) Configure the Memory Statistical Value Based on Historical Occupied Memory of a System Running Process.

Because each user has characteristics of the user, after a terminal is used for a long time, applications installed and running on the terminal are inconsistent, and therefore the memory statistical value may be configured based on the historical occupied memory of the system running process. Specifically, historical status information (procstats) of memory usage during running of each process may be queried when the terminal is not used by the user (for example, at midnight), to obtain maximum memory usage information (for example, an application name and maximum occupied memory). Further, the maximum occupied memory is compared with a current memory statistical value of the system. If the maximum occupied memory is greater than the current memory statistical value of the system, the maximum occupied memory is selected as a new memory statistical value of the system.
(4) Configure the Memory Statistical Value Through Cloud Delivery.

A cloud server may collect, based on an identifier of the terminal, information about memory occupied by all applications running on the terminal in each scenario, form a form by using information such as a name of an application whose occupied memory is greater than a preset value (for example, 300 MB) and a current running scenario of the application, and push the form to the terminal periodically (for example, every month). After receiving the form, the terminal traverses application information in the form and a local application list, determines maximum memory usage information of applications installed on the terminal, and further compares maximum occupied memory with a current memory statistical value of the system; and if the maximum occupied memory is greater than the current memory statistical value of the system, selects the maximum occupied memory as a new memory statistical value of the system.

Optionally, the memory statistical value may alternatively be dynamically configured.

Specifically, an application that is most likely to run next may be predicted based on information such as a user use habit, an application use history, a use frequency, and use duration according to a prediction algorithm by using a user behavior analysis algorithm, and an application list is formed, to obtain maximum memory that needs to be used by an application in the application list, and compare the maximum memory with a current memory statistical value of the system. If the maximum memory is greater than the current memory statistical value of the system, the maximum memory is selected as a new memory statistical value of the system.

Step S3-21: Monitor the current memory statistical value of the system.

Step S3-22: Determine whether the current memory statistical value of the system is less than the thirty-second memory statistical value low_buffer; and if it is determined that the current memory statistical value of the system is less than the thirty-second memory statistical value low_buffer, perform step S3-23, or if it is determined that the current memory statistical value of the system is not less than the thirty-second memory statistical value low_buffer, perform step S3-21, that is, continue to monitor the current memory statistical value of the system.

Step S3-23: When it is determined that the current memory statistical value of the system is less than the thirty-second memory statistical value low_buffer, wake up an anonymous page compression thread, to prepare to reclaim memory.

It may be understood that, when performing memory compression processing, the kernel usually selects an anonymous page as an object of memory compression processing. The anonymous page is a memory page of heap memory dynamically allocated by an application. The anonymous page may be accessed again and cannot be directly reclaimed. Therefore, the memory cannot be directly released. Therefore, memory compression is used to indirectly release occupied memory space. For example, an anonymous page in an allocated memory page is first determined, a specific quantity of memory pages is selected from all anonymous pages as a target memory page, and the target memory page is compressed, to increase free memory.

Step S3-24: Determine that the current memory pressure level of the system is the thirty-first level and report a thirty-first level pressure event (for example, a low level pressure (low_level_press) event) to an upper layer.

Step S3-25: The upper layer receives the low level pressure (low_level_press) event, and configures a reclamation parameter and delivers the reclamation parameter to the anonymous page compression thread based on an application feature, to indicate the anonymous page compression thread to reclaim memory.

Step S3-26: Receive the reclamation parameter, and start compression processing based on the reclamation parameter by using the anonymous page compression thread, to reclaim memory that is, reclaim the thirty-second memory, so as to convert the thirty-second memory into the thirty-first memory.

It may be understood that the upper layer may be a native layer or an application framework (FWK) layer.

It may be understood that the reclamation parameter includes but is not limited to a quantity of target memory pages, a priority of reclaiming a target memory page, a memory reclamation ratio (ratio), and/or the like. The quantity of target memory pages may be determined based on a current memory statistical value of the system and the thirty-second memory statistical value low_buffer. For example, an amount of to-be-reclaimed memory is determined based on a difference between the thirty-second memory statistical value low_buffer and the current memory statistical value of the system, and then a quantity of required target memory pages is calculated based on the amount of to-be-reclaimed memory and an expected compression ratio.

In this way, the anonymous page compression thread may start compression processing based on the reclamation parameter. For example, the target memory page is compressed, and the compressed memory page is written into memory compression space in memory space, to release some memory space occupied by the target memory page. Subsequently, when the system needs to use the memory page again, the system finds the compressed memory page from the memory compression space, decompresses the compressed memory page, and then uses a decompressed memory page.

For example, it is assumed that the current memory statistical value of the system is 10M, and the thirty-second memory statistical value low_buffer is 20M. Therefore, it can be learned that memory space that needs to be released is 10M. Assuming that the expected compression rate is 50%, it can be learned through calculation that a size of memory on which compression processing needs to be performed is 10M/50%=20M. Then, 20M target memory pages are obtained from the anonymous page, and compression processing is performed on these memory pages, to obtain 10M memory space. The compression rate is a ratio of a size of a compressed memory page to a size of an original memory page. The expected compression rate may be a preset empirical value.

Step S3-27: After one time of memory reclamation is completed through anonymous compression, determine whether the current memory statistical value of the system is less than the thirty-first memory statistical value high_buffer; and if it is determined that the current memory statistical value of the system is less than the thirty-first memory statistical value high_buffer, perform step S3-28, or if it is determined that the current memory statistical value of the system is not less than the thirty-first memory statistical value high_buffer, perform step S3-21, that is, continue to monitor the current memory statistical value of the system.

Step S3-28: When it is determined that the current memory statistical value of the system is less than the thirty-first memory statistical value high_buffer, determine that the current memory pressure level of the system is the thirty-second level and report a thirty-second level pressure event (for example, a medium level pressure (medium_level_press) event) to the upper layer by using the anonymous page compression thread.

Step S3-29: The upper layer receives the medium level pressure (medium_level_press) event, and adjusts (for example, decreases) the memory statistical value.

It may be understood that, usually, when the anonymous page compression thread ends reclamation, the thirty-first memory statistical value high_buffer may be reached, so that the system has sufficient idle resources to maintain a large memory statistical value for subsequent opening of an application, for example, opening of a camera.

In addition, memory reclamation is performed by using the anonymous page compression thread, so that the memory statistical value reaches the thirty-first memory statistical value high_buffer, that is, the memory statistical value reaches a high level. This may also effectively avoid a power consumption problem caused by frequent reclamation start, a reclamation efficiency problem caused by reclamation idleness, a refault problem caused by excessive reclamation, and the like.

It may be understood that, in this embodiment of this application, when the anonymous page compression thread ends reclamation, if the current memory statistical value of the system still does not reach the specified thirty-first memory statistical value high_buffer, the memory statistical value is adjusted, for example, the memory statistical value is decreased.

Step S3-210: Determine whether the current memory statistical value of the system is less than the thirty-third memory statistical value min_buffer; and if it is determined that the current memory statistical value of the system is less than the thirty-third memory statistical value min_buffer, perform step S3-211, or if it is determined that the current memory statistical value of the system is not less than the thirty-third memory statistical value min_buffer, perform step S3-26, that is, continue to start the anonymous page compression thread to perform memory reclamation.

Step S3-211: When it is determined that the current memory statistical value of the system is less than the thirty-third memory statistical value min_buffer, report the medium level pressure (medium_level_press) event again, reclaim the thirty-second memory by killing (kill) a process, and perform step S3-21, that is, continue to monitor the current memory statistical value of the system.

It may be understood that, in this embodiment of this application, when the upper layer receives a preset quantity of times (for example, n times) of medium level pressure (medium_level_press) events within a time window A, the memory statistical value is gradually decreased to the thirty-third memory statistical value min_buffer. That the upper layer decreases the memory statistical value means that when receiving a medium level pressure (medium_level_press) event, the upper layer decreases both the thirty-second memory statistical value low_buffer and the thirty-first memory statistical value high_buffer based on a current memory statistical value of the system, where a decreased value is a difference between the thirty-first memory statistical value high_buffer and the current memory statistical value of the system. If the thirty-third memory statistical value min_buffer still cannot be maintained after memory reclamation performed by the anonymous page compression process, that is, the current memory statistical value of the system is still less than the thirty-third memory statistical value min_buffer, when the medium level pressure (medium_level_press) event is reported again, the thirty-second memory is reclaimed by killing (kill) a process.

It may be understood that, when it is determined that a trigger condition for killing a process is met, for example, when the current memory statistical value of the system is still less than the thirty-third memory statistical value min_buffer, a quantity of processes that need to be killed and a target process that needs to be killed may be further determined based on the thirty-third memory statistical value min_buffer and the current memory statistical value of the system, that is, which process or processes to be killed are determined. That is, when it is determined that the trigger condition for killing the process is met, a kill process list may be created, and then the process is killed based on a sequence of processes in the kill process list, until the current memory statistical value of the system reaches the thirty-third memory statistical value min_buffer.

The kill process list is a dynamic two-dimensional table obtained after sorting is performed based on importance of an application, a process priority, and/or another factor (for example, a size and distribution of an anonymous page of an application), and includes processes of one or more applications. That is, the kill process list may include one or more applications, and one application may include one or more processes. The kill process list is a list obtained after sorting is performed based on importance of an application, a process priority, and/or another factor.

Specifically, a manner of creating the kill process list specifically includes but is not limited to the following steps:

(1) Determine a score of a key element of each application that currently runs in the background, where the key element includes one or more of the following: a process priority, a user use habit, a process-occupied system resource, and an application association relationship.

(2) Perform weighted calculation on scores of all key elements of each application, to obtain importance of the application.

(3) Sort all applications based on importance of all the applications.

(4) Sort, based on process priorities, processes included in each sorted application, to generate the kill process list.

In this embodiment of this application, each application that runs in the terminal background may include one or more processes, and the key element of each application includes one or more of the following: the process priority, the user use habit, the process-occupied system resource, and the application association relationship. Each key factor has a corresponding score. When the kill process list is created based on the key elements (the process priority, the user use habit, the process-occupied system resource, and the application association relationship) of the applications, a process that needs to be processed can be subsequently determined from the kill process list based on a memory requirement. In this way, a killable process queue can be accurately selected, and a probability of incorrectly killing/killing more/killing fewer processes is reduced.

The system evaluates importance of each process, and the importance of the process also represents a process priority. Usually, importance is represented by a value oom_adj (out of memory adjust) and assigned to each process. The system determines which processes need to be terminated based on oom_adj. Usually, the score of oom_adj is provided by the system and can be allocated by the system based on a current running status of the application. Usually, a larger score of oom_adj indicates a higher probability that the process is selected and terminated by the system, and a lower process priority.

The user use habit may include but is not limited to a use time record of the application, an accumulated quantity of use times of the application, duration of using the application each time, and accumulated use duration. Based on the user use habit, related process information may be determined, for example, which processes are processes of an application that is frequently used by the user, which processes are processes of an application that is used by the user for a long time, or which processes are processes of an application that is recently used by the user.

An application importance model may be obtained through learning by using a model such as a random forest, and the kill process list is obtained based on an application use frequency, a size and distribution of an anonymous page of an application, and/or another factor. When a process is killed, an application that needs to be killed is obtained based on a status of an anonymous page of an application in the kill process list and a quantity of applications that need to be killed.

It is clear that, as shown in FIG. 3-2a(1) and FIG. 3-2a(2), the memory statistical value includes a thirty-first memory statistical value, a thirty-second memory statistical value, and a thirty-third memory statistical value. The thirty-second memory statistical value is less than the thirty-first memory statistical value. The thirty-third memory statistical value is less than the thirty-second memory statistical value. In this way, the current memory statistical value of the system is compared with the preset thirty-first memory statistical value, thirty-second memory statistical value, and thirty-third memory statistical value, so that different memory management policies can be used based on a comparison result.

For example, refer to FIG. 3-2b. When it is determined that the current memory statistical value of the system is less than the thirty-second memory statistical value, anonymous page compression may be started to reclaim the thirty-second memory, so as to convert the thirty-second memory into the thirty-first memory.

The memory statistical value may be decreased when it is determined, after anonymous page compression, that the current memory statistical value of the system is less than the thirty-first memory statistical value.

When it is determined that the current memory statistical value of the system is less than the thirty-third memory statistical value, the thirty-second memory may be reclaimed by killing a process, to convert the thirty-second memory into the thirty-first memory until the current memory statistical value of the system is not less than the thirty-third memory statistical value.

FIG. 3-3 is a schematic flowchart of another memory management method according to an embodiment of this application. As shown in FIG. 3-3, based on FIG. 3-2a(1) and FIG. 3-2a(2), the memory management method may further include steps S3-30 to S3-33.

Step S3-30: Monitor space usage of a swap partition.

In this embodiment of this application, the swap partition is a swap area. Usually, the memory may include a normal use area and a swap area. When memory resources of the system are insufficient, the reclamation mechanism starts to perform memory reclamation. The reclamation mechanism starts to compress data in the normal use area and places the compressed data into the swap area. If an amount of data in the swap area reaches a watermark, the data in the swap area is swapped to the external storage.

Step S3-31: Determine whether current space usage of the swap partition reaches a preset proportion; and if it is determined that the current space usage of the swap partition reaches the preset proportion, perform step S3-32, or if it is determined that the current space usage of the swap partition does not reach the preset proportion, perform step S3-30, that is, continue to monitor the space usage of the swap partition.

Step S3-32: When it is determined that the current space usage of the swap partition reaches the preset proportion, determine that the current memory pressure level of the system is the thirty-third level and report a thirty-third level pressure event (for example, a high level pressure (critical_level_press) event) to the upper layer.

Step S3-33: The upper layer reclaims the thirty-second memory based on the high level pressure (critical_level_press) event by killing a process.

It may be understood that, when the space usage of the swap partition reaches the preset proportion when the anonymous page compression thread is started, it is difficult to continue to reclaim memory through anonymous page compression for the memory statistical value. In this case, the anonymous page compression thread reports the high level pressure (critical_level_press) event, to trigger the upper layer to reclaim the thirty-second memory by killing the process.

For example, if cold anonymous pages of a large quantity of applications are previously reclaimed, and space of the swap partition is full, when a current round of reclamation ends, the anonymous page compression thread reports a high level pressure (critical_level_press) event, to directly trigger the upper layer to reclaim the thirty-second memory by killing the process.

It may be understood that reclaiming the thirty-second memory by killing the process in step S3-33 is similar to reclaiming the thirty-second memory by killing the process in step S3-211 in FIG. 3-2a(2), and corresponding concepts are also similar. Details are not described herein again.

FIG. 3-4 is a schematic flowchart of another memory management method according to an embodiment of this application. As shown in FIG. 3-4, based on FIG. 3-2a(1) and FIG. 3-2a(2) and/or FIG. 3-3, the memory management method may further include steps S3-40 to S3-44.

Step S3-40: A pressure stall information (Pressure Stall Information, PSI) thread monitors system resource pressure. PSI provides a method for evaluating system resource pressure. A system resource may include a CPU resource, an I/O resource, and the like. Once resource contention occurs, a delay may be increased, and therefore a user experiences frame freezing. There are two consequences if there is no accurate method to detect a resource pressure degree of a system. One is that a resource user overrestrains and does not fully use the system resources. The other is that resource contention often occurs, and overuse of resources leads to a long waiting delay. An accurate detection method can help the resource user determine an appropriate workload, and can also help a system formulate an efficient resource scheduling policy, to maximize system resource utilization and improve user experience. Therefore, in 2018, Facebook opened a set of Linux kernel components and related tools to resolve important computing cluster management problems. PSI is an important resource measurement tool, to provide a method for detecting system resource contention in real time, and is presented in a form of a contention waiting time, which can comprehensively determine current system pressure and provide simple and accurate decision-making for a user and a resource scheduler. Specifically, the PSI is used to aggregate task delays into resource pressure indicators, and the indicators reflect problems in terms of workload health and resource utilization. It may be understood that, in this embodiment of this application, an indicator considered by the PSI thread is usually a speed provided for an application. In one case, a large-memory-consumption application consumes a large amount of memory in a short period of time, for example, consumes 2 GB memory. However, in the foregoing manner (for example, memory is reclaimed through anonymous page compression), a memory reclamation speed is slow. Therefore, the PSI thread may be used to trigger detection of system resource pressure. PSI statistical data (that is, a PSI value) can provide an early warning for impending resource shortages, so that more proactive and detailed responses can be implemented.

Step S3-41: Determine whether a current PSI value of the system is greater than a preset threshold; and if it is determined that the current PSI value of the system is greater than the preset threshold, perform step S3-42, or if it is determined that the current PSI value of the system is not greater than the preset threshold, perform step S3-40, that is, continue to monitor system resource pressure.

Step S3-42: When it is determined that the current PSI value of the system is greater than the preset threshold, the PSI thread reports a PSI pressure value to an upper layer.

Step S3-43: The upper layer receives the PSI pressure value, and determines whether a current memory statistical value of the system is less than a thirty-fourth memory statistical value psi_buffer; and perform step S3-44 if it is determined that the current memory statistical value of the system is less than the thirty-fourth memory statistical value psi_buffer, or perform step S3-40 if it is determined that the current memory statistical value of the system is not less than the thirty-fourth memory statistical value psi_buffer.

Step S3-44: When it is determined that the current memory statistical value of the system is less than the thirty-fourth memory statistical value psi_buffer, reclaim the thirty-second memory by killing a process.

It may be understood that, in this embodiment of this application, when reporting by the PSI thread indicates that a speed of quickly providing system memory for an application is slow, whether the current memory statistical value of the system is less than the thirty-fourth memory statistical value psi_buffer further needs to be determined. When the current memory statistical value of the system is not less than the thirty-fourth memory statistical value psi_buffer, it indicates that the current system can still provide available memory for the application, but a speed of providing the available memory is slow. When the current memory statistical value of the system is less than the thirty-fourth memory statistical value psi_buffer, it indicates that available memory that can be provided by the system for the application is insufficient, and a speed of providing the available memory is slow. In this case, the thirty-second memory is reclaimed directly by killing the process.

It may be understood that the thirty-fourth memory statistical value psi_buffer is less than the thirty-third memory statistical value min_buffer.

It may be understood that reclaiming the thirty-second memory by killing the process in step S3-44 is similar to reclaiming the thirty-second memory by killing the process in step S3-211 in FIG. 3-2a(2) and reclaiming the thirty-second memory by killing the process in step S3-33 in FIG. 3-3, and corresponding concepts are also similar. Details are not described herein again.

FIG. 3-5 is a schematic flowchart of another memory management method according to an embodiment of this application. As shown in FIG. 3-5, based on FIG. 3-2a(1) and FIG. 3-2a(2), FIG. 3-3, and/or FIG. 3-4, the memory management method may further include steps S3-50 to S3-52.

Step S3-50. Detect whether a preset application is opened, and perform step S3-51 if it is detected that the preset application is opened, or continue to perform step S3-50 if it is not detected that the preset application is opened.

It may be understood that the preset application is an application that consumes a large amount of memory when being opened, for example, an application that consumes a large amount of memory in a short period of time once the preset application is opened. The preset application may be preset and stored.

Step S3-51: When it is detected that the preset application is opened, further determine whether the current memory statistical value of the system is greater than the thirty-first memory statistical value high_buffer; and perform step S3-52 if it is determined that the current memory statistical value of the system is less than the thirty-first memory statistical value high_buffer, or perform step S3-50 if it is determined that the current memory statistical value of the system is not less than the thirty-first memory statistical value high_buffer.

Step S3-52: When it is determined that the current memory statistical value of the system is less than the thirty-first memory statistical value high_buffer, reclaim the thirty-second memory by killing a process.

It may be understood that, in this embodiment of this application, if a memory requirement of an application is too high and PSI pressure reporting is still delayed, the thirty-second memory cannot be reclaimed in a timely manner by killing the process. Therefore, in an opening scenario of an application that requires large memory, for example, Camera is opened, when an opening message is received, reclamation of the thirty-second memory that is performed by killing a process is immediately triggered.

It may be understood that, usually, when a large-memory application (for example, Camera) is opened, a large amount of memory is consumed in a short period of time, and a memory statistical value is decreased. In this case, the anonymous page compression thread is woken up to reclaim memory. However, a process of decreasing the memory statistical value to the thirty-third memory statistical value min_buffer may be slow for camera opening. Therefore, in addition to a kill process triggered by opening of the large-memory application, PSI pressure reporting is a good supplement. When the memory statistical value has a decreasing trend, the thirty-second memory is also reclaimed in a timely manner by killing the process.

It may be understood that reclaiming the thirty-second memory by killing the process in step S3-52 is similar to reclaiming the thirty-second memory by killing the process in step S3-211 in FIG. 3-2a(2), reclaiming the thirty-second memory by killing the process in step S3-33 in FIG. 3-3, and reclaiming the thirty-second memory by killing the process in step S3-44 in FIG. 3-4, and corresponding concepts are also similar. Details are not described herein again.

Refer to FIG. 3-2a(1) and FIG. 3-2a(2) to FIG. 3-5 again. It is clear that, in this embodiment of this application, there are at least the following four cases in which the thirty-second memory is reclaimed by killing a process.

Case 1: When the memory statistical value is gradually decreased to a minimum value, that is, the thirty-third memory statistical value min_buffer, if the current memory statistical value of the system still does not reach the thirty-third memory statistical value min_buffer, the thirty-second memory is reclaimed by killing a process, to maintain the memory statistical value to the thirty-third memory statistical value min_buffer (refer to step S3-211 in FIG. 3-2a(2)).

Case 2: When it is detected that the space usage of the swap partition reaches the preset proportion when the anonymous page compression process compresses memory, it is difficult to continue to reclaim memory through anonymous page compression for the memory statistical value. In this case, a high level pressure (critical-level-press) event is reported, and the thirty-second memory is synchronously reclaimed by killing the process (refer to step S3-33 in FIG. 3-3).

Case 3: A PSI pressure reporting policy is used, that is, detection of the thirty-fourth memory statistical value psi_buffer is directly triggered based on a PSI pressure status, and reclamation of the thirty-second memory that is performed by killing the process is triggered (refer to step S3-44 in FIG. 3-4).

Case 4: The preset application is opened, that is, if the memory requirement of the application is too high and PSI reporting is still delayed, the thirty-second memory cannot be reclaimed in a timely manner by killing the process. Therefore, in an opening scenario of an application that requires large memory, for example, Camera is opened, when an opening message is received, reclamation of the thirty-second memory that is performed by killing the process is immediately triggered (refer to step S3-52 in FIG. 3-5).

It may be understood that, in this embodiment of this application, a time or a sequence of killing processes corresponding to the foregoing four cases is not limited. Provided that any one of the four cases is met, reclamation of the thirty-second memory that is performed by killing the process may be triggered.

FIG. 3-6 is a schematic diagram of a structure of a memory management apparatus according to an embodiment of this application. The memory management apparatus 3-200 may be configured to perform some or all steps of the memory management methods described in FIG. 3-2a(1) and FIG. 3-2a(2) to FIG. 3-5. As shown in FIG. 3-6, the memory management apparatus 3-200 may include a thread module 3-21, a creating module 3-22, a reporting module 3-23, a memory reclamation module 3-24, and a memory adjustment module 3-25.

The thread module 3-21 includes at least an anonymous page compression thread 3-211 and a PSI thread 3-212. The anonymous page compression thread 3-211 is configured to compress an anonymous page, to reclaim thirty-second memory. The PSI thread 3-212 is configured to monitor system resource pressure.

The creating module 3-22 is configured to create a memory statistical value and a memory pressure level.

The memory statistical value is used to represent remaining available memory in system memory. Thirty-first memory is idle memory of a system, and the thirty-second memory is occupied memory that can be converted into the thirty-first memory through reclamation.

The memory statistical value includes a thirty-first memory statistical value, a thirty-second memory statistical value, and a thirty-third memory statistical value. The thirty-second memory statistical value is less than the thirty-first memory statistical value. The thirty-third memory statistical value is less than the thirty-second memory statistical value.

The memory pressure level includes a thirty-first level, a thirty-second level, and a thirty-third level. Memory pressure of the thirty-third level is higher than memory pressure of the thirty-second level, and the memory pressure of the thirty-second level is higher than memory pressure of the thirty-first level.

The reporting module 3-23 is configured to: when a current memory statistical value of the system is less than the thirty-second memory statistical value, determine that a current memory pressure level of the system is the thirty-first level, and report a thirty-first level pressure event. The reporting module 3-23 is further configured to: when a current memory statistical value of the system is less than the thirty-first memory statistical value, determine that a current memory pressure level of the system is the thirty-second level, and report a thirty-second level pressure event.

The memory reclamation module 3-24 is configured to start the anonymous page compression thread 3-211 based on the thirty-first level pressure event, to perform anonymous page compression, so as to reclaim the thirty-second memory.

It may be understood that, in this embodiment of this application, the reporting module 3-23 may report a pressure event by using the anonymous page compression thread 3-211.

The memory adjustment module 3-25 is configured to adjust the memory statistical value based on the thirty-second level pressure event. For example, after memory reclamation is performed by using the anonymous page compression thread 3-211, if the current memory statistical value of the system does not reach the thirty-first memory statistical value high_buffer, a medium-level pressure (medium-level-press) event is received, and the memory statistical value is dynamically adjusted (for example, decreased).

The memory reclamation module 3-24 is further configured to: when the memory statistical value is gradually decreased to a minimum value, that is, the thirty-third memory statistical value min_buffer, and the current memory statistical value of the system still does not reach the thirty-third memory statistical value min_buffer, reclaim the thirty-second memory by killing a process, to convert the thirty-second memory into the thirty-first memory.

It may be understood that, the reporting module 3-23 is further configured to: monitor space usage of a swap area, and when current space usage of the swap area reaches a preset proportion, determine that a current memory pressure level of the system is the thirty-third level, and report a thirty-third level pressure event. The memory reclamation module 3-24 is further configured to reclaim the thirty-second memory based on the thirty-third level pressure event by killing the process, to convert the thirty-second memory into the thirty-first memory.

It may be understood that, the memory statistical value further includes a thirty-fourth memory statistical value, and the reporting module 3-23 is further configured to: monitor system resource pressure by using the PSI thread 3-212, and report a PSI pressure value when a current PSI value of the system is greater than a preset threshold. The memory reclamation module 3-24 is further configured to: when the PSI pressure value is received and the current memory statistical value of the system is less than the thirty-fourth memory statistical value, reclaim the thirty-second memory by killing the process, to convert the thirty-second memory into the thirty-first memory.

It may be understood that the memory reclamation module 3-24 is further configured to detect whether a preset application is opened. When detecting that the preset application is opened and the current memory statistical value of the system is less than the thirty-first memory statistical value, the memory reclamation module 3-24 reclaims the thirty-second memory by killing the process, to convert the thirty-second memory into the thirty-first memory.

It may be understood that the memory reclamation module 3-24 may kill the process by outputting a corresponding kill command and based on the kill command. For example, each process is uniquely identified by a pid. The kill command may include a corresponding pid, so that the memory reclamation module 3-24 can kill a corresponding process based on the process identifier (pid).

It may be understood that division into the modules in the memory management apparatus 3-200 is merely used as an example for description. In another embodiment, the memory management apparatus 3-200 may be divided into different modules based on a requirement, to implement all or some functions of the memory management apparatus 3-200.

Implementations of the modules in the memory management apparatus provided in this embodiment of this application may be in a form of a computer program. The computer program may run on an electronic device or a server. A program module formed by the computer program may be stored in a memory of the terminal or the server. When the computer program is executed by a processor, the steps described in embodiments of this application are implemented. For specific implementations of the modules in this embodiment of this application, refer to corresponding descriptions of the method embodiments shown in FIG. 3-2a(1) and FIG. 3-2a(2) to FIG. 3-5. In the memory management apparatus described in FIG. 3-6, problems that memory management efficiency is low, memory is not supplied in a timely manner, a quantity of keepalive applications is small, and the like can be effectively resolved. For specific content, refer to a specific embodiment of the foregoing memory management method. Details are not described herein again.

FIG. 3-7 is a schematic diagram of a partial system framework of a memory management apparatus 3-200 according to an embodiment of this application.

It may be understood that, in this embodiment of this application, descriptions are provided by using an example in which the reporting module 3-23 reports pressure by using the anonymous page compression thread 3-211, monitors system resource pressure by using the PSI thread 3-212, and reports a PSI pressure value when a current PSI value of a system is greater than a preset threshold.

The anonymous page compression thread 3-211 and the PSI thread 3-212 are disposed at a lower layer, for example, a kernel layer. The memory reclamation module 3-24 and the memory adjustment module 3-25 are disposed at an upper layer. The upper layer is a native layer or an application framework (FWK) layer.

It may be understood that, when a current memory statistical value of the system is less than the thirty-second memory statistical value low_buffer, the reporting module 3-23 reports a low-level pressure (low-level-press) event by using the anonymous page compression thread 3-211. When the upper layer receives the low-level pressure (low-level-press) event, the memory reclamation module 3-24 may deliver a corresponding reclamation parameter to the anonymous page compression thread 3-211, to indicate the anonymous page compression thread 3-211 to start compression processing, so as to perform memory reclamation.

After the memory reclamation module 3-24 performs one round of reclamation by using the anonymous page compression thread 3-211, if a current memory statistical value of the system does not reach the specified thirty-first memory statistical value high_buffer, the reporting module 3-23 reports a medium-level pressure (medium_level_press) event by using the anonymous page compression thread 3-211. When receiving the medium-level pressure (medium_level_press) event, the upper layer dynamically adjusts the memory statistical value by using the memory adjustment module 3-25.

When the upper layer receives the medium-level pressure (medium_level_press) event for a preset quantity of times (for example, n times) within a time window A, and the memory statistical value is adjusted to a minimum value, that is, is adjusted to the thirty-third memory statistical value min_buffer, if it is detected again that the current memory statistical value of the system still does not reach the thirty-third memory statistical value min_buffer, the reporting module 3-23 reports the medium-level pressure (medium_level_press) event again by using the anonymous page compression thread 3-211. Then, the upper layer outputs a corresponding kill command by using the memory reclamation module 3-24, to reclaim the thirty-second memory by killing a process, so as to adjust the memory statistical value to the thirty-third memory statistical value min_buffer.

In addition, in some embodiments, the reporting module 3-23 may further monitor space usage of a swap partition by using the anonymous page compression thread 3-211. When it is detected that current space usage of the swap partition has reached a specific proportion, it is difficult to continue to reclaim memory through anonymous page compression for the memory statistical value. In this case, the reporting module 3-23 reports a high-level pressure (critical_level_press) event by using the anonymous page compression thread 3-211. When receiving the high-level pressure (medium_level_press) event, the upper layer outputs a corresponding kill command by using the memory reclamation module 3-24, to reclaim the thirty-second memory by killing a process.

In addition, in some embodiments, the reporting module 3-23 may further monitor system resource pressure by using the PSI thread 3-212, and report PSI pressure when detecting that a current PSI pressure value is greater than a preset threshold. The upper layer receives the PSI pressure reporting event, and determines whether the current memory statistical value of the system is less than the thirty-fourth memory statistical value psi_buffer. When determining that the current memory statistical value of the system is less than the thirty-fourth memory statistical value psi_buffer, the upper layer outputs a corresponding kill command by using the memory reclamation module 3-24, to reclaim the thirty-second memory by killing a process.

In addition, in some embodiments, the upper layer may further detect whether a preset application is opened. When detecting that the preset application is opened, the upper layer further determines whether the current memory statistical value of the system is less than the thirty-first memory statistical value high_buffer. When determining that the current memory statistical value of the system is less than the thirty-first memory statistical value high_buffer, the upper layer outputs a corresponding kill command by using the memory reclamation module 3-24, to reclaim the thirty-second memory by killing a process.

It is clear that, the foregoing three levels of memory pressure scenarios, that is, a low level pressure (low-level-press) scenario, a medium level pressure (medium_level_press) scenario, and a high level pressure (critical_level_press) scenario, are closed separately, and a higher-level closed-loop is formed for management and control of a total memory watermark, finally implementing stable management of the memory watermark.

It may be understood that, in the foregoing memory management method, the anonymous page compression thread preliminarily maintains a watermark based on a multi-level memory statistical value, and reports memory pressure based on levels (a low level pressure (low-level-press) scenario, a medium level pressure (medium_level_press) scenario, and a high level pressure (critical_level_press) scenario) of a working status of the anonymous page compression thread. Under different levels of memory pressure, the upper layer performs adjustment, for example, adjusts a memory reclamation parameter, and dynamically adjusts a memory statistical value, to directly trigger a kill process, so that the memory statistical value can be efficiently maintained to improve application keepalive.

It may be understood that this embodiment of this application provides a kill method based on a user behavior model and an application model, to effectively improve kill efficiency and accuracy, maintain the memory statistical value, and improve application keepalive.

In an embodiment of this application, to better describe this application, refer to FIG. 3-8a and FIG. 3-8b. The following describes in detail a specific implementation process of this application by using a scenario in which large memory is required, for example, a scenario in which a camera application is opened as an example.

First, before the camera application is opened, a current memory statistical value of a system is in a monitoring state. If memory consumption exists in the current background or another application is being used, the current memory statistical value of the system may be already less than the thirty-second memory statistical value low_buffer, and the anonymous page compression thread is woken up.

When the anonymous page compression thread is woken up, the anonymous page compression thread reports a low level pressure (low_level_press) event. When the low level pressure (low_level_press) event is received, the upper layer delivers a reclamation parameter based on an application feature, to indicate the anonymous page compression thread to work, that is, compress an anonymous page to reclaim memory. Usually, w % ben the anonymous page compression thread ends reclamation, the thirty-first memory statistical value high_buffer may be reached, to maintain a large memory watermark for subsequent opening of a camera.

When the camera application is opened, it is identified that the application is a large-memory-consumption application. When a camera opening message is received, it is determined whether the current memory statistical value of the system meets the thirty-first memory statistical value high_buffer, that is, it is determined whether the current memory statistical value of the system is less than the thirty-first memory statistical value high_buffer. When it is determined that the current memory statistical value of the system is less than the thirty-first memory statistical value high_buffer, the thirty-second memory is reclaimed by killing the process.

In this case, if a user uses the camera to record a video for a period of time, that is, the camera application is opened for a period of time, when the anonymous page compression thread ends reclamation, if it is determined that the current memory statistical value of the system still does not reach the specified thirty-first memory statistical value high_buffer, the anonymous page compression thread reports a medium level pressure (medium_level_press) event. In this way, when receiving the medium level pressure (medium_level_press) event, the upper layer decreases the memory statistical value based on a memory requirement until the memory statistical value is decreased to the thirty-third memory statistical value min_buffer.

It may be understood that, if the anonymous page compression thread still cannot be maintained after the memory statistical value is reduced to the thirty-third memory statistical value min_buffer, the medium level pressure (medium_level_press) event is reported again, to trigger kill, so that the upper layer calculates, based on the thirty-third memory threshold min_buffer and the current memory statistical value of the system, a quantity of processes that need to be killed, and kills the thirty-third memory statistical value min_buffer based on a sequence in a killable list.

Finally, when the camera application exits and switches back to the home screen, the upper layer increases the decreased memory statistical value again to the thirty-second memory statistical value low_buffer, to perform steady-state memory management.

It may be understood that, in some embodiments, when the camera application is opened, the camera consumes a large amount of memory in a short period of time to decrease the memory statistical value. Although the anonymous page compression thread may be woken up to perform memory reclamation, a process of decreasing the memory statistical value to the thirty-third memory statistical value min_buffer may be slow for camera opening. Therefore, in addition to kill triggered by opening of a large-memory application, PSI pressure reporting kill is a good supplement. That is, when the memory statistical value decreases, kill is also triggered in a timely manner.

It may be understood that, in some embodiments, in the foregoing process, if cold anonymous pages of a large quantity of applications are previously reclaimed, and space of the swap partition is full, the anonymous page compression thread in the kernel reports a high level pressure (critical_level_press) event. In this way, when the upper layer receives the high level pressure (critical_level_press) event, kill is also directly triggered.

It is clear that, the memory management method and apparatus in embodiments of this application have at least the following advantages:

(1) A new memory statistical value is created, the memory statistical value is calculated according to Formula (1) to provide an adjustable parameter for a ratio of active and inactive parts of a file page, and an available memory part of ION is added. The newly defined memory statistical value can more effectively reflect an available memory supply capability, and more effectively reflect a memory pressure status.

(2) Based on a multi-level memory statistical value, the multi-level memory statistical value is maintained through parallel compression of the anonymous page. Setting the multi-level memory statistical value can maintain a large memory statistical value when memory pressure is low, and can avoid low-efficiency reclamation or idleness caused because the anonymous page compression thread is frequently woken up when memory pressure is high. In this way, long-term stability of the memory statistical value can be efficiently maintained based on the memory pressure.

(3) A multi-level memory pressure reporting mechanism and a multi-dimensional kill mechanism are used. After memory pressure is reported based on maintenance on the memory statistical value by the anonymous page compression thread, a memory reclamation parameter is chosen to be adjusted, and a memory statistical value and kill are dynamically adjusted based on different levels of reported events, to form closed-loop memory statistical value management. This not only achieves optimal reclamation efficiency, but also provides necessary memory supply means for light-load and heavy-load memory scenarios to increase application keepalive.

(4) In a kill method based on a user behavior model and an application model, different kill methods are selected under different memory pressure, to quickly, effectively, and accurately maintain a target memory statistical value required by a corresponding scenario, and complete closed-loop memory management.

It may be understood that, to implement the foregoing functions, the electronic device includes a corresponding hardware structure and/or software module for performing each function. A person skilled in the art should be easily aware that units, algorithms, and steps in the examples described with reference to embodiments disclosed in this specification can be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

When an integrated unit is used, FIG. 3-9 is a possible schematic diagram of a structure of an electronic device related to the foregoing embodiments. The electronic device 300 includes a processing unit 3-301 and a storage unit 3-302.

The processing unit 3-301 is configured to: control and manage an action of the electronic device 300.

The storage unit 3-302 is configured to store instructions and data of the electronic device 300, where the instructions may be used to perform steps in FIG. 3-2*a*(1) and FIG. 3-2*a*(2) to FIG. 3-5 and corresponding embodiments.

An embodiment of this application may further provide a computer storage medium. The computer storage medium stores computer program code, and when the foregoing electronic device executes the computer program code, the electronic device may perform related method steps in FIG. 3-2*a*(1) and FIG. 3-2*a*(2) to FIG. 3-5, to implement the method in the foregoing embodiments.

An embodiment of this application may further provide a computer program product. When the computer program product runs on a computer, the computer is enabled to perform related method steps in FIG. 3-2*a*(1) and FIG. 3-2*a*(2) to FIG. 3-5, to implement the method in the foregoing embodiments.

It may be understood that the electronic device, the computer storage medium, and the computer program product provided in embodiments of this application each may be configured to perform the corresponding method provided above. Therefore, for beneficial effects that can be achieved by the electronic device, the computer storage medium, and the computer program product, refer to the beneficial effects in the corresponding method provided above. Details are not described herein again.

Based on the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed system and method may be implemented in another manner. For example, the described system embodiments are merely examples. For example, division into the modules or units is merely logical function division, and may be other division in an actual implementation. For example, a plurality of units or components may be combined or may be integrated into another system, or some features may be ignored or not be performed. In addition, the displayed or discussed mutual coupling or direct coupling or communication connection may be implemented through some interfaces. The indirect coupling or communication connection between the apparatuses or units may be implemented in electrical, mechanical, or another form.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a ROM, a magnetic disk, or an optical disc.

All programs in a computer run in memory, and the memory is a medium configured to temporarily store operation data of a central processing unit (Central Processing Unit, CPU for short) and exchange data with an external memory such as an external disk. When a program is run, executable program-related data code and the like need to be loaded into memory, and a central processing unit reads the related data from the memory. When a large quantity of programs are run, available memory of an operating system is insufficient, affecting smoothness of the operating system.

Programs in a computer are run in memory of a computer. Therefore, memory usage has great impact on performance of the computer. In the computer, a plurality of processes are usually run simultaneously. To reduce a startup time, an operating system reserves, as much as possible, memory space occupied by the process. However, due to a limitation of a memory size, the operating system cannot reserve the memory space occupied by the process. During out of memory, the operating system may perform swap-out (swap-out). For example, if free memory of the system is less than a preset low watermark (watermark_low), a system process actively triggers a memory reclamation action to release memory space for subsequent memory application. When the free memory is reclaimed to a high watermark (watermark_high), the reclamation stops. Memory reclamation includes two aspects: releasing some page frames; and writing back page data in the page frames and storing the page data in external storage space, and then releasing the page frames. In this case, during memory reclamation, a swap-out operation is performed, that is, data in physical memory is moved to the external storage space. When the data that is swapped to the external storage space is required for a process, swap-in (swap-in) can be performed. Swap-in is moving the data from the external storage space to the physical memory.

For example, when a file or a program is loaded, the file is stored in memory. Because a random access memory (Random Access Memory, RAM) is limited, some files cannot be put in. These files are stored in the external storage space, such as a special part of a hard disk drive, referred to as a "swap partition". Swap is a mechanism. In this mechanism, a process can temporarily swap from memory to external storage space for storage, which is referred to as swap-out, and data swapped to the external storage space is swapped back to the memory, which is referred to as swap-in.

For example, one central processing unit can execute only one instruction at a same moment, and when a process is executed, another process is in a stopped state. Therefore, when the central processing unit is switched to a process B for running, if there is no free physical memory page in the operating system, and memory space is insufficient, a kernel chooses to move data of a physical memory page of a process to the external storage space, and backs up data of a physical memory page of a process A to the external storage space. In this way, physical memory originally occupied by the process A may be released, and the released physical memory may be used by the currently running process B. This process is referred to as swap-out. When the central processing unit is switched to a process A for running, a new physical memory page is re-allocated. In this case, if there is no free physical memory page, a swap-out operation is also performed, and data swapped out of the process A is restored from the external storage space, that is, data swapped from the process A to the external storage space is switched to the physical memory page re-allocated to the process A. This process is referred to as swap-in. The external storage space may include cloud storage space or a storage device. In this embodiment of this application, the external storage space is used as a disk for description. When the physical memory of the system is insufficient, a part of space in disk memory is released for use by a currently running program. The part of released space is a disk swap partition, also referred to as a disk swap area. Data in the disk swap partition is swapped to a disk corresponding to the memory for a read operation, and data in the memory is swapped to a disk corresponding to the disk swap partition for a write operation. Speeds of the read and write operations on the disk swap partition are slow. Therefore, frequent swap-in and swap-out affect performance of a computer.

If the physical memory has remaining space after sufficient memory is allocated to the program, the operating system divides the remaining memory space into two parts, swap cache (Swap cache) space and unallocated memory space (buffer) for use. After the data read from the disk to the memory is read by a related application, if the memory has remaining memory space, the data read from the disk to the memory is stored in the swap cache space. After the kernel swaps a page into the memory, a direction of swap cache space to the page is added. When a program attempts to swap in a page, the program first searches the swap cache space for the page. If the page is found, the program fills the page in a corresponding page table entry PTE and converts a direction to the disk swap partition to a direction to the swap cache space. If the page is not found in the swap cache space, it indicates that no other process has accessed the page before. In this case, the disk swap partition needs to be searched for the page. After a program modifies data in memory, because a disk write operation speed is low, the modified data is first stored in the unallocated memory space (buffer) when there is free memory space, and then the modified data is written from the unallocated memory space (buffer) to a disk at a later time. In this way, the application can continue subsequent operations without a need to wait until a disk write operation is performed on the modified data. If the system requires more memory at a specific moment, the system erases some of the swap cache space and writes content in the buffer to the disk. In this way, the two parts of memory are released for the system.

For swap-in and swap-out of memory data, there is a page-based storage management method. Refer to FIG. 4-1. In an operating system, logical address space (a structure (software layer) in memory virtual space) of a process is divided into pages/pages (page) of a fixed size, and a size is 4 KB in a unit of a page (page). Physical memory space is also divided into page frames (frame) of a same size, and a size is 4 KB in a unit of a page frame (frame). The size of the page is the same as the size of the page frame. When a process is run, any page may be placed into any page frame in physical memory, and the placed page frame does not need to be connected, to implement discrete allocation. Mapping between a physical address and a logical address is implemented by using a page table (page table, PT for short), so that swap-in and swap-out can be performed in a unit of a page. A page table is a set of page table entries (page table entry, PTE). A page table entry is a one-to-one mapping relationship pair (pair) between a page and a page frame. When page data is accessed, the system obtains a virtual address in virtual space, needs to record the relationship between the page and page frame by using the page table, finds, based on the virtual address, a physical address for actually storing data in the physical memory space, and then reads data from the physical address.

Each page has a corresponding page table entry in a PTE page table, and is used to indicate an actual address and related information of the page in the physical memory. Each page table entry corresponds to a swap space page table entry (Swap Entry). A difference lies in that the page table entry PTE is used to search for a location of the page in the physical memory, and the swap space page table entry Swap Entry is used to search for a location of the page in a disk swap partition.

In this embodiment of this application, the swap space page table entry (Swap Entry) is a swap space page table entry allocated to the anonymous page after data of the anonymous page is swapped to the external storage space, and is used to search for a location of the page in the external storage space.

The physical memory address includes a high-order segment and a low-order segment, the high-order segment is referred to as a page frame code, and the low-order segment is referred to as a page frame offset. The virtual memory address includes a high-order segment and a low-order segment, the high-order segment is referred to as a page code, and the low-order segment is referred to as an intra-page offset. When a page is mapped to a page frame, the page code and the page frame code for storing an image of the page need to be filled in the page table entry of the page table. For example, a start 12/47 bit in the page table entry, that is, a $12^{th}$ bit to a $47^{th}$ bit, has a total of 36 bits, and is used to indicate a physical address of a first bit of a page frame. A page structure includes a page frame, a page frame attribute, and page data. A size of each page frame is 4 Kbytes, that is, 2 to the power of 12. Therefore, only one page frame location needs to be located, and an actual physical address can be found starting from a $0^{th}$ location of the page frame based on an intra-page offset of the last 12 bits of the virtual address. The remaining bits 11/0, that is, a $0^{th}$ bit to an $11^{th}$ bit, are used to indicate attribute/control information of a page, including whether the page is valid (whether the page is mapped in the physical memory), whether the page is accessed, whether the page is a file page dirty page, whether the page is write-protected, and the like.

To support a non-uniform memory access (Non-Uniform Memory Access, NUMA) model, the central processing unit may access different memory units at different time points. Therefore, the physical memory is divided into several memory nodes. Each memory node (pg_data-t) in the system is linked to a null-terminated pgdat_list linked list, where each memory node is linked to a next memory node by using a pg_data_tnode_next field. Refer to FIG. 4-2. Each memory node is further divided into a plurality of memory management zones (node-zones), and a memory management zone may be described by using struct zone_struct, to indicate that the memory management zone is in a specific range of the memory. Generally, one memory node is divided into three memory management zones, including a direct memory access (direct memory access, DMA) zone, a normal memory management zone, and a high memory management zone. The direct memory access zone is described as ZONE-DMA, and is usually the start 16 MB of physical memory. The normal memory management zone is described as ZONE-NORMAL, and is usually a physical memory area ranging from 16 MB to 896 MB. The high memory management zone is described as ZONE-HIGH-MEM, is a memory area after 896 MB, and is a physical memory segment that exceeds kernel virtual address space. Each memory management zone includes a large quantity of page frames. The kernel uses a struct page to describe the page frame. The page frame has many attributes, and these attributes describe a status, a purpose, and the like of the page frame. A page frame array is used to record usage of a page frame of a memory partition. The page frame array may be described by using zone_mem_map.

Refer to FIG. 4-3. Each memory node corresponds to a lruvec linked list structure, and lruvec is used as an example for description. Each linked list structure maintains five types of least recently used (Least Recently Used, LRU) linked lists. The least recently used linked list may be a memory management algorithm, is a frequently-used page replacement algorithm in which a page that is not used recently is selected for elimination, and is an important linked list used by the kernel for memory management and reclamation control. LRU linked list types include a file page active linked list (ACTIVE_FILE), a file page inactive linked list (INACTIVE_FILE), an anonymous page active linked list (ACTIVE_ANON), an anonymous page inactive linked list (INACTIVE_ANON), and an unreclaimable linked list (Unevictable). The linked list includes a series of nodes (each element in the linked list is referred to as a node), and the node may be dynamically generated during running. Each node includes two parts: one is a data field for storing a data element, and the other is a pointer field for storing a next node address.

It may be understood that, during out of memory, the system performs memory reclamation, that is, reclaims some page frames. Based on the LRU linked list, the system can select an ideal reclaimed page frame from page frames that can be reclaimed. The LRU linked list is stored in the memory, and memory space is applied for in the memory to store the LRU linked list. In this case, corresponding memory space exists in the memory to store the inactive linked list and the active linked list.

Refer to FIG. 4-4. A plurality of page frames are mounted on each LRU linked list, and are connected by using an address of a linked list header. Each page frame includes a page frame attribute and page data. Each page has a page descriptor of the page, and the kernel mainly adds the page descriptor of the corresponding page to these linked lists. Both the file page active linked list and the file page inactive linked list store page descriptors of file pages (File-backed Page), and the file page is a page of a mapping file. The file page active linked list may store all page descriptors that are of file pages and that are recently accessed in the memory management zone, and PG_active of the page descriptors in the linked list may be marked as 1. The file page inactive linked list may store all page descriptors that are of file pages and that are not recently accessed in the memory management zone, and PG_active of the page descriptors in the linked list may be marked as 0. Both the anonymous page active linked list and the anonymous page inactive linked list store page descriptors of anonymous pages (anonymous pages). An anonymous page is a page that is not associated with a file, such as a heap, a stack, or a data segment of a process. The anonymous page active linked list may store all page descriptors that are recently accessed in the memory management zone and that can be stored in the external storage space, and PG_active of the page descriptors in the linked list may be marked as 1. The anonymous page inactive linked list may store all page descriptors that are not recently accessed in the memory management zone and that can be stored in the external storage space, and PG_active of the page descriptors in the linked list may be marked as 0. The unreclaimable linked list may store a file page or an anonymous page. A page in the linked list cannot be reclaimed in any case. The linked list stores descriptors of all pages that are forbidden to be swapped out in the memory management zone.

It may be understood that, that the page replacement algorithm complies with the first in first out (FIFO) principle includes: a newly allocated page is linked to the head of the inactive or active linked list. A page is extracted from the tail of the active linked list to be lined to the head of the inactive linked list. A page table is extracted from the tail of the inactive linked list for memory reclamation. Memory reclamation enables pages to flow between the active linked list, the inactive linked list, and memory management. When an anonymous page is reclaimed, if no process uses the anonymous page, the anonymous page is directly released. If a process uses the anonymous page, the anonymous page is first swapped to a disk swap partition and then released. A file mapping page can only be written back to the disk swap area and then released.

In a kernel with a Linux operating system, anonymous pages occupy a large proportion, and occupy a part of memory application. When memory pressure is high, if data of the anonymous page is bumped and cannot be effectively processed, memory space may be frequently reclaimed but repeatedly swapped. As a result, the memory pressure is not reduced. The applicant finds that, in an existing anonymous page swap-out and swap-in mechanism, when data of an anonymous page is swapped from a disk swap partition to memory, the data of the anonymous page is swapped, by default, into an active linked list to which the anonymous page belongs, the anonymous page is frequently used by default, and usage of the swapped-in anonymous page is not fully considered. When all anonymous pages are swapped into the active linked list by default, non-bumped anonymous pages are also placed into the active linked list. Due to limited space in the active linked list, some bumped anonymous pages are correspondingly moved to the inactive linked list. As a result, the bumped anonymous pages may be removed to the disk swap partition before being accessed again.

In view of this, an embodiment of this application discloses an anonymous page management method. When data of an anonymous page is swapped from memory to external storage space, and then the data of the anonymous page is swapped from the external storage space to the memory, information about a time interval from the swap-in to the swap-out of the anonymous page is processed, and then the swapped-in anonymous page is put into a proper linked list based on a processing result. Specifically, when the information about the time interval from the swap-in to the swap-out of the anonymous page is greater than the preset fixed value, it is considered that the anonymous page is not bumped, and the anonymous page is swapped into an inactive linked list instead of an active linked list. When the information about the time interval from the swap-in to the swap-out of the anonymous page is less than or equal to a preset fixed value, it is considered that the anonymous page is bumped, and the anonymous page is swapped into an active linked list. Therefore, a non-bumped anonymous page is swapped into an inactive linked list, and a bumped anonymous page is swapped into an active linked list, so that the non-bumped anonymous page can be swapped out prior to the bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved, frame freezing in the electronic device is avoided, and user experience is improved.

The anonymous page management method provided in embodiments of this application may be applied to an electronic device. The electronic device may also be referred to as user equipment (User Equipment, UE), a mobile station (Mobile Station, MS), a mobile terminal (Mobile Terminal), or the like. Optionally, the electronic device may have a capability of communicating with one or more core networks through a radio access network (Radio Access Network, RAN). For example, the electronic device may be a mobile phone (or referred to as a "cellular" phone), a computer with a mobile property, or the like. An operating system of the electronic device may include but is not limited to a Linux system, an Android (Android) system, an iOS operating system, a Symbian (Symbian) operating system, a BlackBerry (BlackBerry) operating system, a Windows Phone 8 operating system, and the like. It may be understood that the anonymous page management method provided in embodiments of this application may be applied to an electronic device having a Linux operating system.

FIG. 4-5 is a schematic diagram of a structure of an electronic device 4-100 according to an embodiment of this application.

The electronic device 4-100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality. AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 4-100 may include a processor 4-110, an external memory interface 4-120, an internal memory 4-121, a universal serial bus (universal serial bus, USB) port 4-130, a charging management module 4-140, a power management module 4-141, a battery 4-142, an antenna 4-1, an antenna 4-2, a mobile communications module 4-150, a wireless communications module 4-160, an audio module 4-170, a speaker 4-170A, a receiver 4-170B, a microphone 4-170C, a headset jack 4-170D, a sensor module 4-180, a button 4-190, a motor 4-191, an indicator 4-192, a camera 4-193, a display 4-194, a subscriber identification module (subscriber identification module. SIM) card interface 4-195, and the like. The sensor module 4-180 may include a pressure sensor 4-180A, a gyro sensor 4-180B, a barometric pressure sensor 4-180C, a magnetic sensor 4-180D, an acceleration sensor 4-180E, a distance sensor 4-180F, an optical proximity sensor 4-180G, a fingerprint sensor 4-180H, a temperature sensor 4-180J, a touch sensor 4-180K, an ambient light sensor 4-180L, a bone conduction sensor 4-180M, and the like.

It may be understood that the structure shown in this embodiment of this application does not constitute a specific limitation on the electronic device 4-100. In some other embodiments of this application, the electronic device 4-100 may include more or fewer components than those shown in the figure, or combine some components, or split some components, or have different component arrangements. The components shown in the figure may be implemented by hardware, software, or a combination of software and hardware.

The processor 4-110 may include one or more processing units. For example, the processor 4-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 4-110, and is configured to store instructions and data In some embodiments, the memory in the processor 4-110 is a cache. The memory may store instructions or data that has been used or cyclically used by the processor 4-110. If the processor 4-110 needs to use the instructions or the data again, the processor may directly invoke the instructions or the data from the memory. This avoids repeated access, reduces waiting time of the processor 4-110, and improves system efficiency.

In some embodiments, the processor 4-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO)

interface, a subscriber identification module (subscriber identification module, SIM) interface, a universal serial bus (universal serial bus. USB) port, and/or the like.

The I2C interface is a two-way synchronization serial bus, and includes a serial data line (serial data line, SDA) and a serial clock line (serial clock line, SCL). In some embodiments, the processor 4-110 may include a plurality of groups of I2C buses. The processor 4-110 may be separately coupled to the touch sensor 4-180K, a charger, a flash, the camera 4-193, and the like through different I2C bus interfaces. For example, the processor 4-110 may be coupled to the touch sensor 4-180K through an I2C interface, so that the processor 4-110 communicates with the touch sensor 4-180K through the I2C bus interface, to implement a touch function of the electronic device 4-100.

The I2S interface may be used for audio communication. In some embodiments, the processor 4-110 may include a plurality of groups of I2S buses. The processor 4-110 may be coupled to the audio module 4-170 through the I2S bus, to implement communication between the processor 4-110 and the audio module 4-170. In some embodiments, the audio module 4-170 may transfer an audio signal to the wireless communications module 4-160 through the I2S interface, to implement a function of answering a call by using a Bluetooth headset.

The PCM interface may also be used for audio communication, and samples, quantizes, and codes an analog signal. In some embodiments, the audio module 4-170 may be coupled to the wireless communications module 4-160 through a PCM bus interface. In some embodiments, the audio module 4-170 may alternatively transfer an audio signal to the wireless communications module 4-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 4-110 to the wireless communications module 4-160. For example, the processor 4-110 communicates with a Bluetooth module in the wireless communications module 4-160 through the UART interface, to implement a Bluetooth function. In some embodiments, the audio module 4-170 may transfer an audio signal to the wireless communications module 4-160 through the UART interface, to implement a function of playing music by using a Bluetooth headset.

The MIPI may be configured to connect the processor 4-110 to a peripheral component such as the display 4-194 or the camera 4-193. The MIPI includes a camera serial interface (camera serial interface, CSI), a display serial interface (display serial interface, DSI), and the like. In some embodiments, the processor 4-110 communicates with the camera 4-193 through the CSI, to implement a photographing function of the electronic device 4-100. The processor 4-110 communicates with the display 4-194 through the DSI, to implement a display function of the electronic device 4-100.

The GPIO interface may be configured by using software. The GPIO interface may be configured as a control signal or a data signal. In some embodiments, the GPIO interface may be configured to connect the processor 4-110 to the camera 4-193, the display 4-194, the wireless communications module 4-160, the audio module 4-170, the sensor module 4-180, and the like. The GPIO interface may alternatively be configured as an I2C interface, an I2S interface, a UART interface, an MIPI, or the like.

The USB port 4-130 is a port that conforms to a USB standard specification, and may be specifically a mini USB port, a micro USB port, a USB Type-C port, or the like. The USB port 4-130 may be configured to connect to a charger to charge the electronic device 4-100, or may be configured to transmit data between the electronic device 4-100 and a peripheral device, or may be configured to connect to a headset for playing an audio through the headset. The port may alternatively be configured to connect to another electronic device such as an AR device.

It may be understood that an interface connection relationship between modules in this embodiment of this application is merely an example for description, and does not constitute a limitation on the structure of the electronic device 4-100. In some other embodiments of this application, the electronic device 4-100 may alternatively use an interface connection manner different from that in the foregoing embodiment, or a combination of a plurality of interface connection manners.

The charging management module 4-140 is configured to receive a charging input from a charger. The charger may be a wireless charger or a wired charger. In some embodiments of wired charging, the charging management module 4-140 may receive a charging input from the wired charger through the USB port 4-130. In some embodiments of wireless charging, the charging management module 4-140 may receive a wireless charging input through a wireless charging coil of the electronic device 4-100. When charging the battery 4-142, the charging management module 4-140 may further supply power to the electronic device by using the power management module 4-141.

The power management module 4-141 is configured to connect to the battery 4-142, the charging management module 4-140, and the processor 4-110. The power management module 4-141 receives an input of the battery 4-142 and/or an input of the charging management module 4-140, and supplies power to the processor 4-110, the internal memory 4-121, the display 4-194, the camera 4-193, the wireless communications module 4-160, and the like. The power management module 4-141 may be further configured to monitor parameters such as a battery capacity, a battery cycle count, and a battery health status (electricity leakage or impedance). In some other embodiments, the power management module 4-141 may alternatively be disposed in the processor 4-110. In some other embodiments, the power management module 4-141 and the charging management module 4-140 may alternatively be disposed in a same device.

A wireless communication function of the electronic device 4-100 may be implemented by using the antenna 4-1, the antenna 4-2, the mobile communications module 4-150, the wireless communications module 4-160, the modem processor, the baseband processor, and the like.

The antenna 4-1 and the antenna 4-2 are configured to: transmit and receive electromagnetic wave signals. Each antenna in the electronic device 4-100 may be configured to cover one or more communication frequency bands. Different antennas may be further multiplexed, to increase antenna utilization. For example, the antenna 4-1 may be multiplexed as a diversity antenna in a wireless local area network. In some other embodiments, the antenna may be used in combination with a tuning switch.

The mobile communications module 4-150 may provide a wireless communication solution that includes 2G/3G/4G/

5G or the like and that is applied to the electronic device 4-100. The mobile communications module 4-150 may include at least one filter, a switch, a power amplifier, a low noise amplifier (low noise amplifier, LNA), and the like. The mobile communications module 4-150 may receive an electromagnetic wave through the antenna 4-1, perform processing such as filtering or amplification on the received electromagnetic wave, and transmit the electromagnetic wave to the modem processor for demodulation. The mobile communications module 4-150 may further amplify a signal modulated by the modem processor, and convert an amplified signal into an electromagnetic wave for radiation through the antenna 4-1. In some embodiments, at least some functional modules in the mobile communications module 4-150 may be disposed in the processor 4-110. In some embodiments, at least some functional modules in the mobile communications module 4-150 may be disposed in a same device as at least some modules in the processor 4-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 4-170A, the receiver 4-170B, or the like), or displays an image or a video through the display 4-194. In some embodiments, the modem processor may be an independent device. In some other embodiments, the modem processor may be independent of the processor 4-110, and is disposed in a same device as the mobile communications module 4-150 or another functional module.

The wireless communications module 4-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, or the like and that is applied to the electronic device 4-100. The wireless communications module 4-160 may be one or more components that integrate at least one communications processor module. The wireless communications module 4-160 receives an electromagnetic wave through the antenna 4-2, performs frequency modulation and filtering processing on the electromagnetic wave signal, and sends a processed signal to the processor 4-110. The wireless communications module 4-160 may further receive a to-be-sent signal from the processor 4-110, perform frequency modulation and amplification on the signal, and convert a processed signal into an electromagnetic wave for radiation through the antenna 4-2.

In some embodiments, the antenna 4-1 and the mobile communications module 4-150 in the electronic device 4-100 are coupled, and the antenna 4-2 and the wireless communications module 4-160 in the electronic device 4-100 are coupled, so that the electronic device 4-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system. QZSS), and/or a satellite based augmentation system (satellite based augmentation system, SBAS).

The electronic device 4-100 may implement a display function through the GPU, the display 4-194, the application processor, and the like. The GPU is a microprocessor for image processing, and is connected to the display 4-194 and the application processor. The GPU is configured to: perform mathematical and geometric calculation, and render an image. The processor 4-110 may include one or more GPUs that execute program instructions to generate or change display information.

The display 4-194 is configured to display an image, a video, and the like. The display 4-194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 4-100 may include one or N displays 4-194, where N is a positive integer greater than 1.

The electronic device 4-100 may implement a photographing function through the ISP, the camera 4-193, the video codec, the GPU, the display 4-194, the application processor, and the like.

The ISP is configured to process data fed back by the camera 4-193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 4-193.

The camera 4-193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 4-100 may include one or N cameras 4-193, where N is a positive integer greater than 1.

The digital signal processor is configured to process a digital signal, and may further process another digital signal in addition to a digital image signal. For example, when the electronic device 4-100 selects a frequency, the digital signal processor is configured to perform Fourier transform or the like on frequency energy.

The video codec is configured to: compress or decompress a digital video. The electronic device 4-100 may support one or more video codecs. In this way, the electronic device 4-100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 4-100, such as image recognition, facial recognition, speech recognition, and text understanding.

The internal memory 4-121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle, may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by using the processor 4-110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 4-110.

The external memory interface 4-120 may be configured to connect to an external non-volatile memory, to extend a storage capability of the electronic device 4-100. The external non-volatile memory communicates with the processor 4-110 through the external memory interface 4-120, to implement a data storage function. For example, files such as music and videos are stored in the external non-volatile memory.

The electronic device 4-100 may implement audio functions, for example, music playing and recording, by using the audio module 4-170, the speaker 4-170A, the receiver 4-170B, the microphone 4-170C, the headset jack 4-170D, the application processor, and the like.

The audio module 4-170 is configured to convert digital audio information into an analog audio signal for output, and is also configured to convert an analog audio input into a digital audio signal. The audio module 4-170 may be further configured to: code and decode an audio signal. In some embodiments, the audio module 4-170 may be disposed in the processor 4-110, or some functional modules in the audio module 4-170 are disposed in the processor 4-110.

The speaker 4-170A, also referred to as a "horn", is configured to convert an electrical audio signal into a sound signal. The electronic device 4-100 may be used to listen to music or answer a call in a hands-free mode over the speaker 4-170A.

The receiver 4-170B, also referred to as an "earpiece", is configured to convert an electrical audio signal into a sound signal. When a call is answered or speech information is received through the electronic device 4-100, the receiver 4-170B may be put close to a human ear to listen to a voice.

The microphone 4-170C, also referred to as a "mike" or a "mic", is configured to convert a sound signal into an electrical signal. When making a call or sending voice information, a user may make a sound near the microphone 4-170C through the mouth of the user, to input the sound signal to the microphone 4-170C. At least one microphone 4-170C may be disposed in the electronic device 4-100. In some other embodiments, two microphones 4-170C may be disposed in the electronic device 4-100, to implement a noise reduction function in addition to collecting a sound signal. In some other embodiments, three, four, or more microphones 4-170C may alternatively be disposed in the electronic device 4-100, to collect a sound signal, reduce noise, identify a sound source, implement a directional recording function, and the like.

The headset jack 4-170D is configured to connect to a wired headset. The headset jack 4-170D may be the USB port 4-130, or may be a 3.5 mm open mobile terminal platform (open mobile terminal platform, OMTP) standard interface or a cellular telecommunications industry association of the USA (cellular telecommunications industry association of the USA. CTIA) standard interface.

The pressure sensor 4-180A is configured to sense a pressure signal, and may convert the pressure signal into an electrical signal. In some embodiments, the pressure sensor 4-180A may be disposed on the display 4-194. There are many types of pressure sensors 4-180A, for example, a resistive pressure sensor, an inductive pressure sensor, and a capacitive pressure sensor. The capacitive pressure sensor may include at least two parallel plates with conductive materials. When a force is applied to the pressure sensor 4-180A, capacitance between electrodes changes. The electronic device 4-100 determines pressure intensity based on the change of the capacitance. When a touch operation is performed on the display 4-194, the electronic device 4-100 detects intensity of the touch operation based on the pressure sensor 4-180A. The electronic device 4-100 may also calculate a touch location based on a detection signal of the pressure sensor 4-180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 4-180B may be configured to determine a motion posture of the electronic device 4-100. In some embodiments, an angular velocity of the electronic device 4-100 around three axes (that is, axes x, y, and z) may be determined through the gyro sensor 4-180B. The gyro sensor 4-180B may be configured to implement image stabilization during photographing. For example, when the shutter is pressed, the gyro sensor 4-180B detects an angle at which the electronic device 4-100 jitters, calculates, based on the angle, a distance for which a lens module needs to compensate, and allows the lens to cancel the jitter of the electronic device 4-100 through reverse motion, to implement image stabilization. The gyro sensor 4-180B may also be used in a navigation scenario and a motion-sensing gaming scenario.

The barometric pressure sensor 4-180C is configured to measure barometric pressure. In some embodiments, the electronic device 4-100 calculates an altitude based on a value of the barometric pressure measured by the barometric pressure sensor 4-180C, to assist in positioning and navigation.

The magnetic sensor 4-180D includes a Hall sensor. The electronic device 4-100 may detect opening and closing of a flip leather case by using the magnetic sensor 4-180D. In some embodiments, when the electronic device 4-100 is a clamshell phone, the electronic device 4-100 may detect opening and closing of a flip cover by using the magnetic sensor 4-180D. Further, a feature such as automatic unlocking upon opening of the flip cover is set based on a detected opening or closing state of the flip cover.

The acceleration sensor 4-180E may detect magnitudes of accelerations of the electronic device 4-100 in various directions (usually on three axes), and may detect a magnitude and a direction of gravity when the electronic device 4-100 is still. The acceleration sensor may be further configured to recognize a posture of the electronic device, and is used in an application such as switching between landscape mode and portrait mode or a pedometer.

The distance sensor 4-180F is configured to measure a distance. The electronic device 4-100 may measure the distance in an infrared manner or a laser manner. In some embodiments, in a photographing scenario, the electronic device 4-100 may measure a distance through the distance sensor 4-180F to implement quick focusing.

The optical proximity sensor 4-180G may include, for example, a light-emitting diode (LED) and an optical detector, for example, a photodiode. The light-emitting diode may be an infrared light-emitting diode. The electronic device 4-100 emits infrared light by using the light-emitting diode. The electronic device 4-100 detects infrared reflected light from a nearby object by using the photodiode. When detecting sufficient reflected light, the electronic device 4-100 may determine that there is an object near the electronic device 4-100. When detecting insufficient reflected light, the electronic device 4-100 may determine that there is no object near the electronic device 4-100. The electronic device 4-100 may detect, by using the optical proximity sensor 4-180G, that the user holds the electronic device 4-100 close to an ear to make a call, to automatically turn off a screen for power saving. The optical proximity sensor 4-180G may also be used in a flip cover mode or a pocket mode to automatically perform screen unlocking or locking.

The ambient light sensor 4-180L is configured to sense ambient light brightness. The electronic device 4-100 may adaptively adjust brightness of the display 4-194 based on the sensed ambient light brightness. The ambient light sensor 4-180L may also be configured to automatically adjust white balance during photographing. The ambient light sensor 4-180L may further cooperate with the optical proximity sensor 4-180G to detect whether the electronic device 4-100 is in a pocket, to avoid an accidental touch.

The fingerprint sensor 4-180H is configured to collect a fingerprint. The electronic device 4-100 may use a feature of the collected fingerprint to implement fingerprint-based unlocking, application lock access, fingerprint-based photographing, fingerprint-based call answering, and the like.

The temperature sensor 4-180J is configured to detect a temperature. In some embodiments, the electronic device 4-100 executes a temperature processing policy by using the temperature detected by the temperature sensor 4-180J. For example, when the temperature reported by the temperature sensor 4-1803 exceeds a threshold, the electronic device 4-100 lowers performance of a processor near the temperature sensor 4-1803, to reduce power consumption for thermal protection. In some other embodiments, when the temperature is less than another threshold, the electronic device 4-100 heats the battery 4-142 to prevent the electronic device 4-100 from being abnormally powered off because of a low temperature. In some other embodiments, when the temperature is less than still another threshold, the electronic device 4-100 boosts an output voltage of the battery 4-142 to avoid abnormal shutdown caused by a low temperature.

The touch sensor 4-180K is also referred to as a "touch component". The touch sensor 4-180K may be disposed on the display 4-194, and a touchscreen includes the touch sensor 4-180K and the display 4-194. The touch sensor 4-180K is configured to detect a touch operation performed on or near the touch sensor. The touch sensor may transfer a detected touch operation to the application processor, to determine a type of a touch event. A visual output related to the touch operation may be provided through the display 4-194. In some other embodiments, the touch sensor 4-180K may alternatively be disposed on a surface of the electronic device 4-100 and is located at a location different from that of the display 4-194.

The bone conduction sensor 4-180M may obtain a vibration signal. In some embodiments, the bone conduction sensor 4-180M may obtain a vibration signal of a vibration bone of a human vocal-cord part. The bone conduction sensor 4-180M may also be in contact with a body pulse to receive a blood pressure beating signal. In some embodiments, the bone conduction sensor 4-180M may also be disposed in a headset, to form a bone conduction headset. The audio module 4-170 may obtain a voice signal through parsing based on the vibration signal that is of the vibration bone of the vocal part and that is obtained by the bone conduction sensor 4-180M, to implement a voice function. The application processor may parse heart rate information based on the blood pressure beating signal obtained by the bone conduction sensor 4-180M, to implement a heart rate detection function.

The button 4-190 includes a power button, a volume button, and the like. The button 4-190 may be a mechanical button, or may be a touch button. The electronic device 4-100 may receive a key input, and generate a key signal input related to a user setting and function control of the electronic device 4-100.

The motor 4-191 may generate a vibration prompt. The motor 4-191 may be configured to provide an incoming call vibration prompt and a touch vibration feedback. For example, touch operations performed on different applications (for example, photographing and audio playing) may correspond to different vibration feedback effects. The motor 4-191 may also correspond to different vibration feedback effects for touch operations performed on different areas of the display 4-194. Different application scenarios (for example, a time reminder scenario, an information receiving scenario, an alarm clock scenario, and a game scenario) may also correspond to different vibration feedback effects. The touch vibration feedback effect may also be customized.

The indicator 4-192 may be an indicator light, and may be configured to indicate a charging status and a power change, or may be configured to indicate a message, a missed call, a notification, and the like.

The SIM card interface 4-195 is configured to connect to a SIM card. The SIM card may be inserted into the SIM card interface 4-195 or removed from the SIM card interface 4-195, to implement contact with or separation from the electronic device 4-100. The electronic device 4-100 may support one or N SIM card interfaces, where N is a positive integer greater than 1. The SIM card interface 4-195 may support a nano-SIM card, a micro-SIM card, a SIM card, and the like. A plurality of cards may be simultaneously inserted into a same SIM card interface 4-195. The plurality of cards may be of a same type or of different types. The SIM card interface 4-195 is compatible with different types of SIM cards. The SIM card interface 4-195 is also compatible with an external storage card. The electronic device 4-100 interacts with a network through the SIM card, to implement functions such as calling and data communication. In some embodiments, the electronic device 4-100 uses an eSIM, that is, an embedded SIM card. The eSIM card may be embedded in the electronic device 4-100, and cannot be separated from the electronic device 4-100.

A software system of the electronic device 4-100 may use a layered architecture, an event-driven architecture, a microkernel architecture, a micro service architecture, or a cloud architecture. In this embodiment of this application, an Android system with a layered architecture is used as an example to describe a software structure of the electronic device 4-100.

Figures 1, 2, 3, 4, 5, 6:
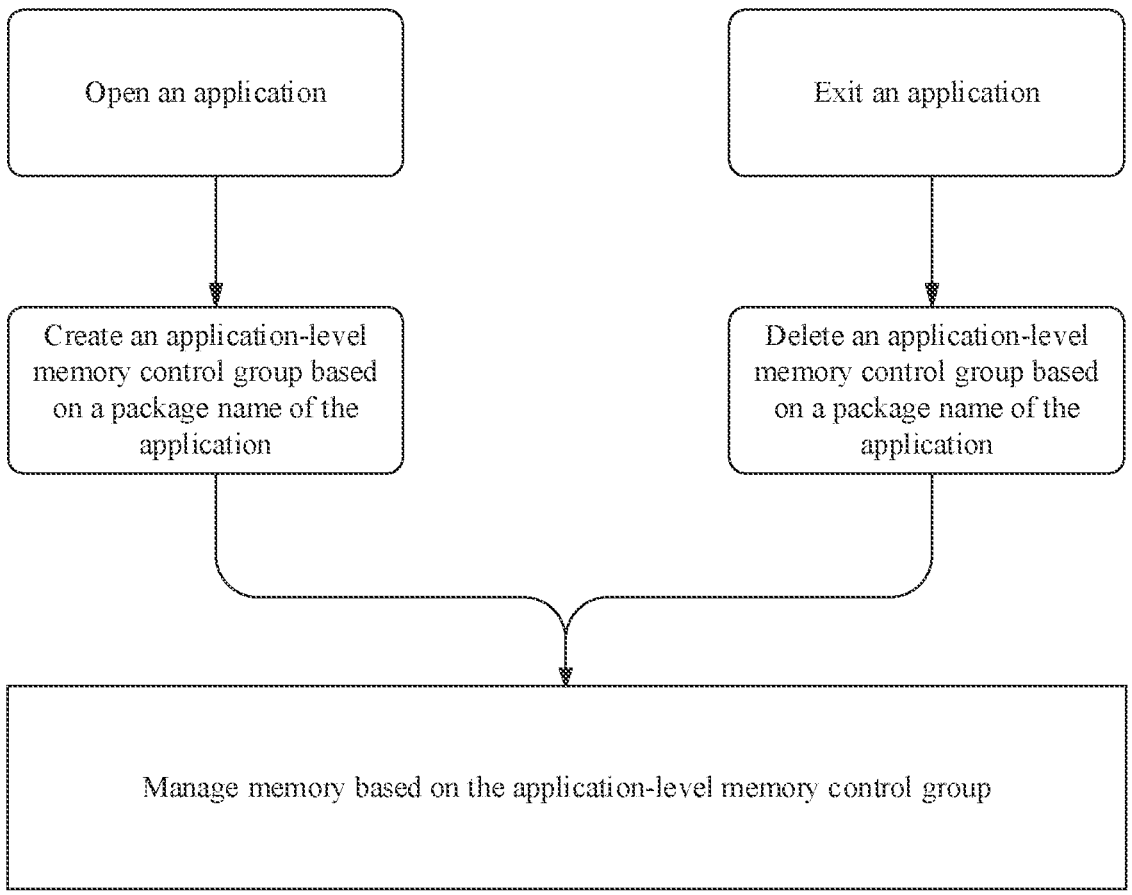

FIG. 4-6 is a block diagram of a software structure of an electronic device 4-100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 4-6, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 4-6, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and received, a browsing history and a browsing bookmark, an address book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide communication functions of the electronic device 4-100, for example, management of a call status (including answering or declining).

The resource manager provides, for an application, various resources such as a localized character string, an icon, a picture, a layout file, and a video file.

The notification manager enables an application to display notification information in a status bar, and may be configured to convey a notification message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an announcement is produced, the electronic device 4-100 vibrates, or an indicator light blinks.

The Android runtime includes a core library and a virtual machine. The Android runtime is responsible for scheduling and management of the Android system.

The core library includes two parts: a function that needs to be invoked by Java language, and a core library of Android.

The application layer and the application framework layer run on a virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 4-100 with reference to a photographing scenario.

When the touch sensor 4-180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, a camera driver is started by invoking the kernel layer, and a static image or a video is captured through the camera 4-193.

It should be noted that, an anonymous page active linked list described below is an active linked list to which an anonymous page belongs, and similarly, an anonymous page inactive linked list is an inactive linked list to which an anonymous page belongs.

In this embodiment of this application, an example in which the external storage space is a disk is used for description.

The following describes in detail the technical solutions in embodiments of this application with reference to the accompanying drawings in embodiments of this application.

FIG. 4-7a and FIG. 4-7b are a schematic diagram of a lifecycle of an anonymous page according to an embodiment of this application. As shown in FIG. 4-7a and FIG. 4-7b, the lifecycle of the anonymous page includes five parts: anonymous page creation ①, anonymous page use ②, anonymous page swap-out ③, anonymous page swap-in ④, and anonymous page destruction ⑤.

Anonymous page creation ①: An anonymous page is created at least in the following cases: (1) malloc/mmap interface function is performed in user space to allocate memory. When a page fault occurs in kernel space, do_anonymous_page( ) is performed to create the anonymous page. (2) When copy-on-write occurs and a write protection error occurs due to a page fault, the anonymous page is created. do_wp_page( ) or do_cow_page( ) may be performed to create the anonymous page. (3) The anonymous page is created when do_swap_page( ) is performed to read data from a disk swap partition. (4) The anonymous page is also created during page migration. As shown in FIG. 4-7a and FIG. 4-7b, P0 to PX are page frames in an active linked list, P10 to PY are page frames in an inactive linked list, a swap partition is a disk swap partition, and another partition is another partition of a disk, including a root partition, a/usr partition, a/home partition, or the like. After an anonymous page is created, a new anonymous page X is generated, and the new anonymous page X is placed into a page frame. This application imposes no specific limitation on creation of the anonymous page.

Anonymous page uses ②: After a new anonymous page X is created, a mapping relationship between virtual address space and a physical address page of a process is established, and the process accesses the virtual address, that is, accesses data of the anonymous page. After being created, the new anonymous page is used by a process in which a page fault occurs, and the newly created anonymous page X is placed into the head of an anonymous page active linked list, so that data of the anonymous page is accessed by a related process. After the anonymous page X is used, if the anonymous page X is no longer used for a long time, the anonymous page X moves backward gradually in the anonymous page active linked list over time. For example, the anonymous page X moves from the page frame P0 to the page frame P1 and then moves backward gradually. When the anonymous page X reaches the tail of the active linked list, a shrink_active_list( ) function is performed in a memory reclamation process to move the anonymous page at the tail of the anonymous page active linked list to the head of the inactive linked list, that is, the anonymous page X moves from the page frame PX to the page frame P10. If the anonymous page X is still not used after being moved to the inactive linked list, the anonymous page X continues to be moved backward in the inactive linked list. For example, the anonymous page X is moved from the page frame P10 to the page frame P11, and is gradually moved to the tail of the inactive linked list. That is, the anonymous page X is moved to the page frame PY.

Anonymous page swap-out ③: When the anonymous page X moves to the tail of the inactive linked list, if the kernel performs a memory reclamation action, a corresponding function is performed to swap data of the anonymous page X to the disk swap partition, that is, swap data stored in the page frame PY to the disk swap partition, and then release an actual physical address page occupied by the anonymous page X in memory, that is, release the page frame PY. In this case, data of other anonymous pages can be stored in the page frame PY. Specifically, a swap space page table entry Swap Entry is allocated during swap-out, and the swap space page table entry Swap Entry is a data structure used to record related information of an anonymous page after the anonymous page is swapped into a disk swap partition. An existing swap space page table entry Swap Entry includes only a page table index (val, unsigned long integer), and the page table index is used as an "index" of the anonymous page after data of the anonymous page is swapped into a disk swap partition, and is used to record "coordinates" of the anonymous page in the disk swap partition, so that data swapped out of the anonymous page can be found from the disk swap partition based on the "coordinates". The page table index includes a page table number and an offset (number) in a page table. In a possible implementation, a structure of the page table index in a 64-bit system is shown in FIG. 4-8. In FIG. 4-8, details are as follows: $0^{th}$ bit and $1^{st}$ bit: Least significant two bits are reserved, used to indicate PAGE_PRESENT, and are 0, $2^{bd}$ bit to $7^{th}$ bit: A page table number type is used to indicate a page table number in a swap partition. $8^{th}$ bit to $5^{th}$ bit: are an offset (offset), and are used to indicate an offset in a page table numbered type in the swap partition, that is, a page number. $58^{th}$ bit: used to indicate validity of a page table entry, and is set to 0 (1 indicates that the index is invalid). $59^{th}$ bit to $63^{rd}$ bit: There is no data content.

In a possible implementation, after the swap space page table entry Swap Entry is generated, the swapped-out data of the anonymous page is placed into the swap cache space. If the anonymous page needs to be accessed again in this process, a process that needs to access the anonymous page is enabled to directly read the data of the anonymous page from the swap cache space. The page data corresponding to the anonymous page is not swapped out, and the swap space page table entry Swap Entry is reclaimed and becomes a PTE page table entry again.

Anonymous page swap-in ④: When the swapped-out anonymous page X is required by a process, a page fault occurs. A page table entry (PTE) of the anonymous page records that a physical page is not in memory, but the page table entry (PTE) is not empty, indicating that the anonymous page X is swapped to external storage space. A do_swap_page( ) function is performed to re-read the data of the anonymous page X, and the data of the anonymous page X is written into a new empty page, to obtain a new anonymous page, swap the new anonymous page into the memory, and directly swap, by default, the new anonymous page into an active linked list to which the original anonymous page X belongs.

In a possible implementation, when the new anonymous page is swapped into the memory, a pointer direction of the swap cache space to the new anonymous page is added, that is, a pointer of the new anonymous page is stored in both the swap cache space and a linked list corresponding to the anonymous page. In the conventional technology, the new anonymous page is directly swapped, by default, into the active linked list to which the original anonymous page X belongs, and therefore the pointer of the new anonymous page is stored in the active linked list to which the anonymous page is swapped. When a program swaps in a page, the program first searches the swap cache space for the page. If the page is found, the program fills the page in a corresponding page table entry PTE and converts a direction to the external storage space into a direction to the swap cache space. If the page is not found in the swap cache space, it indicates that no other process has accessed the page before. In this case, the external storage space needs to be searched for the page.

Anonymous page destruction ⑤: When a user process is closed or exits, virtual addresses of the user process are scanned, mapping on these virtual addresses is cleared, and an actual physical address of the anonymous page X is released. As shown in FIG. 4-7a and FIG. 4-7b, after the anonymous page X is accessed, a process corresponding to the anonymous page X exits. In this case, data of the anonymous page X is swapped out, the anonymous page X is destroyed, and a memory address of the page frame P0 is released.

FIG. 4-9 is a schematic flowchart of an anonymous page management method according to an embodiment of this application. As shown in FIG. 4-9, the method is performed by an electronic device 4-100. A specific implementation process of this application is described by using a Linux system as an example. However, an application scenario of this application is not limited to the Linux system, and may be an Android system. The electronic device 4-100 may be a mobile phone, a tablet computer, or the like. The method may include but is not limited to the following steps.

Step S4-01: When data swapped out of an anonymous page is swapped into memory, obtain information about a time interval from the swap-in to the swap-out.

In this embodiment of this application, the data swapped out of the anonymous page means that data of an entire page of the anonymous page is swapped from the memory to the external storage space. That the data swapped out of the anonymous page is swapped from the external storage space to the memory means that the data that is of the entire page and that is swapped out of the anonymous page to the external storage space is swapped into the memory again.

In this embodiment of this application, after the data of the anonymous page is swapped to the external storage space, if a page fault occurs when the swapped-out anonymous page is required by a process, a corresponding function is called to write the data of the anonymous page from the external storage space to the memory. When the data of the anonymous page is written to the memory, the anonymous page management method in this application is performed, to determine whether to write the anonymous page to an inactive linked list corresponding to the anonymous page or to an active linked list corresponding to the anonymous page.

In this embodiment of this application, the information about the time interval records a swap-out moment of swapping the data of the anonymous page to the external storage space, and records a swap-in moment of swapping the data of the anonymous page from the external storage space to the memory. In this case, information about a time period between the swap-out moment and the swap-in moment that are adjacent to each other is the information about the time interval That is, after being swapped out at a current moment, the data of the anonymous page needs to be accessed and then swapped to the memory again, and a time distance between the two moments of the current swap-in and the previous swap-out is defined as the information about the time interval from the swap-in to the swap-out.

In this embodiment of this application, when a page fault occurs and a corresponding function is called to write the data of the anonymous page from the external storage space to the memory, the information about the time interval from the swap-in to the swap-out is obtained, and a quantity of pages moved by using an inactive linked list in the process is used to approximately express logical time of total swap-out duration of the page, instead of recording real time in a manner such as a timestamp.

In this embodiment of this application, a quantity of moved pages (inactive_age) of an anonymous page inactive linked list is a statistical value maintained in each memory management zone (zone), and is described as zone→inactive_age. The statistical value refers to a quantity of moved pages in an inactive linked list to which the anonymous page belongs in a memory management zone (zone) to which the anonymous page belongs, inactive age belongs to a memory management zone in which inactive age is located. Different memory management zones have different inactive_age, inactive age is an accumulated value. After each system is started and before the system is restarted, inactive_age is not cleared, and a value of inactive_age is continuously accumulated based on page movement of the inactive linked list to which the anonymous page belongs. Page movement of the inactive linked list to which the anonymous page belongs is movement of an entire location of the inactive linked list to which the anonymous page belongs, including removal or upgrade of an anonymous page in the inactive linked list to which the anonymous page belongs. When an anonymous page in the inactive linked list to which the anonymous page belongs is removed from the tail of the inactive linked list, the statistical value inactive_age is increased by one. When an anonymous page in the inactive linked list to which the anonymous page belongs is accessed again (that is, except the first access), the anonymous page is upgraded from the inactive linked list to the active linked list to which the anonymous page belongs, and the statistical value inactive_age is increased by one.

In this embodiment of this application, page removal means that a page leaves from the tail of the inactive linked list, and data of the page is moved to the external storage space. This process is referred to as page removal.

In this embodiment of this application, page upgrade means that a page leaves from the inactive linked list and is moved to the active linked list. This process is referred to as page upgrade.

In this embodiment of this application, the information about the time interval from the swap-in to the swap-out includes information about a time interval between swap-out of an anonymous page and first swap-in after the swap-out.

For example, after an anonymous page A swaps all data B in the anonymous page to the external storage space, when a process needs to access the anonymous page A, that is, needs to read the data B, a page fault occurs, and the swapped-out data B is swapped into the memory. The data B corresponding to the anonymous page A is modified into data C in the memory. In this case, the data of the anonymous page is the data C. After the anonymous page A swaps the data C to the external storage space again, when the process needs to access the anonymous page A, that is, read the data C, a page fault occurs, and the data C is swapped into the memory. In this case, the information about the time interval from the swap-in to the swap-out includes information about a time interval between swapping the data B of the anonymous page A from the external storage space to the memory and swapping the data B from the memory to the external storage space, or the information about the time interval from the swap-in to the swap-out includes information about a time interval between swapping the data C of the anonymous page A from the external storage space to the memory and swapping the data C from the memory to the external storage space.

For example, the anonymous page is swapped from the tail of the inactive linked list at a moment T0, a page fault occurs at a moment T1, and the anonymous page is swapped from the external storage space to the memory at a next moment, that is, a moment T2, based on the page fault at the moment T1. In this case, the information about the time interval from the swap-in to the swap-out includes information about a time interval between the moment T2 and the moment T0.

Step S4-02: Swap the anonymous page into an inactive linked list when a value corresponding to the information about the time interval is greater than a preset fixed value.

In this embodiment of this application, the preset fixed value is a preset value, and the preset fixed value remains unchanged when the anonymous page management method in this application is performed.

It may be understood that, during memory reclamation, the anonymous page is swapped from the tail of the inactive linked list to the external storage space. Therefore, a probability that the anonymous page in the inactive linked list is swapped out is higher than a probability that the anonymous page in the active linked list is swapped out, and a length of the active linked list is fixed. Compared with the conventional technology in which bumped and non-bumped anonymous pages are swapped to the active linked list by default, in this embodiment, some bumped anonymous pages are correspondingly moved to the inactive linked list.

In this embodiment of this application, the anonymous page is swapped into the inactive linked list when the value corresponding to the information about the time interval is greater than the preset fixed value. In this case, the swapping into the inactive linked list includes two possibilities. One possibility is that the anonymous page swapped into the inactive linked list is not accessed in the active linked list to which the anonymous page belongs, is moved to the inactive linked list, then is swapped from the tail of the inactive linked list to the external storage space, and finally is swapped from the external storage space to the memory, and therefore is swapped into the inactive linked list. The other possibility is that when a newly created anonymous page is swapped into the memory, the newly created anonymous page is swapped into the inactive linked list.

In this embodiment of this application, when the value corresponding to the information about the time interval is greater than the preset fixed value, it is considered that the anonymous page is bumped, and the bumped anonymous page is swapped into the inactive linked list. When the value corresponding to the information about the time interval is less than the preset fixed value, it is considered that the anonymous page is non-bumped, and the non-bumped anonymous page is swapped into the active linked list.

In this embodiment of this application, the information about the time interval is compared with the preset fixed value, to determine whether the anonymous page is bumped. When the value corresponding to the information about the time interval is greater than the preset fixed value, it is determined that the anonymous page is non-bumped, and the anonymous page cannot be swapped into the active linked list each time the anonymous page is swapped in, and therefore the non-bumped anonymous page is swapped into the inactive linked list. In this case, from a perspective of the entire anonymous page linked list, occupation of the active linked list by the non-bumped anonymous page is reduced, and more bumped anonymous pages can be swapped into the active linked list. The non-bumped anonymous page is swapped to the external storage space prior to the bumped anonymous page, so that the non-bumped anonymous page can be swapped out prior to the bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

FIG. 4-10*a* and FIG. 4-10*b* are a schematic diagram of an anonymous page swap-out procedure according to an embodiment of this application. An example in which external storage space is a disk is used for description.

As shown in FIG. 4-10*a* and FIG. 4-10*b*, there are many memory management zones in memory, including a memory management zone 4-1 to a memory management zone 4-N. The memory management zone 4-N is used for description. The memory management zone includes a file page active linked list, a file page inactive linked list, an anonymous page active linked list, and an anonymous page inactive linked list. The memory further includes a page table, the page table includes a page table entry PTE, and the page table entry PTE includes a swap space page table entry. The anonymous page active linked list includes a page frame P0 to a page frame PX, and the anonymous page inactive linked list includes a page frame P10 to a page frame PY Herein, N, X, and Y are positive integers greater than 1. Disks include a disk swap partition and another partition. In the disk swap partition, "paging" can be performed to facilitate data exchange between the memory and the disk.

For swap-out of the anonymous page in the memory management zone 4-N, after the anonymous page is used, if the anonymous page is no longer used for a long time, the anonymous page moves backward gradually in the anonymous page linked list (an anonymous page active lined list and an anonymous page inactive linked list) over time. When the anonymous page reaches the tail of the anonymous page active linked list, that is, reaches the page frame PX, the anonymous page at the tail of the active linked list is moved to the head of the anonymous page inactive linked list by using the shrink_active_list( ) method in the memory reclamation process, that is, the data of the anonymous page is moved from the page frame PX to the page frame P10. If the anonymous page is still not used after being moved to the anonymous page inactive linked list, the anonymous page continues to be moved backward in the anonymous page inactive linked list.

When the anonymous page is moved to the tail of the inactive linked list, that is, the anonymous page is moved to the page frame PY, if the kernel performs a memory reclamation action, a shrink_inactive_list( ) method is performed to swap data of the anonymous page to the external storage space, that is, the entire page data of the anonymous page is swapped to the disk swap partition. In this case, a statistical value of inactive_age maintained in a memory management zone to which the anonymous page belongs is increased by 1. Based on a fact that the value of inactive_age corresponds to the memory management zone 4-N, the value of inactive_age is zone→inactive_age, that is, the value of zone→inactive_age maintained in the memory management zone 4-N is increased by 1. The anonymous page linked list is located m the memory management zone (zone), and the statistical value (zone→inactive age) is a statistical value maintained in each memory management zone. Therefore, the value of inactive_age in the memory management zone to which the anonymous page linked list belongs may be directly read. inactive_age is stored in the memory management zone and is represented by integer space. The code zone→inactive_age is executed to read the statistical value.

When the shrink_inactive_list( ) method is performed to swap the data of the anonymous page to the disk swap partition, a get_swap_page( ) function is called to search the disk swap partition for a vacant location that can accommodate the anonymous page, allocate a swap space page table entry Swap Entry to the swapped-out anonymous page, and apply for two pieces of memory space. One is used to record a page table index, and the other is used to record a time parameter of a swap-out moment. A specific number of the found vacant location is recorded in a page table index of a swap space page table entry Swap Entry, inactive_age of the swap-out moment is recorded, and inactive age is recorded in the time parameter of the swap-out moment in the swap space page table entry Swap Entry, so that during swap-out, based on a location number specified in the page table index of the page table entry Swap Entry obtained after conversion, a swap_writepage( ) function is performed to swap the data of the anonymous page in the page frame PY into the location number specified by the disk swap partition, and release the page frame PY for a process in which a memory page fault occurs. Finally, a Swap_entry_to_pte( ) function is performed to store the allocated swap space page table entry Swap Entry in the PTE page table entry, that is, the swap space page table entry Swap Entry is converted into the PTE page table entry by using the Swap_entry_to_pte( ) function, and the PTE page table entry obtained through conversion is used to overwrite a page table entry existing before swap-out, and is stored in a PTE page table.

In a possible implementation, during swap-out of the anonymous page, data of the anonymous page may be stored in the swap cache (Swap cache) space, a direction of the swap cache (Swap cache) space to a page of an anonymous page to be swapped out is added, and a state of the anonymous page is marked as "dirty". After the data of the anonymous page is swapped into the location number specified by the swap partition of the external storage space, a direction of the swap cache space to the page of the anonymous page is cleared.

In this embodiment of this application, compared with a swap space page table entry in the conventional technology, the swap space page table entry Swap Entry in this application further includes a time parameter of a swap-out moment, and the time parameter of the swap-out moment records a value of inactive_age of the swap-out moment. The swap space page table entry Swap Entry in this embodiment of this application includes a page table index and a time parameter of a swap-out moment.

For example, before the anonymous page is swapped from the memory to the external storage space, inactive age is 999. When the anonymous page is swapped from the memory to the external storage space, the anonymous page is removed from the tail of the inactive linked list. In this case, inactive_age is increased by 1, and inactive_age is 1000. A swap space page table entry Swap Entry is allocated to the anonymous page, and a time parameter of a swap-out moment is recorded as 1000 in the swap space page table entry Swap Entry.

According to the anonymous page management method provided in this embodiment of this application, newly added space is applied for when a swap space page table entry Swap Entry is allocated, to record a time parameter of a swap-out moment. During swap-in, a time parameter of a swap-in moment is read. Therefore, a linked list into which the anonymous page is swapped is determined based on information about a time interval from swap-in to swap-out, and a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

FIG. 4-11 is a schematic flowchart of an anonymous page swap-out method according to an embodiment of this application. A procedure of the anonymous page swap-out method includes the following steps.

Step S4-10: During swap-out of an anonymous page, allocate a swap space page table entry to the anonymous page, to record a storage location, in external storage space, of anonymous page data allocated to the anonymous page.

In a possible implementation, when system memory is insufficient, or when an operating system detects that memory is less than a memory watermark, some pages need to be reclaimed to release the memory, and page reclamation always starts from the tail of an inactive linked list, and therefore an anonymous page at the tail of the inactive linked list needs to be released. When the anonymous page is released, data of the anonymous page may be swapped to the external storage space. In this embodiment of this application, the anonymous page is swapped from the memory to the external storage space means that page data of the entire anonymous page is swapped out, and a data size is 4K. If the swapped-out data is compressed, space occupied by the swapped-out data stored in the external storage space is less than 4K.

In this embodiment of this application, when the anonymous page needs to be released for another reason, and the entire 4K page content data of the anonymous page is swapped to the external storage space, a page table entry needs to be allocated to the anonymous page, where the allocated page table entry is a swap space page table entry Swap Entry, and the swap space page table entry Swap Entry is used to record a specific number of a vacant location that is in the external storage space, that is found for the anonymous page, and that is used to store the page data of the anonymous page and a time parameter of a swap-out moment.

In this embodiment of this application, when the swap space page table entry Swap Entry is allocated to an anonymous page, memory space is applied for. Refer to FIG. 4-10a and FIG. 4-10b. The swap space page table entry swp_entry_t in this application includes two pieces of memory space. One is used to record a page table index. The page table index includes a page table number and an offset. The page table index is used to record a data structure of information related to the anonymous page, and includes a specific number of a vacant location that is in the external storage space and that is found for data of the anonymous page. The other is newly applied memory space, and the newly applied memory space is used to record a time parameter of an anonymous page swap-out moment. As shown in FIG. 4-10a and FIG. 4-10b, the time parameter of the swap-out moment is a value of inactive_age maintained in a memory management zone to which the anonymous page belongs at the anonymous page swap-out moment. The page table index may be stored as an integer, and the time parameter of the swap-out moment may be stored as an integer, where the integer may be 64 bits or 32 bits.

Step S4-20: Record the time parameter of the swap-out moment.

In this embodiment of this application, when the data of the anonymous page is swapped to the external storage space, the time parameter of the swap-out moment is further recorded, to obtain information about a time interval from swap-in to swap-out based on the time parameter of the swap-out moment.

In this embodiment of this application, when the data of the anonymous page is swapped from the memory to the external storage space, inactive_age maintained in the memory management zone to which the anonymous page belongs is updated, the value of inactive_age is increased by 1, and an updated value of inactive_age is read. After the swap space page table entry is allocated, updated inactive_age is recorded in the swap space page table entry.

In a possible implementation, the time parameter of the swap-out moment includes a quantity of pages moved from an inactive linked list to which the anonymous page belongs when the data of the anonymous page is swapped to the external storage space. As shown in FIG. 4-10a and FIG. 4-10b, corresponding inactive_age in a memory management zone 4-N is read at the anonymous page swap-out moment. The quantity inactive_age of pages moved from the inactive linked list to which the anonymous page belongs is a value maintained in each memory management zone. The statistical value is directly read and recorded in the swap space page table entry Swap Entry, that is, the statistical value is stored in the newly applied memory space in the swap space page table entry Swap Entry.

It may be understood that, an action of reclaiming an anonymous page in the inactive linked list is used as a "time metric", and an action of removing an anonymous page in the anonymous page inactive linked list from a linked list is recorded as a "moment". An action of upgrading an anonymous page in the anonymous page inactive linked list from the inactive linked list to an active linked list is also recorded as a "moment". That is, when an anonymous page in the anonymous page inactive linked list is removed from the linked list or upgraded, a value of inactive_age is updated in the memory manager zone to which the anonymous page belongs.

Step S4-30: Write the data of the anonymous page into the external storage space based on a location recorded in the swap space page table entry.

In this embodiment of this application, a corresponding specified location is found in the external storage space based on a location number recorded in the page table entry Swap Entry, and a corresponding function is performed to write the data of the anonymous page to the specified location in the external storage space, that is, the swapped-out data is converted into a simplest and most original data stream through serialization and stored in the specified location in the external storage space, the anonymous page is released, and physical memory space obtained through release is used by a process in which a memory page fault occurs.

Step S4-40: Convert the swap space page table entry into a PTE page table entry, and store the PTE page table entry in a PTE page table.

In this embodiment of this application, after the data of the anonymous page is swapped to the external storage space, the swap space page table entry Swap Entry is converted into the PTE page table entry, and the PTE page table entry is stored in the PTE page table. When the data of the anonymous page corresponding to the swap space page table entry Swap Entry is swapped into the memory, the swap space page table entry Swap Entry is destroyed.

In a possible implementation, after the swap space page table entry Swap Entry is generated, the swapped-out data of the anonymous page is placed into the swap cache space. If the anonymous page needs to be accessed again in this process, a process that needs to access the anonymous page is enabled to directly read the data of the anonymous page from the swap cache space. The page data corresponding to the anonymous page is not swapped out, and a direction of the swap cache (Swap cache) space to a page of an anonymous page to be swapped out is added. The swap space page table entry Swap Entry is reclaimed and becomes a PTE page table entry.

Specifically, when a shrink_inactive_list( ) method is performed to swap the data of the anonymous page to a swap partition of the external storage space, an add_to_swap( ) function is first performed to perform a swap-out operation, to request to swap the anonymous page into the disk swap partition, then a get_swap_page( ) function is performed to search the disk swap partition for vacant location space that can accommodate the anonymous page data, allocate a swap space page table entry swp_entry_t to the swapped-out anonymous page, and record, in the swap space page table entry swp_entry_t, a specific number of the vacant location found for the anonymous page and a time parameter of a swap-out moment, that is, inactive_age of a memory management zone, and free_swap_slot( ) may be called to write swp_entry_t into the PTE page table. Finally, based on the location number specified in the page table entry in the allocated swap space page table entry swp_entry_t, a swap- _write page( ) function is performed to write the entire page data of the anonymous page into a specified location in the swap partition of the external storage space, clear the anonymous page, and release physical memory occupied by the anonymous page, that is, a page frame corresponding to the anonymous page is used by a process in which a memory page fault occurs. A Swap_entry_to_pte( ) function is performed to store the allocated page table entry Swap Entry in the PTE page table entry, that is, the swap space page table entry Swap Entry is converted into the PTE page table entry by using the Swap_entry_to_pte( ) function, and the PTE page table entry obtained through conversion is used to overwrite a page table entry existing before swap-out, and is stored in a PTE page table.

In this embodiment of this application, a quantity of pages moved from an inactive linked list to which an anonymous page belongs at a swap-out moment is recorded in the swap space page table entry swp_entry_t, and execution of an action (removal or upgrade) is used as a "time metric", to record a time parameter of the swap-out moment. The swap space page table entry swp_entry_t is allocated at the swap-out moment to record the quantity of pages moved from the inactive linked list to which the anonymous page belongs, and the swap space page table entry swp_entry_t is destroyed at a swap-in moment. Therefore, newly added memory space of the swap space page table entry swp_entry_t of the anonymous page records the quantity of pages moved from the inactive linked list to which the anonymous page belongs at the anonymous page swap-out moment. For example, the anonymous page is swapped out at a moment T1, and a value of inactive_age maintained in a memory management zone to which the anonymous page belongs is 1000. In this case, a value of a time parameter that is of the swap-out moment and that is recorded in the swap space page table entry swp_entry_t allocated to the anonymous page at the moment T1 is 1000. When the anonymous page is swapped into the memory at a moment T2, the time parameter that is of the swap-out moment and that is recorded in the swap space page table entry swp_entry_t is cleared. The anonymous page is swapped out at a moment T3, and a value of inactive_age maintained in a memory management zone to which the anonymous page belongs is 2000. In this case, a value of a time parameter that is of the swap-out moment and that is recorded in the swap space page table entry swp_entry_t allocated to the anonymous page at the moment T3 is 2000.

According to the anonymous page management method provided in this embodiment of this application, newly added space is applied for when a swap space page table entry Swap Entry is allocated, to record a time parameter of a swap-out moment. During swap-in, a time parameter of a swap-in moment is read. Therefore, a linked list into which the anonymous page is swapped is determined based on information about a time interval from swap-in to swap-out, and a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

FIG. 4-12*a* and FIG. 4-12*b* are a schematic diagram of an anonymous page swap-in procedure according to an embodiment of this application.

A difference between FIG. 4-12*a* and FIG. 4-12*b* and FIG. 4-1*l* lies in that FIG. 4-11 shows swap-out of an anonymous page, but FIG. 4-12*a* and FIG. 4-12*b* show swap-in of an anonymous page. As shown in FIG. 4-12*a* and FIG. 4-12*b*, when data of the anonymous page needs to be swapped in after being swapped to a disk, a page fault occurs, and the data of the anonymous page is written from a disk swap partition to memory. When a page fault occurs, a new empty page is applied for. A swap space page table entry Swap Entry is obtained from a page table entry PTE, a time parameter of a swap-out moment is read from the swap space page table entry Swap Entry, and anonymous page data at a corresponding location is found in the disk swap partition based on a location that is recorded by a page table index and at which the anonymous page data allocated to the anonymous page during swap-out is stored in external storage space. The found anonymous page data is written into a new empty page, to obtain a new anonymous page. A time parameter of a swap-in moment is recorded, that is, inactive_age maintained in a memory manager zone at the swap-in moment is read. Based on the memory management zone corresponding to a value of inactive_age, it may be understood that the value of inactive_age is zone→inactive_age, and the value of inactive_age can be read. Then, information about a time interval from the swap-in to the swap-out is obtained based on the time parameter of the swap-in moment and the time parameter of the swap-out moment. Finally, it is determined, based on the information about the time interval and a preset fixed value, whether the new anonymous page is swapped into an anonymous page active linked list or an anonymous page inactive linked list. Specifically, a difference is obtained based on inactive_age of the swap-in moment and inactive_age of the swap-out moment, and the difference is compared with the preset fixed value. Therefore, when the difference is greater than the preset fixed value, the new anonymous page is filled in the anonymous page inactive linked list, that is, a pointer of the new anonymous page is placed into the anonymous page inactive linked list. When the difference is less than the preset fixed value, the new anonymous page is filled in the anonymous page active linked list, that is, a pointer of the new anonymous page is placed into the anonymous page active linked list.

In this embodiment of this application, after a kernel swaps page data of an anonymous page from the external storage space to the memory, a direction of swap cache space to a page of the new anonymous page is added, that is, a pointer of the new anonymous page is stored in both the swap cache space and a linked list corresponding to the anonymous page. When a process attempts to swap in a page, the process first searches the swap cache space for the page. If the page is found, the process fills the page in a corresponding page table entry PTE and converts a direction to the swap partition of the external storage space to a direction to the page of the memory.

In this embodiment of this application, when a process attempts to swap in a page of an anonymous page that is being swapped out, for example, data of the anonymous page is being written into the external storage space, and a process B attempts to access the page of the anonymous page again, a physical address of the anonymous page is found based on a direction of the swap cache space to the page, and the physical address is filled in a page table entry PTE corresponding to the process B.

According to the anonymous page management method provided in this embodiment of this application, newly added space is applied for when a swap space page table entry Swap Entry is allocated, to record a time parameter of a swap-out moment. During swap-in, a time parameter of a swap-in moment is read. Therefore, a linked list into which the anonymous page is swapped is determined based on information about a time interval from swap-in to swap-out, and a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

FIG. 4-13 is a schematic flowchart of an anonymous page swap-in method according to an embodiment of this application. A procedure of the anonymous page swap-in method includes the following steps.

Step S4-100: Apply for a new empty page when a page fault occurs on an anonymous page.

In this embodiment of this application, after page data of the anonymous page is swapped to external storage space, a process needs to read and write the data of the anonymous page, and therefore a page fault occurs. Because a page table entry PTE shows that the physical page is not in memory, but the page table entry PTE is not empty, it indicates that the anonymous page is swapped to the external storage space S. Therefore, a corresponding function is called to re-read the data of the anonymous page.

Specifically, when a swapped-out anonymous page is required for the memory, an original page table entry PTE of the anonymous page is accessed. In this case, the page table entry PTE actually stores a swap space page table entry Swap Entry generated during swap-out of the anonymous page. Therefore, content of the page table entry PTE is re-extracted and converted into the swap space page table entry Swap Entry, and page data that is of the anonymous page and that is stored in the external storage space is found based on the swap space page table entry Swap Entry. In this way, the data is written into a newly allocated empty page to obtain a new anonymous page. In this case, the page table entry PTE maps a physical page corresponding to the newly allocated anonymous page, and stores physical address information corresponding to the new anonymous page.

In this embodiment of this application, when a page fault occurs on an anonymous page, a new empty page needs to be applied for the anonymous page, that is, a logical address space needs to be applied for.

Step S4-200: Obtain the data of the anonymous page from the external storage space based on the location recorded in the swap space page table entry.

In this embodiment of this application, when data of a swapped-out anonymous page is required for the memory, an original page table entry PTE of the anonymous page is accessed. In this case, the page table entry PTE actually stores a swap space page table entry Swap Entry generated during swap-out of the anonymous page. Therefore, content of the PTE is re-extracted and converted into the swap space page table entry Swap Entry, that is, the swap space page table entry Swap Entry is obtained from the page table entry PTE, then the page data that is of the swapped-out anonymous page and that is stored in the external storage space is found based on the location recorded in the swap space page table entry Swap Entry, and the time parameter of the swap-out moment is read from the swap space page table entry Swap Entry.

Step S4-300: Write the data of the anonymous page into the new empty page, to obtain the new anonymous page.

In this embodiment of this application, the anonymous page data has a pointer mark pointing to a memory management zone (zone) to which the anonymous page data belongs, and the pointer exists in 4K page data. When the swapped-out anonymous page data is swapped in again, the 4K anonymous page data is placed into a new empty page allocated to the 4K anonymous page data, to obtain a new anonymous page. Based on a corresponding memory management zone (zone) recorded in the 4K page data during swap-out, and the information about the time interval from the swap-in to the swap-out, the new anonymous page is re-placed into an LRU linked list in the corresponding memory management zone (zone). In this case, the page table entry PTE maps a physical page corresponding to the new anonymous page, and stores physical address information corresponding to the new anonymous page. Data of the new anonymous page is the same as the data of the original swapped-out anonymous page, but an actual physical address of the new anonymous page may be the same as or different from an actual physical address of the original swapped-out anonymous page.

Step S4-400: Record a time parameter of a swap-in moment, and perform bump evaluation on the new anonymous page.

As shown in FIG. 4-12*a* and FIG. 4-12*b*, a value of inactive_age maintained in a memory management zone to which the anonymous page belongs at the swap-in moment may be directly read. It may be understood that a specific value of inactive age corresponding to the swap-in moment is inconsistent with a specific value of inactive age corresponding to the swap-out moment. For example, at a moment T1, the anonymous page is swapped out, and a time parameter, that is, a value of inactive_age, of the swap-out moment T1 is recorded as 2000. At a moment T2, the data of the anonymous page is swapped into the memory again, a time parameter, that is, a value of inactive age, of the swap-in moment T2 is recorded as 3500, inactive_age corresponds to a quantity of pages moved from the anonymous page inactive linked list in a memory management zone to which the anonymous page belongs. At moments T1 to T2, when an anonymous page in the anonymous page inactive linked list is removed from the inactive linked list, or an anonymous page is upgraded from the inactive linked list to the active linked list, the value of inactive_age is increased by 1.

In this embodiment of this application, the time parameter of the swap-out moment is obtained from the swap space page table entry Swap Entry, and then the time parameter of the swap-in moment is read. Then, the information about the time interval from the swap-rn to the swap-out is obtained based on the time parameter of the swap-in moment and the time parameter of the swap-out moment, and finally, bump evaluation is performed, based on the information about the time interval, on the new anonymous page obtained after swap-in.

Compared with the conventional technology in which anew anonymous page obtained after swap-in is swapped into an active linked list by default, in this embodiment of this application, before the new anonymous page needs to be added to the corresponding linked list, bump evaluation is performed, based on the information about the time interval from the swap-in to the swap-out, on the new anonymous page obtained after swap-in, to determine whether to add the new anonymous page to the active linked list or the inactive linked list.

Step S4-500: Add the new anonymous page to a corresponding linked list based on a bump evaluation result.

In this embodiment of this application, bump evaluation is performed on the anonymous page based on the information about the time interval from the swap-in to the swap-out, and when the anonymous page is not bumped, a new anonymous page is swapped into the inactive linked list instead of being uniformly placed into an active linked list by default as in the conventional technology.

Specifically, after the data of the anonymous page is swapped into the disk swap partition, the process needs to read and write the anonymous page, and a page fault occurs, and therefore a do_swap_page( ) method is performed. First, a pte_to_swp_entry( ) function is called to find, in a page table entry PTE, a swap space page table entry swp_entry_t during swap-out of the anonymous page, corresponding to the anonymous page is found based on a location that is recorded in the swap space page table entry swp_entry_t and at which the anonymous page data is stored, and the time parameter of the swap-out moment is read from the swap space page table entry swp_entry_t, that is, a quantity inactive age of pages moved from the inactive linked list to which the anonymous page belongs at the swap-out moment. Then, the alloc_page_vma( ) function is performed to apply for a new empty page, and data of the anonymous page is stored in the new empty page, to obtain a new anonymous page. Data of the new anonymous page is the same as the data of the original swapped-out anonymous page, but an actual physical address of the new anonymous page is not necessarily the same as an actual physical address of the original swapped-out anonymous page.

When a kernel calls the add_page_to_lru_list( ) function to re-put the new anonymous page back to the linked list, the kernel first performs bump evaluation, and reads the time parameter of the swap-in time, that is, reads a quantity inactive_age of pages moved from the inactive linked list to which the anonymous page belongs at the current moment, where the quantity of pages moved from the inactive linked list to which the anonymous page belongs can be obtained by executing the code zone→inactive_age, and then obtains the information about the time interval based on a difference between the quantity of pages moved from the inactive linked list to which the anonymous page belongs at the swap-out moment and the quantity of pages moved from the inactive linked list to which the anonymous page belongs at the swap-in moment, that is, obtains the information about the time interval from the swap-in moment to the swap-out moment by subtracting the quantity of pages moved from the inactive linked list to which the anonymous page belongs at the swap-out moment from the quantity of pages moved from the inactive linked list to which the anonymous page belongs at the swap-in moment.

Finally, as shown in FIG. 4-12*a* and FIG. 4-12*b*, the new anonymous page is added to a corresponding linked list based on a result of comparison between the information about the time interval and a preset fixed value. When the information about the time interval is less than or equal to the preset fixed value, it is considered that the anonymous page is bumped, and it is considered that the anonymous page is called again soon. Therefore, regardless of whether the anonymous page is accessed at this time, a SetPageActive( ) function is called to forcibly place the anonymous page in the head of the active linked list. When the information about the time interval is greater than the preset fixed value, it is considered that the anonymous page is not bumped, the anonymous page is allowed to be swapped out normally, and a SetPageInactive( ) function is called to place the anonymous page in the head of the inactive linked list without processing, or after the anonymous page is placed into the inactive linked list, the anonymous page is upgraded to the head of the active linked list when being accessed next time. Alternatively, when the information about the time interval is less than the preset fixed value, it is considered that the anonymous page is bumped, and it is considered that the anonymous page is called again soon. Therefore, regardless of whether the anonymous page is accessed at this time, a SetPageActive( ) function is called to forcibly place the anonymous page in the head of the active linked list. When the information about the time interval is greater than or equal to the preset fixed value, it is considered that the anonymous page is not bumped, the anonymous page is allowed to be swapped out normally, and a SetPageInactive( ) function is called to place the anonymous page in the head of the inactive linked list without processing, or after the anonymous page is placed into the inactive linked list, the anonymous page is upgraded to the head of the active linked list when being accessed next time.

According to the anonymous page management method provided in this embodiment of this application, newly added space is applied for when a swap space page table entry Swap Entry is allocated, to record a time parameter of a swap-out moment. During swap-in, a time parameter of a swap-in moment is read. Therefore, a linked list into which the anonymous page is swapped is determined based on information about a time interval from swap-in to swap-out, and a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

FIG. 4-14 is a schematic diagram of determining whether an anonymous page is bumped according to an embodiment of this application, and describes a value of the preset fixed value and a bump evaluation principle.

For each memory page (file page or anonymous page) in a linked list, regardless of a location of the memory page, provided that the memory page is used, the memory page is placed into the head of the active linked list again, and other memory pages in the linked list are moved backward accordingly.

If an anonymous page is bumped, the anonymous page needs to be kept in memory permanently. If the anonymous page is just used up, the anonymous page needs to be at the head of the active linked list. If the anonymous page cannot be swapped out, the anonymous page needs to be used again at the tail of the inactive linked list at the latest, to return to the head of the active linked list. If a time at which the anonymous page is just accessed and is located at the head of the active linked list is used as a start time, the anonymous page is located at the tail of the inactive linked list from the start time to this time. In this process, a value of a quantity of pages removed from the inactive linked list needs to be a length of the active linked list plus a length of the inactive linked list.

In other words, for an anonymous page that cannot be swapped out, a maximum waiting distance between two times of using the anonymous page needs to be a total length of an LRU linked list (NR_TOTAL), that is, a sum of the length of the active linked list and the length of the inactive linked list (NR_ACTIVE_ANON+NR_INACTIVE_ANON).

FIG. 4-14 shows determining of an anonymous page in an actual situation. If the anonymous page is a page that is just swapped in, the anonymous page needs to be at the head of the inactive linked list. If the anonymous page is not used, the anonymous page is gradually moved backward to the tail of the inactive linked list, and then is removed from the linked list and swapped into the external storage space. In the process in which the anonymous page is not swapped in after being swapped out, more anonymous pages are removed from the tail of the inactive linked list to which the swapped-out anonymous page belongs to the external storage space, or upgraded to the active linked list to which the swapped-out anonymous page belongs. When a process to which the anonymous page belongs needs to access the anonymous page, the anonymous page is swapped in again, and a time distance between the swap-out and the swap-in of the anonymous page is defined as the information about the time interval, that is, in this process, a total quantity of pages moved from the inactive linked list to which the anonymous page belongs is used to approximately express logical time of total duration of swapping out the page. In an actual situation, it is difficult to record real time in a manner such as a timestamp. Therefore, the quantity of pages removed from the inactive linked list in this process is used to approximately express the logical time of the total duration of swapping out the page.

It may be found that a distance (Read Distance) between the first time of reading the anonymous page and the second time of reading the anonymous page is a sum of the length of the inactive linked list and the information about the time interval from the swap-in to the swap-out (Refault Distance+NR_INACTIVE_ANON).

If the anonymous page is a bumped page in an actual situation, the distance between the two times of reading the anonymous page does not need to exceed the maximum waiting distance, that is, "the total quantity of pages removed from the inactive linked list between the two times of reading the anonymous page does not need to exceed a time period between two times of accessing the anonymous page".

Therefore, details are as follows:
Read Distance<=NR_TOTAL
That is, Refault Distance+NR_INACTIVE_ANON<=NR_ACTIVE_ANON+NR_INACTIVE_ANON.
That is, Refault Distance<=NR_ACTIVE_ANON.

Therefore, the obtained preset fixed value is a length of the active linked list to which the anonymous page belongs.

In this embodiment of this application, the information about the time interval from the swap-in to the swap-out of the anonymous page is compared with the length of the active linked list to which the anonymous page belongs, and the anonymous page is swapped into a corresponding linked list based on a comparison result. Specifically, when a value of the information about the time interval is greater than or equal to a value of the length of the active linked list to which the anonymous page belongs, the anonymous page is forcibly placed at the head of the inactive linked list. When a value of the information about the time interval is less than a value of the length of the active linked list to which the anonymous page belongs, the anonymous page is placed at the head of the active linked list. Alternatively, when a value of the information about the time interval is less than or equal to a value of the length of the active linked list to which the anonymous page belongs, the anonymous page is placed at the head of the active linked list. When a value of the information about the time interval is greater than a value of the length of the active linked list to which the anonymous page belongs, the anonymous page is forcibly placed at the head of the inactive linked list.

FIG. 4-15 is a schematic block diagram of another anonymous page management method according to an embodiment of this application.

In a memory reclamation process, to improve a reclamation speed, when memory is extremely insufficient, a plurality of consecutive memory pages at the tail of the inactive linked list are swapped to the external storage space. This action is referred to as batch swap-out. Correspondingly, an action of swapping out a single memory page each time is referred to as zero-out. When a process needs to access these memory pages, the process swaps the memory pages into the continuous external storage space as a whole. This action is referred to as batch swap-in. Correspondingly, an action of swapping in a single memory page is referred to as zero-in.

In a scenario in which the anonymous page is batch swap-out batch swap-in, a batch swap-out part of the anonymous page is consistent with single anonymous page swap-out. This is not specifically limited in this application. Compared with single-anonymous page zero-in, a traversal step is added to a batch swap-in part of the anonymous page, that is, bump evaluation is performed on each anonymous page in the batch swap-in part.

Because only some pages in an entire memory block may actually need to be accessed by the process, only the entire memory block needs to be traversed, and a zero-in bump evaluation action is performed on each memory page. In other words, after entering a linked list, the entire memory page is no longer processed as a whole, but is re-used as each independent anonymous page on which a corresponding anonymous page management method is performed.

According to the anonymous page management method provided in this embodiment of this application, independent anonymous page management is performed on batch swap-in batch swap-out anonymous pages, and a non-bumped anonymous page is swapped into the inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

FIG. 4-16 is a schematic diagram of an anonymous page management method according to an embodiment of this application. As shown in FIG. 4-16, the method is performed by an electronic device 4-100. A specific implementation process of this application is described by using a Linux system as an example. However, an application scenario of this application is not limited to the Linux system, and may be an Android system or the like. The electronic device 4-100 may be a mobile phone, a tablet computer, or the like. The method may include but is not limited to the following steps.

Step S4-001: Swap data of an anonymous page from memory to external storage space, and record a time parameter of a swap-out moment.

Step S4-002: Swap, from the external storage space to the memory, data swapped out of the anonymous page, and record a time parameter of a swap-in moment.

Step S4-003: Obtain information about a time interval from the swap-in to the swap-out based on the time parameter of the swap-out moment and the time parameter of the swap-in moment.

Step S4-004: Swap the anonymous page into an inactive linked list of the memory when a value corresponding to the information about the time interval is greater than a preset fixed value.

In a possible implementation, the swapping data of an anonymous page from memory to external storage space, and recording a time parameter of a swap-out moment includes but is not limited to the following step:

when the data of the anonymous page is swapped to the external storage space, obtaining the time parameter of the swap-out moment based on a quantity of pages moved from the inactive linked list to which the anonymous page belongs.

In a possible implementation, the swapping data of an anonymous page from memory to external storage space, and recording a time parameter of a swap-out moment includes but is not limited to the following step:

when the data of the anonymous page is swapped to the external storage space, storing the time parameter of the swap-out moment in a page table entry corresponding to the anonymous page.

In a possible implementation, the anonymous page management method further includes:

recording, based on page movement of the inactive linked list to which the anonymous page belongs, the quantity of pages moved from the inactive linked list to which the anonymous page belongs.

In a possible implementation, the anonymous page management method further includes:

when a page of the inactive linked list to which the anonymous page belongs is removed from a tail of the inactive linked list, recording the quantity of pages moved from the inactive linked list to which the anonymous page belongs, or when a page of the inactive linked list to which the anonymous page belongs is moved to an active linked list, recording the quantity of pages moved from the inactive linked list to which the anonymous page belongs.

In a possible implementation, the swapping, from the external storage space to the memory, data swapped out of the anonymous page, and recording a time parameter of a swap-in moment includes but is not limited to the following step:

when the data swapped out of the anonymous page is swapped to the memory, obtaining the time parameter of the swap-in moment based on the quantity of pages moved from the inactive linked list to which the anonymous page belongs.

FIG. 4-17 is a schematic diagram of an anonymous page management apparatus according to an embodiment of this application. The anonymous page management apparatus 4-200 may be configured to perform some or all steps of the methods described in FIG. 4-7a and FIG. 4-7b to FIG. 4-16. For details, refer to related descriptions in FIG. 4-7a and FIG. 4-7b to FIG. 4-16. The details are not described herein again. As shown in FIG. 4-17, the anonymous page management apparatus 4-200 may include:

a fortieth recording unit 4-10, configured to: swap data of an anonymous page from memory to external storage space, and record a time parameter of a swap-out moment;

a forty-first recording unit 4-20, configured to: swap, from the external storage space to the memory, data swapped out of the anonymous page, and record a time parameter of a swap-in moment;

an obtaining unit 4-30, configured to obtain information about a time interval from the swap-in to the swap-out based on the time parameter of the swap-out moment and the time parameter of the swap-in moment; and a swap-in unit 4-40, configured to swap the anonymous page into an inactive linked list of the memory when a value corresponding to the information about the time interval is greater than a preset fixed value.

Refer to FIG. 4-18. The fortieth recording unit 4-10 includes:

a parameter obtaining unit 4-182, configured to: when the data of the anonymous page is swapped from the memory to the external storage space, obtain the time parameter of the swap-out moment based on a quantity of pages moved from the inactive linked list to which the anonymous page belongs; and a storage unit 4-183, configured to: when the data of the anonymous page is swapped from the memory to the external storage space, store the time parameter of the swap-out moment in a page table entry corresponding to the anonymous page.

In a possible implementation, refer to FIG. 4-18. The anonymous page management apparatus 4-200 further includes:

a page recording unit 4-181, configured to record, based on page movement of the inactive linked list to which the anonymous page belongs, the quantity of pages moved from the inactive linked list to which the anonymous page belongs.

In a possible implementation, the page movement of the inactive linked list to which the anonymous page belongs includes:

removing a page of the inactive linked list to which the anonymous page belongs from a tail of the inactive linked list, or moving a page of the inactive linked list to which the anonymous page belongs to an active linked list.

In a possible implementation, the forty-first recording unit 4-20 includes:

when the data swapped out of the anonymous page is swapped to the memory, obtaining the time parameter of the swap-in moment based on the quantity of pages moved from the inactive linked list to which the anonymous page belongs.

In a possible implementation, refer to FIG. 4-19. The anonymous page management apparatus 4-200 further includes:

an interrupt unit 4-50, configured to: when a page fault occurs on the anonymous page and it is detected that a storage location of the data swapped out of the anonymous page is in the external storage space, swap, from the external storage space to the memory, the data swapped out of the anonymous page.

According to the anonymous page management method provided in this embodiment of this application, a non-bumped anonymous page is swapped into the inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, improve anonymous page memory reclamation efficiency, and improve memory reclamation efficiency. In this way, smoothness of an operating system is improved and user experience is improved.

It may be understood that division into the modules in the anonymous page management apparatus is merely used as an example for description. In another embodiment, the anonymous page management apparatus may be divided into different modules based on a requirement, to implement all or some functions of the anonymous page management apparatus.

Implementations of the modules in the anonymous page management apparatus 4-200 provided in this embodiment of this application may be in a form of a computer program. The computer program may run on an electronic device 4-100 or a server. A program module formed by the computer program may be stored in a memory of the terminal or the server. When the computer program is executed by a processor, the steps described in embodiments of this application are implemented. For specific implementations of the modules in this embodiment of this application, refer to corresponding descriptions of the method embodiments shown in FIG. 4-7a and FIG. 4-7b to FIG. 4-16. In the anonymous page management apparatus 4-200 described in FIG. 4-17, in the fortieth recording unit 4-10 described in FIG. 4-18 and the interrupt unit 4-50 described in FIG. 4-19, low-usage memory may be reclaimed in advance, so that application freezing can be avoided, and user experience can be improved. For specific content, refer to a specific embodiment of the foregoing anonymous page management method. Details are not described herein again.

An embodiment of this application further provides a computer-readable storage medium. The readable storage medium stores computer instructions, and when the instructions are run on a computing device, the computing device is enabled to perform the anonymous page management method provided in the foregoing embodiments.

An embodiment of this application further provides a computer program product. The computer program product includes computer program code, and when the computer program code is executed by a computer, the computer program code may enable the computer to perform the foregoing method. Therefore, a non-bumped anonymous page is swapped into an inactive linked list, so that the non-bumped anonymous page can be swapped out prior to a bumped anonymous page. This reduces a probability that the bumped anonymous page is swapped out, to reduce bumping of data of the anonymous page, so as to reduce invalid anonymous page reclamation in a high-pressure state of system memory, and improve anonymous page memory reclamation efficiency.

It is clear that, for a person skilled in the art, this application is not limited to details of the foregoing example embodiments, and this application can be implemented in another specific form without departing from the spirit or basic features of this application. Therefore, appropriate modifications and variations made to the foregoing embodiments shall fall within the protection scope of this application provided that the modifications and variations fall within the essence and spirit of this application.

With rapid development of the intelligent device industry such as smartphones and tablet computers, there are increasingly high requirements for storage devices. In many storage devices, Flash-based memories occupy a large market share of mobile intelligent devices, especially smartphones, due to advantages such as excellent read/write performance, large storage space, low prices, and excellent data reliability. However, due to a physical attribute of the Flash-based memory, program-erase cycles of the Flash-based memory are limited (a life of the component is limited). When the program-erase cycles reach an upper limit of use, reliability of data stored in the Flash-based memory is reduced, causing data loss of the component and finally causing a component failure. Therefore, frequent programming operations on the Flash-based memory shorten a service life of the Flash-based memory.

FIG. 5-1 is a diagram of a system architecture of a life management method for a memory according to an embodiment of this application. The life management method for a memory is applied to an electronic device 5-1. The electronic device 5-1 is configured to: manage and control data swapped from memory to a memory of the electronic device 5-1, to ensure that a service life of the memory reaches an expected service life. The electronic device 5-1 may be a mobile phone, a tablet computer, a desk-top computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 5-1 may include a processor 5-110, an external memory interface 5-120, a memory 5-121, a universal serial bus (universal serial bus, USB) port 5-130, a charging management module 5-140, a power management module 5-141, a battery 5-142, an antenna 1, an antenna 2, a mobile communications module 5-150, a wireless communications module 5-160, an audio module 5-170, a speaker 5-170A, a receiver 5-170B, a microphone 5-170C, a headset jack 5-170D, a sensor module 5-180, a button 5-190, a motor 5-191, an indicator 5-192, a camera 5-193, a display 5-194, a subscriber identification module (subscriber identification module, SIM) card interface 5-195, and the like. The sensor module 5-180 may include a pressure sensor 5-180A, a gyro sensor 5-180B, a barometric pressure sensor 5-180C, a magnetic sensor 5-180D, an acceleration sensor 5-180E, a distance sensor 5-180F, an optical proximity sensor 5-180G, a fingerprint sensor 5-180H, a temperature sensor 5-180J, a touch sensor 5-180K, an ambient light sensor 5-180L, a bone conduction sensor 5-180M, and the like.

It may be understood that the structure shown in this embodiment of the present invention does not constitute a specific limitation on the electronic device 5-1. In some other embodiments of this application, the electronic device 5-1 may include more or fewer components than those shown in the figure, or combine some components, or split some components, or have different component arrangements. The components shown in the figure may be implemented by hardware, software, or a combination of software and hardware.

The processor 5-110 may include one or more processing units. For example, the processor 5-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 5-110, and is configured to store instructions and data In some embodiments, the memory in the processor 5-110 is a cache. The memory may store instructions or data that has been used or cyclically used by the processor 5-110. If the processor 5-110 needs to use the instructions or the data again, the processor may directly invoke the instructions or the data from the memory. This avoids repeated access, reduces waiting time of the processor 5-110, and improves system efficiency.

In some embodiments, the processor 5-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface. MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 5-110 may include a plurality of groups of I2C buses. The processor 5-110 may be separately coupled to the touch sensor 5-180K, a charger, a flash, the camera 5-193, and the like through different I2C bus interfaces. For example, the processor 5-110 may be coupled to the touch sensor 5-180K through an I2C interface, so that the processor 5-110 communicates with the touch sensor 5-180K through the I2C bus interface, to implement a touch function of the electronic device 5-1.

The I2S interface may be used for audio communication. In some embodiments, the processor 5-110 may include a plurality of groups of I2S buses. The processor 5-110 may be coupled to the audio module 5-170 through the I2S bus, to implement communication between the processor 5-110 and the audio module 5-170. In some embodiments, the audio module 5-170 may transfer an audio signal to the wireless communications module 5-160 through the I2S interface, to implement a function of answering a call by using a Bluetooth headset.

The PCM interface may also be used for audio communication, and samples, quantizes, and codes an analog signal. In some embodiments, the audio module 5-170 may be coupled to the wireless communications module 5-160 through a PCM bus interface. In some embodiments, the audio module 5-170 may alternatively transfer an audio signal to the wireless communications module 5-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 5-110 to the wireless communications module 5-160. For example, the processor 5-110 communicates with a Bluetooth module in the wireless communications module 5-160 through the UART interface, to implement a Bluetooth function. In some embodiments, the audio module 5-170 may transfer an audio signal to the wireless communications module 5-160 through the UART interface, to implement a function of playing music by using a Bluetooth headset.

The MIPI may be configured to connect the processor 5-110 to a peripheral component such as the display 5-194 or the camera 5-193. The MIPI includes a camera serial interface (camera serial interface, CSI), a display serial interface (display serial interface, DSI), and the like. In some embodiments, the processor 5-110 communicates with the camera 5-193 through the CSI, to implement a photographing function of the electronic device 5-1. The processor 5-110 communicates with the display 5-194 through the DSI, to implement a display function of the electronic device 5-1.

The GPIO interface may be configured by using software. The GPIO interface may be configured as a control signal or a data signal. In some embodiments, the GPIO interface may be configured to connect the processor 5-110 to the camera 5-193, the display 5-194, the wireless communications module 5-160, the audio module 5-170, the sensor module 5-180, and the like. The GPIO interface may alternatively be configured as an I2C interface, an I2S interface, a UART interface, an MIPI, or the like.

The USB port 5-130 is a port that conforms to a USB standard specification, and may be specifically a mini USB port, a micro USB port, a USB Type-C port, or the like. The USB port 5-130 may be configured to connect to a charger to charge the electronic device 5-1, or may be configured to transmit data between the electronic device 5-1 and a peripheral device, or may be configured to connect to a headset for playing an audio through the headset. The port may alternatively be configured to connect to another electronic device such as an AR device.

It may be understood that an interface connection relationship between the modules in this embodiment of the present invention is merely an example for description, and does not constitute a limitation on the structure of the electronic device 5-1. In some other embodiments of this application, the electronic device 5-1 may alternatively use an interface connection manner different from that in the foregoing embodiment, or a combination of a plurality of interface connection manners.

The charging management module 5-140 is configured to receive a charging input from a charger. The charger may be a wireless charger or a wired charger. In some embodiments of wired charging, the charging management module 5-140 may receive a charging input from the wired charger through the USB port 5-130. In some embodiments of wireless charging, the charging management module 5-140 may receive a wireless charging input through a wireless charging coil of the electronic device 5-1. When charging the battery 5-142, the charging management module 5-140 may further supply power to the electronic device by using the power management module 5-141.

The power management module 5-141 is configured to connect to the battery 5-142, the charging management module 5-140, and the processor 5-110. The power management module 5-141 receives an input of the battery 5-142 and/or an input of the charging management module 5-140, and supplies power to the processor 5-110, the memory 5-121, the display 5-194, the camera 5-193, the wireless communications module 5-160, and the like. The power management module 5-141 may be further configured to monitor parameters such as a battery capacity, a battery cycle count, and a battery health status (electricity leakage or impedance). In some other embodiments, the power management module 5-141 may alternatively be disposed in the processor 5-110. In some other embodiments, the power management module 5-141 and the charging management module 5-140 may alternatively be disposed in a same device.

A wireless communication function of the electronic device 5-1 may be implemented by using the antenna 1, the antenna 2, the mobile communications module 5-150, the wireless communications module 5-160, the modem processor, the baseband processor, and the like.

The antenna 1 and the antenna 2 are configured to: transmit and receive electromagnetic wave signals. Each antenna in the electronic device 5-1 may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 5-150 may provide a wireless communication solution that includes 2G/3G/4G/5G or the like and that is applied to the electronic device 5-1. The mobile communications module 5-150 may include at least one filter, a switch, a power amplifier, a low noise amplifier (low noise amplifier, LNA), and the like. The mobile communications module 5-150 may receive an electromagnetic wave through the antenna 1, perform processing such as filtering or amplification on the received electromagnetic wave, and transmit the electromagnetic wave to the modem processor for demodulation. The mobile communications module 5-150 may further amplify a signal modulated by the modem processor, and convert an amplified signal into an electromagnetic wave for radiation through the antenna 1. In some embodiments, at least some functional modules in the mobile communications module 5-150 may be disposed in the processor 5-110. In some embodiments, at least some functional modules in the mobile communications module 5-150 may be disposed in a same device as at least some modules in the processor 5-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 5-170A, the receiver 5-170B, or the like), or displays an image or a video through the display 5-194. In some embodiments, the modem processor may be an independent device. In some other embodiments, the modem processor may be independent of the processor 5-110, and is disposed in a same device as the mobile communications module 5-150 or another functional module.

The wireless communications module 5-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 5-1. The wireless communications module 5-160 may be one or more components that integrate at least one communications processor module. The wireless communications module 5-160 receives an electromagnetic wave through the antenna 2, performs frequency modulation and filtering processing on the electromagnetic wave signal, and sends a processed signal to the processor 5-110. The wireless communications module 5-160 may further receive a to-be-sent signal from the processor 5-110, perform frequency modulation and amplification on the signal, and convert a processed signal into an electromagnetic wave for radiation through the antenna 2.

In some embodiments, the antenna 1 and the mobile communications module 5-150 in the electronic device 5-1 are coupled, and the antenna 2 and the wireless communications module 5-160 in the electronic device 5-1 are coupled, so that the electronic device 5-1 can communicate with a network and another device by using a wireless communications technology. The wireless communications technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 5-1 may implement a display function through the GPU, the display 5-194, the application processor, and the like. The GPU is a microprocessor for image processing, and is connected to the display 5-194 and the application processor. The GPU is configured to: perform mathematical and geometric calculation, and render an image. The processor 5-110 may include one or more GPUs that execute program instructions to generate or change display information.

The display 5-194 is configured to display an image, a video, and the like. The display 5-194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like.

In some embodiments, the electronic device 5-1 may include one or N displays 5-194, where N is a positive integer greater than 1.

The electronic device 5-1 may implement a photographing function through the ISP, the camera 5-193, the video codec, the GPU, the display 5-194, the application processor, and the like.

The ISP is configured to process data fed back by the camera 5-193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 5-193.

The camera 5-193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 5-1 may include one or N cameras 5-193, where N is a positive integer greater than 1.

The digital signal processor is configured to process a digital signal, and may further process another digital signal in addition to a digital image signal. For example, when the electronic device 5-1 selects a frequency, the digital signal processor is configured to perform Fourier transform or the like on frequency energy.

The video codec is configured to: compress or decompress a digital video. The electronic device 5-1 may support one or more video codecs. In this way, the electronic device 5-1 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 5-1, such as image recognition, facial recognition, speech recognition, and text understanding.

The memory 5-121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk memory and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell. QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by using the processor 5-110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 5-110.

The external memory interface 5-120 may be configured to connect to an external non-volatile memory, to extend a storage capability of the electronic device 5-1. The external non-volatile memory communicates with the processor 5-110 through the external memory interface 5-120, to implement a data storage function. For example, files such as music and videos are stored in the external non-volatile memory.

In this embodiment, system software 5-122 is configured to: process, write, or read data. For example, the system software 5-122 reads data from the memory 5-121 and processes the data, or the system software 5-122 writes the data into the memory 5-121. A software channel 5-124 is configured to allocate data to the memory 5-121. For example, the system software 5-122 first transfers the data to the software channel 5-124, and then the software channel 5-124 allocates the data to the memory 5-121, or the system software 5-122 directly writes the data into the memory 5-121. In this embodiment, a storage management and control module 5-123 is configured to obtain the data written by system software 5-122 into the memory 5-121, and the storage management and control module 5-123 writes the data into the memory 5-121 based on a data quota.

The electronic device 5-1 may implement audio functions, for example, music playing and recording, by using the audio module 5-170, the speaker 5-170A, the receiver 5-170B, the microphone 5-170C, the headset jack 5-170D, the application processor, and the like.

The audio module 5-170 is configured to convert digital audio information into an analog audio signal for output, and is also configured to convert an analog audio input into a digital audio signal. The audio module 5-170 may be further configured to: code and decode an audio signal. In some embodiments, the audio module 5-170 may be disposed in the processor 5-110, or some functional modules in the audio module 5-170 are disposed in the processor 5-110.

The speaker 5-170A, also referred to as a "horn", is configured to convert an electrical audio signal into a sound signal. The electronic device 5-1 may be used to listen to music or answer a call in a hands-free mode over the speaker 5-170A.

The receiver 5-170B, also referred to as an "earpiece", is configured to convert an electrical audio signal into a sound signal. When a call is answered or speech information is received through the electronic device 5-1, the receiver 5-170B may be put close to a human ear to listen to a voice.

The microphone 5-170C, also referred to as a "mike" or a "mic", is configured to convert a sound signal into an electrical signal. When making a call or sending voice information, a user may make a sound near the microphone 5-170C through the mouth of the user, to input the sound signal to the microphone 5-170C. At least one microphone 5-170C may be disposed in the electronic device 5-1. In some other embodiments, two microphones 5-170C may be disposed in the electronic device 5-1, to implement a noise reduction function in addition to collecting a sound signal. In some other embodiments, three, four, or more microphones 5-170C may alternatively be disposed in the electronic device 5-1, to collect a sound signal, reduce noise, identify a sound source, implement a directional recording function, and the like.

The headset jack 5-170D is configured to connect to a wired headset. The headset jack 5-170D may be the USB port 5-130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 5-180A is configured to sense a pressure signal, and may convert the pressure signal into an electrical signal. In some embodiments, the pressure sensor 5-180A may be disposed on the display 5-194. There are many types of pressure sensors 5-180A, for example, a resistive pressure sensor, an inductive pressure sensor, and a capacitive pressure sensor. The capacitive pressure sensor may include at least two parallel plates with conductive materials. When a force is applied to the pressure sensor 5-180A, capacitance between electrodes changes. The electronic device 5-1 determines pressure intensity based on the change of the capacitance. When a touch operation is performed on the display 5-194, the electronic device 5-1 detects intensity of the touch operation based on the pressure sensor 5-180A. The electronic device 5-1 may also calculate a touch location based on a detection signal of the pressure sensor 5-180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 5-180B may be configured to determine a motion posture of the electronic device 5-1. In some embodiments, an angular velocity of the electronic device 5-1 around three axes (that is, axes x, y, and z) may be determined through the gyro sensor 5-180B. The gyro sensor 5-180B may be configured to implement image stabilization during photographing. For example, when the shutter is pressed, the gyro sensor 5-180B detects an angle at which the electronic device 5-1 jitters, calculates, based on the angle, a distance for which a lens module needs to compensate, and allows the lens to cancel the jitter of the electronic device 5-1 through reverse motion, to implement image stabilization. The gyro sensor 5-180B may also be used in a navigation scenario and a motion-sensing gaming scenario.

The barometric pressure sensor 5-180C is configured to measure barometric pressure. In some embodiments, the electronic device 5-1 calculates an altitude based on a value of the barometric pressure measured by the barometric pressure sensor 5-180C, to assist in positioning and navigation.

The magnetic sensor 5-180D includes a Hall sensor. The electronic device 5-1 may detect opening and closing of a flip leather case by using the magnetic sensor 5-180D. In some embodiments, when the electronic device 5-1 is a clamshell phone, the electronic device 5-1 may detect opening and closing of a flip cover by using the magnetic sensor 5-180D. Further, a feature such as automatic unlocking upon opening of the flip cover is set based on a detected opening or closing state of the flip cover.

The acceleration sensor 5-180E may detect magnitudes of accelerations of the electronic device 5-1 in various directions (usually on three axes), and may detect a magnitude and a direction of gravity when the electronic device 5-1 is still. The acceleration sensor may be further configured to recognize a posture of the electronic device, and is used in an application such as switching between landscape mode and portrait mode or a pedometer.

The distance sensor 5-180F is configured to measure a distance. The electronic device 5-1 may measure the distance in an infrared manner or a laser manner. In some embodiments, in a photographing scenario, the electronic device 5-1 may measure a distance through the distance sensor 5-180F to implement quick focusing.

The optical proximity sensor 5-180G may include, for example, a light-emitting diode (LED) and an optical detector, for example, a photodiode. The light-emitting diode may be an infrared light-emitting diode. The electronic device 5-1 emits infrared light by using the light-emitting diode. The electronic device 5-1 detects infrared reflected light from a nearby object by using the photodiode. When detecting sufficient reflected light, the electronic device 5-1 may determine that there is an object near the electronic device 5-1. When detecting insufficient reflected light, the electronic device 5-1 may determine that there is no object near the electronic device 5-1. The electronic device 5-1 may detect, by using the optical proximity sensor 5-180G, that the user holds the electronic device 5-1 close to an ear to make a call, to automatically turn off a screen for power saving. The optical proximity sensor 5-180G may also be used in a flip cover mode or a pocket mode to automatically perform screen unlocking or locking.

The ambient light sensor 5-180L is configured to sense ambient light brightness. The electronic device 5-1 may adaptively adjust brightness of the display 5-194 based on the sensed ambient light brightness. The ambient light sensor 5-180L may also be configured to automatically adjust white balance during photographing. The ambient light sensor 5-180L may further cooperate with the optical proximity sensor 5-180G to detect whether the electronic device 5-1 is in a pocket, to avoid an accidental touch.

The fingerprint sensor 5-180H is configured to collect a fingerprint. The electronic device 5-1 may use a feature of the collected fingerprint to implement fingerprint-based unlocking, application lock access, fingerprint-based photographing, fingerprint-based call answering, and the like.

The temperature sensor 5-180J is configured to detect a temperature. In some embodiments, the electronic device 5-1 executes a temperature processing policy by using the temperature detected by the temperature sensor 5-180J. For example, when the temperature reported by the temperature sensor 5-180J exceeds a threshold, the electronic device 5-1 lowers performance of a processor near the temperature sensor 5-180J, to reduce power consumption for thermal protection. In some other embodiments, when the temperature is less than another threshold, the electronic device 5-1 heats the battery 5-142 to prevent the electronic device 5-1 from being abnormally powered off because of a low temperature. In some other embodiments, when the temperature is less than still another threshold, the electronic device 5-1 boosts an output voltage of the battery 5-142 to avoid abnormal shutdown caused by a low temperature.

The touch sensor 5-180K is also referred to as a "touch component". The touch sensor 5-180K may be disposed on the display 5-194, and the touch sensor 5-180K and the display 5-194 form a touchscreen. The touch sensor 5-180K is configured to detect a touch operation performed on or near the touch sensor. The touch sensor may transfer a detected touch operation to the application processor, to determine a type of a touch event. A visual output related to the touch operation may be provided through the display 5-194. In some other embodiments, the touch sensor 5-180K may alternatively be disposed on a surface of the electronic device 5-1 and is located at a location different from that of the display 5-194.

The bone conduction sensor 5-180M may obtain a vibration signal. In some embodiments, the bone conduction sensor 5-180M may obtain a vibration signal of a vibration bone of a human vocal-cord part. The bone conduction sensor 5-180M may also be in contact with a body pulse to receive a blood pressure beating signal. In some embodiments, the bone conduction sensor 5-180M may also be disposed in a headset, to form a bone conduction headset. The audio module 5-170 may obtain a voice signal through parsing based on the vibration signal that is of the vibration bone of the vocal part and that is obtained by the bone conduction sensor 5-180M, to implement a voice function. The application processor may parse heart rate information based on the blood pressure beating signal obtained by the bone conduction sensor 5-180M, to implement a heart rate detection function.

The button 5-190 includes a power button, a volume button, and the like. The button 5-190 may be a mechanical button, or may be a touch button. The electronic device 5-1 may receive a key input, and generate a key signal input related to a user setting and function control of the electronic device 5-1.

The motor 5-191 may generate a vibration prompt. The motor 5-191 may be configured to provide an incoming call vibration prompt and a touch vibration feedback. For example, touch operations performed on different applications (for example, photographing and audio playing) may correspond to different vibration feedback effects. The motor 5-191 may also correspond to different vibration feedback effects for touch operations performed on different areas of the display 5-194. Different application scenarios (for example, a time reminder scenario, an information receiving scenario, an alarm clock scenario, and a game scenario) may also correspond to different vibration feedback effects. The touch vibration feedback effect may also be customized.

The indicator 5-192 may be an indicator light, and may be configured to indicate a charging status and a power change, or may be configured to indicate a message, a missed call, a notification, and the like.

The SIM card interface 5-195 is configured to connect to a SIM card. The SIM card may be inserted into the SIM card interface 5-195 or removed from the SIM card interface 5-195, to implement contact with or separation from the electronic device 5-1. The electronic device 5-1 may support one or N SIM card interfaces, where N is a positive integer greater than 1. The SIM card interface 5-195 may support a nano-SIM card, a micro-SIM card, a SIM card, and the like. A plurality of cards may be simultaneously inserted into a same SIM card interface 5-195. The plurality of cards may be of a same type or of different types. The SIM card interface 5-195 is compatible with different types of SIM cards. The SIM card interface 5-195 is also compatible with an external storage card. The electronic device 5-1 interacts with a network through the SIM card, to implement functions such as calling and data communication. In some embodiments, the electronic device 5-1 uses an eSIM, that is, an embedded SIM card. The eSIM card may be embedded in the electronic device 5-1, and cannot be separated from the electronic device 5-1.

FIG. 5-2 is a flowchart of a life management method for a memory 5-121 according to an embodiment of this application. Specifically, the method may include the following steps.

Step S5-201: Obtain first data to be swapped from memory of an electronic device 5-1 to the memory 5-121 of the electronic device 5-1 in a first period.

In this embodiment, when obtaining, in the first period, a first instruction used by system software 5-122 to write data into the memory 5-121, the electronic device 5-1 obtains the first data that is of the system software 5-122 and that is to be swapped from the memory of the electronic device 5-1 to the memory 5-121 of the electronic device 5-1. For example, when receiving the first instruction in the first period, the electronic device 5-1 obtains, by using a storage management and control module 5-123, the first data that is of the system software 5-122 and that is to be swapped from the memory of the electronic device 5-1 to the memory 5-121 of the electronic device 5-1. In this embodiment, the first data is data that is of the system software 5-122 and that is to be swapped to the memory 5-121.

Step S5-202: Obtain a total data quota of the memory 5-121 in the first period, and subtract preset user data usage of the memory from the total data quota to obtain a swap-out data quota in the first period.

In this embodiment, for a detailed procedure of obtaining the total data quota of the memory 5-121 in the first period, refer to FIG. 5-3, FIG. 5-5, and the following detailed descriptions of FIG. 5-3 and FIG. 5-5.

Step S5-203: Swap the first data from the memory to the memory 5-121 based on the swap-out data quota. In this embodiment, for a detailed procedure of swapping the first data from the memory to the memory 5-121 based on the swap-out data quota, refer to FIG. 5-4, FIG. 5-6, and the following detailed descriptions of FIG. 5-4 and FIG. 5-6.

Step S5-204: Obtain status information of the memory 5-121, and determine a swap-out data quota of the memory 5-121 in a second period based on the status information of the memory 5-121, where the status information includes program-erase cycles, and/or a total service life, and/or a used service life, and/or a capacity, and/or a component write amplification (Write Amplification. WA) coefficient, and/or a used time In this embodiment, the second period is a next first period after the first period.

In this application, the to-be-swapped-out first data is swapped to the memory 5-121 based on the swap-out data quota. In this way, the data written by the system software 5-122 into the memory 5-121 is limited, to reduce program-erase cycles of the memory 5-121, prolong a service life of the memory 5-121, and ensure that the service life of the memory 5-121 reaches an expected life.

In this embodiment, the electronic device 5-1 obtains the program-erase cycles of the memory 5-121, and calculates the swap-out data quota in the first period based on the program-erase cycles of the memory 5-121. FIG. 5-3 is a flowchart of a method for obtaining a swap-out data quota of a memory 5-121 according to an embodiment of this application. Specifically, the method may include the following steps.

Step S5-301: Obtain program-erase cycles of the memory 5-121 in a first period.

In this embodiment, the first period may be set based on a user requirement. For example, the first period may be set to one day, one week, or one month.

Step S5-302: Calculate a growth rate of the program-erase cycles of the memory 5-121 in the first period based on the program-erase cycles of the memory 5-121 in the first period and the first period.

Step S5-303: Determine preset user data usage in the first period based on the growth rate of the program-erase cycles of the memory 5-121 in the first period.

Step S5-304: Subtract the preset user data usage from a total data quota to obtain a swap-out data quota of the memory 5-121 in the first period.

In this embodiment, the determining preset user data usage in the first period based on the growth rate of the program-erase cycles of the memory 5-121 in the first period includes: inputting the growth rate of the program-erase cycles of the memory 5-121 in the first period into a disk life prediction model, and outputting the preset user data usage after the growth rate is processed by the disk life prediction model. In this embodiment, the disk life prediction model is a neural network model, and the disk life prediction model performs deep learning on the growth rate of the program-erase cycles of the memory 5-121 and the preset user data usage, to obtain a relationship between the growth rate of the program-erase cycles of the memory 5-121 and the preset user data usage amount. In this embodiment, the preset user data usage is an amount of data written into the memory 5-121 by non-system software in a previous period of a current period (for example, the first period or a second period).

In another embodiment, a storage management and control module 5-123 queries a first relationship table (not shown in the figure) based on the growth rate of the program-erase cycles of the memory 5-121, determines the preset user data usage corresponding to the growth rate of the program-erase cycles of the memory 5-121 based on correspondences between a plurality of growth rates of program-erase cycles and a plurality of pieces of preset user data usage that are defined in the first relationship table, and subtracts the preset user data usage (the amount of the data written into the memory by the non-system software in the electronic device 5-1) from the total data quota of the memory 5-121 to obtain the swap-out data quota of the memory 5-121.

In this embodiment, after determining the swap-out data quota in the first period, the electronic device 5-1 swaps the first data from the memory to the memory 5-121 based on the swap-out data quota. FIG. 5-4 is a flowchart of a method for swapping first data from memory to a memory 5-121 based on a swap-out data quota according to an embodiment of this application. Specifically, the method may include the following steps.

Step S5-401: Determine whether a first period ends; and perform step S5-402 if it is determined that the first period does not end, or perform step S5-406 if it is determined that the first period ends.

Step S5-402: Obtain data swapped to the memory 5-121 in the first period, and perform subtraction on the swap-out data quota in the first period and the data swapped to the memory 5-121 in the first period, to obtain a remaining data quota.

Step S5-403: Determine whether to-be-written first data is less than the remaining data quota; and perform step S5-404 if the first data is less than the remaining data quota, or perform step S5-405 if the first data is greater than or equal to the remaining data quota.

Step S5-404: Swap the to-be-swapped-out first data to the memory 5-121.

Step S5-405: Select, from the to-be-swapped-out first data, target data whose data amount is the same as the remaining data quota, swap the target data to the memory 5-121, and disable a write function of the memory 5-121 after the target data is swapped to the memory 5-121.

Step S5-406: Recalculate, in a second period, the swap-out data quota of the memory 5-121 to obtain an updated swap-out data quota, and perform, in the second period based on the updated swap-out data quota, write management and control on second data to be swapped out in the second period.

In this embodiment, the determining a swap-out data quota of the memory 5-121 in a second period based on the status information of the memory 5-121 includes: obtaining program-erase cycles of the memory 5-121 in a preset time period in the second period; calculating a growth rate of the program-erase cycles of the memory 5-121 in the preset time period based on the growth rate of the program-erase cycles of the memory 5-121 in the preset time period; inputting the growth rate of the program-erase cycles of the memory 5-121 into a disk life prediction model, and outputting a total data quota of the memory 5-121 in the second period after the growth rate is processed by the disk life prediction model; and subtracting preset user data usage in the second period from the total data quota of the memory 5-121 in the second period, to obtain a swap-out data quota of the memory 5-121 in the second period.

The first period or the second period in this application may be configured based on a requirement. For example, the first period or the second period may be set by day, week, or month, to manage and control a service life of the memory 5-121. Therefore, management and control requirements of the memory 5-121 in different scenarios are easily met. In addition, because a swap-out data quota that is of the memory 5-121 and that corresponds to each first period is recalculated, a limitation on a disk write amount of the memory 5-121 in a historical first period does not affect write management and control on the memory 5-121 in a new first period, and in particular, a short-term burst excessive write behavior of a user does not cause a permanent write limitation, so that the memory 5-121 has a limited recovery capability. FIG. 5-5 is a flowchart of a method for obtaining a swap-out data quota of a memory 5-121 according to another embodiment of this application. Specifically, the method may include the following steps.

Step S5-501: Set a target use time of the memory 5-121.

Step S5-502. Obtain a used service life and a total service life of the memory 5-121.

In this embodiment, the electronic device 5-1 obtains the used service life of the memory 5-121 from a first register of the memory 5-121. The electronic device 5-1 obtains the total service life of the memory 5-121 from a second register of the memory 5-121. In this embodiment, the total service life of the memory 5-121 is all program-erase cycles of the memory 5-121, and the used service life of the memory 5-121 is program-erase cycles used by the memory 5-121.

Step S5-503: Obtain a component write amplification coefficient of the memory 5-121 and a capacity of the memory 5-121.

Step S5-504: Determine a swap-out data quota of the memory 5-121 in a first period based on the total service life of the memory 5-121, the used service life of the memory 5-121, the capacity of the memory 5-121, the target use time of the memory 5-121, the component write amplification coefficient of the memory 5-121, and the first period.

In this embodiment, the electronic device 5-1 obtains the swap-out data quota of the memory 5-121 in the first period through calculation according to Formula $p=(e-b)*q/((c/t)*w)$. Herein, e is the total service life of the memory 5-121, b is the used service life of the memory 5-121, q is the capacity of the memory 5-121, c is the target use time of the memory 5-121, w is the component write amplification coefficient of the memory 5-121, t is the first period, and p is the swap-out data quota.

In this embodiment, after determining the swap-out data quota of the memory 5-121 in the first period, the electronic device 5-1 swaps to-be-swapped-out first data to the memory 5-121 based on the swap-out data quota FIG. 5-6 is a flowchart of a method for swapping first data to a memory 5-121 based on a swap-out data quota according to another embodiment of this application. Specifically, the method may include the following steps.

Step S5-601: Perform timing based on a preset timing manner, and obtain a timing time in the preset timing manner.

In this embodiment, the electronic device 5-1 performs timing based on the preset timing manner, and obtains the timing time in the preset timing manner. In this embodiment, the preset timing manner includes a manner of performing timing based on a use time of the electronic device 5-1, a manner of performing timing based on a system running time of the electronic device 5-1, and a manner of performing timing based on an atomic clock. In this implementation, the manner of performing timing based on the use time of the electronic device 5-1 means that timing is performed when the electronic device 5-1 runs, and timing is stopped when the electronic device 5-1 is in a sleep state. The manner of performing timing based on the system running time of the electronic device 5-1 refers to a time counted when a system clock of the electronic device 5-1 runs after the electronic device 5-1 is powered on.

Step S5-602: Determine whether the timing time is within a first period; and perform step S5-603 if the timing time is within the first period, or perform step S5-608 if the timing time is not within the first period.

Step S5-603: Obtain accumulated data swapped to the memory 5-121 from the first period to the timing time.

Step S5-604: Perform subtraction on the swap-out data quota of the memory in the first period and the accumulated data to obtain a remaining data quota.

Step S5-605: Determine whether first data is less than a remaining data quota; and perform step S5-606 if the first data is less than the remaining data quota, or perform step S5-607 if the first data is not less than the remaining data quota.

Step S5-606: Swap the first data from memory to the memory 5-121.

Step S5-607: Select, from the first data, target data whose data amount is the same as the remaining data quota, swap the target data from the memory to the memory 5-121, and disable a write function of the memory 5-121 after the target data is written into the memory 5-121.

Step S5-608: Recalculate, in a second period, the swap-out data quota of the memory 5-121 to obtain an updated swap-out data quota, and perform, in the second period based on the updated swap-out data quota, write management and control on second data to be swapped to the memory 5-121 in the second period.

In this embodiment, the status information of the memory 5-121 includes a total service life of the memory 5-121, a used service life of the memory 5-121, a capacity of the memory 5-121, a component write amplification coefficient of the memory 5-121, and a used time of the memory 5-121. The determining a swap-out data quota of the memory in a second period based on the status information of the memory includes: obtaining the total service life of the memory 5-121, the used service life of the memory 5-121, the capacity of the memory 5-121, the component write amplification coefficient of the memory 5-121, and the used time of the memory 5-121; obtaining a preset target use time of the memory 5-121; and obtaining the swap-out data quota of the memory 5-121 in the second period through calculation according to Formula $p=(e-b)*q/((c-c1)*w/t)$. Herein, e is the total service life of the memory 5-121, b is the used service life of the memory 5-121, q is the capacity of the memory 5-121, c is the target use time of the memory 5-121, c1 is the used time of the memory 5-121, w is the component write amplification coefficient of the memory 5-121, t is the first period, and p is the swap-out data quota.

Optionally, in a possible embodiment of this application, if the storage management and control module 5-123 of the electronic device 5-1 obtains a power-off instruction of the electronic device 5-1 in the first period, the storage management and control module 5-123 of the electronic device 5-1 is further configured to write, as statistical information into a statistical information file 5-141 of the memory 5-121, the timing time and all accumulated data swapped to the memory 5-121 from the first period to the timing time. The memory 5-121 is a non-volatile memory. FIG. 5-7A is a schematic diagram of writing statistical information by a storage management and control module 5-123 according to an embodiment of this application. In this embodiment, after obtaining a power-off instruction of the electronic device 5-1, the storage management and control module 5-123 writes timing time and accumulated data into the statistical information file 5-141 of the memory 5-121, so that the electronic device 5-1 reads the timing time and the accumulated data from the statistical information file 5-141 after being powered on next time. The storage management and control module 5-123 writes the timing time and the accumulated data into the statistical information file 5-141 of the memory 5-121 and then controls the electronic device 5-1 to be powered off.

FIG. 5-7B is a schematic diagram of reading statistical information by a storage management and control module 5-123 according to an embodiment of this application. In this embodiment, after obtaining a power-on instruction of the electronic device 5-1, the storage management and control module 5-123 reads timing time and accumulated data from the statistical information file 5-141 of the memory 5-121, and manages and controls, based on the timing time and the accumulated data, first data to be swapped to the memory 5-121 in a first period. For a specific implementation in which the storage management and control module 5-123 manages and controls, based on the timing time and the accumulated data, the first data to be swapped to the memory 5-121 in the first period, refer to the flowchart in FIG. 5-6. Details are not described herein again.

In this application, after the power-on instruction of the system of the electronic device 5-1 is obtained, the timing time and the accumulated data in the uncompleted first management and control period may be read from the statistical information file 5-141 of the memory 5-121, and the first data to be swapped to the memory 5-121 in the first period may continue to be managed and controlled based on the timing time and the accumulated data in the uncompleted first period. Therefore, a life management and control effect of the memory 5-121 may not be affected by a system power-off action or a system power-on action of the electronic device 5-121, and after being powered off or powered on for a plurality of times, the system of the electronic device 5-1 can still manage and control, based on a time axis, the data written into the memory 5-121 in the current first period.

In this embodiment, the status information of the memory 5-121 includes a used service life of the memory 5-121 and a total service life of the memory 5-121. In this embodiment, the method further includes: obtaining the used service life of the memory 5-121 and the total service life of the memory 5-121, calculating a ratio of the used service life of the memory 5-121 to the total service life of the memory 5-121, to obtain a first ratio, and skipping swapping the first data to the memory 5-121 when the first ratio reaches a preset ratio. FIG. 5-8 is a flowchart of a method for swapping first data to a memory 5-121 according to an embodiment of this application. Specifically, the method may include the following steps.

Step S5-801: Set a detection period.

Step S5-802: Obtain a used service life of the memory 5-121 and a total service life of the memory 5-121 in each detection period.

In this embodiment, the electronic device 5-1 obtains the used service life of the memory 5-121 from a first register of the memory 5-121 in each detection period.

In this embodiment, the electronic device 5-1 obtains the total service life of the memory 5-121 from a second register of the memory 5-121 in each detection period. Optionally, in this embodiment of this application, the first register and the second register may be a same register or different registers.

Step S5-803: Calculate a ratio of the used service life of the memory 5-121 to the total service life of the memory 5-121 in each detection period, to obtain a first ratio.

Step S5-804: Determine, in each detection period, whether the first ratio is less than a preset ratio; and perform step S5-805 if the first ratio is less than the preset ratio in each detection period, or perform step S5-806 if the first ratio is greater than or equal to the preset ratio in each detection period.

In this embodiment, the electronic device 5-1 obtains a preset target service life of the memory 5-12114, and calculates a ratio of the target service life of the memory 5-121 to a total service life of the memory 5-121, to obtain the preset ratio.

Step S5-805: Swap the first data from memory to the memory 5-121.

Step S5-806: Skip swapping the first data from the memory to the memory, and disable a write function of the memory 5-121.

In this application, the first ratio of the used service life of the memory 5-121 to the total service life of the memory 5-121 is detected in each detection period, and the first data is swapped to the memory 5-121 based on a write condition, to manage and control a total quantity of storage resources consumed by the memory 5-121, and ensure that a service life of the memory 5-121 reaches a designed service life.

In this embodiment, the method further includes: determining a target use time of the memory 5-121: obtaining a used service life of the memory 5-121; comparing the used service life of the memory 5-121 with the target use time of the memory 5-121; and if the used service life of the memory 5-121 is greater than or equal to the target use time of the memory 5-121, swapping the first data from the memory to the memory 5-121; or if the used service life of the memory 5-121 is less than the target use time of the memory 5-121, obtaining a data limit amount through calculation according to Formula $d=k1*(c-b)*100/b$, where b is the used service life of the memory 5-121, d is the data limit amount, and k1 is a configuration coefficient specified by a user; and using a difference obtained by subtracting the data limit amount from the swap-out data quota in the first period as the swap-out data quota of the memory 5-121 in the first period.

In this implementation, the determining a target use time of the memory 5-121 includes, obtaining a target service life of the memory 5-121 and a total service life of the memory; calculating a ratio of the used service life of the memory 5-121 to the total service life of the memory 5-121 to obtain a second ratio; and obtaining the target use time of the memory 5-121 through calculation according to Formula $c=k2*a$, where a is the target service life of the memory 5-121, k2 is the second ratio, and c is the target use time of the memory 5-121.

In this embodiment, the configuration coefficient indicates a quantity of GB units of stored data that needs to be subtracted from the swap-out data quota each time the target use time of the memory 5-121 is reduced by 1%. In this embodiment, the configuration coefficient is an empirical value of 1 GB.

In this application, if the used service life of the memory 5-121 is less than the target use time of the memory 5-121, the difference obtained by subtracting the data limit amount from the swap-out data quota in the first period as the swap-out data quota of the memory 5-121 in the first period. In this way, data written into the memory 5-121 is corrected in the first period, so that a service life of the memory 5-121 can be prolonged, to reach an expected life.

An embodiment further provides a computer storage medium. The computer storage medium stores computer instructions, and when the computer instructions are run on an electronic device, the electronic device is enabled to perform the foregoing related method steps, to implement the life management method for a memory 5-121 in the foregoing embodiments.

An embodiment further provides a computer program product. When the computer program product runs on a computer, the computer is enabled to perform the foregoing related steps, to implement the memory management method in the foregoing embodiments.

In addition, an embodiment of this application further provides an apparatus. The apparatus may be specifically a chip, a component, or a module. The apparatus may include a processor and a memory that are connected. The memory is configured to store computer executable instructions, and when the apparatus runs, the processor may execute the computer executable instructions stored in the memory, so that the chip performs the life management method for a memory 5-121 in the foregoing method embodiments.

The electronic device, the computer storage medium, the computer program product, and the chip provided in embodiments each are configured to perform the corresponding method provided above. Therefore, for beneficial effects that can be achieved by the electronic device, the computer storage medium, the computer program product, and the chip, refer to beneficial effects in the corresponding method provided above. Details are not described herein again.

Based on the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division in an actual implementation. For example, a plurality of units or components may be combined or may be integrated into another apparatus, or some features may be ignored or not be performed. In addition, the displayed or discussed mutual coupling or direct coupling or communication connection may be implemented through some interfaces. The indirect coupling or communication connection between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of this application, but not intended to limit this application.

Although this application is described in detail with reference to the example embodiments, a person of ordinary skill in the art should understand that the person can still make modifications or equivalent replacement to the technical solutions of this application without departing from the spirit and scope of the technical solutions of this application.

Setting virtual memory in an external storage is a common memory expansion method in a computing system A page that is dynamically allocated by an application in memory and that has no file background is referred to as an anonymous page. Moving an anonymous page from the memory to the external storage is referred to as memory swap-out, and moving an anonymous page from the external storage to the memory is referred to as memory swap-in. Memory swap-out and memory swap-in performance directly affects system performance.

Limited by evolution of a storage medium, a single read delay of the external storage is difficult to be shortened. Read performance of the external storage restricts memory swap-in performance. Poor memory swap-in performance may cause system freezing.

The memory management method provided in embodiments of this application may be applied to an electronic device 6-100 shown in FIG. 6-1. The electronic device 6-100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 6-100 may include a processor 6-110, an external memory interface 6-120, an internal memory 6-121, a universal serial bus (universal serial bus, USB) port 6-130, a charging management module 6-140, a power management module 6-141, a battery 6-142, an antenna 6-1, an antenna 6-2, a mobile communications module 6-150, a wireless communications module 6-160, an audio module 6-170, a speaker 6-170A, a receiver 6-170B, a microphone 6-170C, a headset jack 6-170D, a sensor module 6-180, a camera 6-191, a display 6-192, and the like. The sensor module 6-180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of this application does not constitute a specific limitation on the electronic device 6-100. In some other embodiments of this application, the electronic device 6-100 may include more or fewer components than those shown in the figure, or combine some components, or split some components, or have different component arrangements. The components shown in the figure may be implemented by hardware, software, or a combination of software and hardware.

The processor 6-110 may include one or more processing units. For example, the processor 6-110 may include an application processor (application processor. AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 6-110, and is configured to store instructions and data. In some embodiments, the memory in the processor 6-110 is a cache. The memory may store instructions or data that has been used or cyclically used by the processor 6-110. If the processor 6-110 needs to use the instructions or the data again, the processor may directly invoke the instructions or the data from the memory. This avoids repeated access, reduces waiting time of the processor 6-110, and improves system efficiency.

In some embodiments, the processor 6-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 6-110 may include a plurality of groups of I2C buses.

The I2S interface may be used for audio communication. In some embodiments, the processor 6-110 may include a plurality of groups of I2S buses. The processor 6-110 may be coupled to the audio module 6-170 through the I2S bus, to implement communication between the processor 6-110 and the audio module 6-170. In some embodiments, the audio module 6-170 may transfer an audio signal to the wireless communications module 6-160 through the I2S interface, to implement a function of answering a call by using a Bluetooth headset.

The PCM interface may also be used for audio communication, and samples, quantizes, and codes an analog signal. In some embodiments, the audio module 6-170 may be coupled to the wireless communications module 6-160 through a PCM bus interface. In some embodiments, the audio module 6-170 may alternatively transfer an audio signal to the wireless communications module 6-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 6-110 to the wireless communications module 6-160. For example, the processor 6-110 communicates with a Bluetooth module in the wireless communications module 6-160 through the UART interface, to implement a Bluetooth function. In some embodiments, the audio module 6-170 may transfer an audio signal to the wireless communications module 6-160 through the UART interface, to implement a function of playing music by using a Bluetooth headset.

The MIPI may be configured to connect the processor 6-110 to a peripheral component such as the display 6-192 or the camera 6-191. The MIPI includes a camera serial interface (camera serial interface, CSI), a display serial interface (display serial interface, DSI), and the like. In some embodiments, the processor 6-110 communicates with the camera 6-191 through the CSI, to implement a photographing function of the electronic device 6-100. The processor 6-110 communicates with the display 6-192 through the DSI, to implement a display function of the electronic device 6-100.

The GPIO interface may be configured by using software. The GPIO interface may be configured as a control signal or a data signal. In some embodiments, the GPIO interface may be configured to connect the processor 6-110 to the camera 6-191, the display 6-192, the wireless communications module 6-160, the audio module 6-170, the sensor module 6-180, and the like. The GPIO interface may alternatively be configured as an I2C interface, an I2S interface, a UART interface, an MIPI, or the like.

The USB port 6-130 is a port that conforms to a USB standard specification, and may be specifically a mini USB port, a micro USB port, a USB Type-C port, or the like. The USB port 6-130 may be configured to connect to a charger to charge the electronic device 6-100, or may be configured to transmit data between the electronic device 6-100 and a peripheral device, or may be configured to connect to a headset for playing an audio through the headset. The port may alternatively be configured to connect to another electronic device such as an AR device.

It may be understood that an interface connection relationship between modules in this embodiment of this application is merely an example for description, and does not constitute a limitation on the structure of the electronic device 6-100. In some other embodiments of this application, the electronic device 6-100 may alternatively use an interface connection manner different from that in the foregoing embodiment, or a combination of a plurality of interface connection manners.

The charging management module 6-140 is configured to receive a charging input from a charger. The charger may be a wireless charger or a wired charger. In some embodiments of wired charging, the charging management module 6-140 may receive a charging input from the wired charger through the USB port 6-130. In some embodiments of wireless charging, the charging management module 6-140 may receive a wireless charging input through a wireless charging coil of the electronic device 6-100. When charging the battery 6-142, the charging management module 6-140 may further supply power to the electronic device by using the power management module 6-141.

The power management module 6-141 is configured to connect to the battery 6-142, the charging management module 6-140, and the processor 6-110. The power management module 6-141 receives an input of the battery 6-142 and/or an input of the charging management module 6-140, and supplies power to the processor 6-110, the internal memory 6-121, the display 6-192, the camera 6-191, the wireless communications module 6-160, and the like. The power management module 6-141 may be further configured to monitor parameters such as a battery capacity, a battery cycle count, and a battery health status (electricity leakage or impedance). In some other embodiments, the power management module 6-141 may alternatively be disposed in the processor 6-110. In some other embodiments, the power management module 6-141 and the charging management module 6-140 may alternatively be disposed in a same device.

A wireless communication function of the electronic device 6-100 may be implemented by using the antenna 6-1, the antenna 6-2, the mobile communications module 6-150, the wireless communications module 6-160, the modem processor, the baseband processor, and the like.

The antenna 6-1 and the antenna 6-2 are configured to: transmit and receive electromagnetic wave signals. Each antenna in the electronic device 6-100 may be configured to cover one or more communication frequency bands. Different antennas may be further multiplexed, to increase antenna utilization. For example, the antenna 6-1 may be multiplexed as a diversity antenna in a wireless local area network. In some other embodiments, the antenna may be used in combination with a tuning switch.

The mobile communications module 6-150 may provide a wireless communication solution that includes 2G/3G/4G/5G or the like and that is applied to the electronic device 6-100. The mobile communications module 6-150 may include at least one filter, a switch, a power amplifier, a low noise amplifier (low noise amplifier, LNA), and the like. The mobile communications module 6-150 may receive an electromagnetic wave through the antenna 6-1, perform processing such as filtering or amplification on the received electromagnetic wave, and transmit the electromagnetic wave to the modem processor for demodulation. The mobile communications module 6-150 may further amplify a signal modulated by the modem processor, and convert an amplified signal into an electromagnetic wave for radiation through the antenna 6-1. In some embodiments, at least some functional modules in the mobile communications module 6-150 may be disposed in the processor 6-110. In some embodiments, at least some functional modules in the mobile communications module 6-150 may be disposed in a same device as at least some modules in the processor 6-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 6-170A, the receiver 6-170B, or the like), or displays an image or a video through the display 6-192. In some embodiments, the modem processor may be an independent device. In some other embodiments, the modem processor may be independent of the processor 6-110, and is disposed in a same device as the mobile communications module 6-150 or another functional module.

The wireless communications module 6-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, or the like and that is applied to the electronic device 6-100. The wireless communications module 6-160 may be one or more components that integrate at least one communications processor module. The wireless communications module 6-160 receives an electromagnetic wave through the antenna 6-2, performs frequency modulation and filtering processing on the electromagnetic wave signal, and sends a processed signal to the processor 6-110. The wireless communications module 6-160 may further receive a to-be-sent signal from the processor 6-110, perform frequency modulation and amplification on the signal, and convert a processed signal into an electromagnetic wave for radiation through the antenna 6-2.

In some embodiments, the antenna 6-1 and the mobile communications module 6-150 in the electronic device 6-100 are coupled, and the antenna 6-2 and the wireless communications module 6-160 in the electronic device 6-100 are coupled, so that the electronic device 6-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system. QZSS), and/or a satellite based augmentation system (satellite based augmentation system, SBAS).

The electronic device 6-100 may implement a display function through the GPU, the display 6-192, the application processor, and the like. The GPU is a microprocessor for image processing, and is connected to the display 6-192 and the application processor. The GPU is configured to: perform mathematical and geometric calculation, and render an image. The processor 6-110 may include one or more GPUs that execute program instructions to generate or change display information.

The display 6-192 is configured to display an image, a video, and the like. The display 6-192 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 6-100 may include one or N displays 6-192, where N is a positive integer greater than 1.

The electronic device 6-100 may implement a photographing function through the ISP, the camera 6-191, the video codec, the GPU, the display 6-192, the application processor, and the like.

The ISP is configured to process data fed back by the camera 6-191. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 6-191.

The camera 6-191 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 6-100 may include one or N cameras 6-191, where N is a positive integer greater than 1.

The digital signal processor is configured to process a digital signal, and may further process another digital signal in addition to a digital image signal. For example, when the electronic device 6-100 selects a frequency, the digital signal processor is configured to perform Fourier transform or the like on frequency energy.

The video codec is configured to: compress or decompress a digital video. The electronic device 6-100 may support one or more video codecs. In this way, the electronic device 6-100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 6-100, such as image recognition, facial recognition, speech recognition, and text understanding.

The internal memory 6-121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory). The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage. UFS), an embedded multimedia card (embedded multimedia Card, eMMC), and the like according to storage specifications.

In this embodiment of this application, the random access memory is referred to as memory, and the non-volatile memory is referred to as an external storage.

The memory 6-1211 may be directly read and written by using the processor 6-110. The memory may be configured to store an executable program (for example, machine instructions) in an operating system or another running program, and may be further configured to store data of a user, data of an application, and the like.

The external storage 6-1212 may also store an executable program, data of a user, data of an application, and the like, which may be loaded into the memory in advance for directly reading and writing by the processor 6-110.

The external memory interface 6-120 may be configured to connect to an external non-volatile memory, to extend a storage capability of the electronic device 6-100. The external non-volatile memory communicates with the processor 6-110 through the external memory interface 6-120, to implement a data storage function. For example, files such as music and videos are stored in the external non-volatile memory.

The electronic device 6-100 may implement audio functions, for example, music playing and recording, by using the audio module 6-170, the speaker 6-170A, the receiver 6-170B, the microphone 6-170C, the headset jack 6-170D, the application processor, and the like.

The audio module 6-170 is configured to convert digital audio information into an analog audio signal for output, and is also configured to convert an analog audio input into a digital audio signal. The audio module 6-170 may be further configured to: code and decode an audio signal. In some embodiments, the audio module 6-170 may be disposed in the processor 6-110, or some functional modules in the audio module 6-170 are disposed in the processor 6-110.

The speaker 6-170A, also referred to as a "horn", is configured to convert an electrical audio signal into a sound signal. The electronic device 6-100 may be used to listen to music or answer a call in a hands-free mode over the speaker 6-170A.

The receiver 6-170B, also referred to as an "earpiece", is configured to convert an electrical audio signal into a sound signal. When a call is answered or speech information is received through the electronic device 6-100, the receiver 6-170B may be put close to a human ear to listen to a voice.

The microphone 6-170C, also referred to as a "mike" or a "mic", is configured to convert a sound signal into an electrical signal. When making a call or sending voice information, a user may make a sound near the microphone 6-170C through the mouth of the user, to input the sound signal to the microphone 6-170C. At least one microphone 6-170C may be disposed in the electronic device 6-100. In some other embodiments, two microphones 6-170C may be disposed in the electronic device 6-100, to implement a noise reduction function in addition to collecting a sound signal. In some other embodiments, three, four, or more microphones 6-170C may alternatively be disposed in the electronic device 6-100, to collect a sound signal, reduce noise, identify a sound source, implement a directional recording function, and the like.

The headset jack 6-170D is configured to connect to a wired headset. The headset jack 6-170D may be the USB port 6-130, or may be a 3.5 mm open mobile terminal platform (open mobile terminal platform, OMTP) standard interface or a cellular telecommunications industry association of the USA (cellular telecommunications industry association of the USA, CTIA) standard interface.

A page that is dynamically allocated by an application in memory and that has no file background is referred to as an anonymous page (anonymous page), such as a heap, a stack, and a data segment. As shown in FIG. 6-2, when remaining space of the memory 6-1211 is insufficient, some anonymous pages in the memory 6-1211 may be moved to virtual memory of the external storage 6-1212 to reclaim memory. If an anonymous page that needs to be accessed by an application does not exist in the memory, that is, a memory page fault occurs, the anonymous page may be loaded from the external storage 6-1212 to the memory 6-1211. Moving an anonymous page from the memory 6-1211 to the external storage 6-1212 is referred to as memory swap-out, and loading an anonymous page from the external storage 6-1212 to the memory 6-1211 is referred to as memory swap-in. Memory swap-out and memory swap-in are collectively referred to as memory swap.

In an implementation, as shown in FIG. 6-3, during memory swap-out, anonymous page data is stored in free space with a random storage address in the virtual memory. During memory swap-in, an anonymous page that needs to be accessed by an application is loaded from the virtual memory to the memory. Because the anonymous page that needs to be accessed by the application is random, during memory swap-in, a storage address of the anonymous page that is loaded from the virtual memory to the memory is also random. This manner of randomly reading the anonymous page from the virtual memory is slow, and memory swap performance is low.

An embodiment of this application provides a memory management method. As shown in FIG. 6-4, the memory 6-1211 includes a cache block, and the cache block may be a specified memory area, a dynamically allocated memory area, or the like. For example, the cache block is a ZRAM in Linux. In this application, the cache block is referred to as a fiftieth memory area. In the memory 6-1211, a corresponding memory area is allocated to each process of each application, and is used to run a program of the process and a related variable. It may be understood that the cache block is independent of a memory area allocated to a process of an application.

When remaining space of the memory area of the application process in the memory 6-1211 is insufficient (for example, the remaining space of the memory 6-1211 is less than a fiftieth specified value), memory reclamation is performed, and some anonymous pages in the memory area of the process are moved to the cache block. When remaining space of the cache block is insufficient (for example, the remaining space of the cache block is less than a fifty-first specified value), write-back storage is performed, and some or all of the anonymous pages in the cache block are moved to the virtual memory. The anonymous page moved to the virtual memory includes anonymous page data 6-410 belonging to a fiftieth application. In an implementation, the anonymous page data 6-410 belonging to the fiftieth application occupies a segment of space with consecutive storage addresses in the virtual memory. When the fiftieth application is switched to the foreground, all (or some) anonymous page data belonging to the fiftieth application is loaded to the cache block, that is, memory prefetching. Then, a process of the fiftieth application is called, and if a memory page fault occurs (that is, data that needs to be accessed by the process of the fiftieth application does not exist in the memory area of the process), the anonymous page that needs to be accessed is directly read from the cache block. When the application is switched to the foreground, all or most of the anonymous pages of the application are already loaded to the cache block. When a memory page fault occurs, an anonymous page that needs to be accessed is directly read from the cache block, and data in the memory is accessed. In this way, data read performance is not limited by read performance of the external storage, to improve data reading efficiency and effectively avoid system freezing.

With reference to the accompanying drawings, the following describes in detail a memory management method provided in embodiments of this application.

As shown in FIG. 6-5, the memory management method provided in this embodiment of this application may include the following steps.

S6-501: When remaining space in memory is insufficient, move an anonymous page that meets a fiftieth condition in the memory to a cache block, where the anonymous page that meets the fiftieth condition includes a plurality of anonymous pages of a fiftieth application.

The memory is managed by using an application. Each application corresponds to a memory management linked list, and is used to perform memory management on an anonymous page related to the application. A memory management linked list corresponding to an application includes all anonymous pages related to the application.

If the remaining space in the memory is less than a fiftieth specified value (for example, 60%), and no memory area can be allocated to the process, that is, the remaining space in the memory is insufficient, the anonymous page that meets the fiftieth condition in the memory is moved to the cache block.

In an example, one or more applications are randomly selected from applications running on the background, and an anonymous page in a memory management linked list corresponding to the one or more applications is moved to the cache block.

In another example, an anonymous page in a memory management linked list corresponding to one or more applications that are first opened in applications running on the background is moved to the cache block based on a sequence of opening the applications.

In another example, an anonymous page of one or more applications that are coldest in applications running on the background is moved to the cache block based on hotness and coldness of the applications. Longer duration for which an application is not called last time indicates a colder application; and shorter duration for which an application is not called last time indicates a hotter application. For example, each application corresponds to one field, and is used to record a time t (t>=0) for which the application is last called. A larger value of t correspondingly indicates a colder application. A smaller value of t correspondingly indicates a hotter application.

In another example, a least recently used (least recently used, LRU) algorithm mechanism is used for a memory management linked list corresponding to each application (the memory management linked list is also referred to as an LRU linked list). In the memory management linked list, anonymous pages are sorted in an order from hot to cold or an order from cold to hot. Longer duration for which an anonymous page is not called last time indicates a colder anonymous page. An anonymous page that is least recently invoked (least recently used) is a coldest anonymous page. When the remaining space in the memory is insufficient, p (p>2, which can be set by a user) coldest anonymous pages in the memory are moved to the cache block.

In the cache block, the anonymous page is managed by using an application. Each application corresponds to a cache management linked list, and is used to manage an anonymous page related to the application. A cache management linked list corresponding to an application includes all anonymous page data related to the application in the cache block.

For example, the cache block includes a fiftieth cache management linked list corresponding to the fiftieth application, and the fiftieth cache management linked list includes anonymous page data related to the fiftieth application.

S6-502: When remaining space in the cache block is insufficient, move an anonymous page that meets a fifty-first condition in the cache block to the virtual memory, where the removed anonymous page includes anonymous page data of the fiftieth application.

If the remaining space in the cache block is less than a fifty-first specified value (for example, 80%), that is, the remaining space in the cache block is insufficient, the anonymous page that meets the fifty-first condition in the cache block is moved to the virtual memory.

In an example, one or more applications are randomly selected, and anonymous page data in a cache management linked list corresponding to the one or more applications is moved to the virtual memory.

In another example, q (q>2, which may be set by a user) pieces of coldest anonymous page data are moved to the virtual memory based on hotness and coldness of anonymous page data in the cache block. Anonymous page data that is first moved to a cache page is colder than anonymous page data that is later moved to the cache page, and the anonymous page data that is later moved to the cache page is hotter than the anonymous page data that is first moved to the cache page.

In an implementation, anonymous page data belonging to a same application is moved to space with consecutive storage addresses in the virtual memory. For example, a plurality of anonymous page data belonging to a same application in the cache block are packaged into one data block, and a plurality of data blocks belonging to a same application are moved to space with consecutive storage addresses in the virtual memory.

In some examples, in a front-to-back order of virtual addresses, the virtual memory is searched for free space that is greater than or equal to space occupied by the anonymous page data removed from the cache block and that has consecutive storage addresses; and the anonymous page data is moved to the space with the consecutive storage addresses.

Optionally, if there is no free space that is greater than or equal to the space occupied by the anonymous page data removed from the cache block and that has the consecutive storage addresses, storage space (a storage block) occupied by one or more fifty-first applications in the virtual memory is released, that is, the one or more fifty-first applications are killed on the background, and data of the one or more fifty-first applications in the virtual memory is cleared. For example, the fifty-first application may be one or more applications that occupy most storage blocks in the virtual memory. For example, as shown in FIG. 6-6, anonymous page data of a plurality of applications in the virtual memory separately occupies a segment of space with consecutive storage addresses. Space 6-601 with largest continuous space is occupied by anonymous page data of an application. When release of storage space occupied by an application in the virtual memory is triggered, an application that occupies the space 6-601 is released. In this way, space 6-602 with consecutive storage addresses is released to occupy the anonymous page data moved to the virtual memory in the cache block. After the space 6-602 is occupied by anonymous page data of two applications, release of storage space occupied by an application in the virtual memory is triggered again. In this case, space 6-603 with largest continuous space is occupied by anonymous page data of an application, and an application that occupies the space 6-603 is released. In this way, space 6-604 with consecutive storage addresses is released to occupy the anonymous page data subsequently moved to the virtual memory m the cache block.

Optionally, if there is no free space that is greater than or equal to the space occupied by the anonymous page data removed from the cache block and that has consecutive storage addresses, in a front-to-back order, the virtual memory is searched for an application whose occupied space is greater than or equal to the space occupied by the anonymous page data removed from the cache block, the application is killed, and storage space occupied by the application is released.

Optionally, if there is no free space that is greater than or equal to the space occupied by the anonymous page data removed from the cache block and that has consecutive storage addresses, an application to which anonymous page data that is first moved to the virtual memory belongs is killed, and storage space occupied by the application is released.

It may be understood that if there is no free space that is greater than or equal to the space occupied by the anonymous page data removed from the cache block and that has consecutive storage addresses, another rule may alternatively be used to determine the killed application in the virtual memory, and release the storage space occupied by the application. This is not limited in embodiments of this application.

Optionally, if there is no free space that is greater than or equal to the space occupied by the anonymous page data removed from the cache block and that has consecutive storage addresses, moving a data block to the virtual memory is stopped.

In some other examples, corresponding storage space with consecutive storage addresses is pre-allocated to each application. Sizes of storage space with consecutive storage spaces may be the same or different.

S6-503: Detect that the fiftieth application is switched to the foreground, and load anonymous page data belonging to the fiftieth application from the virtual memory to the cache block.

That the application is switched to the foreground may mean that a display of an electronic device displays an interface of the application.

That the application is switched to the foreground may alternatively mean that an activity corresponding to the application enters an active state from a pause state.

A software system of the electronic device may use a layered architecture. In a layered architecture, software may be divided into several layers, and each of the layers has a clear role and task. The layers communicate with each other through a software interface. In some embodiments, the software system of the electronic device is divided into three layers: an application layer (application layer), an application framework layer (briefly referred to as a framework layer), and a kernel layer (also referred to as a driver layer) from top to bottom.

The application layer may include a series of application packages, for example, applications such as Camera. Gallery. Calendar, Phone, Map, Navigation, WLAN, Bluetooth. Music, Videos, Messages, and Launcher (Launcher). The framework layer provides an application programming interface (application programming interface, API) and a programming framework for an application at the application layer. The application framework layer includes some predefined functions. The framework layer may include a window manager (window manager service, WMS), an activity manager AMS, and the like.

The window manager WMS is configured to manage a window program. The window manager may obtain a size of a display, determine whether there is a status bar, perform screen locking, take a screenshot, and the like. The activity manager AMS is configured to manage activities, and is responsible for work such as startup, switching, and scheduling of each component in a system, and management and scheduling of applications. The kernel layer is a layer between hardware and software. The kernel layer includes at least a display driver, a camera driver, an audio driver, and a sensor driver. The kernel layer is a layer between hardware and software.

When a user performs an input operation (for example, an operation for triggering the electronic device to display an application) on the electronic device, the kernel layer may generate a corresponding input event (for example, a foldable screen unfolding event) based on the input operation, and report the event to the application framework layer. Application window attributes are set by the activity manager service AMS at the application framework layer. The window manager service WMS at the application framework layer draws a window based on the settings of the AMS, and then sends window data to the display driver at the kernel layer. The display driver displays a corresponding application interface on a foldable screen.

The attribute of the window may include a location and a size of an activity window, and a visible attribute (that is, a status of the activity window) of the activity window. The location of the activity window is a location of the activity window on the display, and the size of the activity window may be information such as a width and a height in application opening config. The visible attribute of the activity window may be true or false. When the visible attribute of the activity window is true, it indicates that the activity window is in an active state, and the activity window is visible to a user, that is, the display driver displays content of the activity window. When the visible attribute of the activity in the activity window is false, it indicates that the activity window is in a pause state, and the activity window is invisible to a user, that is, the display driver does not display content of the activity window.

An application (for example, an application 1 or an application 2) may invoke an activity start interface to start a corresponding activity. In response to invoking from the application, the activity manager AMS may request the window manager WMS to draw a window corresponding to the activity, and invoke the display driver to implement interface display.

The application that enters the active state performs the following processing: (1) creating an Application object and a Context object; (2) calling Activity.attach( ) to create the window corresponding to the activity: (3) invoking the onCreate method for the user, where the setContentView method in the onCreate method is used to create a view DecorView of the activity; and (4) calculating and drawing the view of the activity. After the foregoing steps are completed, an image of the application is displayed. The application is a foreground application.

It should be noted that image content of the foreground application may include not only an image visible to the user, but also content without a user interface, content of a transparent layer, or content that is invisible to the user and is blocked by another application interface.

S6-504: When a fiftieth process of the fiftieth application is called, read anonymous page data of the fiftieth process from the cache block.

When the fiftieth process of the fiftieth application is called, if the anonymous page of the fiftieth process does not exist in the memory, that is, a memory page fault occurs, the anonymous page data of the fiftieth process is directly read from the cache block. The anonymous page data of the fiftieth process is a part of the anonymous page data that belongs to the fiftieth application and that is loaded to the cache in S6-503.

When the fiftieth application is switched to the foreground, the anonymous page data of the application is already loaded to the cache block. When a memory page fault occurs, an anonymous page that needs to be accessed is directly read from a cache block. In this way, data read performance is not limited by read performance of the external storage, to improve data reading efficiency and effectively avoid system freezing. In addition, the anonymous page data of the fiftieth application has consecutive storage addresses in the external storage. When the anonymous page data is loaded from the external storage to the cache block, data is read from space with consecutive storage addresses, to improve read efficiency.

Figures 1, 2, 3, 4, 5, 6, 7:
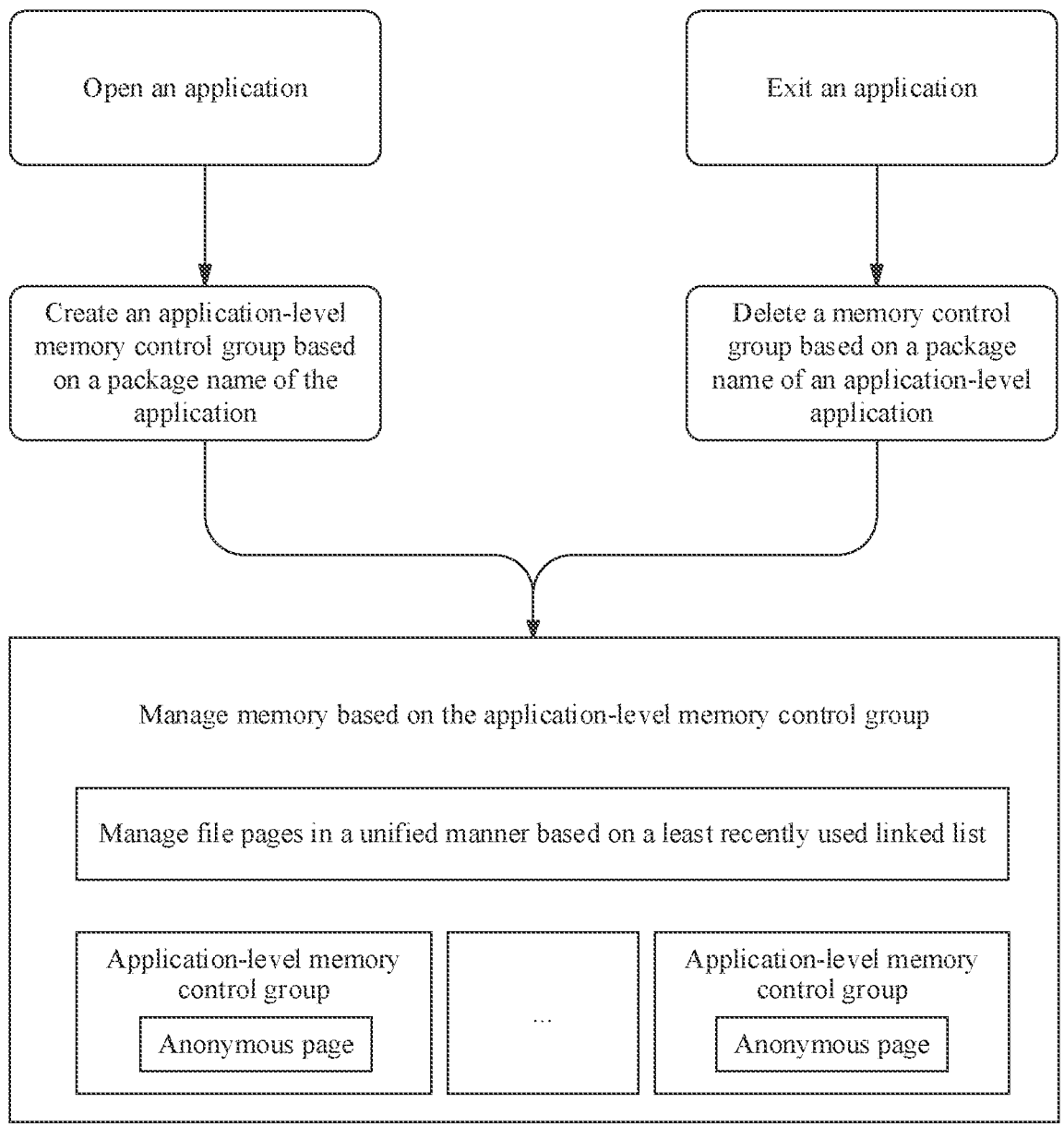

In some embodiments, refer to FIG. 6-7. An anonymous page that meets a fiftieth condition in memory is moved to a cache block 6-710. In the cache block 6-710, the anonymous page is managed in a unit of application. Each application corresponds to one cache management linked list. For example, a cache management linked list corresponding to an application 1 is a linked list of the application 1 and includes an anonymous page belonging to the application 1; a cache management linked list corresponding to an application i is a linked list of the application i and includes an anonymous page belonging to the application i, and a cache management linked list corresponding to an application n is a linked list of the application n and includes an anonymous page belonging to the application n. When remaining space in the cache block 6-710 is insufficient, the anonymous page belonging to the application i is moved to virtual memory 6-720. In an implementation, a plurality of anonymous pages belonging to the application i are packaged into one data block, and a plurality of data blocks formed through packaging are stored in space with consecutive storage addresses in the virtual memory 6-720. For example, a size of one anonymous page is 4 KB, and a size of one data block is 32 KB. Eight anonymous pages are packaged into one data block. It may be understood that if a quantity of to-be-packaged anonymous pages is less than a maximum quantity of allowed anonymous pages m one data block, these to-be-packaged anonymous pages may be packaged into one data block. The virtual memory 6-720 includes a plurality of storage blocks 6-721, and each storage block 6-721 may store one data block. Addresses of storage blocks 6-721 occupied by a plurality of data blocks formed by packaging anonymous pages belonging to the application i are consecutive. It may be understood that storage addresses of anonymous pages in one data block may be consecutive or inconsecutive.

Figures 1, 2, 3, 4, 5, 6, 7, 8:
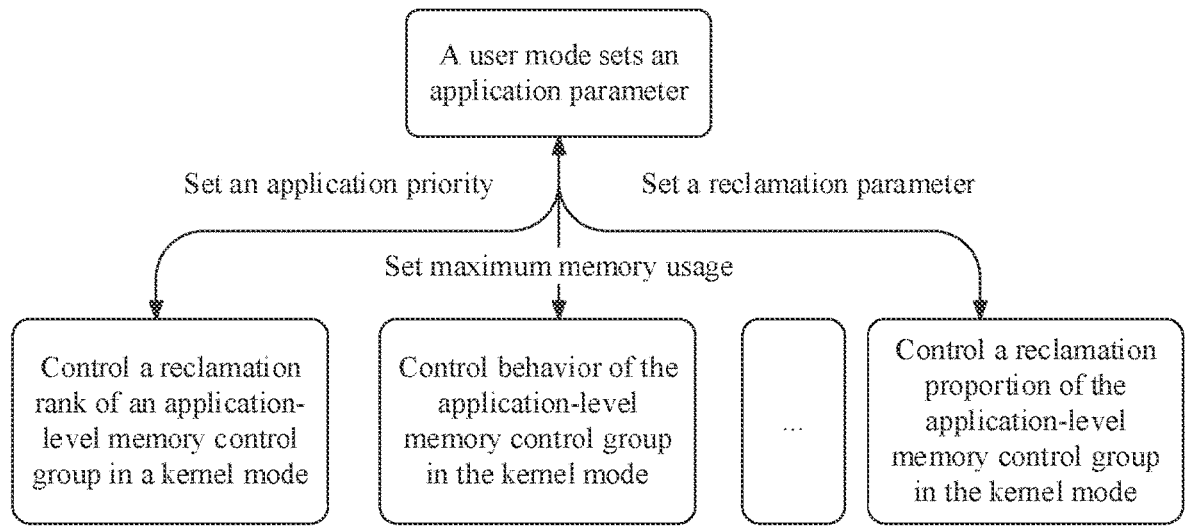
Figures 1, 2, 3, 4, 5, 6, 7, 8, 9:
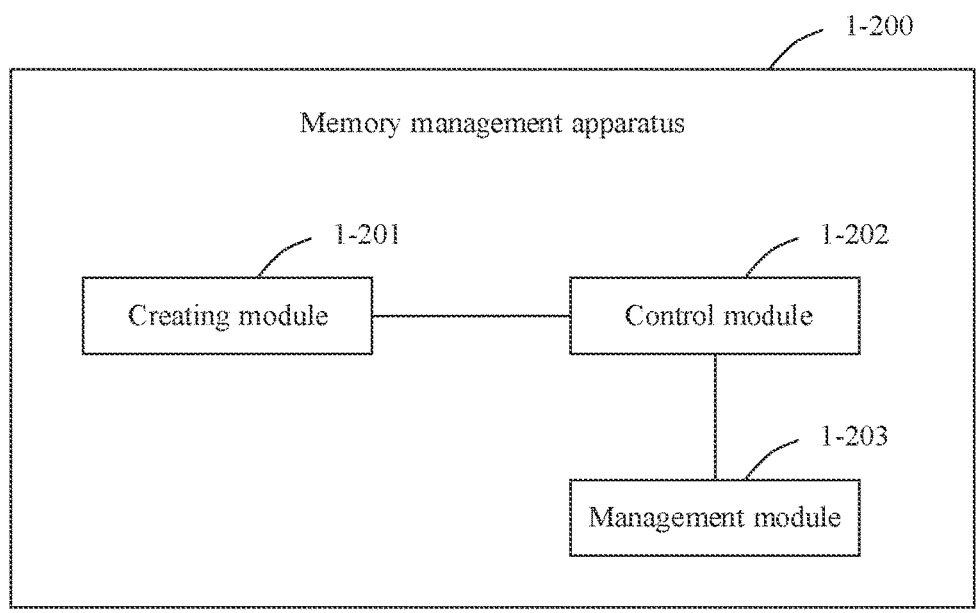
Figures 1, 2:
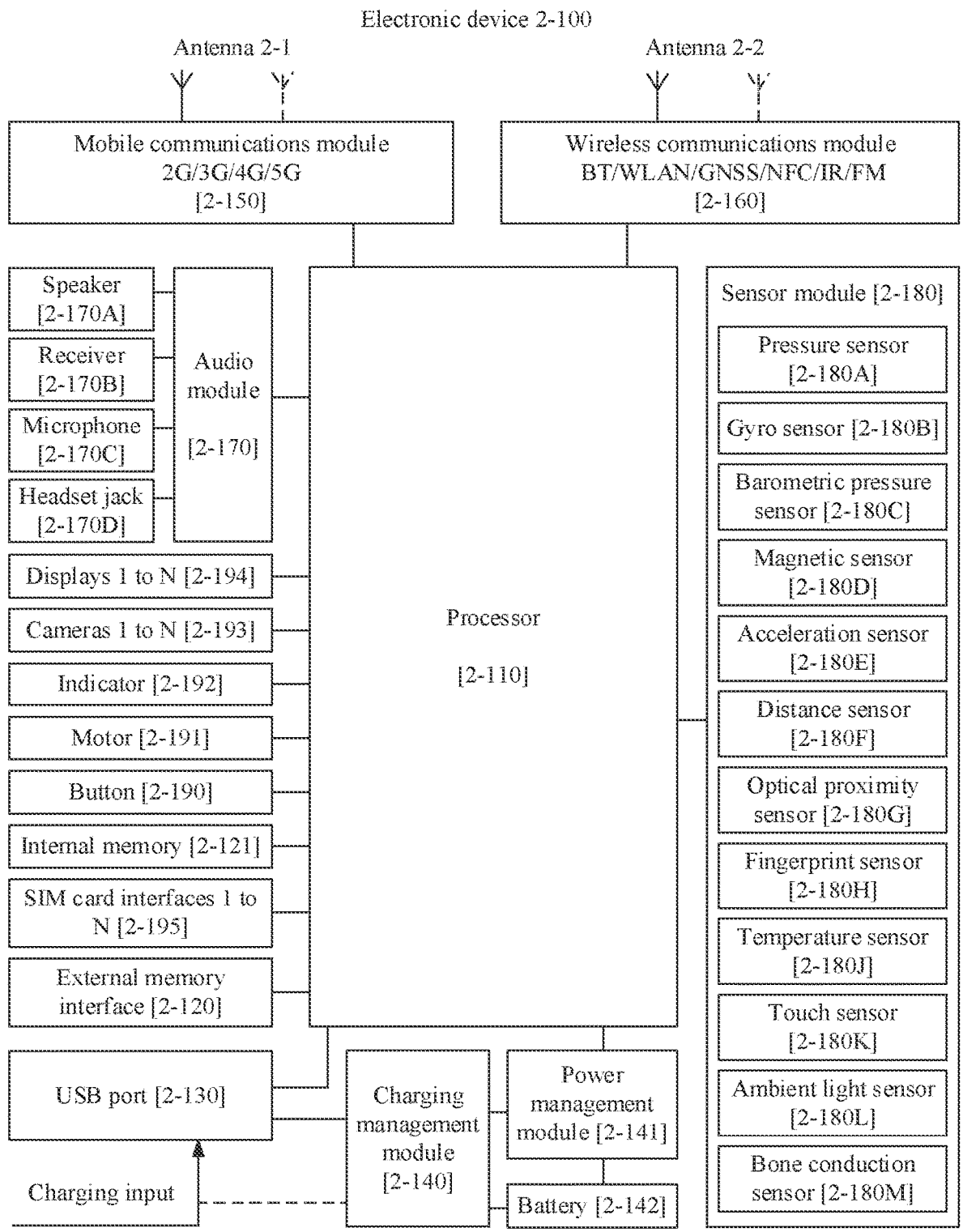
Figure 2:
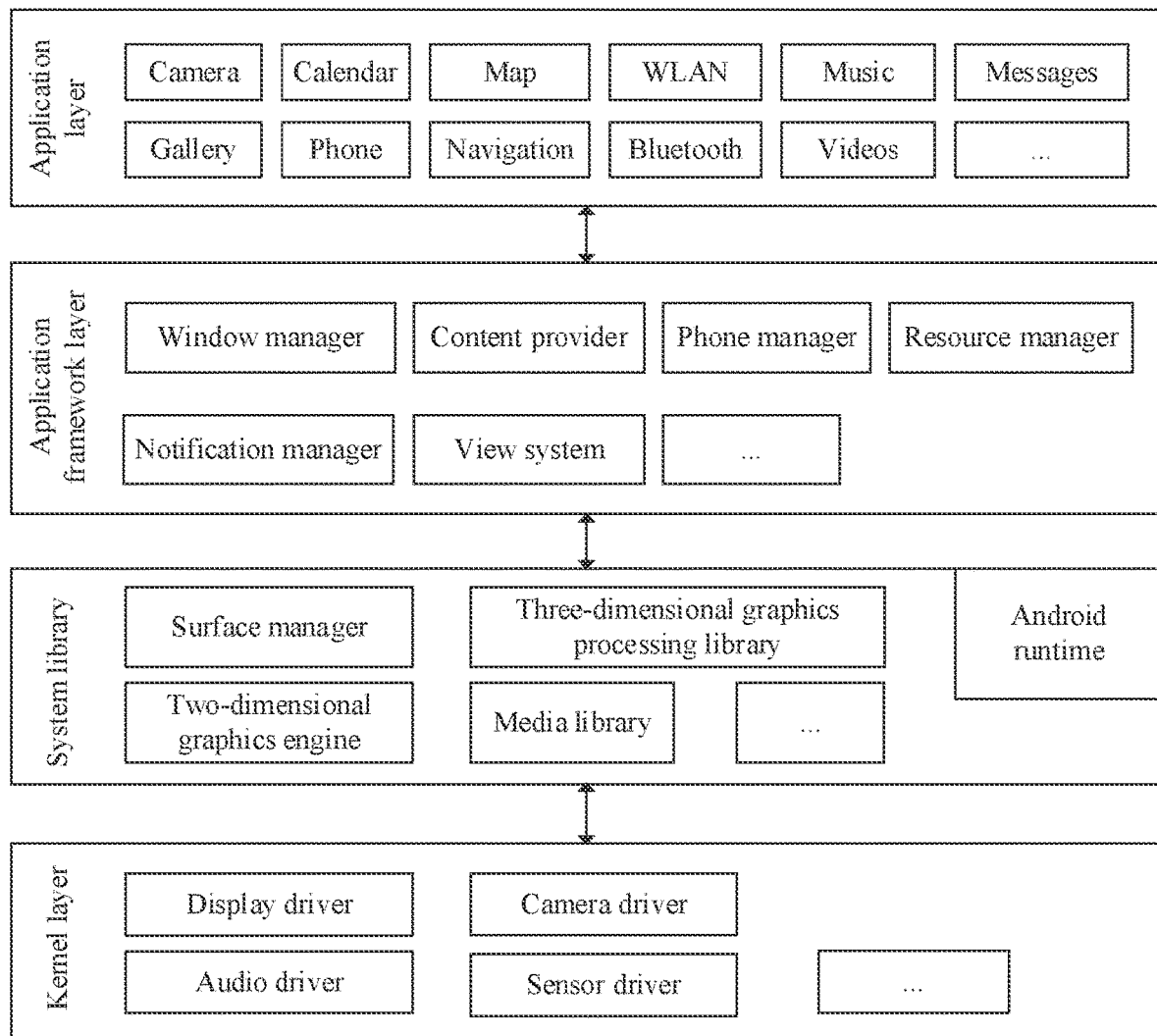
Figures 2, 3:
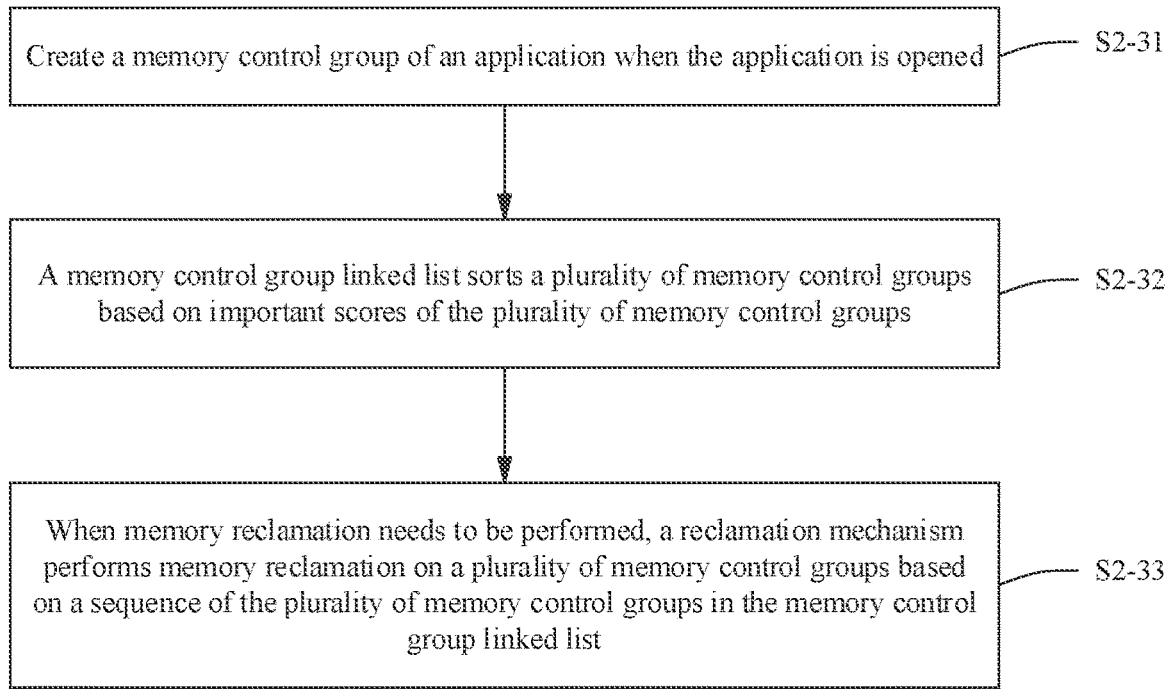
Figures 2, 3, 4:
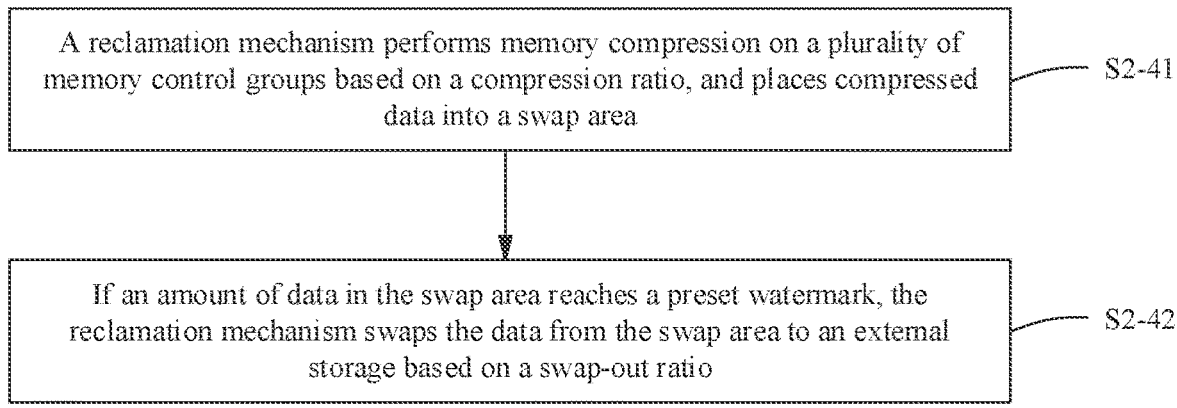
Figures 2, 3, 4, 5:
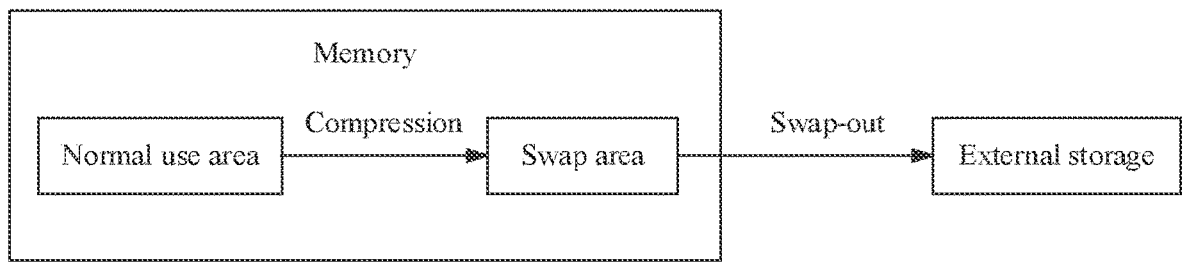
Figures 2, 3, 4, 5, 6:
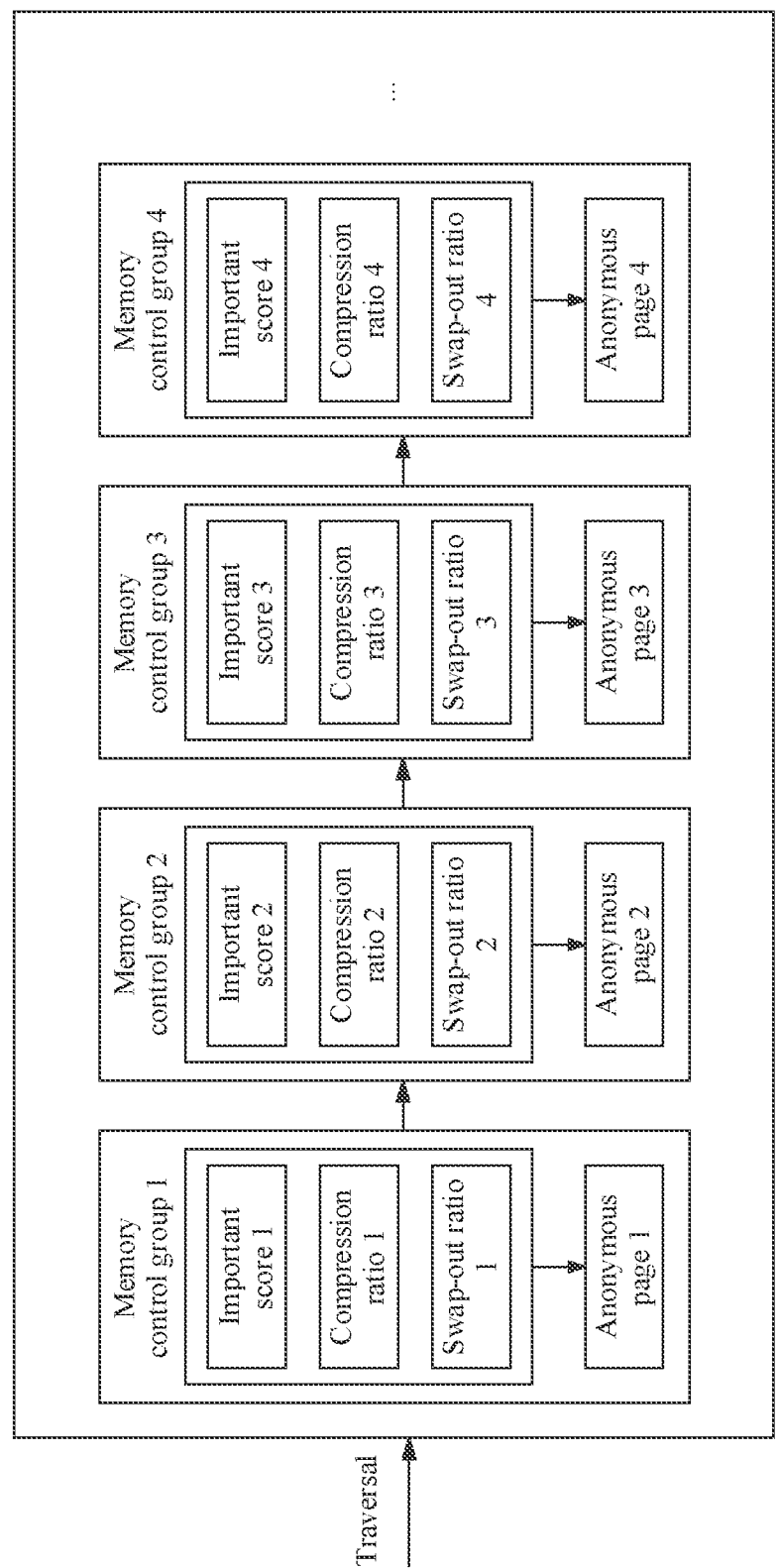
Figures 2, 3, 4, 5, 6, 7:
Figures 2, 3, 4, 5, 6, 7, 8:
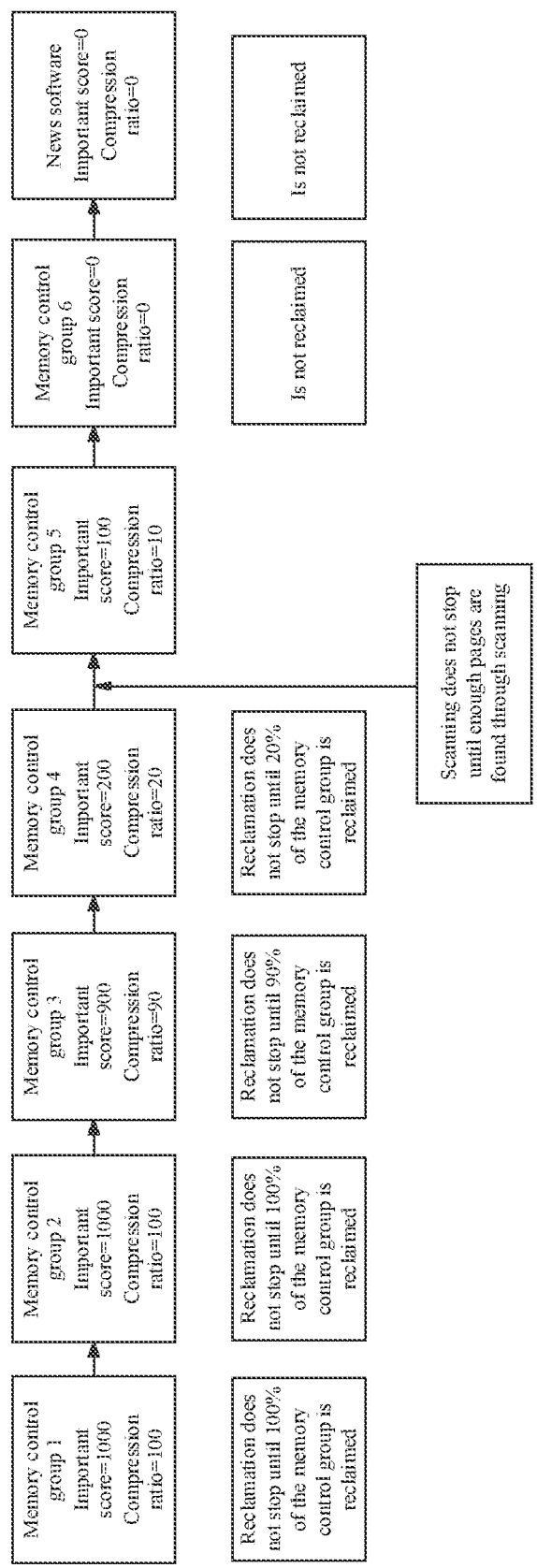
Figures 2, 3, 4, 5, 6, 7, 8, 9:
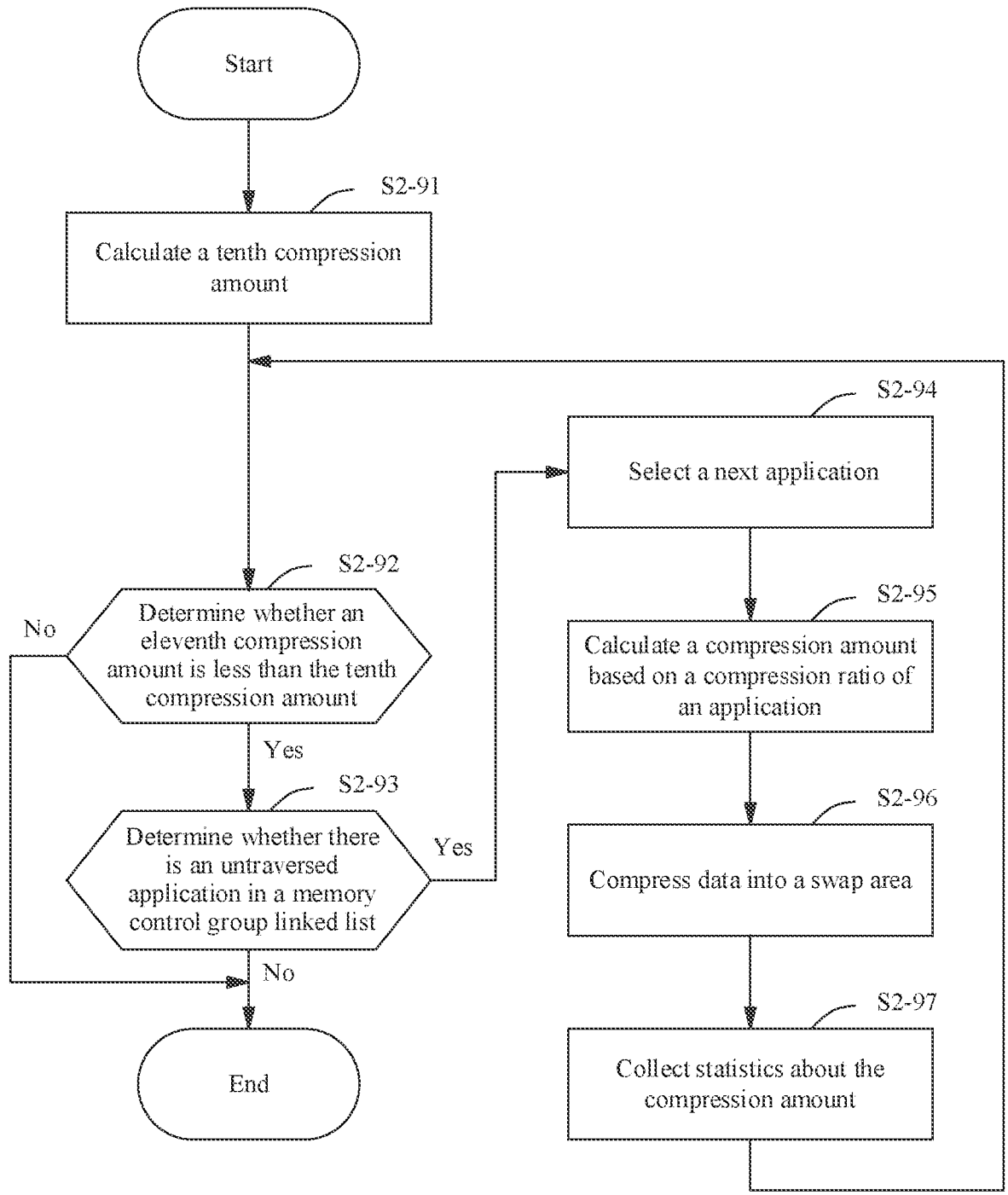
Figures 2, 3, 4, 5, 6, 7, 8, 9, 10:
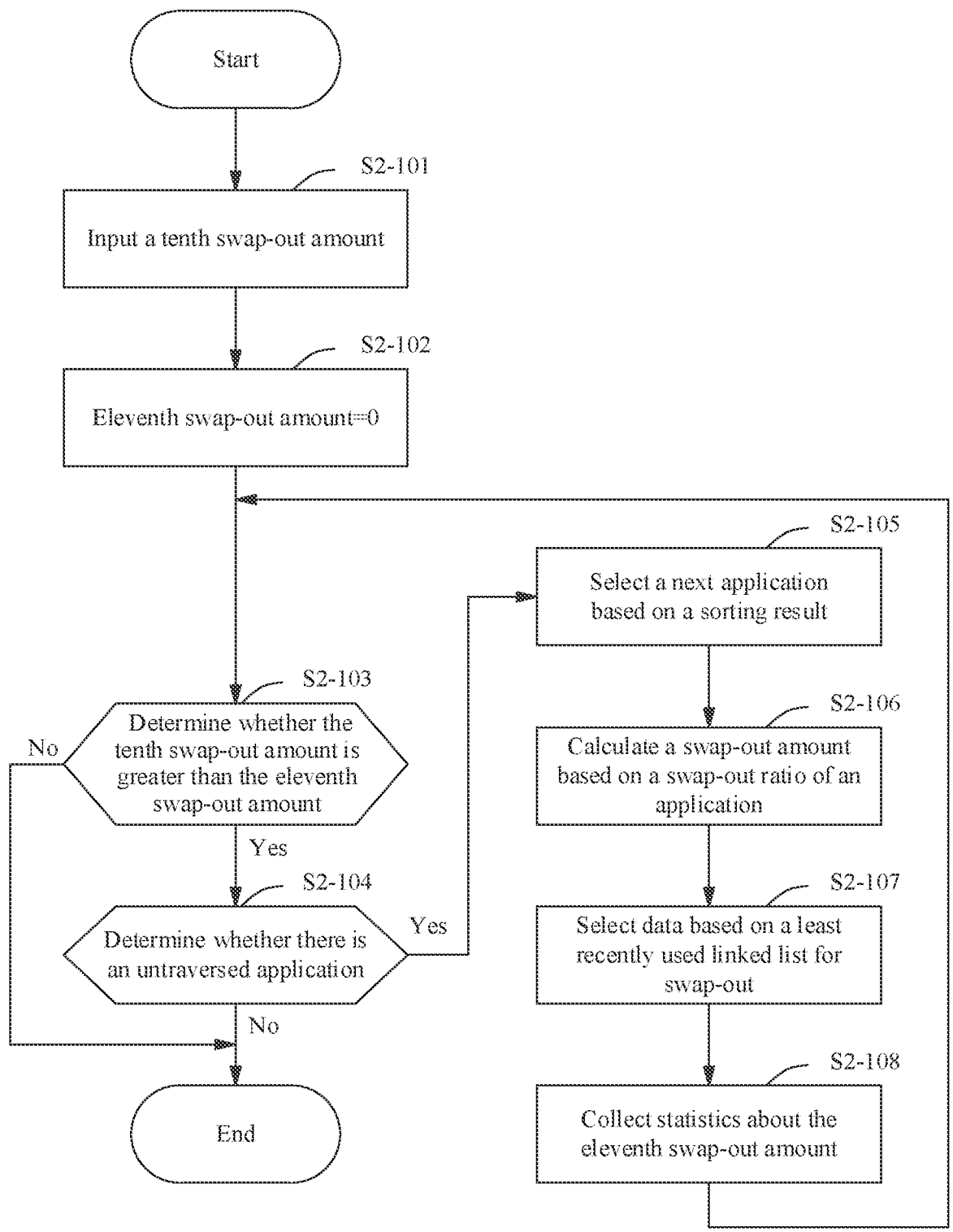
Figures 2, 3, 4, 5, 6, 7, 8, 9, 10, 11:
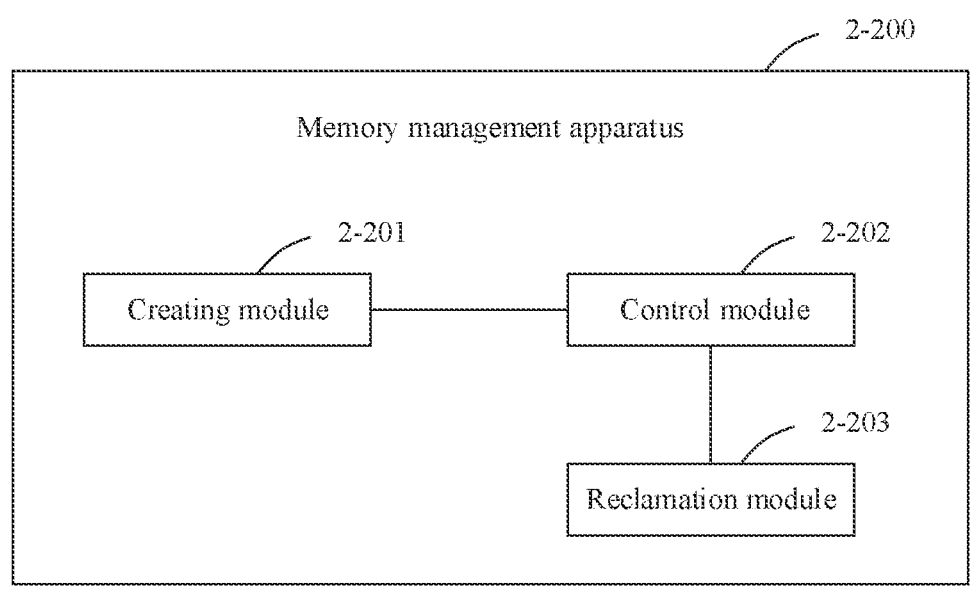

Refer to FIG. 6-8. When an application i is opened, anonymous page data belonging to the application i is loaded from the virtual memory 6-720 to the cache block 6-710. In an implementation, in the virtual memory 6-720, the anonymous page data of the application i is stored in a form of a data block. The data block is unpacked into a plurality of anonymous pages and then moved to the cache block 6-710. Because the anonymous page data of the application i is stored in space with consecutive storage addresses in the virtual memory 6-720, a rate at which the anonymous page data is loaded from the virtual memory 6-720 to the cache block 6-710 is increased. When a fiftieth process of the application i is called, an anonymous page of the fiftieth process is directly read from a plurality of anonymous pages included m the linked list of the application i in the cache block 6-710. Reading the anonymous page from the cache block 6-710 is data exchange in the memory. In this way, data reading efficiency is high, and a data reading rate is not limited by read performance of the external storage, to improve data reading efficiency and effectively avoid system freezing.

In some embodiments, refer to FIG. 6-9. An anonymous page that meets a fiftieth condition in memory is moved to a cache block 6-710, the anonymous page is compressed by using a compression algorithm, and the compressed anonymous page (compressed object) is moved to the cache block 6-710. In the cache block 6-710, a cache management linked list corresponding to each application includes all compressed anonymous pages (compressed objects) belonging to the application. For example, a cache management linked list corresponding to an application 1 is a linked list of the application 1 and includes a compressed object belonging to the application 1; a cache management linked list corresponding to an application i is a linked list of the application i and includes a compressed object belonging to the application i; and a cache management linked list corresponding to an application n is a linked list of the application n and includes a compressed object belonging to the application n. When remaining space in the cache block 6-710 is insufficient, the compressed object belonging to the application i is moved to virtual memory 6-720. In an implementation, a plurality of compressed objects belonging to the application i are packaged into one data block, and a plurality of data blocks formed through packaging are stored in space with consecutive storage addresses in the virtual memory 6-720. For example, a size of one anonymous page is 4 KB, a size of one compressed object is less than 4 KB, and a maximum size of one data block is 32 KB. A plurality of compressed objects are packaged into one data block. The virtual memory 6-720 includes a plurality of storage blocks 6-721, and each storage block 6-721 may store one data block. Addresses of storage blocks 6-721 occupied by a plurality of data blocks formed by packaging compressed objects belonging to the application i are consecutive. It may be understood that storage addresses of compressed objects in one data block may be consecutive or inconsecutive.

Refer to FIG. 6-10. When an application i is opened, anonymous page data belonging to the application i is loaded from the virtual memory 6-720 to the cache block 6-710. In an implementation, in the virtual memory 6-720, the anonymous page data of the application i is stored in a form of a data block. The data block is unpacked into a plurality of compressed objects and then moved to the cache block 6-710. Because the anonymous page data of the application i is stored in space with consecutive storage addresses in the virtual memory 6-720, a rate at which the anonymous page data is loaded from the virtual memory 6-720 to the cache block 6-710 is increased. When a fiftieth process of the application i is called, a compressed object of the fiftieth process is directly obtained from a plurality of compressed objects included in the linked list of the application i in the cache block 6-710, and an anonymous page of the fiftieth process is obtained after decompression. Reading the compressed object from the cache block 6-710 is data exchange in the memory. In this way, data reading efficiency is high, and a data reading rate is not limited by read performance of the external storage, to improve data reading efficiency and effectively avoid system freezing. Storing the compressed anonymous page in the cache block can save memory space and improve memory utilization.

In some embodiments, refer to FIG. 6-11. Anonymous pages that meet a fiftieth condition in memory are moved to a cache block in an order from cold to hot. An anonymous page that is first moved to the cache block is colder than an anonymous page that is later moved to the cache block. Anonymous pages (or compressed objects) in a cache management linked list are sorted based on hot and cold. When remaining space in the cache block 6-710 is insufficient, the anonymous pages (or compressed objects) are packaged into a plurality of data blocks in an order from hot to cold. In this way, the data blocks are moved to space with consecutive storage addresses in the virtual memory 6-720 in the order from hot to cold.

Refer to FIG. 6-12. When an application i is opened, data blocks of the application i are loaded from the virtual memory 6-720 to the cache block 6-710 in an order from hot to cold. When a fiftieth process of the application i is called, an anonymous page (or a compressed object) of the fiftieth process is obtained from a plurality of anonymous pages (or compressed objects) included in a linked list of the application i in the cache block 6-710. In an example, when the fiftieth process of the application i is called, only some anonymous pages belonging to the application i are loaded to the cache block 6-710. Loading data blocks of the application i from the virtual memory 6-720 to the cache block 6-710 in an order from hot to cold can increase a probability that when the fiftieth process is called, the cache block includes an anonymous page of the fiftieth process, that is, increase a probability that the anonymous page of the fiftieth process is read from the cache block. A speed of reading anonymous page data from the cache block is faster than a speed of reading anonymous page data from the virtual memory, to improve data reading efficiency and effectively avoid system freezing.

In some embodiments, an application is woken up on the background, and needs to access an anonymous page. A memory page fault occurs when the anonymous page does not exist in the memory. Refer to FIG. 6-13. In an implementation, a data block to which the anonymous page belongs is loaded from the virtual memory to the cache block, to obtain a plurality of anonymous pages (or compressed objects), and an anonymous page that needs to be accessed is read from the plurality of anonymous pages (or compressed objects). Optionally, more data blocks may be loaded from the virtual memory to the cache block, or some data blocks may be loaded to the cache block. This is not limited in this embodiment of this application.

In this way, storage addresses of a plurality of data blocks of the application i in the virtual memory may be inconsecutive. In an implementation, when the data block of the application i is extracted from the virtual memory 6-720, a storage block in which a data block does not exist may be skipped. For example, a quantity (a jump interval) of skipped storage blocks is less than a specified fiftieth value (for example, the fiftieth value is 1 or 2).

An embodiment of this application provides a memory management method. The memory is managed by using a process of an application. Each process corresponds to a memory management linked list, and is used to perform memory management on an anonymous page related to the process. A memory management linked list corresponding to a process includes all anonymous pages related to the process. When the remaining space in the memory is less than a fiftieth specified value (for example, 60%), that is, the remaining space in the memory is insufficient, the anonymous page that meets the fiftieth condition in the memory is moved to the cache block. For example, one or more processes may be randomly selected, and an anonymous page in a memory management linked list corresponding to the one or more processes is moved to the cache block. For example, an anonymous page related to a coldest process (that is, a process that is least recently called) is moved to the cache block based on hotness and coldness of processes. For example, a plurality of coldest anonymous pages are moved to the cache block based on hotness and coldness of anonymous pages.

In the cache block, the anonymous page is managed by using a process. Each process corresponds to a cache management linked list, and is used to manage an anonymous page related to the process. A cache management linked list corresponding to a process includes all anonymous page data related to the process in the cache block.

If the remaining space in the cache block is less than a fifty-first specified value (for example, 80%), that is, the remaining space in the cache block is insufficient, the anonymous page that meets the fifty-first condition in the cache block is moved to space with consecutive virtual addresses in the virtual memory. For example, one or more processes may be randomly selected, and an anonymous page in a cache management linked list corresponding to the one or more processes is moved to the virtual memory. For example, q (q>2, which may be set by a user) pieces of coldest anonymous page data are moved to the virtual memory based on hotness and coldness of anonymous page data in the cache block.

It is detect that the fiftieth application is opened, and the anonymous page data belonging to the fiftieth application is loaded from the virtual memory to the cache block. When the fiftieth process of the fiftieth application is called, the anonymous page data of the fiftieth process is read from the cache block.

When the fiftieth application is switched to the foreground, the anonymous page data of the application is already loaded to the cache block. When a memory page fault occurs, an anonymous page that needs to be accessed is directly read from a cache block. In this way, data read performance is not limited by read performance of the external storage, to improve data reading efficiency and effectively avoid system freezing.

It may be understood that, to implement the foregoing functions, the electronic device includes a corresponding hardware structure and/or software module for performing each function. A person skilled in the art should be easily aware that units, algorithms, and steps in the examples described with reference to embodiments disclosed in this specification can be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

As shown in FIG. 6-14, an embodiment of this application discloses an electronic device 6-1400. The electronic device 6-1400 may specifically include one or more processors 6-1401, a memory 6-1402, one or more applications (not shown), one or more computer programs 6-1403, and a communications interface 6-1404. The foregoing components may be connected through one or more communications buses 6-1405. The one or more computer programs 6-1403 are stored in the memory 6-1402 and are configured to be executed by the one or more processors 6-1401. The one or more computer programs 6-1403 include instructions, and the instructions may be used to perform related steps in the foregoing embodiments. In an example, the electronic device 6-1400 may be the electronic device 6-100 in FIG. 6-1.

An embodiment of this application further provides a computer-readable storage medium. The computer-readable storage medium stores computer program code, and when a processor executes the computer program code, an electronic device performs the method in the foregoing embodiments.

An embodiment of this application further provides a computer program product. When the computer program product runs on a computer, the computer is enabled to perform the method in the foregoing embodiments.

The electronic device 6-1400, the computer-readable storage medium, and the computer program product provided in embodiments of this application each are configured to perform the corresponding method provided above. Therefore, for beneficial effects that can be achieved by the electronic device 6-1400, the computer-readable storage medium, and the computer program product, refer to the beneficial effects in the corresponding method provided above. Details are not described herein again.

Based on the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division in an actual implementation. For example, a plurality of units or components may be combined or may be integrated into another apparatus, or some features may be ignored or not be performed. In addition, the displayed or discussed mutual coupling or direct coupling or communication connection may be implemented through some interfaces. The indirect coupling or communication connection between the apparatuses or units may be implemented in electrical, mechanical, or another form.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

Setting virtual memory in an external storage is a common memory expansion method in a computing system. A page that is dynamically allocated by an application in memory and that has no file background is referred to as an anonymous page. Moving an anonymous page from the memory to the external storage is referred to as memory swap-out, and moving an anonymous page from the external storage to the memory is referred to as memory swap-in. Memory swap-out and memory swap-in are referred to as memory swap. Memory swap performance directly affects system performance.

During memory swap, a large amount of memory needs to be applied for from a kernel system and released to the kernel system for exchanging anonymous page data between the memory and the external storage. Generally, during memory swap, the kernel system is busy and memory resources are insufficient. Applying for and releasing a large amount of memory cause a memory swap delay, causing system freezing.

The memory management method provided in embodiments of this application may be applied to an electronic device 7-100 shown in FIG. 7-1. The electronic device 7-100 may be a mobile phone, a tablet computer, a desktop computer, a laptop computer, a handheld computer, a notebook computer, an ultra-mobile personal computer (ultra-mobile personal computer. UMPC), a netbook, a cellular phone, a personal digital assistant (personal digital assistant, PDA), an augmented reality (augmented reality. AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 7-100 may include a processor 7-110, an external memory interface 7-120, an internal memory 7-121, a universal serial bus (universal serial bus, USB) port 7-130, a charging management module 7-140, a power management module 7-141, a battery 7-142, an antenna 7-1, an antenna 7-2, a mobile communications module 7-150, a wireless communications module 7-160, an audio module 7-170, a speaker 7-170A, a receiver 7-170B, a microphone 7-170C, a headset jack 7-170D, a sensor module 7-180, a camera 7-191, a display 7-192, and the like. The sensor module 7-180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of this application does not constitute a specific limitation on the electronic device 7-100. In some other embodiments of this application, the electronic device 7-100 may include more or fewer components than those shown in the figure, or combine some components, or split some components, or have different component arrangements. The components shown in the figure may be implemented by hardware, software, or a combination of software and hardware.

The processor 7-110 may include one or more processing units. For example, the processor 7-110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 7-110, and is configured to store instructions and data In some embodiments, the memory in the processor 7-110 is a cache. The memory may store instructions or data that has been used or cyclically used by the processor 7-110. If the processor 7-110 needs to use the instructions or the data again, the processor may directly invoke the instructions or the data from the memory. This avoids repeated access, reduces waiting time of the processor 7-110, and improves system efficiency.

In some embodiments, the processor 7-110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 7-110 may include a plurality of groups of I2C buses.

The I2S interface may be used for audio communication. In some embodiments, the processor 7-110 may include a plurality of groups of I2S buses. The processor 7-110 may be coupled to the audio module 7-170 through the I2S bus, to implement communication between the processor 7-110 and the audio module 7-170. In some embodiments, the audio module 7-170 may transfer an audio signal to the wireless communications module 7-160 through the I2S interface, to implement a function of answering a call by using a Bluetooth headset.

The PCM interface may also be used for audio communication, and samples, quantizes, and codes an analog signal. In some embodiments, the audio module 7-170 may be coupled to the wireless communications module 7-160 through a PCM bus interface. In some embodiments, the audio module 7-170 may alternatively transfer an audio signal to the wireless communications module 7-160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 7-110 to the wireless communications module 7-160. For example, the processor 7-110 communicates with a Bluetooth module in the wireless communications module 7-160 through the UART interface, to implement a Bluetooth function. In some embodiments, the audio module 7-170 may transfer an audio signal to the wireless communications module 7-160 through the UART interface, to implement a function of playing music by using a Bluetooth headset.

The MIPI may be configured to connect the processor 7-110 to a peripheral component such as the display 7-192 or the camera 7-191. The MIPI includes a camera serial interface (camera serial interface, CSI), a display serial interface (display serial interface, DSI), and the like. In some embodiments, the processor 7-110 communicates with the camera 7-191 through the CSI, to implement a photographing function of the electronic device 7-100. The processor 7-110 communicates with the display 7-192 through the DSI, to implement a display function of the electronic device 7-100.

The GPIO interface may be configured by using software. The GPIO interface may be configured as a control signal or a data signal. In some embodiments, the GPIO interface may be configured to connect the processor 7-110 to the camera 7-191, the display 7-192, the wireless communications module 7-160, the audio module 7-170, the sensor module 7-180, and the like. The GPIO interface may alternatively be configured as an I2C interface, an I2S interface, a UART interface, an MIPI, or the like.

The USB port 7-130 is a port that conforms to a USB standard specification, and may be specifically a mini USB port, a micro USB port, a USB Type-C port, or the like. The USB port 7-130 may be configured to connect to a charger to charge the electronic device 7-100, or may be configured to transmit data between the electronic device 7-100 and a peripheral device, or may be configured to connect to a headset for playing an audio through the headset. The port may alternatively be configured to connect to another electronic device such as an AR device.

It may be understood that an interface connection relationship between modules in this embodiment of this application is merely an example for description, and does not constitute a limitation on the structure of the electronic device 7-100. In some other embodiments of this application, the electronic device 7-100 may alternatively use an interface connection manner different from that in the foregoing embodiment, or a combination of a plurality of interface connection manners.

The charging management module 7-140 is configured to receive a charging input from a charger. The charger may be a wireless charger or a wired charger. In some embodiments of wired charging, the charging management module 7-140 may receive a charging input from the wired charger through the USB port 7-130. In some embodiments of wireless charging, the charging management module 7-140 may receive a wireless charging input through a wireless charging coil of the electronic device 7-100. When charging the battery 7-142, the charging management module 7-140 may further supply power to the electronic device by using the power management module 7-141.

The power management module 7-141 is configured to connect to the battery 7-142, the charging management module 7-140, and the processor 7-110. The power management module 7-141 receives an input of the battery 7-142 and/or an input of the charging management module 7-140, and supplies power to the processor 7-110, the internal memory 7-121, the display 7-192, the camera 7-191, the wireless communications module 7-160, and the like. The power management module 7-141 may be further configured to monitor parameters such as a battery capacity, a battery cycle count, and a battery health status (electricity leakage or impedance). In some other embodiments, the power management module 7-141 may alternatively be disposed in the processor 7-110. In some other embodiments, the power management module 7-141 and the charging management module 7-140 may alternatively be disposed in a same device.

A wireless communication function of the electronic device 7-100 may be implemented by using the antenna 7-1, the antenna 7-2, the mobile communications module 7-150, the wireless communications module 7-160, the modem processor, the baseband processor, and the like.

The antenna 7-1 and the antenna 7-2 are configured to: transmit and receive electromagnetic wave signals. Each antenna in the electronic device 7-100 may be configured to cover one or more communication frequency bands. Different antennas may be further multiplexed, to increase antenna utilization. For example, the antenna 7-1 may be multiplexed as a diversity antenna in a wireless local area network. In some other embodiments, the antenna may be used in combination with a tuning switch.

The mobile communications module 7-150 may provide a wireless communication solution that includes 2G/3G/4G/5G or the like and that is applied to the electronic device 7-100. The mobile communications module 7-150 may include at least one filter, a switch, a power amplifier, a low noise amplifier (low noise amplifier, LNA), and the like. The mobile communications module 7-150 may receive an electromagnetic wave through the antenna 7-1, perform processing such as filtering or amplification on the received electromagnetic wave, and transmit the electromagnetic wave to the modem processor for demodulation. The mobile communications module 7-150 may further amplify a signal modulated by the modem processor, and convert an amplified signal into an electromagnetic wave for radiation through the antenna 7-1. In some embodiments, at least some functional modules in the mobile communications module 7-150 may be disposed in the processor 7-110. In some embodiments, at least some functional modules in the mobile communications module 7-150 may be disposed in a same device as at least some modules in the processor 7-110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 7-170A, the receiver 7-170B, or the like), or displays an image or a video through the display 7-192. In some embodiments, the modem processor may be an independent device. In some other embodiments, the modem processor may be independent of the processor 7-110, and is disposed in a same device as the mobile communications module 7-150 or another functional module.

The wireless communications module 7-160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 7-100. The wireless communications module 7-160 may be one or more components that integrate at least one communications processor module. The wireless communications module 7-160 receives an electromagnetic wave through the antenna 7-2, performs frequency modulation and filtering processing on the electromagnetic wave signal, and sends a processed signal to the processor 7-110. The wireless communications module 7-160 may further receive a to-be-sent signal from the processor 7-110, perform frequency modulation and amplification on the signal, and convert a processed signal into an electromagnetic wave for radiation through the antenna 7-2.

In some embodiments, the antenna 7-1 and the mobile communications module 7-150 in the electronic device 7-100 are coupled, and the antenna 7-2 and the wireless communications module 7-160 in the electronic device 7-100 are coupled, so that the electronic device 7-100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution. LTE), BT, a GNSS, a WLAN, NFC, FM, an IR technology, and/or the like. The GNSS may include a global positioning system (global positioning system. GPS), a global navigation satellite system (global navigation satellite system. GLONASS), a BeiDou navigation satellite system (BeiDou navigation satellite system, BDS), a quasi-zenith satellite system (quasi-zenith satellite system. QZSS), and/or a satellite based augmentation system (satellite based augmentation system, SBAS).

The electronic device 7-100 may implement a display function through the GPU, the display 7-192, the application processor, and the like. The GPU is a microprocessor for image processing, and is connected to the display 7-192 and the application processor. The GPU is configured to: perform mathematical and geometric calculation, and render an image. The processor 7-110 may include one or more GPUs that execute program instructions to generate or change display information.

The display 7-192 is configured to display an image, a video, and the like. The display 7-192 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 7-100 may include one or N displays 7-192, where N is a positive integer greater than 1.

The electronic device 7-100 may implement a photographing function through the ISP, the camera 7-191, the video codec, the GPU, the display 7-192, the application processor, and the like.

The ISP is configured to process data fed back by the camera 7-191. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 7-191.

The camera 7-191 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into a standard image signal in an RGB format, a YUV format, or the like. In some embodiments, the electronic device 7-100 may include one or N cameras 7-191, where N is a positive integer greater than 1.

The digital signal processor is configured to process a digital signal, and may further process another digital signal in addition to a digital image signal. For example, when the electronic device 7-100 selects a frequency, the digital signal processor is configured to perform Fourier transform or the like on frequency energy.

The video codec is configured to: compress or decompress a digital video. The electronic device 7-100 may support one or more video codecs. In this way, the electronic device 7-100 may play or record videos in a plurality of coding formats, for example, moving picture experts group (moving picture experts group, MPEG)-1, MPEG-2, MPEG-3, and MPEG-4.

The NPU is a neural-network (neural-network. NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 7-100, such as image recognition, facial recognition, speech recognition, and text understanding.

The internal memory 7-121 may include one or more random access memories (random access memory, RAM) and one or more non-volatile memories (non-volatile memory, NVM).

The random access memory may include a static random access memory (static random access memory. SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory. DDR SDRAM, for example, a 5th generation DDR SDRAM is usually referred to as a DDR5 SDRAM), and the like.

The non-volatile memory may include a magnetic disk storage device and a flash memory (flash memory). The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

In this embodiment of this application, the random access memory is referred to as memory, and the non-volatile memory is referred to as an external storage.

The memory 7-1211 may be directly read and written by using the processor 7-110. The memory may be configured to store an executable program (for example, machine instructions) in an operating system or another running program, and may be further configured to store data of a user, data of an application, and the like.

The external storage 7-1212 may also store an executable program, data of a user, data of an application, and the like, which may be loaded into the memory in advance for directly reading and writing by the processor 7-110.

The external memory interface 7-120 may be configured to connect to an external non-volatile memory, to extend a storage capability of the electronic device 7-100. The external non-volatile memory communicates with the processor 7-110 through the external memory interface 7-120, to implement a data storage function. For example, files such as music and videos are stored in the external non-volatile memory.

The electronic device 7-100 may implement audio functions, for example, music playing and recording, by using the audio module 7-170, the speaker 7-170A, the receiver 7-170B, the microphone 7-170C, the headset jack 7-170D, the application processor, and the like.

The audio module 7-170 is configured to convert digital audio information into an analog audio signal for output, and is also configured to convert an analog audio input into a digital audio signal. The audio module 7-170 may be further configured to: code and decode an audio signal. In some embodiments, the audio module 7-170 may be disposed in the processor 7-110, or some functional modules in the audio module 7-170 are disposed in the processor 7-110.

The speaker 7-170A, also referred to as a "horn", is configured to convert an electrical audio signal into a sound signal. The electronic device 7-100 may be used to listen to music or answer a call in a hands-free mode over the speaker 7-170A.

The receiver 7-170B, also referred to as an "earpiece", is configured to convert an electrical audio signal into a sound signal. When a call is answered or speech information is received through the electronic device 7-100, the receiver 7-170B may be put close to a human ear to listen to a voice.

The microphone 7-170C, also referred to as a "mike" or a "mic", is configured to convert a sound signal into an electrical signal. When making a call or sending voice information, a user may make a sound near the microphone 7-170C through the mouth of the user, to input the sound signal to the microphone 7-170C. At least one microphone 7-170C may be disposed in the electronic device 7-100. In some other embodiments, two microphones 7-170C may be disposed in the electronic device 7-100, to implement a noise reduction function in addition to collecting a sound signal. In some other embodiments, three, four, or more microphones 7-170C may alternatively be disposed in the electronic device 7-100, to collect a sound signal, reduce noise, identify a sound source, implement a directional recording function, and the like.

The headset jack 7-170D is configured to connect to a wired headset. The headset jack 7-170D may be the USB port 7-130, or may be a 3.5 mm open mobile terminal platform (open mobile terminal platform. OMTP) standard interface or a cellular telecommunications industry association of the USA (cellular telecommunications industry association of the USA, CTIA) standard interface.

A page that is dynamically allocated by an application in memory and that has no file background is referred to as an anonymous page (anonymous page), such as a heap, a stack, and a data segment. As shown in FIG. 7-2, when remaining space of the memory 7-1211 is insufficient, some anonymous pages of an application running on the background in the memory 7-1211 may be moved to virtual memory of the external storage 7-1212 to reclaim memory. If an anonymous page that needs to be accessed by a process of an application running on the background does not exist in the memory after the application is switched to the foreground, that is, a memory page fault occurs, the anonymous page may be loaded from the external storage 7-1212 to the memory 7-1211. Moving an anonymous page from the memory 7-1211 to the external storage 7-1212 is referred to as memory swap-out, and loading an anonymous page from the external storage 7-1212 to the memory 7-1211 is referred to as memory swap-in. Memory swap-out and memory swap-in are collectively referred to as memory swap.

The following describes switching an application to the foreground in this embodiment of this application.

That the application is switched to the foreground may mean that a display of an electronic device displays an interface of the application.

That the application is switched to the foreground may alternatively mean that an activity corresponding to the application enters an active state from a pause state.

A software system of the electronic device may use a layered architecture. In a layered architecture, software may be divided into several layers, and each of the layers has a clear role and task. The layers communicate with each other through a software interface. In some embodiments, the software system of the electronic device is divided into three layers: an application layer (application layer), an application framework layer (briefly referred to as a framework layer), and a kernel layer (also referred to as a driver layer) from top to bottom.

The application layer may include a series of application packages, for example, applications such as Camera, Gallery, Calendar, Phone, Map, Navigation, WLAN, Bluetooth, Music, Videos, Messages, and Launcher (Launcher). The framework layer provides an application programming interface (application programming interface, API) and a programming framework for an application at the application layer. The application framework layer includes some predefined functions. The framework layer may include a window manager (window manager service. WMS), an activity manager AMS, and the like.

The window manager WMS is configured to manage a window program. The window manager may obtain a size of a display, determine whether there is a status bar, perform screen locking, take a screenshot, and the like. The activity manager AMS is configured to manage activities, and is responsible for work such as startup, switching, and scheduling of each component in a system, and management and scheduling of applications. The kernel layer is a layer between hardware and software. The kernel layer includes at least a display driver, a camera driver, an audio driver, and a sensor driver. The kernel layer is a layer between hardware and software.

When a user performs an input operation (for example, an operation for triggering the electronic device to display an application) on the electronic device, the kernel layer may generate a corresponding input event (for example, a foldable screen unfolding event) based on the input operation, and report the event to the application framework layer. Application window attributes are set by the activity manager service AMS at the application framework layer. The window manager service WMS at the application framework layer draws a window based on the settings of the AMS, and then sends window data to the display driver at the kernel layer. The display driver displays a corresponding application interface on a foldable screen.

The attribute of the window may include a location and a size of an activity window, and a visible attribute (that is, a status of the activity window) of the activity window. The location of the activity window is a location of the activity window on the display, and the size of the activity window may be information such as a width and a height in application opening config. The visible attribute of the activity window may be true or false. When the visible attribute of the activity window is true, it indicates that the activity window is in an active state, and the activity window is visible to a user, that is, the display driver displays content of the activity window. When the visible attribute of the activity in the activity window is false, it indicates that the activity window is in a pause state, and the activity window is invisible to a user, that is, the display driver does not display content of the activity window.

An application (for example, an application 1 or an application 2) may invoke an activity start interface to start a corresponding activity. In response to invoking from the application, the activity manager AMS may request the window manager WMS to draw a window corresponding to the activity, and invoke the display driver to implement interface display.

The application that enters the active state performs the following processing: (1) creating an Application object and a Context object: (2) calling Activity.attach( ) to create the window corresponding to the activity; (3) invoking the onCreate method for the user, where the setContentView method in the onCreate method is used to create a view DecorView of the activity; and (4) calculating and drawing the view of the activity. After the foregoing steps are completed, an image of the application is displayed. The application is a foreground application.

It should be noted that image content of the foreground application may include not only an image visible to the user, but also content without a user interface, content of a transparent layer, or content that is invisible to the user and is blocked by another application interface.

An embodiment of this application provides a memory management method. As shown in FIG. 7-3, the memory 7-1211 includes a cache block, and the cache block may be a specified memory area, a dynamically allocated memory area, or the like. For example, the cache block is a ZRAM in Linux. When remaining space of the memory 7-1211 is insufficient (for example, the remaining space of the memory 7-1211 is less than a sixtieth specified value), memory reclamation is performed, and some anonymous pages in the memory are moved to the cache block. In the cache block, the anonymous page is managed by using an application. Each application corresponds to a cache management linked list, and is used to manage an anonymous page related to the application. A cache management linked list corresponding to an application includes all anonymous page data related to the application in the cache block. For example, as shown in FIG. 7-3, a cache management linked list corresponding to the application 1 is a linked list of the application 1, and includes an anonymous page belonging to the application 1. A cache management linked list corresponding to the application i is a linked list of the application i, and includes an anonymous page belonging to the application i. A cache management linked list corresponding to an application j is a linked list of the application j, and includes an anonymous page belonging to the application j.

When remaining space of the cache block is insufficient (for example, the remaining space of the cache block is less than a sixtieth specified value), some or all of the anonymous pages in the cache block are moved to the virtual memory. In an implementation, a plurality of anonymous pages are packaged into one data block, and all anonymous pages belonging to the application i are packaged into one or more data blocks. For example, a size of one anonymous page is 4 KB, and a size of one data block is 32 KB. Eight anonymous pages may be packaged into one data block. The virtual memory includes a plurality of storage blocks, and each storage block may store one data block. In an implementation, addresses of storage blocks occupied by a plurality of data blocks formed by packaging anonymous pages belonging to the application i are consecutive. It may be understood that storage addresses of anonymous pages in one data block may be consecutive or inconsecutive.

Optionally, the anonymous page in the memory may be compressed and then moved to the cache block. In this way, each cache management linked list in the cache block includes all compressed anonymous pages (compressed objects) related to the application in the cache block. When some or all of the anonymous pages in the cache block are moved to the virtual memory, a plurality of compressed objects are packaged into one data block. Each data block moved to the virtual memory includes a plurality of compressed objects.

When the application is switched to the foreground, all (or some) anonymous page data belonging to the application is loaded to the cache block. In an example, the anonymous page data in the virtual memory is stored m a form of a data block. Anonymous page data of the application j is extracted from the virtual memory, that is, a plurality of data blocks of the application j are extracted; and the data block is unpacked into a plurality of anonymous pages (or compressed objects) and then moved to the cache block. Then, a process of the application j is called, and if a memory page fault occurs (that is, data that needs to be accessed by the process of the application j does not exist in the memory), the anonymous page that needs to be accessed is directly read from the cache block.

In the foregoing memory swap-out and memory swap-in processes, the anonymous page data is moved from the cache block to the virtual memory in a form of a data block, and is loaded from the virtual memory to the cache block in a form of a data block. The memory swap process includes movement of a large quantity of data blocks. As shown in FIG. 7-4, memory swap between the cache block and the virtual memory is managed through memory swap processing. Movement of a plurality of data blocks is managed through one piece of memory swap processing. For example, one piece of memory swap processing supports data exchange of a maximum of 1 M. A maximum size of a data block is 32 KB. A maximum of 32 data blocks can be managed through one piece of memory swap processing. A plurality of pieces of parallel memory swap processing may be performed between the cache block and the virtual memory.

In some embodiments, as shown in FIG. 7-5, n pieces of memory swap processing are performed between the cache block and the virtual memory, and movement of data blocks are processed in parallel through the n pieces of memory swap processing. Movement of a plurality of data blocks is managed through each piece of memory swap processing.

When memory swap (memory swap-out or memory swap-in) occurs, each piece of memory swap processing applies to the Linux kernel for one piece of memory for each data block managed through the memory swap processing. After a data block is moved (the data block is moved from the cache block to the virtual memory, or is loaded from the virtual memory to the cache block), memory corresponding to the data block is released to the Linux kernel. In this way, during memory swap, a large amount of memory is applied for from the Linux kernel and released to the Linux kernel. Applying for and releasing a large amount of memory from the Linux kernel cause a memory swap delay, causing system freezing.

An embodiment of this application provides a memory management method. As shown in FIG. 7-6, when remaining space of a cache block is insufficient and a data block to be moved from the cache block to virtual memory exists, or when it is detected that an application is switched to the foreground and a data block to be loaded from the virtual memory to the cache block exists, memory swap processing needs to apply for corresponding sixtieth memory for each data block managed through the memory swap processing.

In this embodiment of this application, a kernel system is configured to: allocate memory, and provide the allocated memory for the invoker to use; and is further configured to: reclaim the memory, and stop providing the allocated memory for the invoker to use. For example, the kernel system is a Linux kernel. The memory invoker may apply to the kernel system for allocating memory to the memory invoker, or release the allocated memory to the kernel system for reclamation.

The memory includes a memory swap memory pool, which is used to store sixtieth free memory in the memory. For example, a virtual address of the sixtieth free memory in the memory may be recorded in the memory swap memory pool. The memory swap memory pool may be a specified memory area, a dynamically allocated memory area, or the like. The sixtieth memory is the sixtieth free memory after a data block is moved from the cache block to the virtual memory by using the sixtieth memory through memory swap processing, or a data block is loaded from the virtual memory to the cache block by using the sixtieth memory through memory swap processing. When the sixtieth free memory is placed in the memory swap memory pool and is not reclaimed by the kernel system, the memory can continue to be used for memory swap processing.

In some examples, when the memory swap processing needs to apply for corresponding sixtieth memory for each data block managed through the memory swap processing, the sixtieth memory is first applied for from the memory swap memory pool. If the application for the sixtieth memory succeeds, the data block is moved (the data block is moved from the cache block to the virtual memory, or the data block is loaded from the virtual memory to the cache block) by using the sixtieth memory through the memory swap processing. If the application to the memory swap memory pool for the sixtieth memory fails (the sixtieth free memory does not exist in the memory swap memory pool), the memory swap processing applies to the kernel system for allocating the sixtieth memory. A data block of a preset size is moved from the cache block of the memory to the external storage by using the sixtieth allocated memory through the memory swap processing, or a data block of a preset size is loaded from the external storage to the cache block of the memory by using the sixtieth allocated memory through the memory swap processing.

After the data block is moved from the cache block to the virtual memory by using the sixtieth memory through the memory swap processing, or the data block is loaded from the virtual memory to the cache block by using the sixtieth memory through the memory swap processing, the sixtieth memory is released to the memory swap memory pool, so that one piece of sixtieth memory is added to the memory swap memory pool. In this way, the memory swap memory pool may include one or more pieces of sixtieth memory. The memory swap processing may apply to the memory swap memory pool for the sixtieth memory again.

In an implementation, when no data block to be loaded into the cache block of the memory exists in the external storage; and no data block to be moved to the external storage exists in the cache block of the memory, the memory swap memory pool releases all sixtieth memory in the memory swap memory pool to the kernel system, that is, the kernel system reclaims all the sixtieth allocated memory.

In an implementation, if the sixtieth memory in the memory swap memory pool is greater than a specified threshold (for example, the specified threshold is a percentage, for example, 80%; for example, the specified threshold is a size of a data amount, for example, 2 MB), the memory swap memory pool releases some sixtieth memory in the memory swap memory pool to the kernel system In an example, some sixtieth memory that exceeds the specified threshold in the memory swap memory pool is released to the kernel system In another example, sixtieth memory in a specified range (for example, 40%) in the memory swap memory pool is released to the kernel system.

According to the memory management method provided in this embodiment of this application, in a memory swap process, after the data block is moved through the memory swap processing by using the memory allocated by the kernel system, the memory is temporarily put into the memory swap memory pool for re-use for the memory swap processing. After the memory swap process is completed, the memory allocated by the kernel system is released to the kernel system. This effectively reduces application to the kernel system for memory and release of memory to the kernel system, reduces a memory swap delay, and improves memory swap performance.

It may be understood that, to implement the foregoing functions, the electronic device includes a corresponding hardware structure and/or software module for performing each function. A person skilled in the art should be easily aware that units, algorithms, and steps in the examples described with reference to embodiments disclosed in this specification can be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

As shown in FIG. 7-7, an embodiment of this application discloses an electronic device 7-1400. The electronic device 7-1400 may specifically include one or more processors 7-1401, a memory 7-1402, one or more applications (not shown), one or more computer programs 7-1403, and a communications interface 7-1404. The foregoing components may be connected through one or more communications buses 7-1405. The one or more computer programs 7-1403 are stored in the memory 7-1402 and are configured to be executed by the one or more processors 7-1401. The one or more computer programs 7-1403 include instructions, and the instructions may be used to perform related steps in the foregoing embodiments. In an example, the electronic device 7-1400 may be the electronic device 7-100 in FIG. 7-1.

An embodiment of this application further provides a computer-readable storage medium. The computer-readable storage medium stores computer program code, and when a processor executes the computer program code, an electronic device performs the method in the foregoing embodiments.

An embodiment of this application further provides a computer program product. When the computer program product runs on a computer, the computer is enabled to perform the method in the foregoing embodiments.

The electronic device 7-1400, the computer-readable storage medium, and the computer program product provided in embodiments of this application each are configured to perform the corresponding method provided above. Therefore, for beneficial effects that can be achieved by the electronic device 7-1400, the computer-readable storage medium, and the computer program product, refer to the beneficial effects in the corresponding method provided above. Details are not described herein again.

Based on the foregoing descriptions of the implementations, a person skilled in the art may clearly understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division in an actual implementation. For example, a plurality of units or components may be combined or may be integrated into another apparatus, or some features may be ignored or not be performed. In addition, the displayed or discussed mutual coupling or direct coupling or communication connection may be implemented through some interfaces. The indirect coupling or communication connection between the apparatuses or units may be implemented in electrical, mechanical, or another form.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by an electronic device, wherein the method comprises:
opening a first process of a first application;
creating, in response to opening the first process of the first application and based on an application identifier corresponding to the first process, an application-level memory control group of the first application;
adding, to a first least recently used linked list of the application-level memory control group, a first anonymous page of the first application;
reclaiming, based on the first least recently used linked list, the first anonymous page;
adding, to a global least recently used linked list of a memory node, a file page of the first application; and
reclaiming, based on the global least recently used linked list, the file page.

2. The method of claim 1, further comprising at least one of:
managing, based on the application-level memory control group, the first anonymous page;
controlling, based on a status of the first application, a reclamation rank of the first anonymous page;
controlling, based on the application-level memory control group, a reclamation proportion of the first anonymous page, wherein the reclamation proportion is of a quantity of to-be-reclaimed anonymous pages in the first application to a total quantity of anonymous pages in the first application; or
controlling memory usage of the first application.

3. The method of claim 2, wherein controlling the reclamation rank comprises identifying, based on a frozen state, an active state, or a foreground state, the reclamation rank.

4. The method of claim 1, wherein creating the application-level memory control group comprises creating the application-level memory control group when a memory control group corresponding to the application identifier does not exist.

5. The method of claim 1, wherein when a memory control group corresponding to the application identifier exists, creating the application-level memory control group comprises:
adding the first process to the application-level memory control group; and
managing, based on the application-level memory control group, the first process.

6. The method of claim 1, further comprising:
creating, based on a whitelist and when the electronic device is started, a memory control group;
detecting, when a system process is started and based on a process name of the system process, whether the system process is a whitelist process; and
adding, when the system process is the whitelist process, the whitelist process to the memory control group.

7. The method of claim 6, further comprising:
adding a second anonymous page of the whitelist process to a second least recently used linked list of the memory control group; and
reclaiming, based on the second least recently used linked list, the second anonymous page.

8. The method of claim 6, further comprising:
adding, to the global least recently used linked list, a second file page of the whitelist process; and
reclaiming, based on the global least recently used linked list, the second file page.

9. The method of claim 1, wherein when a second process of the first application is started, the method further comprises:
adding, to a second least recently used linked list of a memory control group, a second anonymous page of the second process; and
adding, to the global least recently used linked list, a second file page of the second process.

10. The method of claim 9, further comprising deleting the first process or the second process from the application-level memory control group when the first process or the second process is destroyed.

11. The method of claim 9, further comprising deleting the application-level memory control group when the first application is destroyed.

12. The method of claim 1, further comprising:
adding the first anonymous page to an active least recently used linked list of the application-level memory control group when the first application obtains the first anonymous page; and
adding the file page to a global active least recently used linked list when the first application obtains the file page.

13. An apparatus, comprising:
a memory configured to store instructions; and
one or more processors coupled to the memory and configured to execute the instructions to:
open a first process of a first application;
create, in response to opening the first process of the first application and based on an application identifier corresponding to the first process, application, an application-level memory control group of the first application;
add, to a first least recently used linked list of the application-level memory control group, a first anonymous page of the first application;
reclaim, based on the first least recently used linked list, the first anonymous page;
add, to a global least recently used linked list of a memory node, a file page of the first application; and
reclaim, based on the global least recently used linked list, the file page.

14. The apparatus of claim 13, wherein the one or more processors are further configured to execute the instructions to:
manage, based on the application-level memory control group, the first anonymous page;
control, based on a status of the first application, a reclamation rank of the first anonymous page;
control, based on the application-level memory control group, a reclamation proportion of the first anonymous page; or
control memory usage of the first application.

15. The apparatus of claim 13, wherein the one or more processors are further configured to execute the instructions to create the application-level memory control group when a memory control group corresponding to the application identifier does not exist.

16. The apparatus of claim 15, wherein when the memory control group exists, the one or more processors are further configured to execute the instructions to:

add the first process to the application-level memory control group; and manage, based on the application-level memory control group, the first process.

17. A computer program product comprising instructions stored on a non-transitory computer-readable medium that, when executed by one or more processors, cause an electronic device to:

open a first process of a first application;

create, in response to opening the first process of the first application and based on an application identifier corresponding to the first process, an application-level memory control group of the first application;

add, to a first least recently used linked list of the application-level memory control group, a first anonymous page of the first application;

reclaim, based on the first least recently used linked list, the first anonymous page;

add, to a global least recently used linked list of a memory node, a file page of the first application; and reclaim, based on the global least recently used linked list, the file page.

18. The computer program product of claim 17, wherein the one or more processors are further configured to execute the instructions to:

manage, based on the application-level memory control group, the first anonymous page;

control, based on a status of the first application, a reclamation rank of the first anonymous page;

control, based on the application-level memory control group, a reclamation proportion of the first anonymous page, wherein the reclamation proportion is of a quantity of to-be-reclaimed anonymous pages in the first application to a total quantity of anonymous pages in the first application; or control memory usage of the first application.

19. A method implemented by an electronic device, wherein the method comprises:

opening a first application;

creating, in response to opening the first an application-level memory control group of the first application;

adding, to a first least recently used linked list of the application-level memory control group, a first anonymous page of the first application;

reclaiming, based on the first least recently used linked list, the first anonymous page;

adding, to a global least recently used linked list of a memory node, a file page of the first application;

reclaiming, based on the global least recently used linked list, the file page;

creating, based on a whitelist and when the electronic device is started, a memory control group;

detecting, when a system process is started and based on a process name of the system process, whether the system process is a whitelist process; and adding, when the system process is the whitelist process, the whitelist process to the memory control group.

20. The method of claim 19, wherein creating the application-level memory control group comprises:

starting a first process of the first application; and further creating, in response to starting the first process and based on an application identifier corresponding to the first process.

* * * * *